(12) United States Patent
Cosic

(10) Patent No.: US 10,528,570 B2
(45) Date of Patent: *Jan. 7, 2020

(54) SYSTEMS AND METHODS OF USING AN ARTIFICIALLY INTELLIGENT DATABASE MANAGEMENT SYSTEM AND INTERFACES FOR MOBILE, EMBEDDED, AND OTHER COMPUTING DEVICES

(71) Applicant: Jasmin Cosic, Miami, FL (US)

(72) Inventor: Jasmin Cosic, Miami, FL (US)

( * ) Notice: Subject to any disclaimer, the term of this patent is extended or adjusted under 35 U.S.C. 154(b) by 716 days.

This patent is subject to a terminal disclaimer.

(21) Appl. No.: 15/144,822

(22) Filed: May 3, 2016

(65) Prior Publication Data
US 2016/0246850 A1 Aug. 25, 2016

Related U.S. Application Data

(63) Continuation of application No. 13/962,948, filed on Aug. 8, 2013, now Pat. No. 9,367,806.

(51) Int. Cl.
*G06N 5/02* (2006.01)
*G06F 16/2457* (2019.01)
(Continued)

(52) U.S. Cl.
CPC ...... *G06F 16/24575* (2019.01); *G06F 3/0481* (2013.01); *G06F 3/04842* (2013.01); *G06F 3/167* (2013.01); *G06F 16/21* (2019.01); *G06F 16/2379* (2019.01); *G06F 16/252* (2019.01); *G06F 16/284* (2019.01); *G06F 16/8358* (2019.01); *G06N 5/02* (2013.01); *G06N 5/022* (2013.01); *G10L 15/26* (2013.01); *G10L 21/10* (2013.01)

(58) Field of Classification Search
CPC ...................................................... G06N 5/04

USPC ........................................................ 706/46
See application file for complete search history.

(56) References Cited

U.S. PATENT DOCUMENTS 4,862,390 A 8/1989 Weiner
5,121,470 A 6/1992 Trautman
(Continued)

OTHER PUBLICATIONS

Mittal et al ("QueRIE: A Query Recommender System supporting Interactive Database Exploration" 2010).*
(Continued)

*Primary Examiner* — Lut Wong

(57) ABSTRACT

The current disclosure generally relates to database management systems (DBMSs) and may be generally directed to methods and systems of using artificial intelligence (i.e. machine learning and/or anticipation functionalities, etc.) to learn a user's use of a DBMS, store this "knowledge" in a knowledgebase, and anticipate the user's future operating intentions. The current disclosure may also be generally directed to associative methods and systems of constructing DBMS commands. The current disclosure may also be generally directed to methods and systems of using a simplified DBMS command language (SDCL) for associative DBMS command construction. The current disclosure may also be generally directed to artificially intelligent methods and systems for associative DBMS command construction. The current disclosure may also be generally directed to methods and systems for associative DBMS command construction through voice input. Other methods, systems, features, elements and/or their embodiments are also disclosed.

20 Claims, 45 Drawing Sheets

(51) Int. Cl.

| | |
|---|---|
| *G06F 16/21* | (2019.01) |
| *G06F 16/25* | (2019.01) |
| *G06F 16/28* | (2019.01) |
| *G06F 16/23* | (2019.01) |
| *G06F 16/835* | (2019.01) |
| *G06F 3/0481* | (2013.01) |
| *G06F 3/0484* | (2013.01) |
| *G06F 3/16* | (2006.01) |
| *G10L 15/26* | (2006.01) |
| *G10L 21/10* | (2013.01) |

(56) References Cited

U.S. PATENT DOCUMENTS

| | | |
|---|---|---|
| 5,185,857 A | 2/1993 | Rozmanith et al. |
| 5,533,029 A | 7/1996 | Gardner |
| 5,544,222 A | 8/1996 | Robinson et al. |
| 5,598,534 A | 1/1997 | Haas |
| 5,812,117 A | 9/1998 | Moon |
| 5,956,637 A | 9/1999 | Ericsson et al. |
| 6,087,952 A | 7/2000 | Prabhakaran |
| 6,122,527 A | 9/2000 | Robinson et al. |
| 6,128,012 A | 10/2000 | Seidensticker, Jr. et al. |
| 6,202,060 B1 | 3/2001 | Tran |
| 6,226,665 B1 | 5/2001 | Deo et al. |
| 6,493,717 B1 | 12/2002 | Junkin |
| 6,549,625 B1 | 4/2003 | Rautila et al. |
| 6,636,873 B1 | 10/2003 | Carini et al. |
| 6,654,762 B2 | 11/2003 | Cheng et al. |
| 6,795,706 B1 | 9/2004 | Cheng |
| 6,832,084 B1 | 12/2004 | Deo et al. |
| 6,871,068 B1 | 3/2005 | O'Neil |
| 6,879,989 B2 | 4/2005 | Cheng et al. |
| 6,889,139 B2 | 5/2005 | Prabhakaran |
| 6,895,234 B1 | 5/2005 | Laursen et al. |
| 6,959,436 B2 | 10/2005 | Peng |
| 7,113,946 B2 | 9/2006 | Cosic |
| 7,117,225 B2 | 10/2006 | Cosic |
| 7,328,030 B2 | 2/2008 | Laursen et al. |
| 7,444,143 B2 | 10/2008 | Deo et al. |
| 7,450,962 B2 | 11/2008 | Kim |
| 7,483,905 B2 | 1/2009 | Gauweiler |
| 7,523,112 B2 | 4/2009 | Hassan et al. |
| 7,685,127 B2 | 3/2010 | Gauweiler |
| 7,756,525 B1 | 7/2010 | Thomas et al. |
| 7,756,829 B2 | 7/2010 | Bhanote |
| 7,779,029 B2 | 8/2010 | Neil |
| 7,805,397 B2 | 9/2010 | Kurian et al. |
| 7,813,714 B2 | 10/2010 | Laursen et al. |
| 7,831,554 B2 | 11/2010 | Schreter et al. |
| 7,865,924 B2 | 1/2011 | Teegan et al. |
| 7,885,635 B2 | 2/2011 | Laursen et al. |
| 7,945,687 B2 | 5/2011 | Kim |
| 7,958,270 B2 | 6/2011 | Sidon |
| 8,031,694 B2 | 10/2011 | Gidron et al. |
| 8,041,372 B1 | 10/2011 | Minns et al. |
| 8,099,332 B2 | 1/2012 | Lemay et al. |
| 8,103,272 B2 | 1/2012 | Williamson |
| 8,145,663 B2 | 3/2012 | Meng |
| 8,190,645 B1 | 5/2012 | Bashaw |
| 8,204,911 B2 | 6/2012 | Neil |
| 8,214,409 B2 | 7/2012 | O'Farrell et al. |
| 8,266,187 B2 | 9/2012 | Mercer et al. |
| 8,290,898 B2 | 10/2012 | Bowlus et al. |
| 8,291,408 B1 | 10/2012 | Czymontek |
| 8,335,805 B2 | 12/2012 | Cosic |
| 8,359,223 B2 | 1/2013 | Chi et al. |
| 8,401,539 B2 | 3/2013 | Beenau et al. |
| 8,412,150 B2 | 4/2013 | Louch |
| 8,417,740 B2 | 4/2013 | Cosic |
| 9,318,108 B2 * | 4/2016 | Gruber ................ G06F 17/3087 |
| 2001/0044732 A1 | 11/2001 | Maus et al. |
| 2002/0078209 A1 | 1/2002 | Peng |
| 2002/0161735 A1 | 10/2002 | Cheng et al. |
| 2002/0174189 A1 | 11/2002 | Peng |
| 2003/0046451 A1 | 3/2003 | Prabhakaran |
| 2003/0065662 A1 | 4/2003 | Cosic |
| 2004/0010699 A1 | 1/2004 | Shao et al. |
| 2004/0049476 A1 | 3/2004 | Sai et al. |
| 2004/0098394 A1 | 5/2004 | Merritt et al. |
| 2004/0128327 A1 | 7/2004 | Shi et al. |
| 2004/0203845 A1 | 10/2004 | Lal |
| 2004/0224675 A1 | 11/2004 | Puskoor et al. |
| 2004/0229595 A1 | 11/2004 | Laursen et al. |
| 2004/0249785 A1 | 12/2004 | Gauweiler |
| 2004/0249857 A1 | 12/2004 | Gauweiler |
| 2005/0044165 A1 | 2/2005 | O'Farrell et al. |
| 2005/0076069 A1 | 4/2005 | Deo et al. |
| 2005/0086203 A1 | 4/2005 | Gauweiler |
| 2005/0149517 A1 | 7/2005 | Cosic |
| 2005/0149542 A1 | 7/2005 | Cosic |
| 2005/0289105 A1 | 12/2005 | Cosic |
| 2006/0136454 A1 | 6/2006 | Tchouati et al. |
| 2006/0212846 A1 | 9/2006 | O'Farrell et al. |
| 2007/0136264 A1 | 1/2007 | Tran |
| 2007/0049246 A1 | 3/2007 | Schreter et al. |
| 2007/0291757 A1 | 12/2007 | Dobson et al. |
| 2008/0005054 A1 | 1/2008 | Kurian et al. |
| 2008/0039062 A1 | 2/2008 | Laursen et al. |
| 2008/0040782 A1 | 2/2008 | Laursen et al. |
| 2008/0045205 A1 | 2/2008 | Park et al. |
| 2008/0086481 A1 | 4/2008 | Kim |
| 2008/0091763 A1 | 4/2008 | Devonshire et al. |
| 2008/0126403 A1 | 5/2008 | Moon |
| 2008/0172274 A1 | 7/2008 | Hurowitz et al. |
| 2008/0189250 A1 | 8/2008 | Cha et al. |
| 2008/0281825 A1 | 11/2008 | Meng |
| 2009/0070149 A1 | 3/2009 | Kurian et al. |
| 2009/0106360 A1 | 4/2009 | Peng et al. |
| 2009/0176529 A1 | 7/2009 | Warren et al. |
| 2009/0201908 A1 | 8/2009 | Gidron et al. |
| 2009/0217375 A1 | 8/2009 | Joosten et al. |
| 2009/0254594 A1 | 10/2009 | Burchall |
| 2009/0275331 A1 | 11/2009 | Maitreya et al. |
| 2010/0023531 A1 | 1/2010 | Brisebois et al. |
| 2010/0023541 A1 | 1/2010 | Cosic |
| 2010/0077468 A1 | 3/2010 | Pragides et al. |
| 2010/0082536 A1 | 4/2010 | Cosic |
| 2010/0088316 A1 | 4/2010 | Robinson et al. |
| 2010/0159903 A1 | 6/2010 | Goldman-Shenhar |
| 2010/0223228 A1 | 9/2010 | Logan et al. |
| 2010/0257376 A1 | 10/2010 | Little et al. |
| 2010/0278162 A1 | 11/2010 | Groux et al. |
| 2011/0010344 A1 | 1/2011 | Sjogren |
| 2011/0016089 A1 | 1/2011 | Freedman et al. |
| 2011/0106448 A1 | 5/2011 | Widmann et al. |
| 2011/0119758 A1 | 5/2011 | Uterhardt et al. |
| 2011/0145210 A1 | 6/2011 | Rathinam et al. |
| 2011/0145242 A1 | 6/2011 | Mehrotra et al. |
| 2011/0161290 A1 | 6/2011 | Waterman et al. |
| 2011/0258345 A1 | 10/2011 | Bhanote |
| 2011/0314482 A1 | 12/2011 | Cupala et al. |
| 2012/0016901 A1 | 1/2012 | Agarwal et al. |
| 2012/0101993 A1 | 4/2012 | Wong |
| 2012/0131116 A1 | 5/2012 | Tu et al. |
| 2012/0159393 A1 | 6/2012 | Sethi |
| 2012/0173485 A1 | 7/2012 | Kothule et al. |
| 2012/0183221 A1 | 7/2012 | Alasry et al. |
| 2012/0209925 A1 | 8/2012 | Lee et al. |
| 2012/0209948 A1 | 8/2012 | Tenenblat et al. |
| 2013/0036089 A1 | 2/2013 | Lucas |
| 2013/0198171 A1 | 8/2013 | Shah et al. |

OTHER PUBLICATIONS

Tim Paek, Bongshin Lee, Bo Thiesson, Designing Phrase Builder: A Mobile Real-Time Query Expansion Interface, 2009, 10 pages, Microsoft Research.

* cited by examiner

Operation/Instruction Set List — 510

| Operation/Instruction Set n | | | | | | |
|---|---|---|---|---|---|---|
| SELECT | Col1, Col2 ... | FROM Tbl1, Tbl2 ... | WHERE Col1 Operator1 Val1 AND Col2 Operator2 Val2 ... | ORDER BY Col1, Col2 ... | GROUP BY Col1, Col2 ... — 630 | Time Stamp ... |

620 — 610

Operation/Instruction Set n-1
| DELETE FROM Tbl | WHERE Col1 Operator1 Val1 AND Col2 Operator2 Val2 ... | Time Stamp ... |

Operation/Instruction Set n-2
| UPDATE Tbl | SET Col1=Val1, Col2=Val2 ... | WHERE Col1 Operator1 Val1 AND Col2 Operator2 Val2 ... | Time Stamp ... |

Operation/Instruction Set n-3
| INSERT INTO Tbl Col1, Col2 ... | VALUES Val1, Val2 ... | Time Stamp ... |

Operation/Instruction Set n-4
| SELECT | Col1, Col2 ... | FROM Tbl1, Tbl2 ... | WHERE Col1 Operator1 Val1 AND Col2 Operator2 Val2 ... | ORDER BY Col1, Col2 ... | GROUP BY Col1, Col2 ... | Time Stamp ... |

Operation/Instruction Set n-5
| DELETE FROM Tbl | WHERE Col1 Operator1 Val1 AND Col2 Operator2 Val2 ... | Time Stamp ... |

Operation/Instruction Set n-6
| UPDATE Tbl | SET Col1=Val1, Col2=Val2 ... | WHERE Col1 Operator1 Val1 AND Col2 Operator2 Val2 ... | Time Stamp ... |

Operation/Instruction Set n-7
| INSERT INTO Tbl Col1, Col2 ... | VALUES Val1, Val2 ... | Time Stamp ... |

Operation/Instruction Set n-8
| CREATE TABLE Tbl Col1 Type1, Col2 Type1 ... | ... |

Operation/Instruction Set n-m
| ... | ... | ... | ... | ... | ... |

FIG. 7

SYSTEMS AND METHODS OF USING AN ARTIFICIALLY INTELLIGENT DATABASE MANAGEMENT SYSTEM AND INTERFACES FOR MOBILE, EMBEDDED, AND OTHER COMPUTING DEVICES

CROSS REFERENCE TO RELATED APPLICATION

This application is a continuation of, and claims priority under 35 U.S.C. § 120 from, nonprovisional U.S. patent application Ser. No. 13/962,948 entitled "SYSTEMS AND METHODS OF USING AN ARTIFICIALLY INTELLIGENT DATABASE MANAGEMENT SYSTEM AND INTERFACES FOR MOBILE, EMBEDDED, AND OTHER COMPUTING DEVICES", issued as U.S. Pat. No. 9,367,806, filed on Aug. 8, 2013. The disclosure of the foregoing document is incorporated herein by reference.

FIELD OF THE INVENTION

The current disclosure generally relates to database management systems. More specifically, the present disclosure is generally directed to systems and methods for database management systems and their applications on mobile, embedded, and other computing devices and applications.

BACKGROUND

As processing power and memory become more affordable and compact, mobile, embedded, and other computing devices are being designed to include greater functionality. For instance, today's mobile, embedded, and other computing devices such as cellular-enabled computing devices (i.e. Smartphones, etc.) may comprise various applications for the users in addition to the basic telephonic functionality.

On the other hand, database management systems (DBMSs) are often used on conventional systems for storing, managing and/or manipulating structured data by inputting often complicated, complex and lengthy DBMS related instructions to be executed by the DBMS to perform operations on data stored in databases or on databases themselves. As such, operating the DBMS may often be a time consuming task, reserved for expensive and well-trained DBMS operators, thereby also incurring additional cost in order to perform operations on the data.

SUMMARY OF THE INVENTION

As DBMSs are traditionally reserved for execution on conventional database servers, personal desktop computers, or other more traditional computing devices, most DBMS management platforms count on the user to be very well versed in DBMS operation and commands in addition to having readily available a keyboard and a mouse for input, a full size display for output, and plentiful processing power with a permanent network connection and a plethora of bandwidth for operation. Such conditions however, should not be assumed for mobile and embedded computing device operations in which a user may not have access to a full size display, mouse or a standard keyboard in order to operate a DBMS. Furthermore, an average user of a mobile device may not be highly-trained in DBMS operation, and yet may need to operate a DBMS or a DBMS application. Therefore, in order to accommodate such a user of a mobile or embedded device to more efficiently and conveniently operate a DBMS via the mobile or embedded device platform, new approaches to DBMS design, functioning, and interfacing are herein introduced, enabling the user to realize the benefits of modern DBMS applications, while utilizing a new advanced DBMS operating functionalities presented below. To that extent, the present disclosure provides solutions to the at least aforementioned issues by providing advanced DBMS application functionalities accessible via mobile, embedded, and other computing devices that allow a user to utilize these functionalities on the go.

Concerning the advanced functionalities, the current disclosure discloses artificial intelligence (i.e. machine learning and/or anticipation functionalities, etc.) to learn the user's use of the DBMS, store this "knowledge" in a knowledge-base, and anticipate the user's future operating intentions with minimal or no user input. With respect to user interfacing, the current disclosure discloses an associative method of constructing DBMS commands, a simplified DBMS command language (SDCL) for associative DBMS command construction, and an artificially intelligent method for associative DBMS command construction. Also, the current disclosure discloses a method associative DBMS command construction through voice input.

In one aspect, the present disclosure relates to an interface for an artificially intelligent database management system. In some embodiments, an interface of a database management system may be operating on a mobile device. The interface may be configured to receive a sequence of instruction sets. Each instruction set may be for performing an operation on data stored in a database. The sequence of instruction sets may comprise a first instruction set followed by a second instruction set. The interface may disassemble the first instruction set into a first plurality of portions and the second instruction set into a second plurality of portions. The interface may perform one or more database operations corresponding to the first instruction set followed by the operations corresponding to the second instruction set. The interface may receive a new instruction set for performing an operation on data stored in a database. The interface may disassemble the new instruction set into a new plurality of portions for comparing the new plurality of portions with the first plurality of portions and the second plurality of portions. The interface may also select to display on the mobile device the second instruction set, as an option to be selected by a user, responsive to a determination that the portions of the new instruction set substantially match the portions of the first instruction set and that the second instruction set follows in sequence the first instruction set.

In another aspect, the present disclosure relates to a system accessed from a mobile device. The system may include a database management system (DBMS) configured to store a sequence of instruction sets, where each instruction set is for performing an operation on data stored in a database, and the sequence of instruction sets comprises a first instruction set followed by a second instruction set, and the first instruction set comprises a first plurality of portions and the second instruction set comprises the second plurality of portions. The DBMS may also be configured to receive a new instruction set for performing an operation on a database and to disassemble the new instruction set into a new plurality of portions for comparing the new plurality of portions with the first plurality of portions and the second plurality of portions. The DBMS may also be configured to compare one or more of the new plurality of portions of the new instruction set with one or more of the first plurality of portions of the first instruction set. The DBMS may further be configured to transmit to the mobile device a second instruction set, as an option to be selected by a user, responsive to a determination that the portions of the new instruction set substantially match the portions of the first instruction set and that the second instruction set follows in sequence the first instruction set.

In one aspect, the present disclosure relates to an interface for a database management system (DBMS). In some embodiments, an interface of a database management system may be operating on a mobile device. The interface may be configured to receive, from the DBMS, a plurality of collections of instruction set portions for assembling instruction sets for performing operations on a database. The interface may associate each of a plurality of keys of a mobile device with each of a plurality of instruction set portions from a first collection from the plurality of collections. The interface may display on the mobile device, for a selection by a user, the plurality of instruction set portions from the first collection. The interface may receive, from a database management system (DBMS), a first portion of a new instruction set assembled using a first instruction set portion from the plurality of instruction set portions from the first collection, the first instruction set portion selected by the user. The interface may re-associate each of the plurality of keys of the mobile device with each of a plurality of instruction set portions from a second collection from the plurality of collections. The interface may display on the mobile device, for a selection by the user, the plurality of instruction set portions from the second collection. The interface may receive, from the DBMS, a second portion of the new instruction set, the second portion assembled to follow the first portion of the new instruction set, the second portion of the new instruction set assembled using a second instruction set portion from the plurality of instruction set portions from the second collection, the second instruction set portion selected by the user. The interface may re-associate each of the plurality of keys of the mobile device with each of a plurality of instruction set portions from a third collection from the plurality of collections. The interface may display on the mobile device, for a selection by the user, the plurality of instruction set portions from the third collection. The interface may receive, from the DBMS, a third portion of the new instruction set, the third portion assembled to follow the second portion of the new instruction set, the third portion of the new instruction set assembled using a third instruction set portion from the plurality of instruction set portions from the third collection, the third instruction set portion selected by the user.

In another aspect, the present disclosure relates to a system accessed from a mobile device. The system may include a database management system (DBMS) configured to maintain a plurality of collections of instruction set portions for assembling instruction sets for performing operations on a database. The DBMS may also be configured to assemble, by the DBMS, a first portion of a new instruction set using a first instruction set portion from a plurality of instruction set portions from a first collection, the first instruction set portion selected via a mobile device key associated with the first instruction set portion. The DBMS may also be configured to assemble, by the DBMS, a second portion of the new instruction set using a second instruction set portion from a plurality of instruction set portions from a second collection, the second instruction set portion selected via a mobile device key associated with the second instruction set portion, the second portion of the new instruction set following the first portion of the new instruction set. The DBMS may further be configured to assemble, by the DBMS, a third portion of the new instruction set using a third instruction set portion from a plurality of instruction set portions from a third collection, the third instruction set portion selected via a mobile device key associated with the third instruction set portion, the third portion of the new instruction set following the second portion of the new instruction set.

In one aspect, the present disclosure relates to an interface for a database management system. In some embodiments, an interface of a database management system may be operating on a mobile device. The interface may be configured to receive, from the DBMS, a plurality of collections of instruction set portions for assembling instruction sets for performing operations on a database. The interface may associate each of a plurality of user phrases with each of a plurality of instruction set portions from a first collection from the plurality of collections. The interface may display on the mobile device, for a selection by a user, the plurality of instruction set portions from the first collection. The interface may receive, from a database management system (DBMS), a first portion of a new instruction set assembled using a first instruction set portion from the plurality of instruction set portions from the first collection, the first instruction set portion selected by the user. The interface may re-associate each of the plurality of user phrases with each of a plurality of instruction set portions from a second collection from the plurality of collections. The interface may display on the mobile device, for a selection by the user, the plurality of instruction set portions from the second collection. The interface may receive, from the DBMS, a second portion of the new instruction set, the second portion assembled to follow the first portion of the new instruction set, the second portion of the new instruction set assembled using a second instruction set portion from the plurality of instruction set portions from the second collection, the second instruction set portion selected by the user. The interface may re-associate each of the plurality of user phrases with each of a plurality of instruction set portions from a third collection from the plurality of collections. The interface may display on the mobile device, for a selection by the user, the plurality of instruction set portions from the third collection. The interface may receive, from the DBMS, a third portion of the new instruction set, the third portion assembled to follow the second portion of the new instruction set, the third portion of the new instruction set assembled using a third instruction set portion from the plurality of instruction set portions from the third collection, the third instruction set portion selected by the user.

In another aspect, the present disclosure relates to a system accessed from a mobile device. The system may include a database management system (DBMS) configured to maintain a plurality of collections of instruction set portions for assembling instruction sets for performing operations on a database. The DBMS may also be configured to assemble, by the DBMS, a first portion of a new instruction set using a first instruction set portion from a plurality of instruction set portions from a first collection, the first instruction set portion selected on a mobile device via a user phrase associated with the first instruction set portion: The DBMS may also be configured to assemble, by the DBMS, a second portion of the new instruction set using a second instruction set portion from a plurality of instruction set portions from a second collection, the second instruction set portion selected on a mobile device via a user phrase associated with the second instruction set portion, the second portion of the new instruction set following the first portion of the new instruction set. The DBMS may further be configured to assemble, by the DBMS, a third portion of the new instruction set using a third instruction set portion from a plurality of instruction set portions from a third collection, the third instruction set portion selected on a mobile device via a user phrase associated with the third instruction set portion, the third portion of the new instruction set following the second portion of the new instruction set.

In one aspect, the present disclosure relates to an interface for an artificially intelligent database management system, in some embodiments, an interface of a database management system may be operating on a mobile device. The interface may be configured to receive a sequence of instruction set portions of an instruction set for performing an operation on data stored in a database. The sequence of instruction set portions may comprise a first instruction set portion followed by a second instruction set portion. The interface may receive a new instruction set portion of a new instruction set for performing an operation on data stored in a database. The interface may compare the new instruction set portion with the first instruction set portion and the second instruction set portion. The interface may also select to display on the mobile device the second instruction set portion, as an option to be selected by a user, responsive to a determination that the new instruction set portion substantially match the first instruction set portion and that the second instruction set portion follows in sequence the first instruction set portion.

In another aspect, the present disclosure relates to a system accessed from a mobile device. The system may include a database management system (DBMS) configured to store a sequence of instruction set portions of an instruction set for performing an operation on data stored in a database, and the sequence of instruction set portions comprises a first instruction set portion followed by a second instruction set portion. The DBMS may also be configured to receive a new instruction set portion of a new instruction set for performing an operation on a database. The DBMS may also be configured to compare the new instruction set portion with the first instruction set portion and the second instruction set portion. The DBMS may further be configured to transmit to the mobile device the second instruction set portion, as an option to be selected by a user, responsive to a determination that the new instruction set portion substantially matches the first instruction set portion and that the second instruction set portion follows in sequence the first instruction set portion.

In one aspect, the present disclosure relates to an interface for an artificially intelligent database management system. In some embodiments, an interface of a database management system may be operating on a mobile device. The interface may be configured to receive a first portion of a new instruction set for performing an operation on data stored in a database and a second portion of the new instruction set for performing the operation on data stored in the database. The interface may disassemble the first and the second portions of the new instruction set for comparing the first and the second portions with a stored plurality of instruction sets. The interface may also select to display on the mobile device, a third portion of a first instruction set of the stored plurality of instruction sets, responsive to a determination that the first instruction set includes a first portion that substantially matches the first portion of the new instruction set and a second portion that substantially matches the second portion of the new instruction set. The interface may further be configured to select to display on the mobile device, the third portion of a first instruction set, responsive to a further determination that the third portion of the first instruction set follows the first portion of the first instruction set and the second portion of the first instruction set.

In another aspect, the present disclosure relates to a system accessed from a mobile device. The system may include a database management system (DBMS) configured to store one or more instruction sets, each instruction set of the stored one or more instruction sets including instructions for an operation to be performed on data stored in one or more databases. The DBMS may also be configured to receive, from an interface for the DBMS, a first portion of a new instruction set for performing an operation on data stored in a database and a second portion of the new instruction set for performing the operation on data stored in the database. The DBMS may also be configured to compare the first and the second portions of the new instruction set with instruction sets from the one or more stored instruction sets: The DBMS may further be configured to transmit, to the interface, a third portion of a first instruction set of the stored plurality of instruction sets in response to a determination that the first portion of the first instruction set substantially matches the first portion of the new instruction set and that the second portion of the first instruction set substantially matches the second portion of the new instruction set. The DBMS may further be configured to transmit, to the interface, the third portion of a first instruction set, responsive to a further determination that that the third portion of the first instruction set follows the first portion of the first instruction set and the second portion of the first instruction set.

In one aspect, the present disclosure relates to a system for interfacing with a database management system. The system may include an interface of a database management system operating on a mobile device. The interface may be configured to receive a first portion of a new instruction set for performing an operation on data stored in a database and a second portion of the new instruction set for performing the operation on data stored in the database. The interface may also be configured to disassemble the first and the second portions of the new instruction set for comparing the first and the second portions with a stored plurality of instruction sets. The interface may further be configured to select to display on the mobile device, a first instruction set of the stored plurality of instruction sets. The selection to display on the mobile device of the first instruction set may be responsive to a determination that the first instruction set includes portions that substantially match the first and the second portions of the new instruction set.

In some embodiments, the interface is further configured to select to display on the mobile device, a second instruction set of the stored plurality of instruction sets. The second instruction set may be selected to be displayed responsive to a determination that the second instruction set includes portions that substantially match the first and the second portions of the new instruction set. In further embodiments, the interface is also configured to receive a third portion of the new instruction set for performing the operation on data stored in the database. The interface may also be configured to disassemble the third portion of the new instruction set for comparing the first, the second and the third portions with a stored plurality of instruction sets and to select for display on the mobile device, a third instruction set of the stored plurality of instruction sets, responsive to a determination that the third instruction set includes portions that substantially match the first, the second and the third portions of the new instruction set. The interface may also be configured to select to display the third instruction set as a preferred option for a user's selection with respect to the first instruction set and the second instruction set.

In some embodiments, the interface is further configured to select to display on the mobile device, the first instruction set, responsive to receiving the determination from the database management system. In certain embodiments, the interface is further configured to select to display on the mobile device the first instruction set as an option to be selected by a user. In some embodiments, the interface is further configured to transmit the first instruction set for execution by the database management system, responsive to a user's selection of the first instruction set. In yet some embodiments, the interface is further configured to select to display on the mobile device the first instruction set prior to receiving, by the interface, a final portion of the new instruction set, the final portion following at least the first and the second portions of the new instruction set. In certain embodiments, the interface is further configured to receive instructions for the database management system to operate on data in the database. In further embodiment, the interface is further configured to disassemble the new instruction set into a plurality of portions, including the first portion and the second portion, as the new instruction set is being received by the interface.

In some embodiments, each of the stored plurality of instruction sets include a different set of instructions for operating, by the database management system, on data stored in one or more databases. In some embodiments, the stored plurality of instruction sets comprise instruction sets previously entered by one or more users via the interface, the instruction sets for instructing the database management system to perform operations on data stored in one or more databases. In further embodiments, the stored plurality of instruction sets comprise instruction sets previously entered by a plurality of different users via a plurality of interfaces, the instruction sets for instructing the database management system to perform operations on data stored in one or more databases.

In some embodiments, the operation on data stored in a database comprises one of, or a combination of: accessing, modifying, creating or deleting a database. In some embodiments, the operation on data stored in a database comprises one of, or a combination of: accessing, modifying, creating or deleting a table of a database. In some embodiments, the operation on data stored in a database comprises one of, or a combination of: accessing, modifying, creating or deleting of a row, column, or cell within a table of a database. In some embodiments, the operation on data stored in a database comprises one of, or a combination of: accessing, modifying, creating or deleting a report/view, relation, user account, and/or other objects in a DBMS.

In some aspects, the present disclosure relates to a non-transitory computer readable medium storing a program causing a computer to execute an interface for a database management system. The program may comprise an interface for a database management system configured to: receive a first portion of a new instruction set for performing an operation on data stored in a database, receive a second portion of the new instruction set for performing the operation on data stored in the database, disassemble the first and the second portions of the new instruction set for comparing the first and the second portions with a stored plurality of instruction sets, and select to display on the mobile device, a first instruction set of the stored plurality of instruction sets, responsive to a determination that the first instruction set includes portions that substantially match the first and the second portions of the new instruction set.

In some aspects, the present disclosure relates to a non-transitory computer readable medium storing a program causing a computer to execute a database management system. The program may comprise a database management system (DBMS) configured to: store one or more instruction sets, each instruction set of the stored one or more instruction sets including instructions for an operation to be performed on data stored in one or more databases, receive, from an interface for the DBMS, a first portion of a new instruction set for performing an operation on data stored in a database and a second portion of the new instruction set for performing the operation on data stored in the database, compare the first and the second portions of the new instruction set with instruction sets from the one or more stored instruction sets, and transmit, to the interface, a first instruction set of the stored plurality of instruction sets in response to a determination that the first and the second portions of the new instruction set substantially match portions of the first instruction set.

In some aspects, the present disclosure relates to a system accessed from a mobile device. The system may include a database management system (DBMS). The DBMS may be configured to store one or more instruction sets, each instruction set of the stored one or more instruction sets including instructions for an operation to be performed on data stored in one or more databases. The DBMS may be configured to receive, from an interface for the DBMS, a first portion of a new instruction set for performing an operation on data stored in a database and a second portion of the new instruction set for performing the operation on data stored in the database. The DBMS may also be configured to compare the first and the second portions of the new instruction set with instruction sets from the one or more stored instruction sets. The DBMS may further be configured to transmit, to the interface, a first instruction set of the stored plurality of instruction sets in response to a determination that the first and the second portions of the new instruction set substantially match portions of the first instruction set.

In some embodiments, the DBMS is further configured to receive, from the interface, a third portion of the new instruction set for performing the operation on data stored in the database. In further embodiments, the DBMS is also configured to compare the first, the second and the third portions of the new instruction set with instruction sets from the one or more stored instruction sets and to transmit to the interface, a second instruction set of the stored plurality of instruction sets, responsive to a determination that the first, second and third portions of the new instruction set substantially match portions of the second instruction set.

In some embodiments, the DBMS is further configured to store an instruction set previously entered via the interface as an instruction set of the one or more stored instruction sets. In further embodiments, the DBMS is further configured to execute the first instruction set responsive to a selection by the user. In some embodiments, the DBMS is further configured transmit, to the interface, a second instruction set of the one or more stored instruction sets responsive to a determination that the first and the second portions of the new instruction set substantially match portions of the second instruction set.

In some embodiments, the DBMS is further configured to transmit, to the interface, the first instruction set prior to receiving, by the interface, a final portion of the new instruction set, the final portion following at least the first and the second portions of the new instruction set: in some embodiments; the one or more stored instruction sets comprise instruction sets previously entered by one or more users, via the interface, to instruct the DBMS to perform operations on one or more databases. In yet further embodiments, the one or more stored instruction sets comprise instruction sets previously entered by a plurality of different users via a plurality of interfaces to instruct the DBMS to perform operations on one or more databases.

In still some embodiments, the operation on data stored in the database comprises one of or a combination of: accessing, modifying, creating or deleting of an entry within a table of the database. In further embodiments, the operation on data stored in the database comprises one of: accessing, modifying, creating or deleting a table of the database. In still further embodiments, the operation on data stored in the database comprises one of: accessing, modifying, creating or deleting the database.

In certain aspects, the present disclosure relates to systems and methods for using a mobile processing system for anticipating instructions of a user for implementation via a DBMS. The systems and methods may include and utilize an artificially intelligent database management system (AI DBMS), an interface through which a user can input AI DBMS operating instructions, a disassembling unit for disassembling the AI DBMS operating instructions, and a maintained list of the user's past operating instructions that includes various past AI DBMS instructions. The system may structure the user's past AI DBMS operating instructions as knowledge of the user's use of the AI DBMS and store them along with other stored prior AI DBMS operating instructions in a knowledgebase. The system may then anticipate the user's future operating intentions based on the knowledgebase, and assemble the AI DBMS operating instructions based on the anticipating.

In some embodiments, the AI DBMS comprises an underlying DBMS through which the user can perform one or more of accessing, managing and/or manipulating a data. In some embodiments, performing operations on data in a database includes one or more of accessing, managing and/or manipulating data. For example, accessing, managing and/or manipulating data may include one or more of, or a combination of: (1) accessing, creating, altering, and deleting one or more a database within the underlying DBMS; (2) accessing, creating, altering, and deleting one or more a table within the one or more database; (3) accessing, creating, altering, deleting, searching, sorting and rearranging one or more a column, a row, and a data cell within the one or more table; (4) accessing, creating, altering, and deleting one or more a report/view within the one or more the database; (5) accessing, creating, altering, and deleting one or more a relation among the one or more the table and/or the report/view; and (6) accessing, creating, altering, and deleting one or more a user account and its privileges.

In some embodiments, the interface through which a user can input AI DBMS operating instructions includes a means of inputting one or more of alphanumeric, acoustic, tactile, and visual operating instructions. In further embodiments, the AI DBMS operating instructions includes a structured query language (SQL) statement. In some embodiments, the disassembling of the AI DBMS operating instructions includes disassembling a structured query language (SQL) statement into its instruction set portions, which may also be referred to as the instruction set portions. In some embodiments, the maintaining a list of the user's past operating instructions includes a data structure for storing a specific number of the user's past operating instructions. In some embodiments, structuring the user's past AI DBMS operating instructions as knowledge of the user's use of the AI DBMS includes creating a knowledge cell (1) in which some of the user's past AI DBMS operating instructions are copied into the knowledge cell's anticipatory operating instructions, and (2) in which some of the user's past AI DBMS operating instructions are copied into the knowledge cell's comparative operating instructions: In some embodiments, the entries in such knowledge cells may then be used for anticipating instruction sets which the user is intending to implement, by comparing the user's recently implemented instruction sets against the stored prior instruction sets from the knowledge cells in the knowledgebase. In other embodiments, the entries in such knowledge cells may then be used for anticipating the instruction set which the user is intending to input, by comparing the instruction set portions being inputted against the stored prior instruction sets from the knowledge cells in the knowledgebase. In yet other embodiments, the entries in such knowledge cells may then be used for anticipating the instruction set portions which the user is intending to input, by comparing the instruction set portions being inputted against the stored prior instruction set portions from the knowledge cells in the knowledgebase.

In some embodiments, storing the knowledge of the user's use of the AI DBMS instructions in a knowledgebase includes a data structure for storing the knowledge cells. The knowledgebase may include local or remote knowledgebases into which the instruction sets can be stored. In some embodiments, anticipating of the user's operating intentions based on the knowledgebase information includes performing a substantial similarity comparison between the user's recently implemented operating instructions and the operating instructions in the knowledgebase. In other embodiments, anticipating of the user's operating intentions based on the knowledgebase information includes performing a substantial similarity comparison between the user's recently inputted portions of an operating instruction and the operating instructions in the knowledgebase. In yet other embodiments, anticipating of the user's operating intentions based on the knowledgebase information includes performing a substantial similarity comparison between the user's recently inputted portions of an operating instruction and the portions of operating instructions in the knowledgebase. In some embodiments, the assembling AI DBMS operating instructions based on the anticipating includes assembling a structured query language (SQL) statement from its instruction set portions.

In some aspects, the present disclosure relates to a non-transient machine readable medium that stores executable instructions, the executable instructions causing a machine to perform operations comprising: defining an artificially intelligent database management system (AI DBMS), generating an interface through which a user can input AI DBMS operating instructions, disassembling the AI DBMS operating instructions, maintaining a list of the user's past operating instructions, structuring the user's past AI DBMS operating instructions as knowledge of the user's use of the AI DBMS, storing the knowledge of the user's use of the AI DBMS in a knowledgebase, determining the user's intended AI DBMS operating instructions based on comparing the user's recent AI DBMS operating instructions and the data stored in the knowledgebase, and assembling the intended AI DBMS operating instruction set based on the comparison.

Other features and advantages of the current disclosure will become apparent from the following description, including the claims and drawings.

BRIEF DESCRIPTION OF THE DRAWINGS

FIG. 7 is a diagram showing an embodiment of Operation/instruction Set List 510.

Figure 1A:
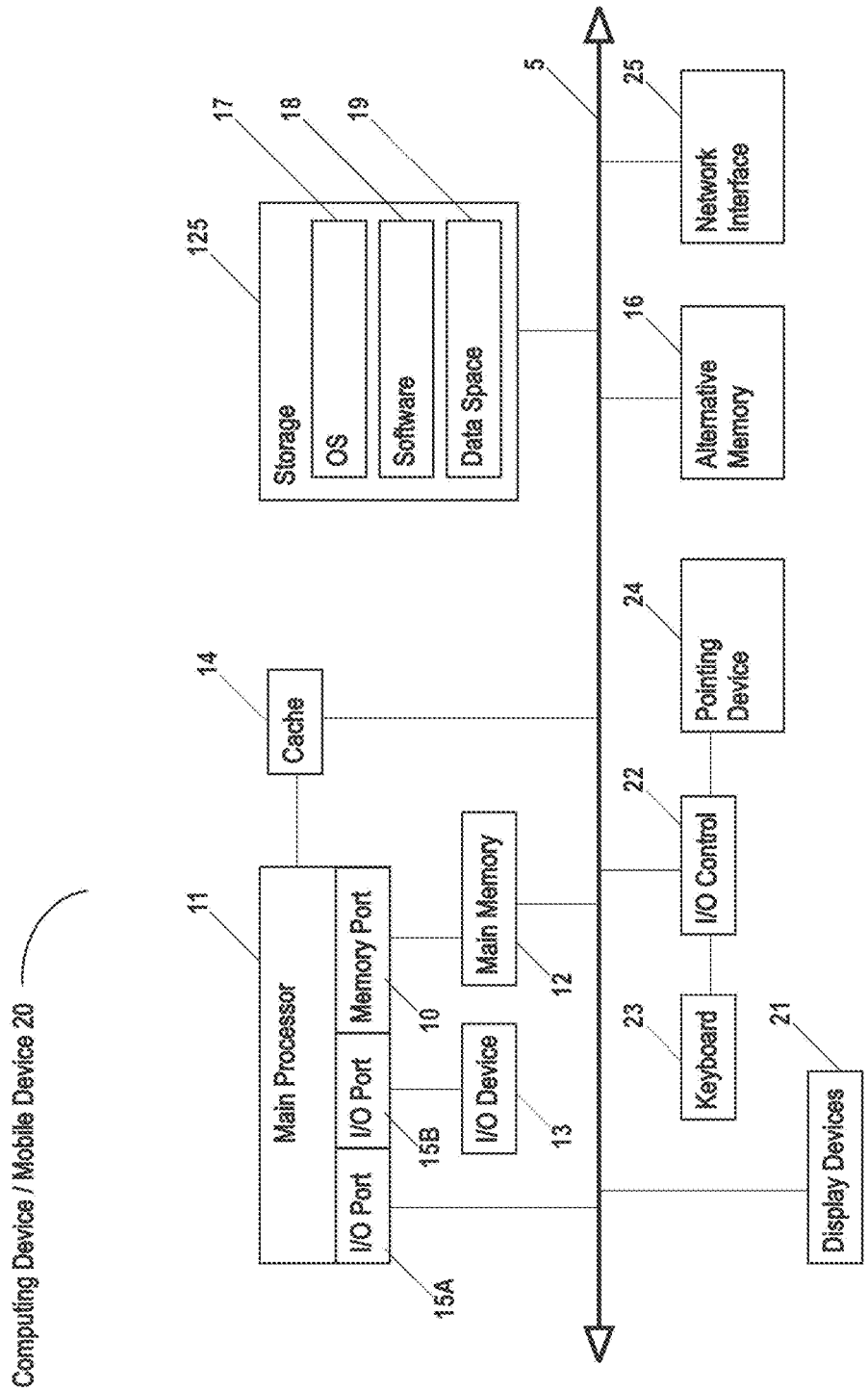
FIG. 1A illustrates a block diagram of an environment or architecture on which the features of the present disclosure may be implemented.

Like reference numerals in different figures indicate like elements. Horizontal or vertical " . . . " and other such indicia may be used to indicate additional instances of the same type of element. n, m, n+m, n−m or other such indicia may represent any integers or sequential numbers that follow the sequence where they are indicated. Any of these indicia may be used interchangeably according to the context and space available.

DETAILED DESCRIPTION

The disclosed systems and methods of using an artificially intelligent DBMS and interfaces for mobile, embedded, and other computing devices (both artificially intelligent DBMS and interfaces herein referred to individually or collectively as AI DBMS 100, AI DBMS or Smart DBMS) includes advanced features and functionalities to enable a user to operate a DBMS (i.e. perform operations on data, databases, tables, reports, relations, user accounts, and/or other objects or elements within a DBMS, etc.) using a mobile, embedded or other computing device.

In some embodiments, AI DBMS may include machine learning functionality enabling the AI DBMS to "learn" the user's uses of the DBMS and store this "knowledge" in a knowledgebase for a future operation. Then, using this stored "knowledge", AI DBMS may anticipate the user's future operating intentions. These functionalities enable a user to realize the standard DBMS operations on a mobile, embedded, or other computing device as well as greatly extend the standard operations through enabling artificially intelligent DBMS operations that may require minimal or no user input.

Referring now to FIG. 1A, an embodiment of a computing device 20, also referred to as the Mobile Device 20, in which the features of the present invention may be implemented is illustrated. In brief overview, devices or systems described herein may include functions, algorithms, hardware or software, or a combination thereof that may be implemented or executed on any type and form of computing device, such as a computer, a mobile device, a server, a video gaming device, a television device, a GPS receiver, a media player, an embedded device, or any other type and form of a computing device capable of performing the operations described herein. FIG. 1A depicts a block diagram of a computing device 20 which may include hardware, software or a combination of hardware and software providing the structure on which the embodiments of the present disclosure are practiced. Computing device 20 may include a central processing unit, which may also be referred to as a main processor 11, that may include one or more memory ports 10 and one or more input output ports, also referred to I/O ports 15, such as the I/O ports 15A and 15B. Computing device 20 may further include, a main memory unit 12 which may be connected to the remainder of the components of the computing device 20 via a bus 5 and/or may be directly connected to the main processor 11 via memory port 10. The computing device 20 of a computing device may also include a visual display device 21 such as a monitor, projector or glasses, a keyboard 23 and/or a pointing device 24, such as a mouse, interfaced with the remainder of the device via an I/O control 22. Each computing device 20 may also include additional optional elements, such as one or more input/output devices 13. Main processor 11 may comprise or be interfaced with a cache memory 14. Storage 125 may comprise memory which provides an operating system, also referred to as OS 17, additional software 18 operating on the OS 17 and data space 19 in which additional data or information may be stored. Alternative memory device 16 may be connected to the remaining components of the computing environment via bus 5. A network interface 25 may also be interfaced with the bus 5 and be used to communicate with external computing devices via an external network. Any or all of the described elements of the computing device 20 may be directly or operatively connected with each other or with other additional elements as depicted on FIG. 1A or using any other connection means known in the art in alternate embodiments.

Main processor 11 includes any logic circuitry that responds to and processes instructions fetched from the main memory unit 12. Main processor 11 may also include any combination of hardware and software for implementing and executing logic functions or algorithms. Main processor 11 may include a single core or a multi core processor. Main processor 11 may comprise any functionality for loading an operating system 17 and operating any software 18 thereon. In many embodiments, the central processing unit is provided by a microprocessing or a processing unit, such as for example Snapdragon processors produced by Qualcomm Inc., processors by Intel Corporation of Mountain View, Calif., those manufactured by Motorola Corporation of Schaumburg, Ill.; those manufactured by Transmeta Corporation of Santa Clara, Calif.; the RS/6000 processor, those manufactured by International Business Machines of White Plains, N.Y.; those manufactured by Advanced Micro Devices of Sunnyvale, Calif., or any computing unit for performing similar functions. The computing device 20 may be based on any of these processors, or any other processor capable of operating as described herein, whether on a mobile or embedded device or a larger more conventional machine.

Main memory unit 12 may include one or more memory chips capable of storing data and allowing any storage location to be directly accessed by the microprocessor 11, such as Static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 12 may be based on any of the above described memory chips, or any other available memory chips capable of operating as described herein. In some embodiments, the main processor 11 communicates with main memory 12 via a system bus 5, In some embodiments of a computing device comprising computing device 20, the processor communicates directly with main memory 12 via a memory port 10.

FIG. 1A depicts an embodiment in which the main processor 11 communicates directly with cache memory 14 via a connection means, such as a secondary bus which may also sometimes be referred to as a backside bus. In other embodiments, main processor 11 communicates with cache memory 14 using the system bus 5. Main memory 12, 110 device 13 or any other component of the computing device comprising a computing device 20 may be connected with any other components of the computing environment via similar secondary bus, depending on the design, Cache memory 14 however may typically have a faster response time than main memory 12 and may include a type of memory which may be considered faster than main memory 12, such as for example SRAM, BSRAM, or EDRAM. Cache memory may include any structure such as multilevel caches. In some embodiments, the main processor 11 communicates with one or more I/O devices 13 via a local system bus 5. Various busses may be used to connect the main processor 11 to any of the I/O devices 13, such as a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 21, the main processor 11 may use an Advanced Graphics Port (AGP) to communicate with the display 21, In some embodiments, main processor 11 communicates directly with I/O device 13 via HyperTransport, Rapid I/O, or InfiniBand. In further embodiments, local busses and direct communication are mixed. For example, the main processor 11 may communicate with I/O device 13 using a local interconnect bus while communicating with I/O device 13 directly. Similar configurations may be used for any other components described herein.

Computing device 20 may further include alternative memory, such as an SD memory slot, a USB memory stick, an optical drive such as a CD-ROM drive, a CD-R/RW drive, a DVD-ROM drive or a BlueRay disc, a hard-drive or any other device that may include non-volatile memory suitable for storing data or installing software and programs, Computing device 20 may further include a storage device 125 which may include any type and form of non-volatile memory for storing an operating system (OS) which may include any type and form of Windows OS, Mac OS, Unix OS, Linux OS, Android OS, iPhone OS, mobile version of Windows OS, or any other OS that may operate on the computing device 20. Computing device 20 may also include software 18 and/or data space 19 for storing additional data or information. In some embodiments, an alternative memory 16 may be used as the storage device 125. Additionally, OS 17 and/or the software 18 may be run from a bootable medium, for example, a flash drive, a bootable CD, such as KNOPPIX®, a bootable CD for GNU/Linux that is available as a GNU/Linux distribution from knoppix.net.

Computing device 20 may include a network interface 25 to interface to a Local Area Network (LAN), Wide Area Network (WAN) or the Internet through a variety of connections including, but not limited to, standard telephone lines, wired or wireless connections, LAN or WAN links (i.e. 802.11, T1, T3, 56 kb, X.25), broadband connections (e.g., ISDN, Frame Relay, ATM), or some combination of any or all of the above. Network interface 25 may include Bluetooth or WiFi capability. The network interface 25 may comprise a built-in network adapter, network interface card, PCMCIA network card, card bus network adapter, wireless network adapter, Bluetooth adapter, USB network adapter, modem or any other device suitable for interfacing the computing device to any type of network capable of communication and performing the operations described herein.

Still referring to FIG. 1A, I/O devices 13 may be present in various shapes and forms in the computing device 20, Input devices may include joysticks, keyboards, mice, trackpads, touchscreens, trackballs, microphones, drawing tablets, gloves, video game components for inputting video game data or a video camera, Output devices may include video displays, touchscreens, speakers, transceivers for sending and receiving data. I/O devices 13 may be controlled by an I/O control 22. The I/O control 22 may control one or more I/O devices such as a keyboard 23 and a pointing device 24, e.g., a joystick, a mouse or an optical pen: I/O control 22 may also comprise an interface between an external detector, such as a video camera or a microphone and the computing device. I/O control 22 may enable any type and form of a detecting device, such as a video camera to be interfaced with other components of the computing device 20. Furthermore, an I/O device 13 may also provide storage 125 and/or an alternative memory 16 for the computing device. In still other embodiments, the computing device may provide USB connections to receive handheld USB storage devices such as the USB Flash Drive line of devices manufactured by Twintech Industry, Inc. of Los Alamitos, Calif.

In some embodiments, the computing environment may comprise or be connected to multiple display devices 21. Display devices 21 may each be of the same or different type and/or form. I/O devices 13 and/or the I/O control 22 may comprise any type and/or form of suitable hardware, software, or combination of hardware and software to support, enable or provide for the connection and use of multiple display devices 21 or multiple detection devices.

In one example, computing device includes any type and/or form of video adapter, video card, driver, and/or library to interface, communicate, connect or otherwise use the display devices 21 or any I/O devices 13 such as video camera devices. In one embodiment, a video adapter may comprise multiple connectors to interface to multiple display devices 21. In other embodiments, the computing device may include multiple video adapters, with each video adapter connected to one or more of the display devices 21. In some embodiments, any portion of the operating system of the computing device may be configured for using multiple displays 21, In other embodiments, one or more of the display devices 21 may be provided by one or more other computing devices, such as computing devices connected to a remote computing device via a network.

In further embodiments, an I/O device 13 may be a bridge between the system bus 5 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus; a SCI/LAMP bus; a FibreChannel bus, or a Serial Attached small computer system interface bus.

Computing environment on the computing device 20 may operate under the control of operating systems, which may control scheduling of tasks and access to system resources. The computing device may be running any operating system including mobile device or desktop machine operating systems, including Android OS, iPhone OS, Windows 8 OS, or any other version of OS for running a computing device. For example, with respect to operating systems, the computing device 20 may use different releases of the Unix and Linux operating systems, any version of the Mac OS® for Macintosh computers, any embedded operating system, any realtime operating system, any open source operating system, any video gaming operating system, any proprietary operating system, any operating systems for mobile computing devices, or any other operating system capable of running on the computing device and performing the operations described herein. Typical operating systems include: WINDOWS XP, Windows 7, Windows 8 all of which are manufactured by Microsoft Corporation of Redmond, Wash.; MacOS, iPhone OS manufactured by Apple Computer of Cupertino, Calif.; OS/2, manufactured by International Business Machines of Armonk, N.Y.; and Linux a freely-available operating system distributed by Caldera Corp. of Salt Lake City, Utah, or any type and/or form of a Unix operating system, among others. Similarly, any other operating systems by Android or Apple; can be utilized; just as those of the Microsoft.

In other embodiments, the computing device 20 may have any different combination of processors, operating systems, and input/output devices consistent with the device's purpose and structure. For example, in one embodiment the computing device includes a Snapdragon by Qualcomm, Inc., or Tegra processors by nVidia, or any other mobile device processor or a microprocessor for a similar application. In this embodiment, the smartphone device may be operated under the control of the Android, iPhone OS, PalmOS or any other operating system of a similar purpose. The device may then also include a stylus input device as well as a five-way navigator device. In another example, the computing device includes a Wii video game console released by Nintendo Co. operating an es operating system. In this embodiment, the I/O devices may include a video camera or an infrared camera for recording or tracking movements of a player or a participant of a Wii video game. Other I/O devices 13 may include a joystick, a keyboard or an RF wireless remote control device. Similarly, the computing device 20 may be tailored to any workstation, mobile or desktop computer, laptop or notebook computer, Smartphone device or tablet, server, handheld computer, gaming device, embedded device, or any other computer or computing product, or other type and form of computing or telecommunications device and that has sufficient processor power and memory capacity to perform the operations described herein.

Still referring to FIG. 1A, from a perspective of a general architecture and variations of the underlying operating environment in which the features of the present disclosure may be implemented, the current disclosure is not limited to the use with the configurations shown in the figures or described in the specification, and it may find applicability in any operating, computing, communication, electronic, and/or processing environment. The environment may include various different model infrastructures such as web services, distributed computing, grid computing, and other infrastructures.

Various implementations of the methods, systems and techniques described herein can be realized in digital electronic circuitry, integrated circuitry, specially designed application specific integrated circuits (ASICs), field programmable gate arrays (FPGAs), computer hardware; firmware, software, virtual machines, and/or combinations thereof including their structural, logical, and/or physical equivalents. The various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A computer program (also known as program, software, software application, script or code) includes machine instructions for a programmable processor, and can be implemented in a high-level procedural and/or object-oriented programming language, and/or in a low-level assembly/machine language. Any language used may be a compiled or an interpreted language. A computer program may be deployed in any form, including as a stand-alone program or as a module, component, subroutine, or other unit suitable for use in a computing environment. A computer program does not necessarily correspond to a file in a file system. A program may be stored in a portion of a file that holds other programs or data (i.e. one or more scripts stored in a markup language document, etc.), in a single file dedicated to the program in question, or in multiple coordinated files (i.e. files that store one or more modules, sub programs, or portions of code, etc.). A computer program may be deployed to be executed on one computer or on multiple computers at one site or distributed across multiple sites and interconnected by a communication network.

The methods, systems and techniques described herein may include clients and servers. A client and server are generally remote from each other and typically interact through a communication network. The relationship of client and server arises by virtue of computer programs running on the respective computers and having a client-server relationship to each other.

A computing device may be embedded in another device such as a tablet computer, a mobile telephone, a personal digital assistant (PDA), a media player, an audio or video player, a Global Positioning System (GPS) receiver, a game console, a portable storage device (i.e. a USB flash drive, etc.), gateway, a router, a hub, a digital video recorder, a set-top box, an automobile entertainment system, an automobile navigation system, a television device, a residential gateway, a refrigerator, a washing machine, a factory automation device, an assembly line device, a factory floor monitoring device, to name just a few. The processor and the memory may be supplemented by, or incorporated in, special purpose logic circuitry.

As used herein, the terms machine-readable medium and computer-readable medium refer to any computer program product, apparatus and/or device used to provide machine instructions and/or data to a programmable processor, including a machine-readable medium that receives machine instructions as a machine-readable signal. The term machine-readable signal refers to any signal used to provide machine instructions and/or data to a programmable processor. A machine-readable medium may include both a volatile and non-volatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art.

The methods, systems and techniques described herein can be implemented in a computing system that includes a back end component (i.e. a data server, etc.), or that includes a middleware component (i.e. an application server, etc.), or that includes a front end component (i.e. a client computer having a graphical user interface or a web browser through which a user can interact with an implementation of the methods, systems and techniques described herein, etc.), or any combination of such back end, middleware, or front end components. The components of the system can be interconnected by any form or medium of digital data communication (i.e. a communication network, etc.). Examples of communication networks include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), virtual network, a virtual private network (VPN), Bluetooth network, a wireless network, a wireless LAN, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, or any type of network known in the art.

Any of the files shown in the figures or described in the specification may reside in any repository accessible by an implementation of the methods, systems and techniques described herein. In each instance where a specific file or file type is mentioned, other files, file types or formats may be substituted.

Where a reference to a data structure is used herein, it should be understood that any variety of data structures may be used such as, for example, array, list, linked list, doubly linked list, queue, tree, heap, graph, map, grid, matrix, multi-dimensional matrix, table, database, DBMS, file, and/or any other type or form of a data structure.

Where a reference to a storing data, object, item or any element is used herein, it should be understood that any data, object, item or element stored may be a pointer to the data, object, item or any element stored somewhere else.

Figure 1B:
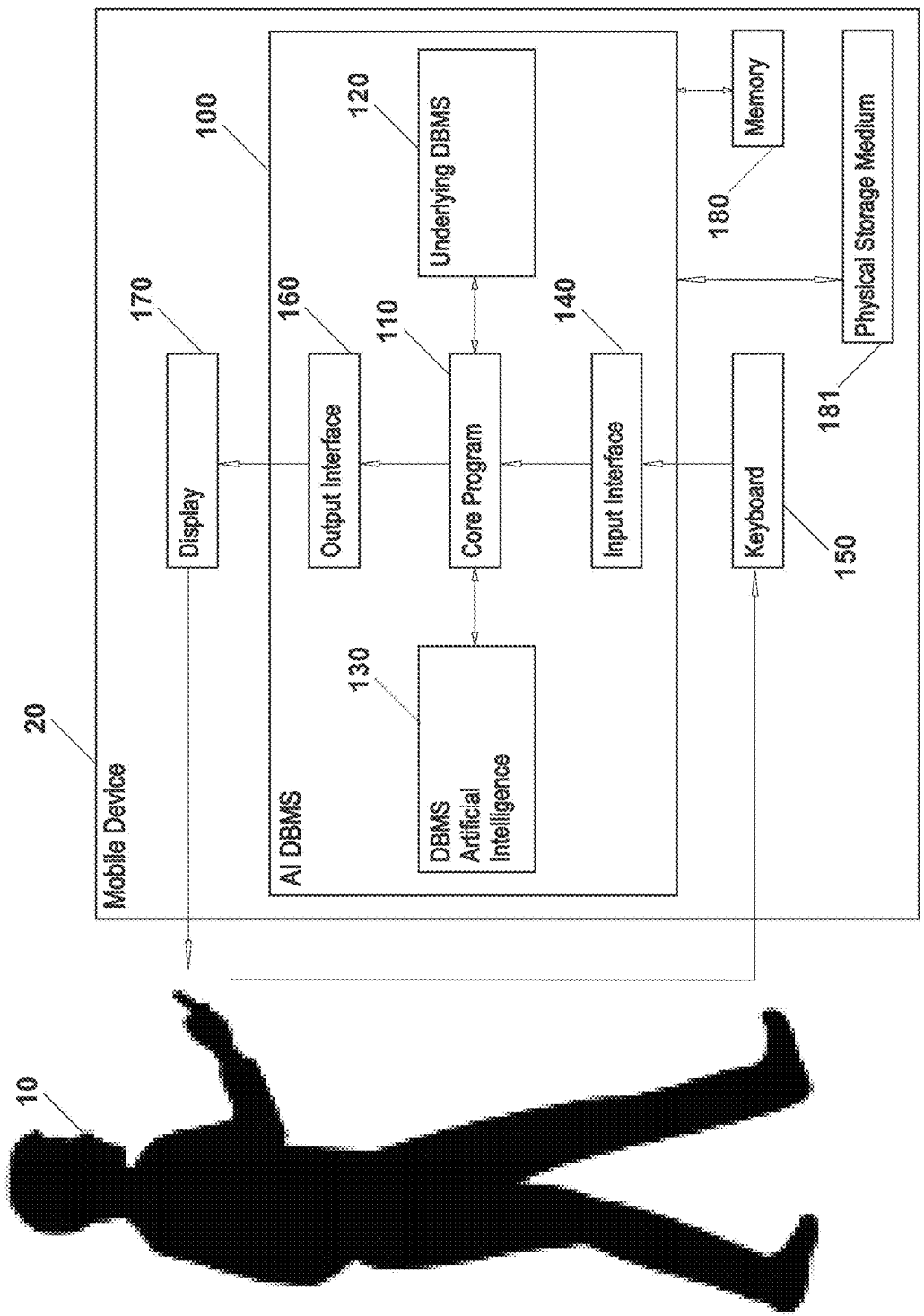
FIG. 1B is a diagram showing an embodiment of AI DBMS implemented on a Mobile Device 20.

Referring to FIG. 1B, an embodiment of a Mobile Device 20 implementing the AI DBMS is illustrated. User 10 may operate a Mobile Device 20, which Mobile Device 20 may further include Core Program 110, Underlying DBMS 120, DBMS Artificial Intelligence 130, the Input interface 140, the Keyboard 150, the Output Interface 160, the Display 170, the Memory 180, and the Physical Storage Medium 181. Other additional elements may be included as needed, or some of the disclosed ones may be excluded, or a combination thereof may be utilized in alternate embodiments.

To clarify the context of the embodiment illustrated by FIG. 1B, the User 10 may utilize AI DBMS on a Mobile Device 20. Mobile Device 20 may include the Core Program 110 that may accept the User's 10 operating instructions and may issue corresponding DBMS Commands to access, manage and/or manipulate (i.e. access, store, create, add, delete, modify or rearrange data, databases, tables, reports, relations, user accounts and/or other DBMS objects or elements, etc.) the Underlying DBMS 120. DBMS command may be any instruction set, operation, Structured Query Language (SQL) statement, computer command, instruction, or any other command understood by a DBMS, and these terms may be used interchangeably herein. Mobile Device 20 may include the Underlying DBMS 120 that receives and executes an instruction set and returns execution results. The User 10 may interact with the Core Program 110 through inputting operating instructions via Keyboard 150 and Input Interface 140 or another input device and its associated interface. User 10 may also interact with the Core Program 110 through viewing results via Display 170 and Output Interface 160 or another output device and its associated interface. DBMS Artificial Intelligence 130 may provide the functionality of "learning" (i.e. recording, etc.) the User's 10 use of the Underlying DBMS 120, structuring this use into usable "knowledge," storing it into a knowledgebase for future use, and anticipating the User's 10 future operating intentions. Mobile Device 20 may include the Memory 180 as temporary storage and the Physical Storage Medium 181 as permanent storage.

Mobile Device 20 may be any mobile computer, a mobile phone, a Smartphone (i.e. iPhone, Windows Phone, Blackberry, Android phone, etc.), a tablet, a personal digital assistant (PDA), or another similar type of mobile device capable of implementating the functionalities described herein. The main processor 11 of the Mobile Device 20 may include hardware and software for executing instructions and processing data operatively coupled with aforementioned memory for storing the instructions and data. The memory may also include applications such as AI DBMS applications and functions discussed herein. The main processor 11 of the Mobile Device 20 may also access a computer-readable medium including a volatile and non-volatile medium, a removable and non-removable medium, a communication medium, a storage medium, and other similar type of computer-readable medium. The processor may be operatively coupled with an output device such as a Liquid Crystal Display (LCD) to show information to the user. An input device, such as a key pad, keyboard, and/or touch screen may also be operatively coupled with the processor to enable the user to input instructions. The memory may store software that can provide functionality when executed by the processor. The software may include a user interface that enables a user to interact with the mobile device, and a mobile operating system that provides system functionality. A modern mobile operating system combines the features of a personal computer operating system with high resolution display, touchscreen, cellular network connectivity, bluetooth, WiFi, GPS, mobile navigation, microphone, camera, video camera, voice recorder, speech recognition, music player, near field communication, PDA, and other features and applications. Examples of a mobile operating system include iOS, Android, Windows Mobile, BlackBerry OS, Symbian OS, Palm OS, and other mobile operating systems.

Mobile Device 20 may also be, or include, an embedded device, which may be any device or system with a dedicated function within a larger device or system. Embedded systems may range from the simplest ones dedicated to one task with no user interfaces to complex ones with advanced user interfaces that resemble modern desktop computer systems. Simple embedded devices use buttons, light emitting diodes (LEDs), graphic or character LCDs with a simple menu system. More sophisticated devices may use a graphical screen with touch sensing or screen-edge buttons where the meaning of the buttons may change with the screen. Examples of devices that include an embedded device may include a gaming device, a media player, a digital still or video camera, a pager, a television device, a set-top box, a personal navigation device, a global positioning system (GPS) receiver, a digital watch, a DVD player, a printer, a microwave oven, a washing machine, a dishwasher, a thermostat, a automobile, a factory controller, a telephone, a router, a network bridge, or another similar type of embedded device. The embedded device may include one or more elements described in the Mobile Device 20 above such as the main processor 11, any of the aforementioned memory, the network interface 25, computer-readable medium, the output device, the input device, the user interface, the software, the operating system, etc. Examples of an operating system for the embedded device include MicroC/OS-II, QNX, VxWorks, eCos, TinyOS, Windows Embedded, Embedded Linux, and other embedded operating systems.

Other computing device may be any computing device including a traditional computing device with all of its processing, storage, communication, networking, input and output interfacing, and other functionalities. Examples of the traditional computing device may include a personal desktop computer, a server, a mainframe computer, or another similar type of the traditional computing device. The traditional computing device may include one or more elements described in the Mobile Device 20 above such as the main processor 11, any of the aforementioned memory, the network interface 25, computer-readable medium, the output device, the input device, the user interface, the software, the operating system, etc. Examples of an operating system for a traditional computing device include Windows, MacOS, Linux, Unix, and other similar operating systems.

AI DBMS, included in the Mobile Device 20, may be any software, hardware or a combination of software and hardware for providing machine learning, anticipating, and/or other functionalities described herein. Similarly, AI DBMS may be any hardware, software or a combination of hardware and software for providing an interface with a DBMS. In some embodiments, AI DBMS may include a software application or a function acting as an interface between a user and a DBMS. In further embodiments, AI DBMS may include a software application or a function for an interface with one or more databases, as a part of a general DBMS operating and providing one or more databases. For example, AI DBMS may be executed by the processor that may accept a user's instructions, transmit them to the processor for execution, determine, through processing, that the user's intended instruction set for operating a DBMS is a particular instruction set and transmit results back to the user including the determined particular instruction set to be presented to the user.

In some embodiments, AI DBMS may be implemented as a Java Micro Edition (ME), Java Standard Edition (SE), or other Java Editions application or program. Java ME is specifically designed for mobile and embedded devices and provides a robust and flexible environment for applications with flexible user interfaces, robust security, built-in network protocols, powerful application programming interfaces, DBMS connectivity and interfacing functionality, file manipulation capabilities, and support for networked and offline applications, Applications based on Java ME are portable across many devices, yet leverage each device's native capabilities.

In another embodiment, AI DBMS may be a Java SE application as the traditional computing devices support it, and more mobile and embedded devices continue to support it. Java SE supports the feature sets of most Smartphones and a broad range of high-end connected devices while still fitting within their resource constraints. Java platforms include one or more basic application programming interfaces (APIs) and virtual machine features that comprise a runtime environment for software applications. The use of Java platforms may provide core application functionality for software applications such as AI DBMS that may be executed on mobile, embedded, and other computing devices.

AI DBMS may be a software application that includes a Java program written for a Java platform, and is an example of an application that may execute on a mobile, embedded, and other computing device. A Java program or application may provide a wide range of user-level functionality that may be used in applications such as AI DBMS, including, but not limited to, providing an Internet browser to a user, displaying text and graphics, playing and recording audio media, displaying and recording visual media, communicating with another mobile device, and other functionality. AI DBMS is programming language, platform, and operating system independent, Besides the platforms and operating systems previously described, programming languages additional to lava, may include C, C++, Cobol, Java Script, Tcl, Visual Basic, Pascal, VB Script, Perl, PHP, and other programming languages or functions capable of implementing the functionalities described herein.

In some embodiments, A DBMS may be implemented as a Xlet within the Java platform, A Xlet is a Java applet or application configured to execute on a mobile, embedded, and other computing device, that may be a part of the Java TV specification, and may use a Personal Basis Profile ("PBP") of a Connected Device Configuration ("CDC") for the Java ME platform. A Xlet may be managed by a special-purpose application-management software built into the mobile, embedded, and other computing device:

Core Program 110 may be any hardware, software or a combination of hardware and software directing and controlling the flow of instructions and data among the elements of AI DBMS system. Core Program 110 may be directly or operatively coupled with Underlying DBMS 120, DBMS Artificial Intelligence 130, Input Interface 140, Output Interface 160, and/or other elements of the AI DBMS system to produce desired results. Core Program 110 may be initiated by the User 10 or it may be initiated automatically when the Mobile Device 20 turns on. Core Program 110 may run continuously as a deamon or it may run only as long as the User 10 needs it.

Figure 2:
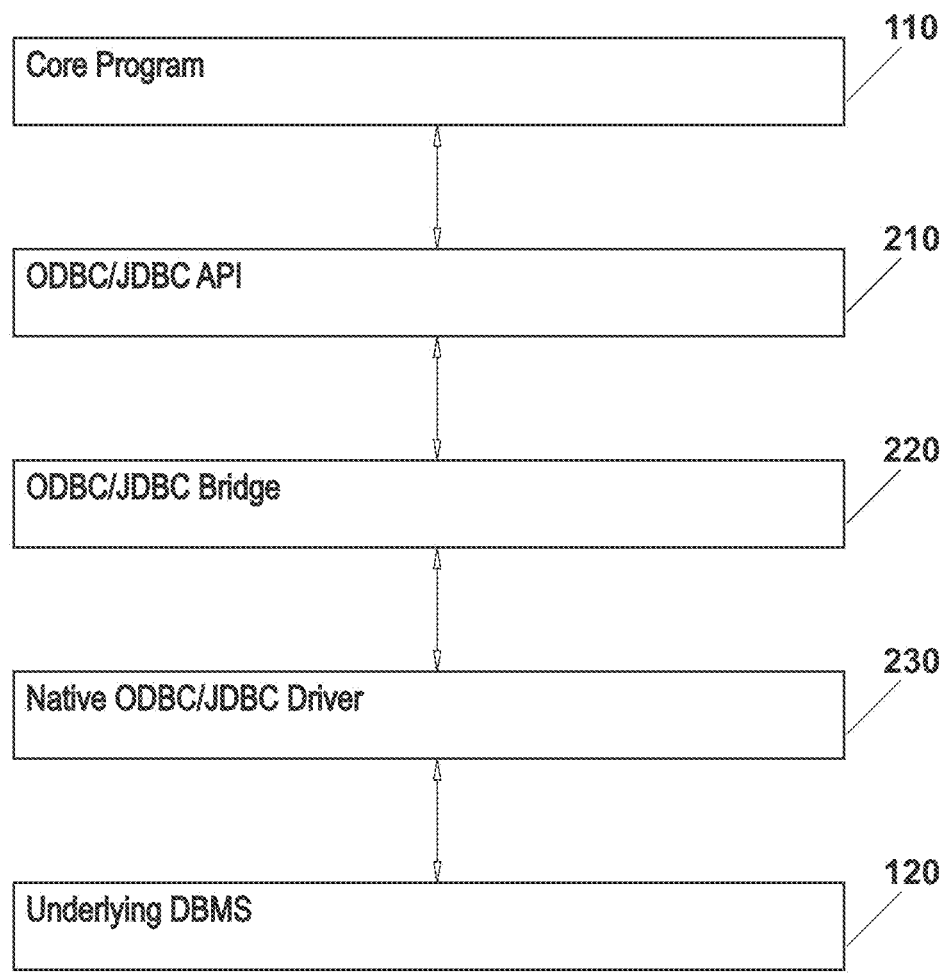
FIG. 2 is a diagram showing an example of interfacing between the Core Program 110 and the Underlying DBMS 120.

Core program 110, as shown in an embodiment illustrated in FIG. 2, may be, directly or operatively, connected to the Underlying DBMS 120 through the ODBC/JDBC API 210, the ODBC/JDBC Bridge 220, and/or the Native ODBC/JDBC Driver 230, in one example. The inter-process interaction may occur on a single mobile, embedded, or other computing device, or between two or more mobile, embedded, or other computing devices over a network. Other elements or types of connections such as a specialized database interface, a socket, an operating system command, a global function, a local function, a direct command, etc. may be included, or some of the disclosed ones may be excluded, or a combination thereof may be utilized in alternate implementations of the interaction between the Core Program 110 and the Underlying DBMS 120.

Upon connecting to the Underlying DBMS 120, the Core Program 110 may transmit to the Underlying DBMS 120 an instruction set understood by the Underlying DBMS 120. Subsequently, the Underlying DBMS 120 may perform an operation that corresponds to the instruction set and may transmit results to the Core Program 110 for presentation to the User 10. In the case that the instruction set used is a SQL statement, it would be platform-independent and supported by a vast majority of commercial and open-source DBMSs. It should be clear to one of ordinary skill in the art that the instruction set (i.e. SQL statement, etc.) discussed herein as an example, may be replaced by any type or form of instruction set or statement in any other language or script, as needed to conform to a given DBMS.

Input Interface 140 may comprise any hardware, software or a combination of hardware and software, and/or it may include functions and algorithms for processing input events of the Keyboard 150 or other input devices for use by the Core Program 110 or other elements of the current disclosure. The Input Interface 140 may be Java keyboard listener, keypad listener, touch screen listener, mouse listener, trackball listener, any device driver (i.e. audio, video, keyboard, mouse, or other driver), speech recognizer, video recognizer, or any other input interface. Input Interface 140 may be or comprise any functionality of I/O control 22, keyboard 23, and/or I/O device 13.

Keyboard 150 may comprise any hardware, software or a combination of hardware and software, and/or it may include functions and algorithms for inputting letters, numbers and/or symbols into the Mobile Device 20, Keyboard 150 may be suited or specialized for a mobile device, tablet or a Smartphone. Keyboard 150 may be or comprise any functionality of keyboard 23, I/O device 13 and/or I/O control 22. In one implementation, Keyboard 150 may be an element of the current disclosure through which the User 10 inputs operating instructions by pressing keys or buttons. Other input devices for detecting user input may be utilized in place of the Keyboard 150 such as keypad, touch screen, external keyboard, mouse, trackball, microphone, video or still camera, tactile input device, or any other input device.

Output Interface 160 may comprise any hardware, software or a combination of hardware and software, and/or it may include functions and algorithms for processing output from the Core Program 110 or other elements of the current disclosure for presentation to a user. In some embodiments, Output Interface 160 may include functions and algorithms for processing the results from the Core Program 110 for viewing by the User 10. The Output Interface 160 may be a Java graphical user interface, an acoustical output interface, tactile output interface, any device driver (i.e. audio, video, or other driver), or any other output interface. Output interface 160 may be or comprise any functionality of I/O control 22, display devices 21, and/or I/O device 13.

Display 170 may comprise any hardware, software or a combination of hardware and software, and/or it may include functions and algorithms for displaying information to a user. In some embodiments, Display 170 may comprise functions and algorithms for showing AI DBMS results to the User 10. Other output devices for conveying information may be utilized such as a projector, an external monitor, a speaker, tactile output device, or any other output device. Display 170 may be or comprise any functionality of display devices 21, I/O control 22, and/or I/O device 13.

Memory 180 may comprise any hardware, software or a combination of hardware and software, and/or it may include functions and algorithms for storing data or information in an electronic format. Memory 180 may be, or comprise any functionality of storage 125, cache 14, and/or main memory 12. In some embodiments, memory 180 may comprise any hardware, software or a combination of hardware and software, and/or it may include functions and algorithms for temporarily storing programs and/or data currently running on the Mobile Device 20.

Physical storage medium 180 may also comprise any hardware, software or a combination of hardware and software, and/or it may include functions and algorithms for storing data and information in an electronic format. In one implementation, the Physical Storage Medium 181 may comprise any hardware, software or a combination of hardware and software, and/or it may include functions and algorithms for permanently storing the Core Program 110, Underlying DBMS 120 data files and any supporting data structures, and/or other needed items. The Physical Storage Medium 181 may be a hard drive, a microSD card, a flash drive, or any other type of physical storage medium. Physical storage medium 181 may be or comprise any functionality of storage 125.

Figure 3:
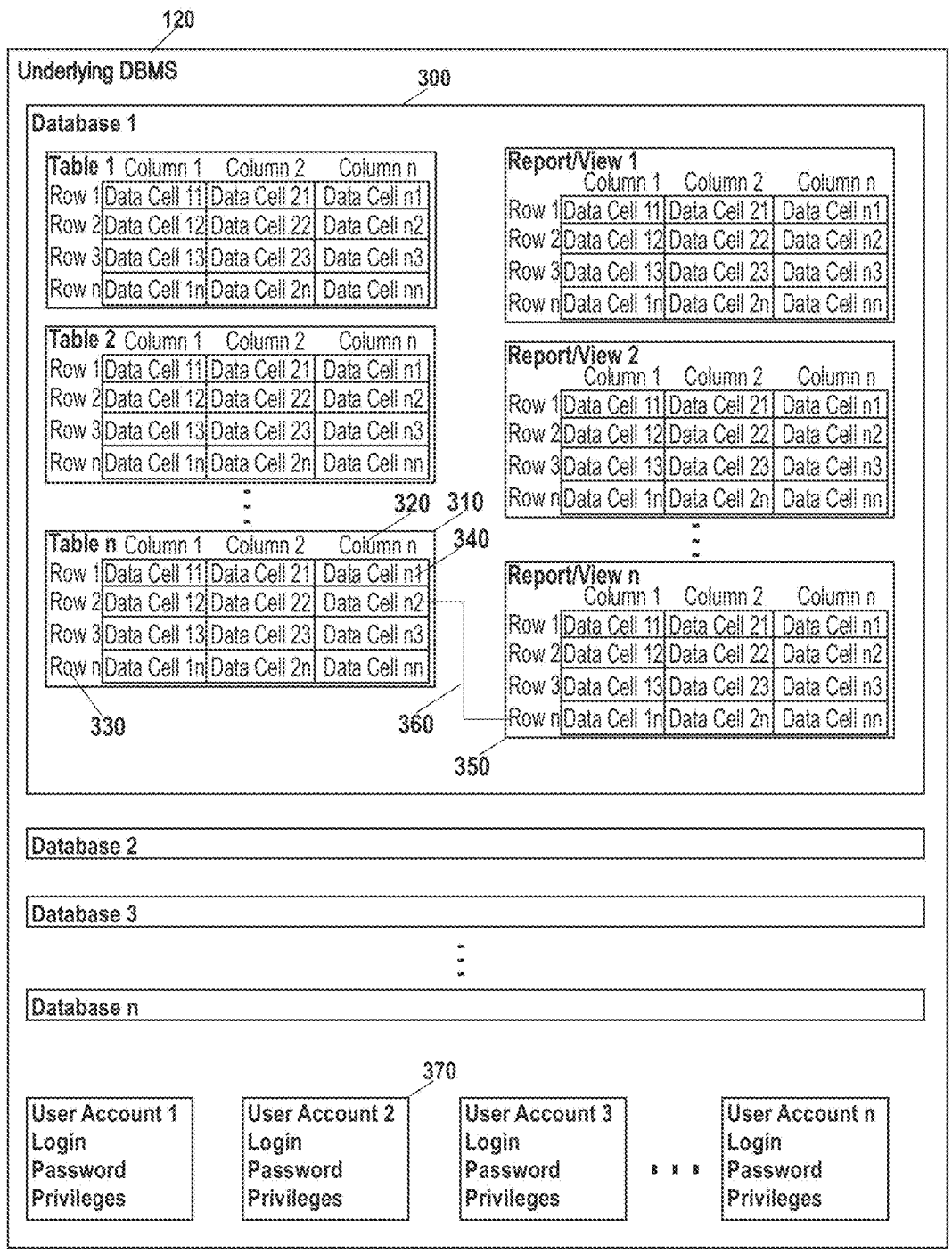
FIG. 3 is a diagram showing an example of a typical data organization of the Underlying DBMS 120.

Referring to FIG. 3, Underlying DBMS 120 may comprise any hardware, software or a combination of hardware and software, and/or it may include functions and algorithms for storing, managing and/or manipulating data and/or any supporting data structures (i.e. databases, tables, etc.). Underlying DBMS 120 may comprise software functionality for performing operations which a User 10 of the Underlying DBMS 120 may want to perform.

As shown in an embodiment illustrated in FIG. 3, Underlying DBMS 120 may include data generally organized in Databases 300. The Database 300 may be a collection of data generally organized in Tables 310. The term "database" when used casually often refers to a DBMS and the data it contains as well as the supporting data structures such as databases, tables, reports, relations, user accounts and their privileges, etc. Underlying DBMS 120 may be a relational DBMS in which case the Tables 310 and/or Reports/Views 350 may be linked and Relations 360 among the Tables 310 and/or Reports/Views 350 may be defined. Furthermore, Underlying DBMS 120 may be or include any data structure or system that may store any type or form of data on which data operations described herein may be performed.

Underlying DBMS 120 may include instruction sets in the form of structured query language (SQL) capabilities. SQL is a computer language used to access, manage, and manipulate data in DBMSs, although other similar languages having similar capabilities may be utilized as needed. An example of a SQL statement is as follows: "SELECT col1, col2, col3, . . . FROM tbl1, tbl2, tbl3, . . . ORDER BY col1*, col2*, col3*, . . . ". In this SQL statement, "col1, col2, col3, . . . " represents the Columns 320 to be selected, "tbl1, tbl2, tbl3, . . . " represents the names of Tables 310 from which to obtain data, and "col1*, col2*, col3*, . . . " represents the Columns 320 by which to sort the resulting Report/View 350.

In some embodiments, User 10 may not need to input instruction sets such as SQL statements to operate a DBMS. User 10 may utilize software application with a graphical user interface or program that generates instruction sets understood by the Underlying DBMS 120. For example, a report generating program (i.e. Chrystal Reports, etc.) or a visual DBMS application (i.e. Microsoft Access, etc.) may provide input fields, selectable lists, drop-down menus, buttons, or other graphical elements to enable a User 10 to create instruction sets in a point and click manner without ever typing SQL code, for example.

The User 10 may access, manage and/or manipulate the Underlying DBMS 120 and the Underlying DBMS 120 may store, manage and/or manipulate data and/or supporting data structures responsive to the User 10. User's 10 accessing, managing and/or manipulating and/or Underlying DBMS's 120 storing, managing and/or manipulating data and/or supporting data structures may include (1) storing, accessing, creating, altering, and/or deleting one or more Database 300 within the Underlying DBMS 120; (2) storing, accessing, creating, altering, and/or deleting one or more Table 310 within the one or more Database 300; (3) storing, accessing, creating, altering, deleting, searching, sorting and/or rearranging one or more Column 320, Row 330, and/or Data Cell 340 (generally also referred to as data) within the one or more Table 310; (4) storing, accessing, creating, altering, and/or deleting one or more Report/View 350 within the one or more Database 300; (5) storing, accessing, creating, altering, and/or deleting one or more Relation 360 among the one or more Table 310 and/or Report/View 350; (6) storing, accessing, creating, altering, and/or deleting one or more User Account 370 and its privileges; and (7) other operations.

Figure 4:
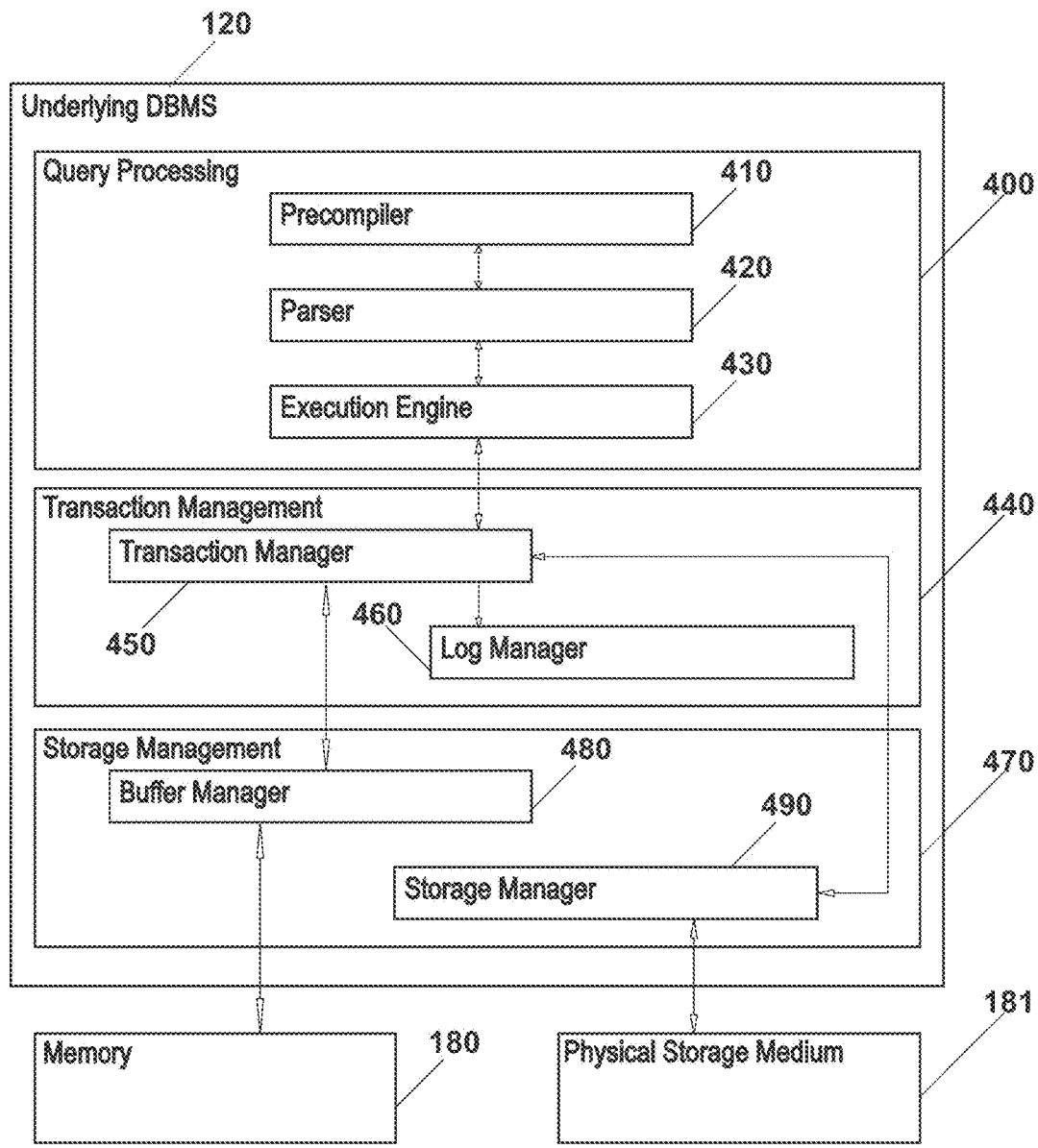
FIG. 4 is a diagram showing an example of a typical process flow of the Underlying DBMS 120.

Referring to FIG. 4, an embodiment of a typical SQL compliant DBMS is illustrated where the Underlying DBMS 120 may include the following process flow elements: the Query Processing 400, which may include Precompiler 410, Parser 420, and Execution Engine 430. Transaction Management 440, also included in this implementation, may comprise Transaction Manager 450, and Log Manager 460. Storage Management 470, also included in Underlying DBMS 120 in this implementation, may comprise Buffer Manager 480 and Storage Manager 490. Any of the aforementioned components may be stored on, or connected to, either directly or operatively, memory 180 and/or physical storage medium 181.

Precompiler 410: In some embodiments, Precompiler 410 may comprise any hardware, software or a combination of hardware and software, and/or it may include functions and algorithms for extracting the relevant SQL statement(s) or other DBMS command(s) embedded in the Core Program's 110 instruction set, or for translating the instruction set into corresponding SQL statement(s) or other DBMS command(s). The instruction may come from an API or directly from an application program such as the Core Program 110. The Precompiler 410 may process Core Program's 110 instruction set into SQL statement or any other DBMS command format that the Underlying DBMS 120 understands.

Parser 420: In some embodiments, Parser 420 may comprise any hardware, software or a combination of hardware and software, and/or it may include functions and algorithms for parsing the SQL statement(s) or other DBMS command(s) that were deciphered from the Core Program's 110 instruction set. At this stage, the objective of the Parser 420 may be to create a parse tree structure based on the SQL statement(s) or other DBMS command(s) so that it may be easily understood by the other elements later in the Underlying DBMS 120 execution flow.

Execution Engine 430: In some embodiments, Execution Engine 430 may comprise any hardware, software or a combination of hardware and software, and/or it may include functions and algorithms for executing the SQL statement(s) or other DBMS command(s) that were deciphered from the Core Program's 110 instruction set against a Database 300 and/or any of its components to perform an operation on a Database 300 and/or any of its components. For example, this operation may involve (1) accessing, adding, modifying or deleting a Database 300, (2) accessing, adding, modifying or deleting a Table 310, (3) accessing, adding, modifying or deleting any of the Columns 320, Rows 330 or Data Cells 340 of the Tables 310 in the Database 300, and/or (4) any other similar operation normally implemented by a DBMS. When executing SQL statement(s) or other DBMS command(s), a plurality of lower level operations may generally be performed by the Underlying DBMS 120 in a predetermined order including issuing a read or write request to the Physical Storage Medium 181.

Transaction Manager 450: In some embodiments, Transaction Manager 450 may comprise any hardware, software or a combination of hardware and software, and/or it may include functions and algorithms for ensuring that a transaction is executed properly in accordance with particular rules of the DBMS, SQL and/or any other applicable system rules. The transaction is a single unit of work that has one or more SQL statement(s) or other DBMS command(s) in it. Transaction Manager 450 may also include functionality for resolving any deadlock situations that may occur during the process, such as for example during a situation when two transactions cannot continue because they each have some data that the other needs to proceed.

Log Manager 460: In some embodiments, Log Manager 460 may comprise any hardware, software or a combination of hardware and software, and/or it may include functions and algorithms for logging every operation executed by the Underlying DBMS 120. It may do so by storing a log on the Physical Storage Medium 181.

Buffer Manager 480: In some embodiments, Buffer Manager 480 may comprise any hardware, software or a combination of hardware and software, and/or it may include functions and algorithms for allocating and managing the Memory 180. Buffer Manager 480 may include functionality to allocate resources for accessing, managing and/or manipulating data. Buffer Manager 480 may take in formatted requests and decide how much Memory 180 to allocate per buffer and how many buffers to allocate per request.

Storage Manager 490: In some embodiments, Storage Manager 490 may comprise any hardware, software or a combination of hardware and software, and/or it may include functions and algorithms for retrieving and storing data in memory. For example, Storage Manager 490 may include functionality, at the lowest level, to make requests through the underlying Physical Storage Medium 181 controller (not shown; i.e. hard disk controller, etc.) or the operating system to retrieve data from or store data to the Physical Storage Medium 181. The Physical Storage Medium 181 controller may be a device configured to provide an interface for retrieving and storing data and any supporting data structures in physical files.

Other additional elements such as data definition language (DDL) compiler, query preprocessor, security manager, integration manager, query optimizer, recovery manager, concurrency manager, control manager, resource manager, communications manager, lock manager, page and cache manager, etc. may be included, or some of the disclosed ones may be excluded, or a combination thereof may be utilized in alternate implementations of the Underlying DBMS 120, Also, some features may be included in alternate implementations of the Underlying DBMS 120 such as maintaining the integrity and security of stored data, indices that provide fast access to data items that hold particular values, statistical data that store statistical information about the data, etc.

The current disclosure is independent of the type of Underlying DBMS 120 it uses that may include any DBMS that can be executed on the operating environments previously described such as Advantage Database Server, EffiProz, ElevateDB, Embedded InnoDB, Empress Embedded Database, Extensible Storage Engine, eXtremeDB, Firebird Embedded, HSQLDB, Informix Dynamic Server, InfinityDB, InterBase, ITTIA DB, NexusDB, Raima Database Manager, ScimoreDB, SolidDB, SQLite, SQL Server Compact, Valentina DB, VistaDB, Oracle, Microsoft SQL Server, MySQL, Informix, Sybase, and other DBMSs. Underlying DBMS 120 may also be a single database, multiple databases, a single table, multiple tables, a single file, multiple files, a file system, a single data structure, multiple data structures, a data structure system, a single system, multiple systems, or any other data structure or a combination of the aforementioned data structures for storing, managing and/or manipulating digital data.

Figure 5:
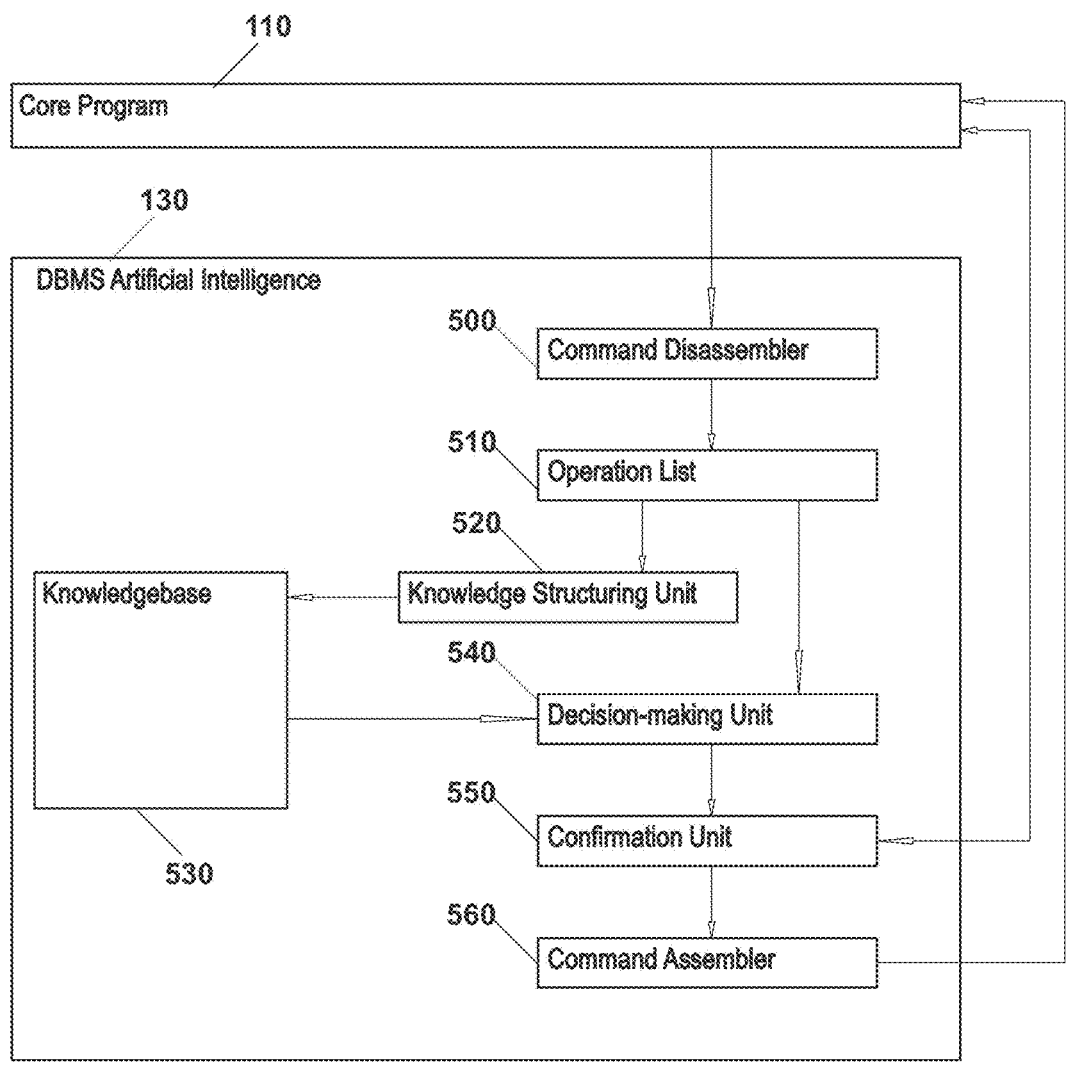
FIG. 5 is a diagram showing an embodiment of DBMS Artificial Intelligence 130.

Referring to FIG. 5, DBMS Artificial Intelligence 130 may comprise any hardware, software or a combination of hardware and software, and/or it may include functions and algorithms for "learning" the User's 10 past operating instructions and/or anticipating the User's 10 future operating intentions. DBMS Artificial intelligence 130 may comprise functions and algorithms for determining one or more instruction sets or sequences of instruction sets which the user may be interested in running. DBMS Artificial intelligence 130 may also include functions and algorithms for identifying a particular number of selected instruction sets to be presented to the user as selections of the instruction sets or sequences of instruction sets which the system has determined the user may want to execute. The particular number of instruction sets to be presented may vary based on the determinations of the DBMS Artificial Intelligence 130, or it may alternatively be predetermined. The DBMS Artificial Intelligence 130 may be, directly or operatively, connected to the Core Program 110 and/or other elements to facilitate the overall system operation and implement the functionalities described herein.

DBMS Artificial Intelligence 130 may include a Command Disassembler 500, an Operation List 510, a Knowledge Structuring Unit 520, a Knowledgebase 530, a Decision-making Unit 540, a User Confirmation Unit 550, and a Command Assembler 560. Other additional elements may be included as needed, or some of the disclosed ones may be excluded, or a combination thereof may be utilized in alternate embodiments.

Figure 6:
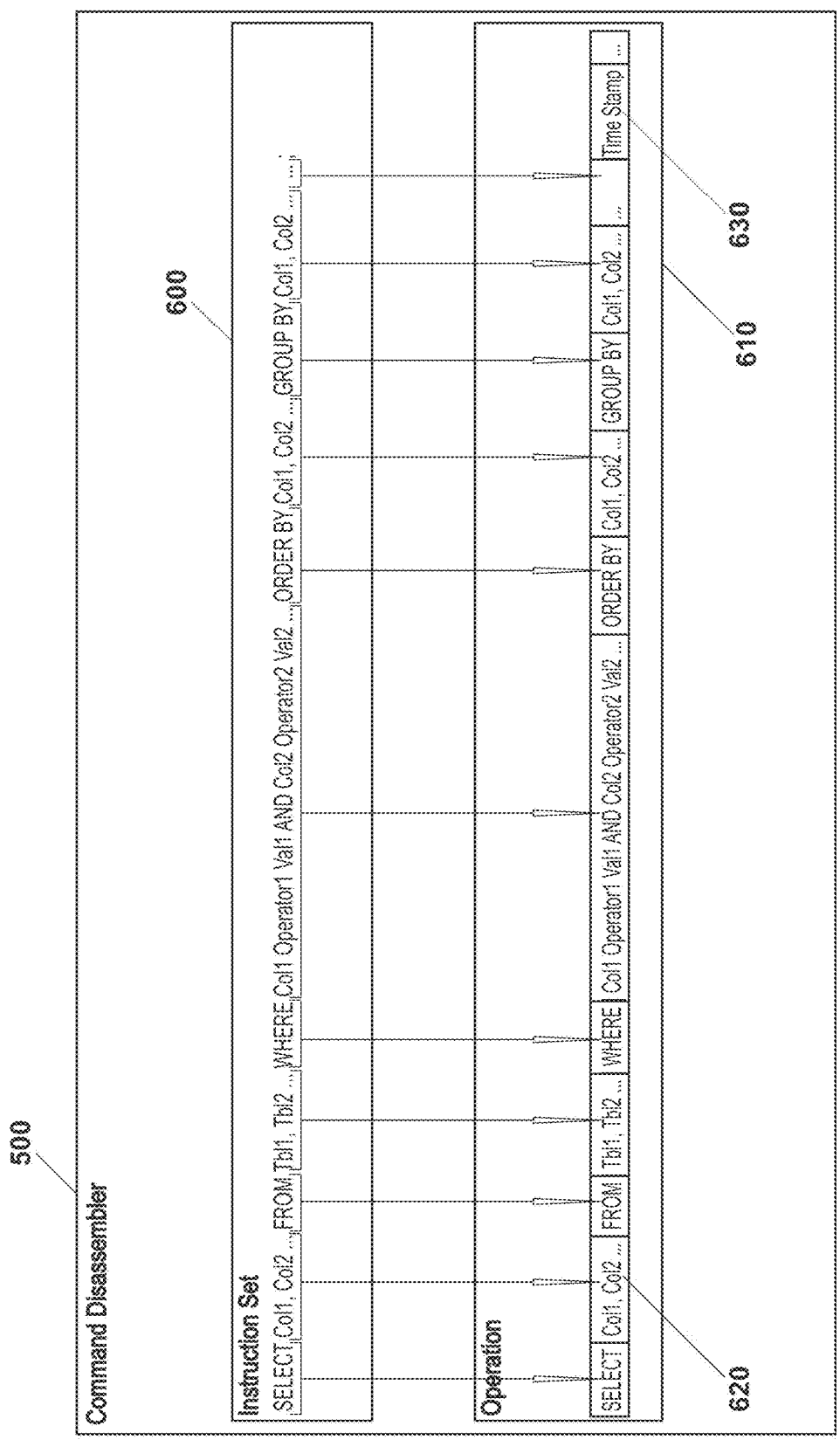
FIG. 6 is a diagram showing an embodiment of Command Disassembler 500.

Referring to FIG. 6, Command Disassembler 500 may comprise any hardware, software or a combination of hardware and software, and/or it may include functions and algorithms for disassembling an Instruction Set 600 into its instruction Set Portions 620 (also referred to as Inst Set Por) or subsets of the Instruction Set 600. Command Disassembler 500 may be, directly or operatively, connected to the Core Program 110 and the Operation List 510 and/or other elements to facilitate the overall system operation and implement the functionalities described herein.

Instruction Set 600 may be a SQL Statement, any DBMS command, any computer command, any instruction or instruction set used to access, manage, and/or manipulate (i.e. add, delete, change, etc.) data and the supporting data structures (i.e. databases, tables, relations, user accounts, etc.) in the Underlying DBMS 120. Instruction Set 600 may be issued in structured query language (SQL), a language utilized by many standard DBMSs, or in any programming language understood by the Underlying DBMS 120. Instruction Set 600 may comprise a number of commands, keywords, instructions, operators; variables, values, objects, functions and/or other components for performing a particular operation.

When an Instruction Set 600; such as the one in FIG. 6, is processed by Command Disassembler 500, the Instruction Set 600 may be divided or split into one or more Instruction Set Portions 620, which Instruction Set Portions 620 may then be stored in an Operation 610. The Operation 610 may be any data structure (i.e. array, list, linked list, doubly linked list, queue; table, file, etc.) comprising one or more data fields that may store instruction Set Portions 620 of a particular Instruction Set 600. Therefore; an instruction Set 600 may correspond to a particular Operation 610 identified by that particular Instruction Set 600; and vice versa. Also; the Instruction Set 600 may be referred to as the Operation 610, and vice versa, as this Operation 610 may be a representation of this particular Instruction Set 600, in effect, an instruction Set 600 and its corresponding Operation 610 may be logical equivalents where the Operation 610 may comprise Instruction Set's 600 Instruction Set Portions 620 and Extra Info 630 about the Instruction Set 600 and/or other relevant extra info. Therefore, Instruction Set 600 and Operation 610 may be used interchangeably herein.

Instruction Set Portions 620 may comprise particular commands, keywords (i.e. "SELECT", "FROM"; "INSERT"; etc.), instructions; operators (i.e. =, <, >, etc.), variables; values; objects (i.e. table, database, report/view, etc.), functions (i.e. FIRST( ), MIN( ), MAX( ), etc.) and/or other components (some or all of these components may be used interchangeably herein) for performing or specifying a particular portion of the Instruction Set 600. For example; an Instruction Set Portion 620 may include a keyword "SELECT" to indicate a type of operation to perform. Keywords "FROM" and "WHERE" may also be used to facilitate the operation and identify the data on which a particular command is to be performed. In addition; keywords may include a particular variable, such as a particular Database 300 name, or a particular Row 330 or Column 320 within a particular Table 310, or a particular data stored in a particular location in the Database 300.

Command Disassembler 500 may comprise functions and/or algorithms for identifying and recognizing specific commands, keywords, instructions, operators, variables, values, objects, functions and/or other components included within an Instruction Set 600. In some embodiments, the specific commands, keywords, instructions, operators, variables, values, objects, functions and/or other components may be included in a lexicon stored in a data structure (i.e. a list, array; table, etc.) containing all possible or most used commands, keywords, instructions; operators, variables, values, objects; functions and/or other components that may generally be used in SQL or other DBMS language used; and/or the ones that may specifically be used in the Underlying DBMS 120. This data structure may be predefined and may change as the objects or other elements within the Underlying DBMS 120 change. In one example, in response to changing the name of a table within a database, the data structure would update this table's name in itself, so Command Disassembler 500 may recognize the updated table name as an Instruction Set Portion 620 in its next run. In other embodiments, the data structure containing the lexicon may be created on fly or as needed by the AI DBMS system by (1) reading the Underlying DBMS 120 objects or other elements, meta data; data dictionary, and/or (2) including other typical Instruction Set Portions 620 (i.e. SQL or other language keywords, operators, functions, etc.) used in DBMSs.

Still referring to FIG. 6, in one example; the keyword "SELECT" is an Instruction Set Portion 620 of the Instruction Set 600 and therefore it is extracted and stored in a data field of the Operation 610. The next Instruction Set Portion 620 that is extracted and stored is the "Col1, Col2 . . . " representing the columns to be selected. The next Instruction Set Portion 620 that is extracted and stored is the keyword "FROM". The next instruction Set Portion 620 that is extracted and stored is the "Tbl1; Tbl2 . . . " representing the names of tables from which to obtain data. The next Instruction Set Portion 620 that is extracted and stored is the keyword "WHERE". The next Instruction Set Portion 620 that is extracted and stored is the "Col1 Operator1 Val1 AND Col2 Operator2 Val2 . . . " representing columns, operators and values used in restricting output results. The next Instruction Set Portion 620 that is extracted and stored is the keyword "ORDER BY". The next Instruction Set Portion 620 that is extracted and stored is the "Col1, Col2 . . . " representing columns by which to sort the resulting data set. The next Instruction Set Portion 620 that is extracted and stored is the keyword "GROUP BY". The next Instruction Set Portion 620 that is extracted and stored in a data field of the Operation 610 is the "Col1, Col2 . . . " representing columns by which to group the resulting data set. Other Instruction Set Portions 620 not shown may be utilized in alternate embodiments such as functions including (1) MIN( ), MAX( ), SUM( ), FIRST( ), LAST( ) etc., (2) operators including OR, LESS THAN, GREATER THAN, etc., (3) objects including databases, relations, user accounts, privileges, etc., and (4) other Instruction Set Portions 620 including all their variations.

Various types of Instruction Sets 600 will have different Instruction Set Portions 620 stored in Operation 610 data fields. For example, INSERT type of Instruction Set 600 would not have "SELECT", "FROM", "WHERE", "ORDER BY"; and "GROUP BY" keywords and their associated objects and operators. Instead, INSERT type of Instruction Set 600 would have different keywords, objects and operators such as "INSERT" and "INTO" keywords and their associated objects and operators.

In addition to Instruction Set's 600 Instruction Set Portions 620, extra information or Extra Info 630 such as a time stamp may also be stored in the data fields within the Operation 610, Time stamp of when the instruction Set 600 is executed may be useful for anticipation of the User's 10 future operating intentions related to a specific time frame. Other Extra Info 630 may be included in the Operation 610 such as user specific information, group user information, any context information such as the type of business for which the AI DBMS is used, the type of computing device executing the AI DBMS; the type of user (novice, moderate, skilled, expert) and other context information, version of the Underlying DBMS 120, etc. to provide as much information as possible for best anticipation of the User's 10 future operating intentions. Also, Command Disassembler 500 may be more detailed in its disassembling of the Instruction Set 600 in which case every keyword, operator, value and other portions of the Instruction Set 600 may be captured and stored as an instruction Set Portion 620 in the Operation 610. In general, when the Instruction Set 600 is disassembled into its Instruction Set Portions 620 and stored in the Operation 610 it becomes easier to compare to other Instruction Sets 600 or Operations 610.

Referring to FIG. 7, Operation List/Instruction Set List 510 (also referred to as Operation List 510 or Instruction Set List 510) may comprise any hardware, software or a combination of hardware and software; and/or it may include functions and algorithms for storing one or more Operations 610 and/or their corresponding Instruction Sets 600, In some embodiments, Operation List 510 may include any data structure (i.e. array, list, linked list, table; etc.) that may store one or more Operations 610 and/or their corresponding Instruction Sets 600. The Operation List 510 may be, directly or operatively, connected to the Command Disassembler 500; Knowledge Structuring Unit 520, and the Decision-making Unit 540 and/or other elements to facilitate the overall system operation and implement the functionalities described herein.

Operation List 510 may receive Operations 610 or Instruction Sets 600 from the Command Disassembler 500 and store a number of Operations 610 or Instruction Sets 600 that were most recently used or implemented by the system. The number of Operations 610 or Instruction Sets 600 most recently used or implemented may vary depending on the embodiments. For example, in some embodiments anywhere between 1 and 10000 most recently used or implemented Operations 610 or Instruction Sets 600 may be stored. In some embodiments the number of stored Operations 610 or instruction Sets 600 is between 2 and 10, such as for example 2, 5, 6, or 9. In other embodiments, the number of Operations 610 or Instruction Sets 600 is between 10 and 50, such as for example 12, 15, 20, 30, 40 or 50 Operations 610 or Instruction Sets 600. In further embodiments, the number of Operations 610 or Instruction Sets 600 stored is between 50 and 200, such as for example 50, 70, 80, 100, 130, 180 or 200 Operations 610 or Instruction Sets 600. In further embodiments, the number of Operations 610 or Instruction Sets 600 stored is between 200 and 10000, such as for example 500, 1000, 3000, 5000, 8000 or 10000. The number of Operations 610 or instruction Sets 600 may be any number, even greater than 1000. The number of most recently used or implemented Operations 610 or Instruction Sets 600 stored may be even greater than 10000, as one of ordinary skill in the art would recognize that the number of stored Operations 610 or Instruction Sets 600 may be any number that may be stored in any memory or storage described herein.

In one embodiment, in which the last nine Operations 610 or instruction Sets 600 are stored in the Operation List 510, Operations 610 or Instruction Sets 600 may be identified such that the current Operation 610 or Instruction Set 600 is identified as Operation n, the most recent Operation 610 or Instruction Set 600 prior to the current may be identified as Operation n−1, and so on until the least most recent Operation 610 or Instruction Set 600 being stored is labeled as Operation n−8, In such embodiments, each time the Operation List 510 receives another new Operation 610 or Instruction Set 600 from the Command Disassembler 500, it may erase the least recent Operation 610 or Instruction Set 600 such as the Operation n−8, and insert the current Operation 610 or Instruction Set 600 received as Operation n. Naturally, all the most recently used or implemented Operations 610 or Instruction Sets 600 that are stored in this list or queue may be shifted by one count further towards Operation n−8. This way, the system may maintain a queue of stored most recently used or implemented Operations 610 or Instruction Sets 600, where the queue may include any number of stored Operations 610 or Instruction Sets 600 as previously described.

In one example illustrated in FIG. 7, the Operation List 510 may represent a hypothetical situation where the User 10 may create a table and perform two repetitions of INSERT, UPDATE, DELETE and SELECT type operations.

Figure 8:
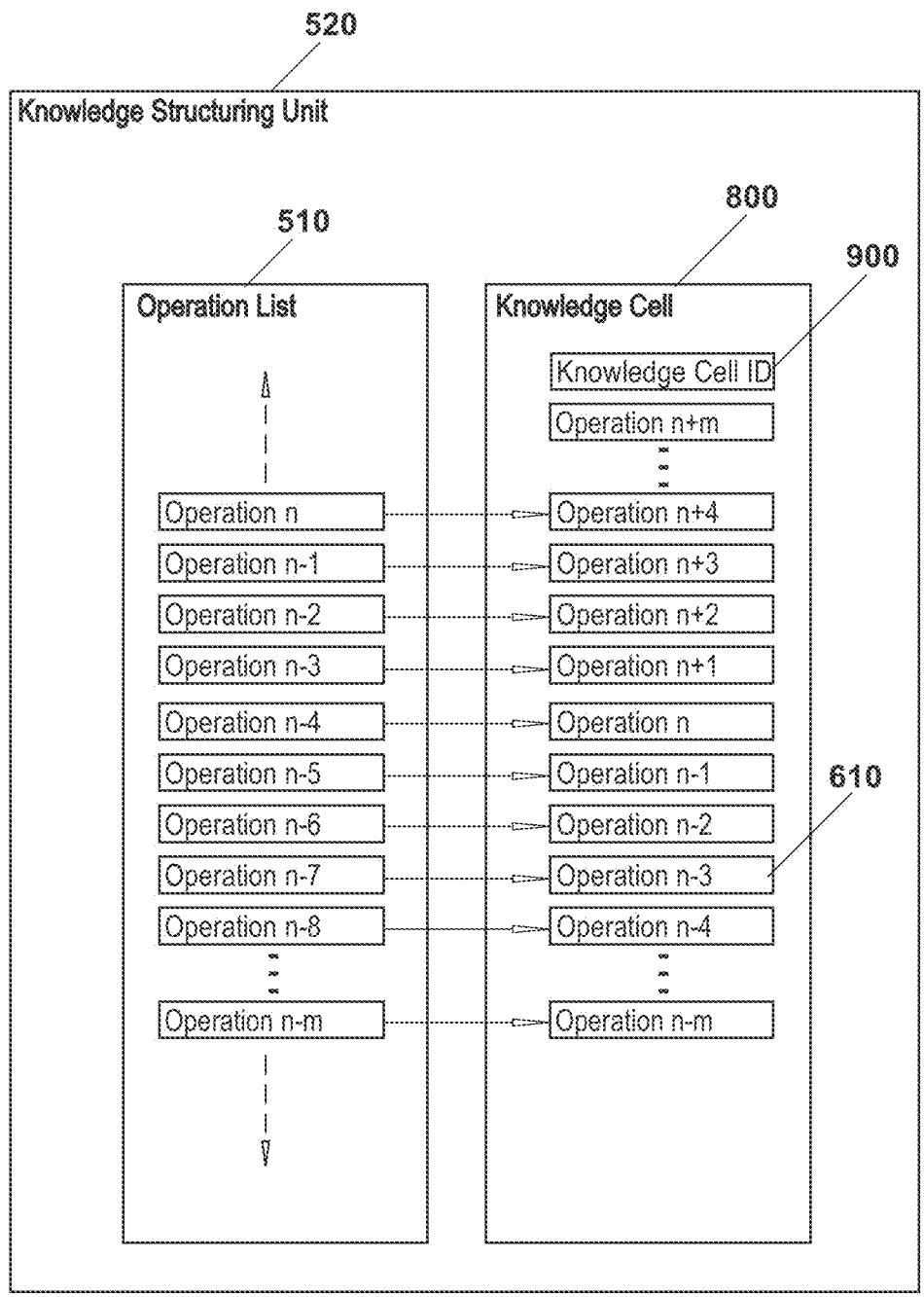
FIG. 8 is a diagram showing an embodiment of Knowledge Structuring Unit 520.

Referring to FIG. 8, Knowledge Structuring Unit 520 may comprise any hardware, software or a combination of hardware and software, and/or it may include functions and algorithms for structuring the "knowledge" of the User's 10 use of Operations 610 or Instruction Sets 600 for anticipating future Operations 610 or Instruction Sets 600. Knowledge Structuring Unit 520 may include functions and algorithms for structuring the stored sequence (i.e. Operation List 510) of User's 10 Operations 610 or Instruction Sets 600 into usable "knowledge" for future anticipating of the User's 10 operating intentions. Knowledge Structuring Unit 520 may include the functionality to produce any variations of Operations 610 or Instruction Sets 600 that may ever be used by a User 10, Knowledge Structuring Unit 520 may be, directly or operatively, connected to the Operation List 510 and Knowledgebase 530 and/or other elements to facilitate the overall system operation and implement the functionalities described herein.

In some embodiments, Knowledge Structuring Unit 520 may receive the current Operation List 510 and may create a Knowledge Cell 800 by copying, for example, Operation n from the Operation List 510 into Operation n+4 of the Knowledge Cell 800, by copying Operation n−1 from the Operation List 510 into Operation n+3 of the Knowledge Cell 800, by copying Operation n−2 from the Operation List 510 into Operation n+2 of the Knowledge Cell 800, and so forth, Knowledge Cell 800 may comprise any hardware, software or a combination of hardware and software, and/or it may include functions and algorithms for storing a recorded sequence of the User's 10 operating instructions (i.e. Operations 610 or Instruction Sets 600). In effect, when a Knowledge Cell 800 is created it may include any data structure (i.e. array, list, linked list, table, etc.) that may store a recorded sequence of the User's 10 operating instructions (i.e. Operations 610 or Instruction Sets 600) where, for example, Operation n, Operation n−1, Operation n−2, Operation n−3, and Operation n−4 may later be used for comparison with the then User's 10 current and recent operating instructions, and Operation n+1, Operation n+2, Operation n+3, and Operation n+4 may later be used for anticipation of the User's 10 future operating intentions (i.e. future Operations 610 or Instruction Sets 600). In some embodiments, Operations 610 or Instruction Sets 600 within the Knowledge Cell 800 with an order number greater than n may be anticipatory and the rest of the Operations 610 or instruction Sets 600 may be comparative, although this particular split may differ in alternate embodiments. Any number of comparative and any number of anticipatory Operations 610 or Instruction Sets 600 may be included in a Knowledge Cell 800 and any number of Knowledge Cells 800 may be used in the AI DBMS system. In one embodiment, one long Knowledge Cell 800 may be used in which case comparisons of Operations 610 or Instruction Sets 600 may be performed in a traversing pattern as explained below. Also, as indicated by the up and down vertical dotted arrows, the copying of Operation n from the Operation List 510 into the Knowledge Cell 800 may start at any Operation n+m through Operation n−m of the Knowledge Cell 800. This way, the number of comparative and anticipatory Operations 610 or Instruction Sets 600 may differ and they can be determined either by the user or the system itself. For example, a Knowledge Cell 800 may include only one anticipatory Operation 610 or Instruction Set 600 in the case where the copying of the Operation List 510 into the Knowledge Cell 800 starts with copying Operation n of the Operation List 510 into Operation n+1 of the Knowledge Cell 800. In another example, a Knowledge Cell 800 may include four anticipatory Operations 610 or Instruction Sets 600 in the case where the copying of the Operation List 510 into the Knowledge Cell 800 starts with copying Operation n of the Operation List 510 into Operation n+4 of the Knowledge Cell 800.

Figure 9:
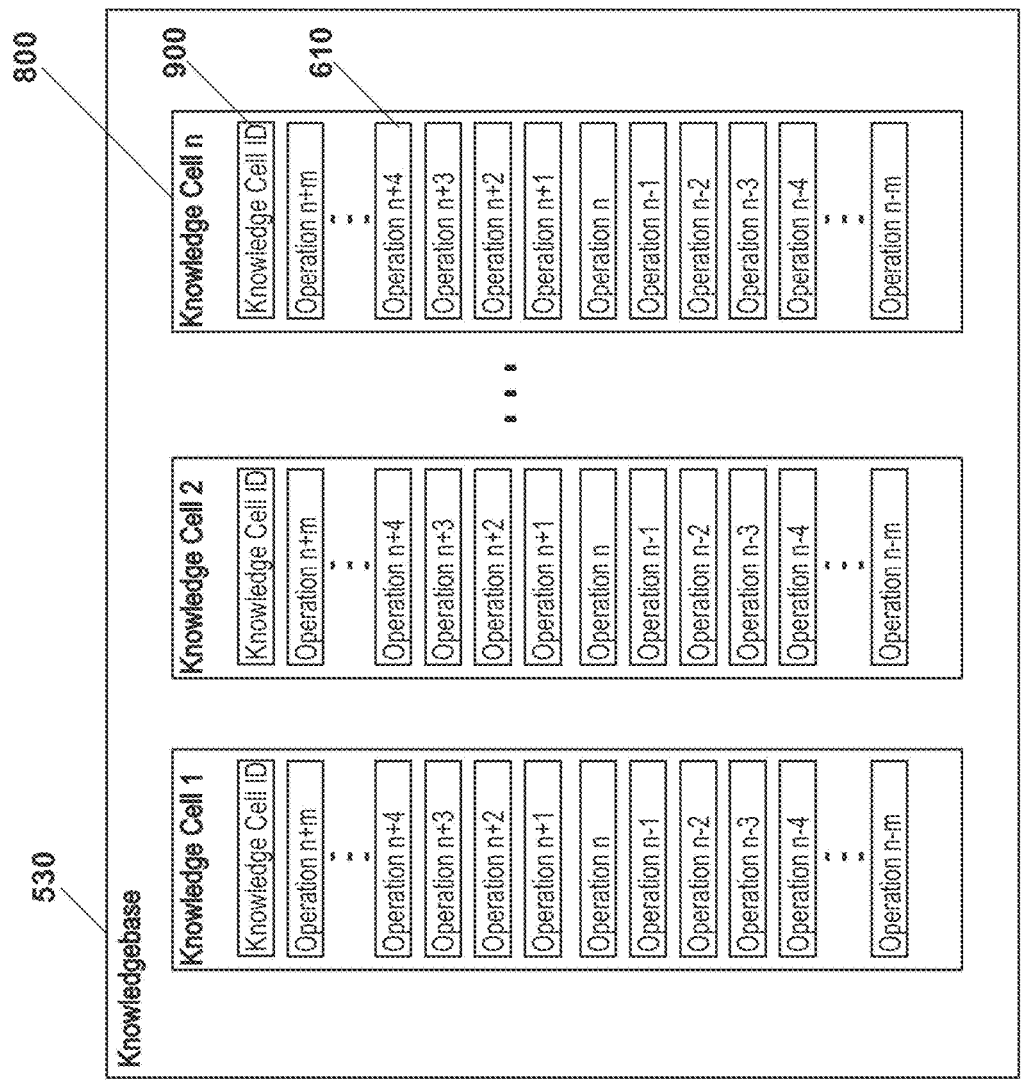
FIG. 9 is a diagram showing an embodiment of Knowledgebase 530.

Referring to FIG. 9, Knowledgebase 530 may comprise any hardware, software or a combination of hardware and software, and/or it may include functions and algorithms for storing a plurality of Operations 610 or Instruction Sets 600. Knowledgebase 530 may include functions and algorithms for storing a plurality of Operations 610 or instruction Sets 600 generally structured into one or more Knowledge Cells 800, although Operations 610 or Instruction Sets 600 may be stored directly in the Knowledgebase 530 and need not be structured into or use Knowledge Cells 800. Knowledgebase 530 may include the functionality for storing Knowledge Cells 800, or Operations 610 or instruction Sets 600 in a particular order to enable easier access and usage of stored data. Knowledgebase 530 may also include the functionality for managing and/or modifying and/or providing Knowledge Cells 800, or Operations 610 or Instruction Sets 600 as necessary. Knowledgebase 530 may comprise the functionality to store and manage all the Knowledge Cells 800, or Operations 610 or instruction Sets 600 that were used or implemented by any users in the past. Knowledgebase 530 may store any variations of Knowledge Cells 800, or Operations 610 or Instruction Sets 600 that may ever be used by a user. Knowledgebase 530 may be, directly or operatively, connected to the Knowledge Structuring Unit 520 and the Decision-making Unit 540 and/or other elements to facilitate the overall system operation and implement the functionalities described herein.

As shown in FIG. 9, Knowledgebase 530 may include a table (a vertical representation of records in a table is shown), although, one or more tables, databases, files, or any other data structures or data repositories may be used. Knowledgebase 530 may include an entire DBMS dedicated to Knowledgebase 530 functionalities in some embodiments. For example, in the case of a single table being used as the Knowledgebase 530, a Knowledge Cell 800 may be stored within the table where each of the Operations 610 or Instruction Sets 600 of the Knowledge Cell 800 may be a record with a common Knowledge Cell Identifier (ID) 900 that signifies its association with its parent Knowledge Cell 800. Each record within the table may contain data fields (i.e. Instruction Set Portions 620) of the corresponding Operation 610 or Instruction Set 600. Later in the process, a simple call to the table to read all records with a specific Knowledge Cell ID 900 would reconstruct the Knowledge Cell 800. Knowledgebase 530 may reside within the Underlying DBMS 120 in some embodiments, or it may reside anywhere outside the Underlying DBMS 120 in other embodiments.

In some embodiments, Operations 610 or Instruction Sets 600 may be stored directly within the Knowledgebase 530 without using Knowledge Cell 800 as the intermediary data structure, in these embodiments, Operations 610 or Instruction Sets 600 may be stored in one or more sequences (i.e. tables, lists, arrays, etc.) of the Knowledgebase 530. Furthermore, comparisons of Operations 610 or instruction Sets 600 later described may be performed by traversing the one or more sequences of Operations 610 or Instruction Sets 600 to find a match. In one example, Knowledgebase 530 may include all of User's 10 Operations 610 or Instruction Sets 600 in a single long sequence (i.e. table, list, array, etc.), or it may record User's 10 Operations 610 or Instruction Sets 600 in daily, weekly, monthly, yearly or other periodic sequences (i.e. monthly tables, monthly lists, monthly arrays, etc.) in another example. In the case of a single long sequence, for example, the comparisons of Operations 610 or Instruction Sets 600 later described would compare Operations 610 or instruction Sets 600 in the current Operation List 510 with subsequences of the single long sequence in incremental or other traversing pattern. The incremental traversing pattern of comparison may start from one of the ends of the single long sequence and move the comparison subsequence up or down the list one incremental Operation 610 or Instruction Set 600 at a time. Other traversing patterns or algorithms may be employed such as starting from the middle of the sequence and subdividing the resulting sub-sequences in a recursive pattern, or any other traversing pattern or algorithm.

Figure 10:
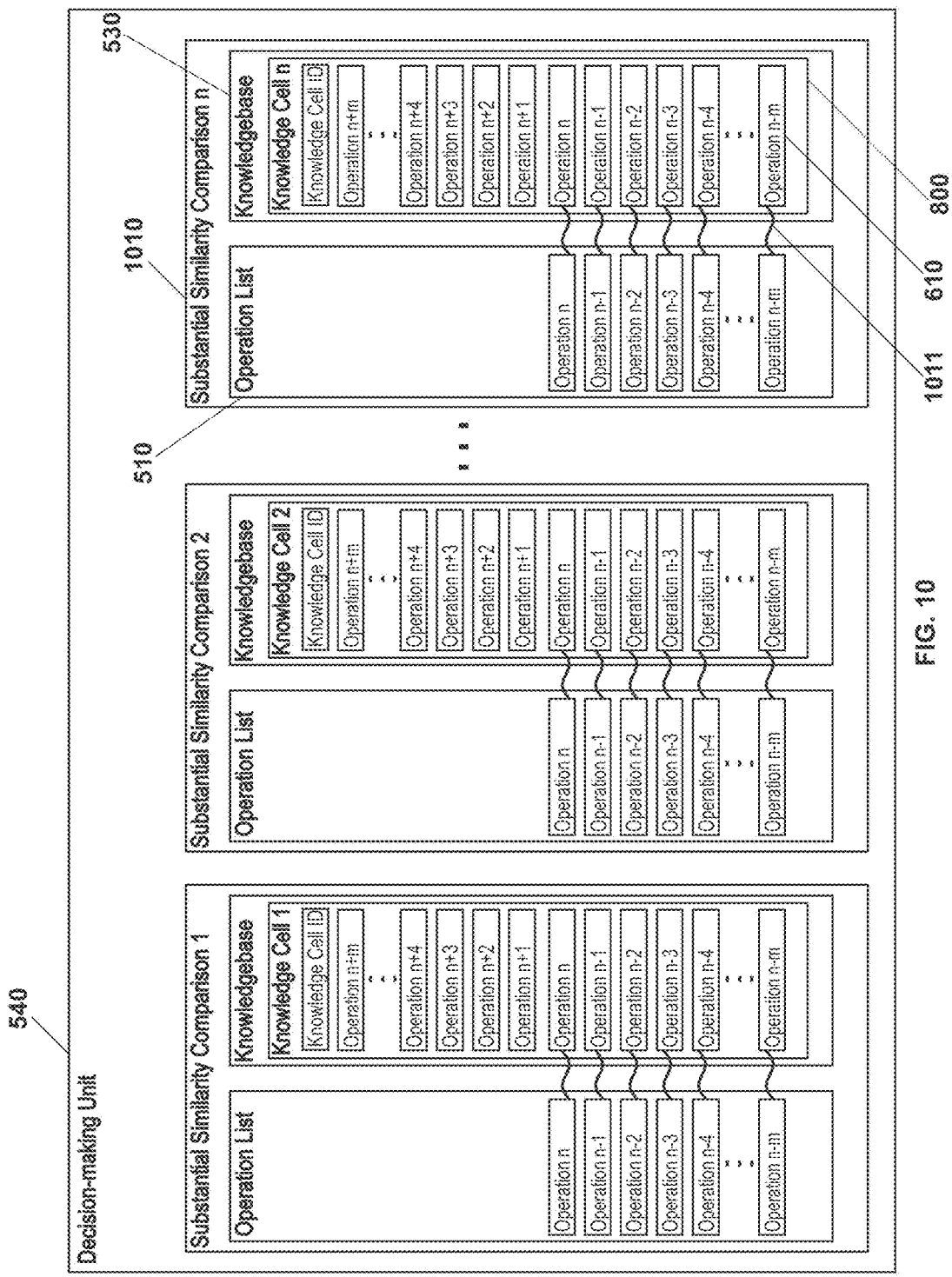
FIG. 10 is a diagram showing an embodiment of Decision-making Unit 540.

Referring to FIG. 10, the Decision-making Unit 540 may comprise any hardware, software or a combination of hardware and software, and/or it may include functions and algorithms for anticipating the User's 10 future operating intentions (i.e. future Operations 610 or Instruction Sets 600). Decision-making Unit 540 may comprise algorithms, functions, rules and logic to enable the system to determine which Operation 610 or Instruction Set 600 the User 10 may intend or is most likely to use or implement. Similarly, Decision-making Unit 540 may comprise the functionality to determine which Operation 610 or instruction Set 600 the user is second most likely to use or implement, which Operation 610 or Instruction Set 600 the user is third most likely to use or implement, and so on. Furthermore, Decision-making Unit 540 may comprise the functionality to determine the sequence or order in which the user may intend or is most likely to use or implement Operations 610 or instruction Sets 600. The Decision-making Unit 540 may be, directly or operatively, connected to the Operation List 510 and the Knowledgebase 530 and/or other elements to facilitate the overall system operation and implement the functionalities described herein.

As shown in FIG. 10, Decision-making Unit 540 may anticipate the User's 10 future operating intentions (i.e. future Operations 610 or Instruction Sets 600) by performing Substantial Similarity Comparisons 1010 between the current Operation List 510 and Knowledge Cells 800 stored in the Knowledgebase 530. This may be done by performing Substantial Similarity Comparisons 1010 one Knowledge Cell 800 at a time, by traversing a one long knowledge cell, or by other similar algorithms.

Substantial Similarity Comparison 1010 may comprise any hardware, software or a combination of hardware and software, and/or it may include functions and algorithms for comparing or matching Operations 610 or Instruction Sets 600. Substantial Similarity Comparison 1010 may include functions and algorithms for comparing or matching Operations 610 or Instruction Sets 600 from the Operation List 510 with (1) Operations 610 or Instruction Sets 600 stored in a Knowledgebase 530 or (2) Operations 610 or Instruction Sets 600 from the Knowledge Cells 800 stored in a Knowledgebase 530. In some embodiments, the comparing or matching may include comparing Operations 610 or Instruction Sets 600 from the Operation List 510 with comparative Operations 610 or instruction Sets 600 from the Knowledge Cells 800 stored in a Knowledgebase 530. Substantial Similarity Comparison 1010 may comprise algorithms, functions and/or logic for performing matching or comparisons and for determining that while a perfect match is not found, a substantially similar match has been found. Substantial Similarity Comparison 1010 may therefore identify an Operation 610 or Instruction Set 600 from an Operation List 510 that is most like an Operation 610 or Instruction Set 600 from a Knowledge Cell 800 in a Knowledgebase 530, even if the Operation 610 or Instruction Set 600 from the Operation List 510 is different from the Operation 610 or instruction Set 600 in the Knowledge Cell 800.

In some embodiments such as one illustrated in FIG. 10, Substantial Similarity Comparison 1010 may include comparing a particular number of User's 10 most recently implemented Operations 610 or Instruction Sets 600 (such as for example: Operation n, Operation n−1, Operation n−2, Operation n−3, Operation n−4, etc.) from the Operations List 510 with the corresponding Operations 610 or Instruction Sets 600 from the Knowledge Cells 800 in the Knowledgebase 530, If a substantially similar pattern of User's 10 most recently implemented Operations 610 or Instruction Sets 600 (such as for example: Operation n, Operation n−1, Operation n−2, Operation n−3, Operation n−4, etc.) is found, subsequent User's 10 operating intentions (i.e. future Operations 610 or instruction Sets 600) may be anticipated in the anticipatory Operations 610 or Instruction Sets 600 (such as for example: Operation n+1, Operation n+2, Operation n+3, Operation n+4, etc.). Any number of Operations 610 or Instruction Sets 600 may be compared in alternate embodiments of the Substantial Similarity Comparisons 1010.

Still referring to FIG. 10, each Substantial Similarity Comparison 1010 may comprise a Comparison Strictness Function 1011. Although FIG. 10 illustrates each Substantial Similarity Comparison 1010 including its own dedicated Comparison Strictness Function 1011, in some embodiments, Comparison Strictness Function 1011 may be a single function, in connection with a Decision-making Unit 540, servicing multitude Substantial Similarity Comparisons 1010, Comparison Strictness Function 1011 may comprise hardware, software or a combination of hardware and software for determining the strictness criteria for finding a substantial similarity match between the Operations 610 or instruction Sets 600 in the Operation List 510 and the Knowledgebase 530. As appropriately strict rules for substantial similarity need to be defined in the Substantial Similarity Comparisons 1010, if the rules are too strict, the Substantial Similarity Comparisons 1010 may not find a matching Knowledge Cell 800 in the Knowledgebase 530. On the other hand, if the rules are too flexible the Substantial Similarity Comparisons 1010 may find too many matching Knowledge Cells 800 and may anticipate inaccurate User's 10 future operating intentions (i.e. future Operations 610 or Instruction Sets 600). Comparison Strictness Function 1011 may therefore include the functionality for setting and resetting the strictness of rules for finding the substantially similar matches, thereby fine tuning the Substantial Similarity Comparisons 1010 so that the rules for finding the match are not too strict nor too lenient.

The appropriately strict rules for substantial similarity may be defined for the current disclosure based on the type of DBMS application, experience, testing logs, inquiry, analysis, synthesis or other techniques in alternate implementations. As such, the strictness rules of the Comparison Strictness Function 1011 may be set by the user or by AI DBMS administrator based on such experience and knowledge. In one implementation, substantial similarity may be achieved when most of the Instruction Set Portions 620 of the User's 10 most recently implemented Operations 610 or Instruction Sets 600, such as for example five Operations 610 or Instruction Sets 600 (i.e. Operation n, Operation n−1, Operation n−2, Operation n−3, and Operation n−4) in the Operations List 510 substantially match the Instruction Set Portions 620 of the corresponding (i.e. comparative) Operations 610 or Instruction Sets 600 from a Knowledge Cell 800. Alternatively, total equivalence may be found when all Instruction Set Portions 620 of the User's 10 most recently implemented Operations 610 or Instruction Sets 600 from the Operation List 510 match the Instruction Set Portions 620 of all corresponding (i.e. comparative) Operations 610 or Instruction Sets 600 from a Knowledge Cell 800 within the Knowledgebase 530. In other embodiments, when a total equivalence match is not found, Substantial Similarity Comparison 1010 may omit values, operators, or other components from the comparison, although values, operators, or other components are captured as sub-segments of Instruction Set Portions 620.

Comparison Strictness Function 1011 may comprise algorithms, functions and logic to automatically adjust its level of strictness for finding a best substantial similarity match between the Operations 610 or Instruction Sets 600 in the Operation List 510 and the corresponding (i.e. comparative) Operations 610 or instruction Sets 600 in the Knowledgebase 530 (i.e. Knowledge Cells 800 stored in the Knowledgebase 530 or Operations 610 or instruction Sets 600 stored in the Knowledgebase 530). Depending on the design, various levels of strictness may be used. In some embodiments, Comparison Strictness Function 1011 may set the rules to search for a substantial similarity by finding perfect matches between the Operations 610 or Instruction Sets 600 in the Operation List 510 and the corresponding (i.e. comparative) Operations 610 or Instruction Sets 600 in the Knowledgebase 530, If such a match is not found, Comparison Strictness Function 1011 may decrease the strictness level. In some embodiments, in response to decreasing the strictness level, Comparison Strictness Function 1011 may set the strictness of the rules to search for a substantial similarity in terms of a total equivalence with respect to command portions of the Operation 610 or Instruction Set 600 only, thereby tolerating mismatches in variable names, such as the names of databases or tables. Comparison Strictness Function 1011 may choose to relax the rules in response to determining that no total equivalence match had been found. For example, in such embodiments, a substantial similarity may be achieved when a match is found in terms of a correct operation, but for a different database than the one the user wants to operate on. In such instances, upon presenting the user with the substantial similarity match (i.e. substantially similar Knowledge Cell 800), the AI DBMS may give the user an anticipatory Operation 610 or instruction Set 600 from the matched Knowledge Cell 800 allowing the user to change the variable names into the ones desired, still saving the user work on inputting the commands. In further embodiments, Comparison Strictness Function 1011 may, upon determining that a perfect match is not found, allow for matching all but one of the Operations 610 or Instruction Sets 600 from the Operation List 510 and the corresponding (i.e. comparative) Operations 610 or instruction Sets 600 in the Knowledgebase 530. In further embodiments, the Comparison Strictness Function 1011 may set the rules to find a match with all but two or more Operations 610 or Instruction Sets 600 from the Operation List 510 and the corresponding (i.e. comparative) Operations 610 or Instruction Sets 600 in the Knowledgebase 530.

All the aforementioned settings of strictness of the substantial similarity match may be set, or reset, by the Comparison Strictness Function 1011, in response of another strictness level determination. For example, Comparison Strictness Function 1011 may adjust a strictness level for identifying a substantial similarity match for an Operation 610 or Instruction Set 600 whose Instruction Set Portions 620 corresponding to command words are a total match with Instruction Set Portions 620 of an Operation 610 or Instruction Set 600 in a Knowledgebase 530, while tolerating mismatches in table names, database names and similar. Such an adjustment in strictness may be done by the Comparison Strictness Function 1011 in response to determining that a total equivalence match for an entire Operation 610 or Instruction Set 600 is not found in the Knowledgebase 530. Similarly, Comparison Strictness Function 1011 may adjust the strictness level for identifying a substantial similarity match for an Operation 610 or Instruction Set 600 whose Instruction Set Portions 620 match all but one instruction Set Portion 620 of an Operation 610 or Instruction Set 600 in a Knowledgebase 530. Also, Comparison Strictness Function 1011 may adjust the strictness level for identifying a substantial similarity match for an Operation 610 or Instruction Set 600 whose Instruction Set Portions 620 match all but two or more Instruction Set Portions 620 of an Operation 610 or Instruction Set 600 in a Knowledgebase 530. Such an adjustment in strictness may be done by the Comparison Strictness Function 1011 in response to determining that not a sufficient number of matches had been found using a higher strictness level.

Comparison Strictness Function 1011 may therefore increase and decrease the strictness of the rules for finding a substantial similarity match depending on whether or not perfect matches (i.e. perfect equivalents between the compared Operations 610 or Instruction Sets 600) had been found. As such, Comparison Strictness Function 1011 may utilize two thresholds, the upper and a lower threshold, to determine the strictness of the rules used for determining the substantial similarity match. The upper threshold may correspond to the number of substantial similarity matches that are too high to be presented to the user (i.e. too many matching results, too vague suggestions). Alternatively, the lower threshold may correspond to the strictness level that results in too few results to be presented to the user. Comparison Strictness Function 1011 may make any combination of the aforementioned adjustments to achieve that the number of substantial similarity matches between the Operations 610 or Instruction Sets 600 in the Operation List 510 and the corresponding (i.e. comparative) Operations 610 or Instruction Sets 600 in the Knowledgebase 530 falls between the upper and the lower threshold. As such, Comparison Strictness Function 1011 may keep adjusting the strictness rules for finding the substantially similar match until both thresholds are satisfied, thereby adjusting the results until the best set of results is found.

In one embodiment, Comparison Strictness Function 1011 may adjust the strictness level by choosing the number of Operations 610 or Instruction Sets 600 that it will use to find a substantial similarity match. For example, as a user implements first three Operations 610 or Instruction Sets 600, Comparison Strictness Function 1011 may run these three Operations 610 or instruction Sets 600 against Knowledge Cells 800 in the Knowledgebase 530. If the Substantial Similarity Comparison 1010 provides a number of matching results (i.e. results that have perfect equivalence) that is above a particular threshold, the Comparison Strictness Function 1011 may decide to increase the strictness of the rules to decrease the number of results. In response, Substantial Similarity Comparison 1010 may then decide to wait for the user to add a fourth Operation 610 or Instruction Set 600, thereby allowing the Substantial Similarity Comparison 1010 to use the fourth Operation 610 or Instruction Set 600 in addition to the earlier three to find a smaller number of matching results. Once the user adds the fourth Operation 610 or Instruction Set 600, the Substantial Similarity Comparison 1010 may use all four Operations 610 or Instruction Sets 600 to find a match. If the number of matching results (i.e. results that perfectly match or total equivalences) is sufficiently small, the system may present the user with these results. If however, the number of matching results is still too high, the Comparison Strictness Function 1011 may determine to further increase the strictness by requiring the user to add additional Operations 610 or Instruction Sets 600 and thereby further narrow the search results before presenting the user with the suggested results. In some embodiments, Operations 610 or Instruction Sets 600 added may include a portion of an Operation 610 or instruction Set 600 such as a first one or more Instruction Set Portions 620 or one or more letters or one or more keywords, commands, phrases, etc. of such Instruction Set Portions 620.

To increase comparison accuracy, Extra info 630 (i.e. time stamp, user specific information, group user information, etc.) besides Instruction Set Portions 620 may be recorded at the creation of an Operation 610 by the Command Disassembler 500, as previously described. Substantial Similarity Comparison 1010 may use this additional information for finding the best match between the Operations 610 or Instruction Sets 600 in the Operation List 510 and the corresponding (i.e. comparative) Operations 610 or Instruction Sets 600 in the Knowledgebase 530. Concerning time stamp, User 10 may perform some operations such as data backup periodically, such as for example, during a specific time of day, week, month, year or any other time period. The Substantial Similarity Comparison 1010 may utilize the time stamp in the comparisons to determine the best match in the case of these time-sensitive Operations 610 or Instruction Sets 600.

Another technique for increasing comparison accuracy and/or adjusting strictness level of the Comparison Strictness Function 1011 may be to assign an importance index (i.e. on a scale from 1 to 10) to each Instruction Set Portion 620 and/or Extra Info 630. This way, the Substantial Similarity Comparison 1010 may focus more on the comparison of, for example, command words, keywords and/or objects, and less on operators and time stamps for certain types of Operations 610 or Instruction Sets 600.

Another technique for increasing comparison accuracy and/or adjusting strictness level of the Comparison Strictness Function 1011 may be to include semantic analysis in the Substantial Similarity Comparison 1010. For example, an Operation 610 or Instruction Set 600 from the Operation List 510 may contain a table called Customers. Instead of looking for the exact name match in the corresponding (i.e. comparative) Operation 610 or instruction Set 600 from the Knowledgebase 530 the Substantial Similarity Comparison 1010 may employ semantic analysis and attempt to match Cust, Cst, Cstm, Cstmr, Cstmrs, or other variations of the table name with a meaning Customers. This semantic analysis method is not limited to the use only with meanings of object names such as database names, table names, column names, etc. This approach may be utilized with any differing field or segment of an Operation 610 or instruction Set 600 with a potentially same meaning such as various operators with same meanings, various values with same meanings, various keywords with same meanings, etc.

Another technique that may be used is for the Substantial Similarity Comparison 1010 to assign comparison accuracy (not shown) during the comparison process based on how well matched are the Operations 610 or Instruction Sets 600 of the Operation List 500 to the Operations 610 or Instruction Sets 600 of a Knowledge Cell 800 in the Knowledgebase 530. An indicator of comparison accuracy with a scale from 1 to 10 may be utilized, for example. The indicator of comparison accuracy may then be stored in the Operations 610 or Instruction Sets 600 of the Substantially Similar Knowledge Cell 1110. Comparison accuracy information may be useful later in the User Confirmation 1130 process step to help automate the confirmation process.

Figure 11:
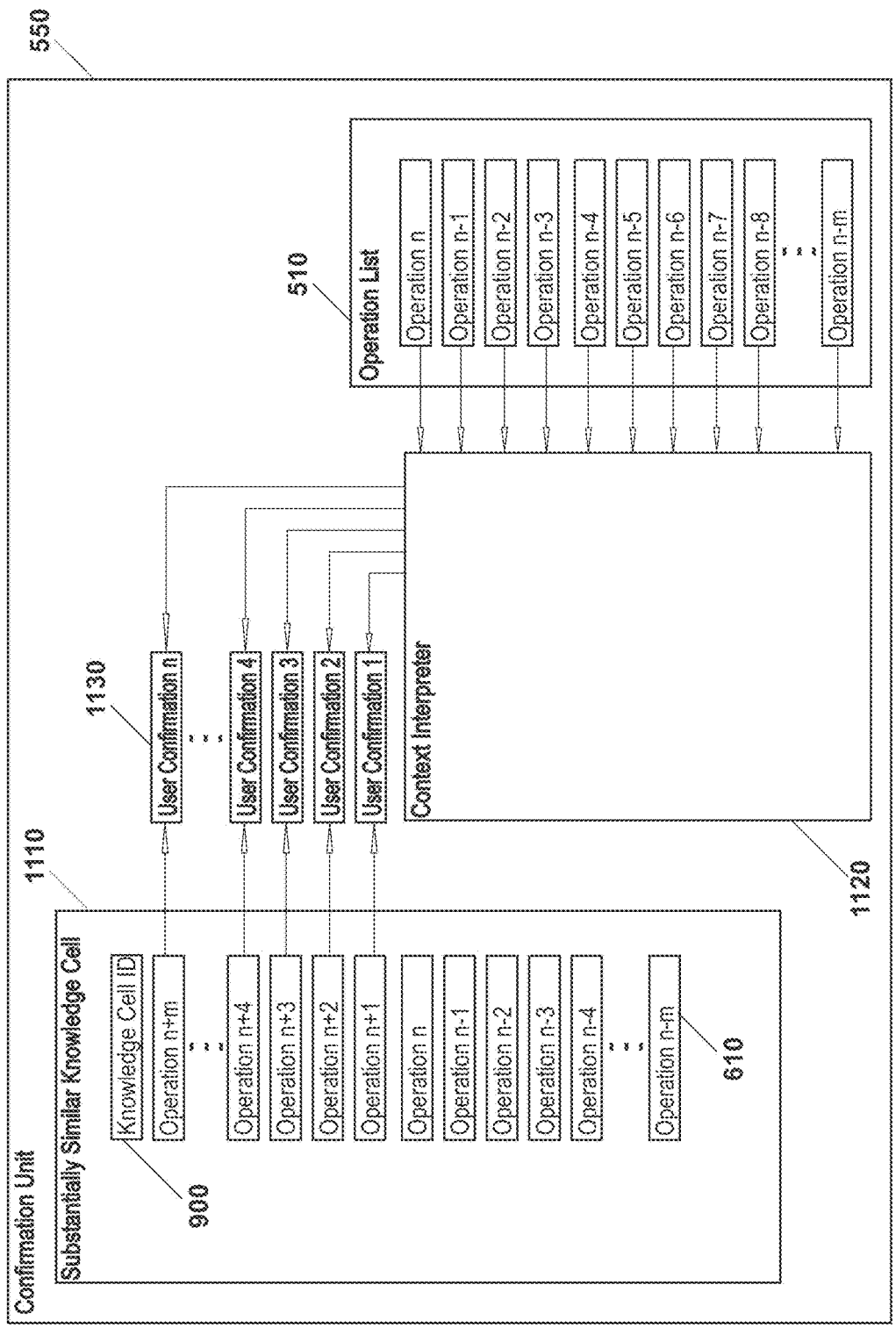
FIG. 11 is a diagram showing an embodiment of Confirmation Unit 550.

Referring to FIG. 11, Confirmation Unit 550 may comprise any hardware, software or a combination of hardware and software, and/or it may include functions and algorithms for confirming the User's 10 anticipated operating intentions (i.e. anticipatory Operations 610 or Instruction Sets 600) with the User 10. Confirmation Unit 550 may comprise algorithms and functions to enable the system to confirm the Operations 610 or Instruction Sets 600 that the AI DBMS determined (i.e. via the substantial similarity comparison) could be the Operations 610 or Instruction Sets 600 which the user may want to use or implement. Confirmation Unit 550 may be, directly or operatively, connected to the Decision-making Unit 540 and the Command Assembler 560 and/or other elements to facilitate the overall system operation and implement the functionalities described herein.

As shown in FIG. 11, Confirmation Unit 550 may include Substantially Similar Knowledge Cell 1110, Context Interpreter 1120, User Confirmation 1130 process step, and Operation List 510. Other additional elements may be included as needed, or some of the disclosed ones may be excluded, or a combination thereof may be utilized in alternate embodiments. The Substantially Similar Knowledge Cell 1110 may be a product of the Decision-making Unit 540 and may be the knowledge cell whose comparative Operations 610 or Instruction Sets 600 are substantially similar to the User's 10 most recently implemented Operations 610 or instruction Sets 600 from the Operation List 510.

The context in which Operations 610 or Instruction Sets 600 from the Operation List 510 were performed may be analyzed by the Context Interpreter 1120. In some embodiments, context may be defined as (1) any segment of the Instruction Set 600 not captured as an Instruction Set Portion 620 in an Operation 610, (2) any sub-segment of an Instruction Set Portion 620 within an Operation 610 that is not used in the Substantial Similarity Comparison 1010, or (3) any information about Operations 610 or Instruction Sets 600 from the Operation List 510 that may be useful in anticipating User's 10 operating intentions (future Operations 610 or Instruction Sets 600). In effect, Context Interpreter 1120 may perform an extra analysis step and it may attempt to capture all information and/or elements that may have been omitted by the Command Disassembler 500, by the Substantial Similarity Comparison 1010, or by other process steps.

An example of Context Interpreter's 1120 usefulness is the fact that values may be omitted from Substantial Similarity Comparisons 1010 in some embodiments, as previously described. It is Context Interpreter's 1120 responsibility to discover the values or ranges of values used in the User's recent Operations 610 or Instruction Sets 600 by extracting the values from their Instruction Set Portions 620. User Confirmation 1130 process steps may then take these values or ranges of values, modify anticipatory Operations 610 or Instruction Sets 600 (such as for example: Operation n+1, Operation n+2, Operation n+3, Operation n+5, etc.) according to these values or ranges of values, and present the modified anticipatory Operations 610 or instruction Sets 600 to the User 10 for confirmation before executing them.

User Confirmation 1130 may comprise any hardware, software or a combination of hardware and software, and/or it may include functions and algorithms for automating user confirmation if the Substantially Similar Knowledge Cell 1110 contains comparison accuracy information as previously described, such as for example an instance in which one or more comparative Operations 610 or Instruction Sets 600 were found to be a perfect or highly accurate match. In such instances, anticipatory Operations 610 or instruction Sets 600 from the Substantially Similar Knowledge Cell 1110 may be automatically executed by AI DBMS without asking the user to confirm them. As such, anticipatory Operations 610 or Instruction Sets 600 from the Substantially Similar Knowledge Cell 1110 with complete or high comparison accuracy may be executed without the need to confirm with User 10, Conversely, anticipatory Operations 610 or instruction Sets 600 from the Substantially Similar Knowledge Cell 1110 with less than high comparison accuracy may be presented to User 10 for confirmation including presenting the comparison accuracy information for User's 10 consideration.

Figure 12:
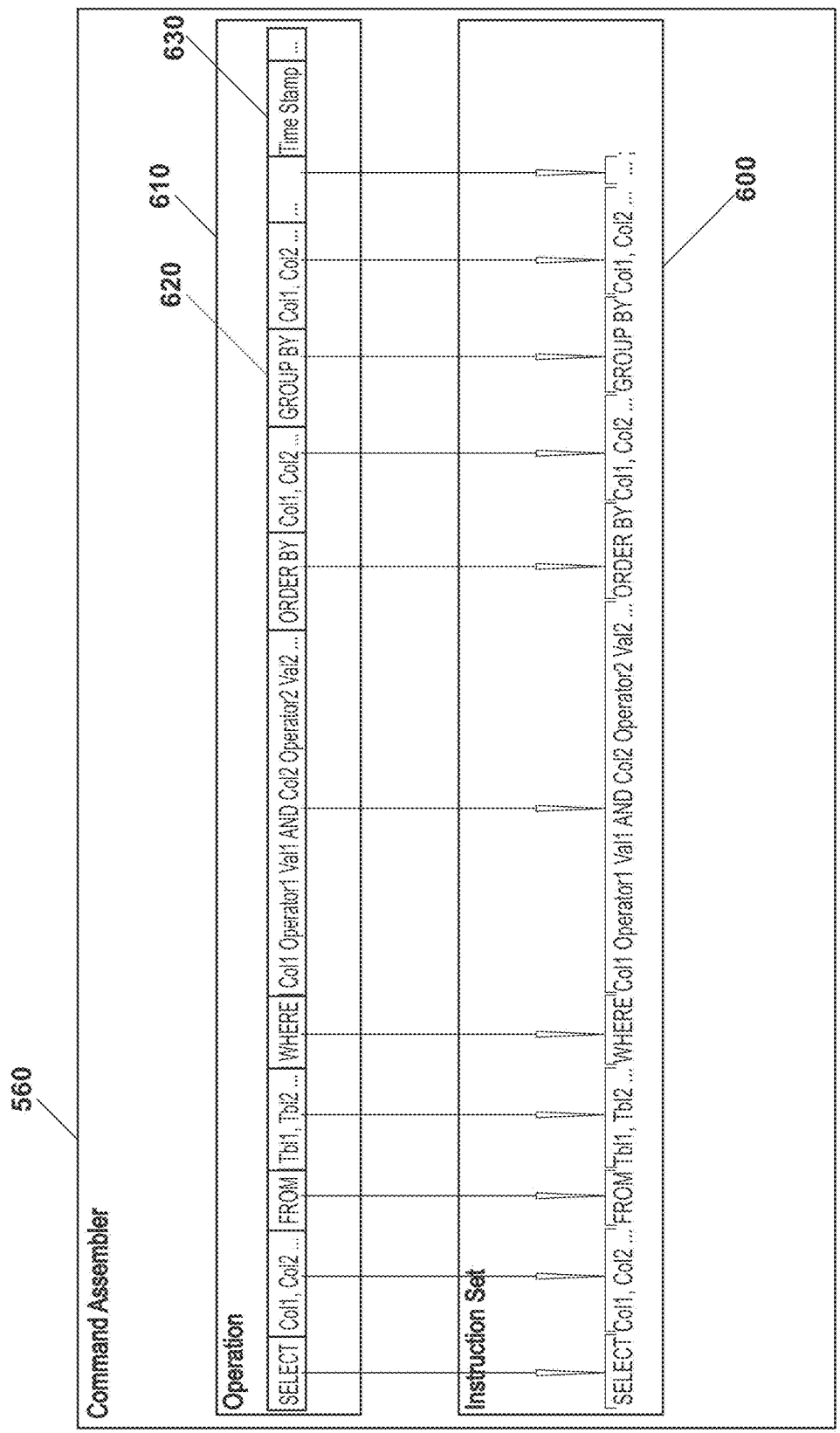
FIG. 12 is a diagram showing an embodiment of Command Assembler 560.

Referring to FIG. 12, Command Assembler 560 may comprise any hardware, software or a combination of hardware and software, and/or it may include functions and algorithms for assembling an instruction Set 600. Command Assembler 560 may include functions and algorithms for assembling an Instruction Set 600 from the Instruction Set Portions 620 stored in the Operation 610. Alternatively, when a complete Instruction Set 600 is known and no assembly of various Instruction Set Portions 620 is needed, Command Assembler 560 may simply verify that the Instruction Set 600 is ready for implementation by the AI DBMS, Command Assembler 560 may be, directly or operatively, connected to Confirmation Unit 550 and Core Program 110 and/or other elements to facilitate the overall system operation and implement the functionalities described herein.

As shown in FIG. 12, Command Assembler 560 may assemble Instruction Set 600 from the Instruction Set Portions 620 stored in the data fields of the Operation 610. Command Assembler 560 in effect performs the reverse action relative to the Command Disassembler 500.

In some embodiments, when anticipatory Operations 610 or Instruction Sets 600 are known and ready to execute, Command Assembler 560 or any other element of the current disclosure may trigger an external function or process of the system within which AI DBMS may operate. For example, in an embodiment where AI DBMS may be used or embedded within a television device (embodiment later described), AI DBMS may trigger a video recording process in response to anticipating a User's 10 switching (i.e. selecting or performing a SELECT type DBMS operation) to a favorite channel. In another embodiment where AI DBMS may be used or embedded within a cellular telephone, AI DBMS may trigger a calling process in response to anticipating User's 10 input (i.e. inserting or performing an INSERT type DBMS operation) of a new contact in the contact list.

In yet some embodiments, an Instruction Set 600 may be passed directly to the Operation List 510 without being disassembled, in which case Command Disassembler 500 may be omitted from the overall system. In these embodiments, Operation List 510, Knowledge Cells 800, and Knowledgebase 530 may all include original Instruction Sets 600 instead of disassembled Operations 610. Therefore, Substantial Similarity Comparisons 1010 between the Instruction Sets 600 in the Operation List 510 and the corresponding (i.e. comparative) Instruction Sets 600 in the Knowledgebase 530 may be performed either directly (i.e. letter for letter, word for word, etc.) or indirectly by performing extraction or disassembling of Instruction Set Portions 620 in the comparison step.

In further embodiments, AI DBMS may be configured to run automatically (i.e. autonomously, etc.) and/or perform DBMS operations. For example, AI DBMS and/or Artificial Intelligence 130 may periodically (i.e. daily, weekly, monthly, yearly, etc.) automatically run to analyze (i.e. through the Substantial Similarity Comparison 1010 process, etc.) time stamps of all of the Operations 610 or Instruction Sets 600 in the Knowledgebase 530 to determine which Operations 610 or Instruction Sets 600 the User 10 may have implemented in particular time periods. If repetitive Operations 610 or Instruction Sets 600 may have been found, they may be executed automatically with or without User's 10 confirmation depending, for example, on how accurate or confident the substantial similarity match may be. Other patterns in addition to analyzing the time stamp may be analyzed in alternate embodiments.

Figure 13A:
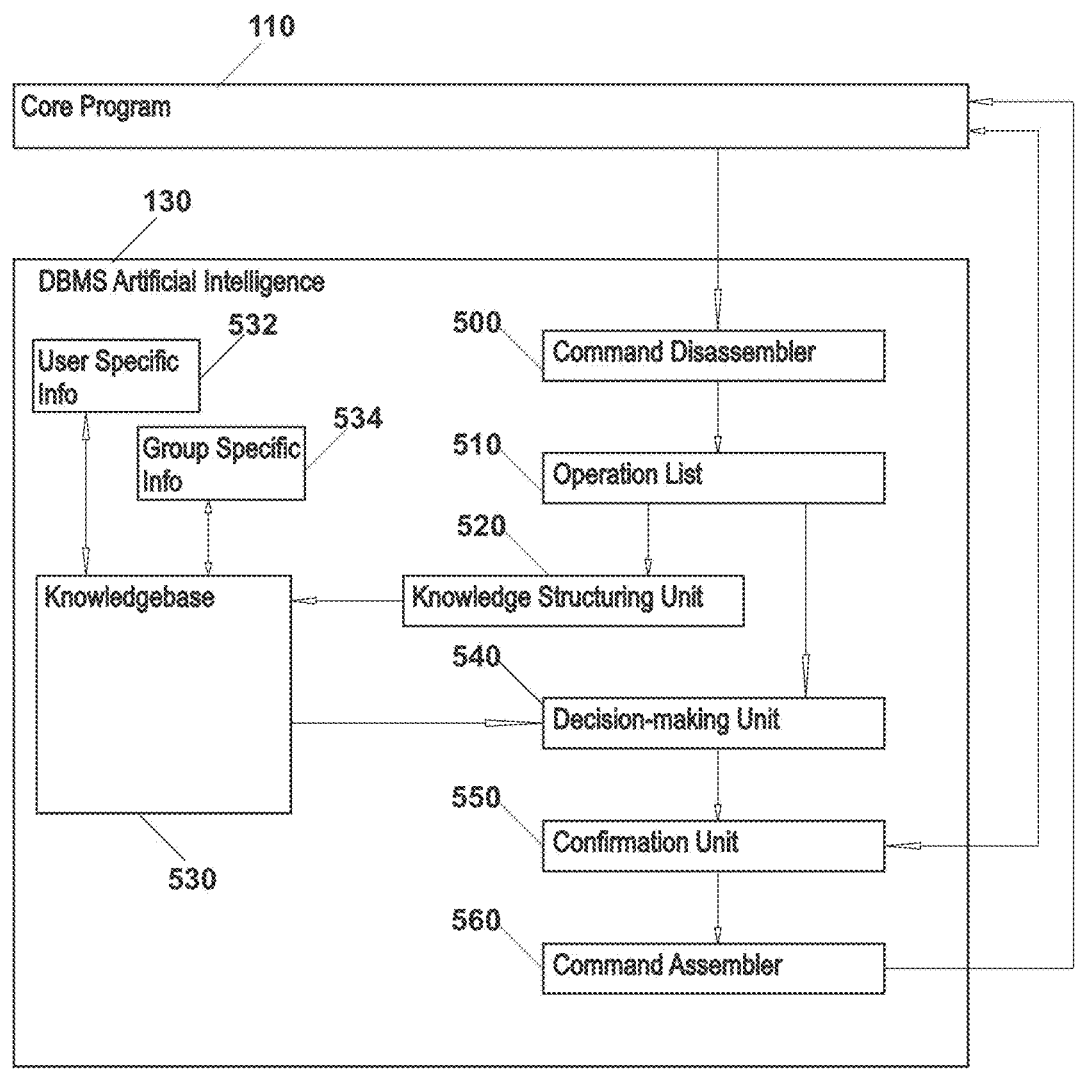
FIG. 13A is a diagram showing an embodiment of DBMS Artificial Intelligence 130 with User Specific Info 532 and Group Specific Info 534.

Referring to FIG. 13A, in some aspects of the present disclosure, AI DBMS may be implemented to include additional information either within the Knowledgebase 530, within additional knowledgebases, or within any other part of the AI DBMS system. This additional information may assist the Substantial Similarity Comparison 1010 and/or other process steps and/or elements in the performance of their respective functions (i.e. more accurately anticipate user's future DBMS operating intentions, etc.). As shown in FIG. 13A, AI DBMS may comprise additional knowledgebases that, in this example, may include User Specific information 532, Group Specific Information 534, and/or other additional knowledgebases. These additional knowledgebases may be directly or operatively coupled with the Knowledgebase 530 or with any other elements of the current disclosure as needed.

User Specific Information 532, or User Specific Info 532, may comprise hardware, software or a combination of hardware and software for storing information pertaining to a specific user. There may be plurality of User Specific Infos 532 on the system, one for each user. User Specific Info 532 may include the information on the most prevalent Operations 610 or Instruction Sets 600 the user may be using, information on databases on which the user may have most often performed operations, information on types of Operations 610 or Instruction Sets 600 the user most often performs, information on the sequence of Operations 610 or Instruction Sets 600 which the user may perform or have performed most often, and more. User Specific Info 532 may further include the information along with a timestamp for each Operation 610 or Instruction Set 600 which the user has performed in the past, thereby allowing the system to determine which Operations 610 or Instruction Sets 600 the user has most recently been using and which Operations 610 or Instruction Sets 600 the user has not used in a while.

Group Specific Information 534, or Group Specific Info 534, may comprise hardware, software or a combination of hardware and software for storing information pertaining to a group of users. The group of users may be a group having a particular access level to the AI DBMS, such as for example group of administrators, group of general users, group of managers, group of guests, and more. Each group may be given a different access level and different level of control over the system. There may be plurality of or Group Specific Infos 534 on the system, one for each group of users. Group Specific info 534 may include the information on the most prevalent Operations 610 or Instruction Sets 600 the users of the group may be using, information on databases on which the users of the group may have most often performed operations, information on types of operations the users of the group most often perform, information on the sequence of Operations 610 or Instruction Sets 600 which the users of the group may perform or have perform most often, and more. Group Specific Info 534 may further include the information along with a timestamp for each Operation 610 or Instruction Set 600 which the users of the group have performed in the past, thereby allowing the system to determine which Operations 610 or instruction Sets 600 the users of the group have most recently been using and which Operations 610 or Instruction Sets 600 the user have not used in a while.

In some embodiments, the Core Program 110 and the Underlying DBMS 120 may be provided as distinct elements executing on the same computing device.

Figure 13B:
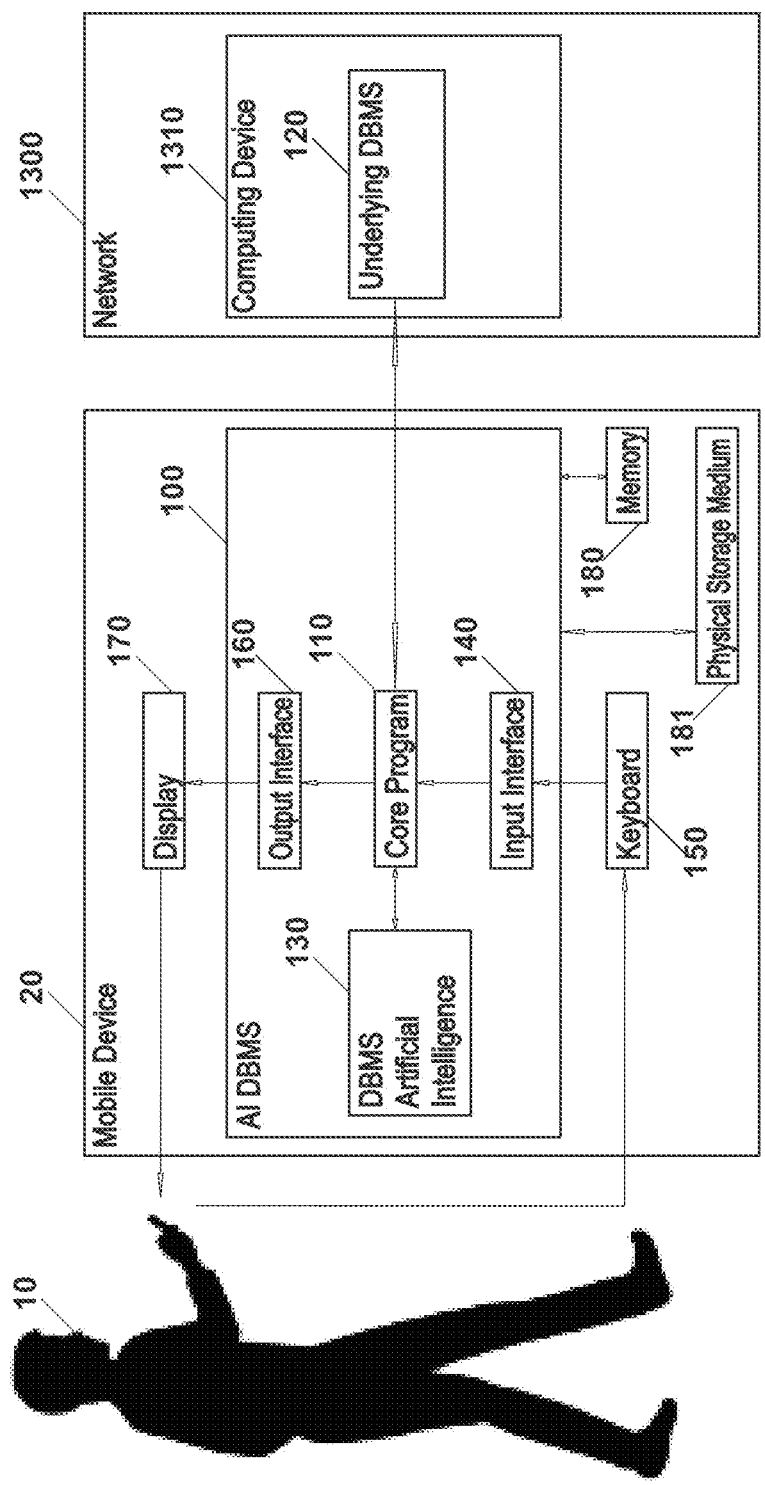
FIG. 13B is a diagram showing an embodiment of AI DBMS with the Underlying DBMS 120 executing on a remote computing device.

Referring to FIG. 13B, an embodiment is illustrated in which the Core Program 110 may execute on the User's 10 Mobile Device 20 and the Underlying DBMS 120 may execute on a remote Computing Device 1310. Remote Computing Device 1310 may be any device remote from the Mobile Device 20, such as a remote computer, a remote server, a remote Mobile Device 20, or another similar type of remote computing device to which the Core Program 110 may connect over the Network 1300. In this implementation, the Core Program 110 may use a database interface and/or an associated API for the Java platform to connect to the remote DBMS. One of ordinary skill in the art will recognize that the remote Computing Device 1310 may include any functionality of a Mobile Device 20, including any memory, processing and/or similar components which may be utilized by the features of the present disclosure.

Figure 14:
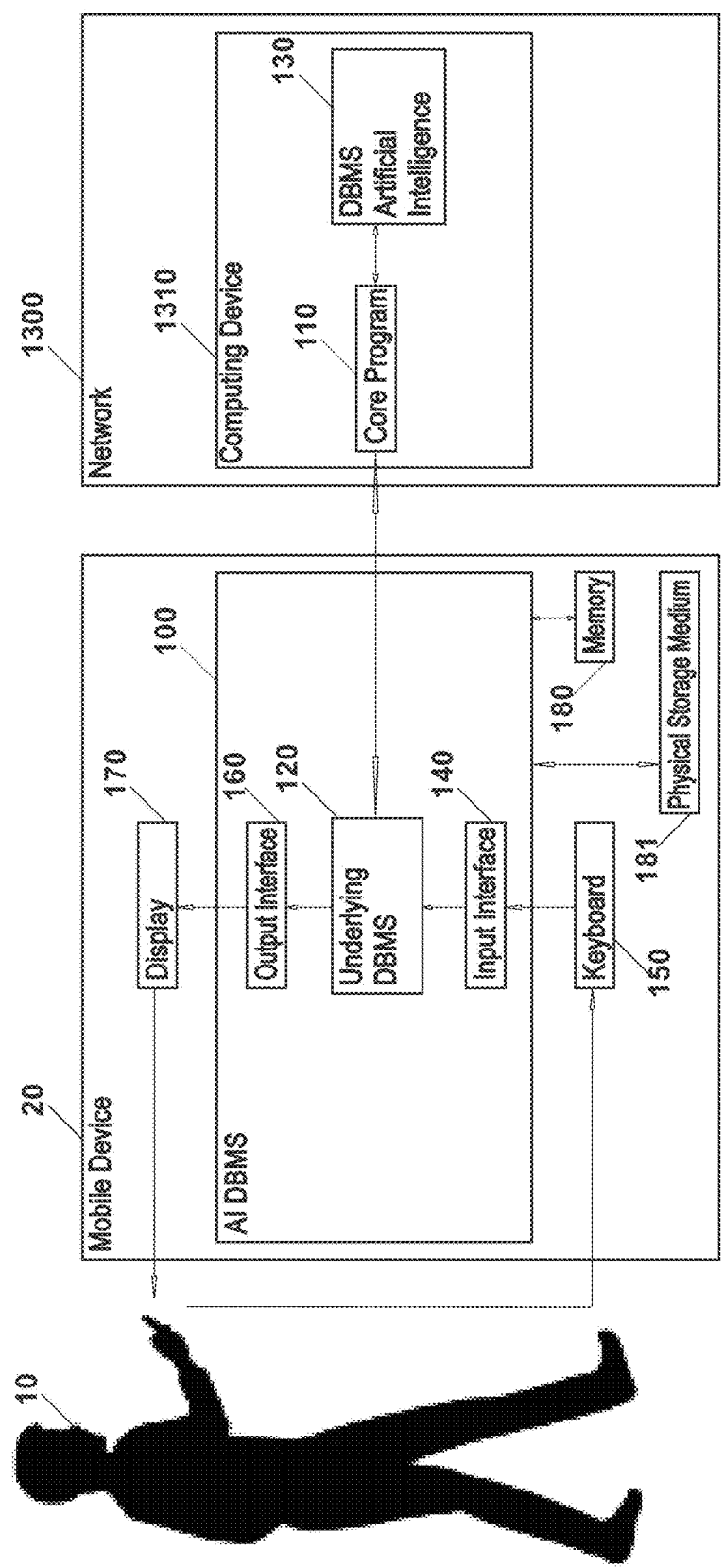
FIG. 14 is a diagram showing an embodiment of AI DBMS with the Core Program 110 and the DBMS Artificial Intelligence 130 executing on a remote computing device.

Referring to FIG. 14, an embodiment is illustrated in which the Underlying DBMS 120 may execute on the User's 10 Mobile Device 20 and the Core Program 110 may execute on a remote Computing Device 1310, and the Core Program 110 may connect to the local Underlying DBMS 120 over the Network 1300. In this implementation, the Core Program 110 may use a database interface and/or an associated API for the platform where it runs to connect to the local Underlying DBMS 120.

Figure 15A:
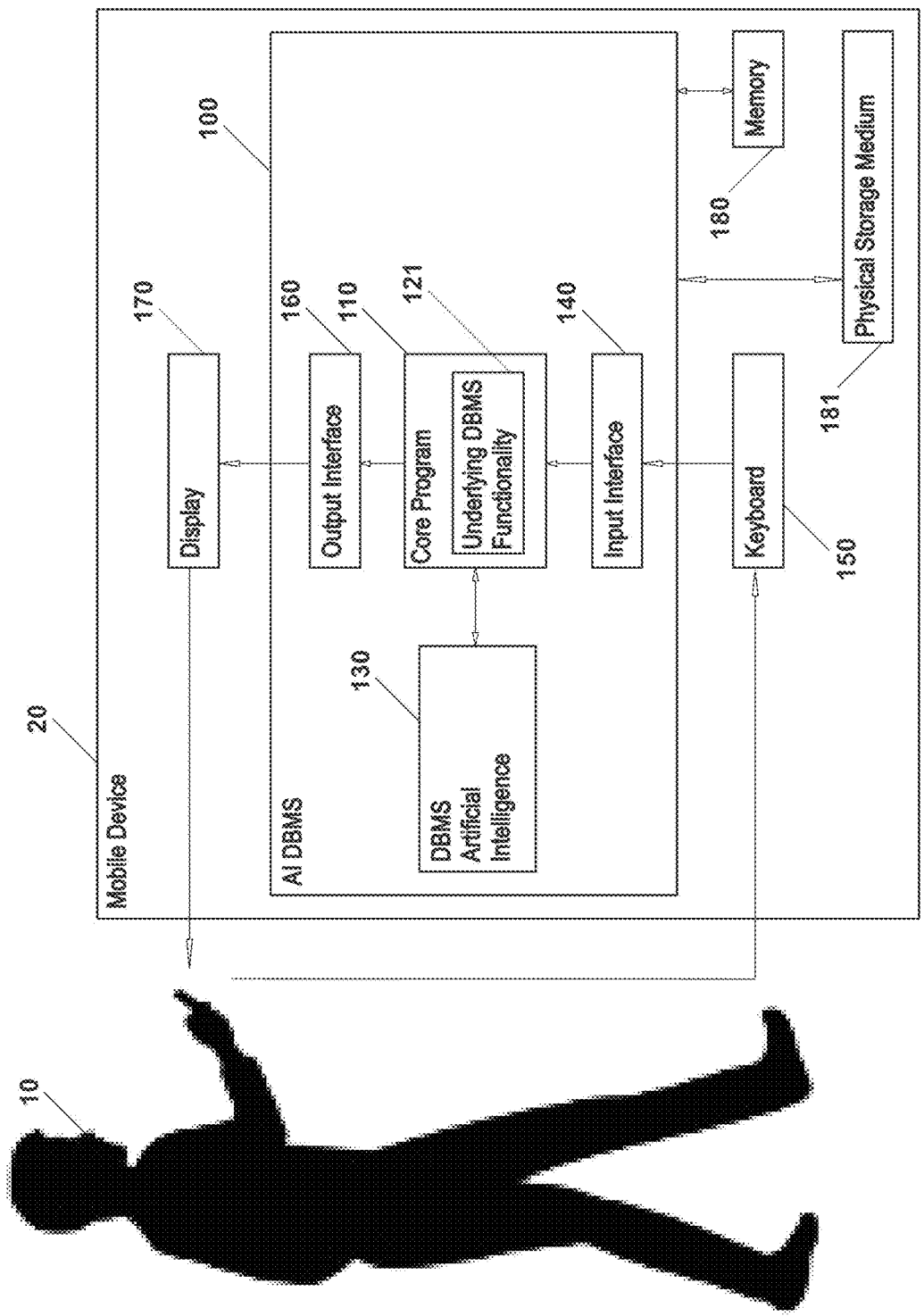
FIG. 15A is a diagram showing an embodiment of AI DBMS configured to include Underlying DBMS Functionality 121 in the Core Program 110.

Referring to FIG. 15A, an embodiment is illustrated in which the Core Program 110 includes Underlying DBMS Functionality 121. In this integrated implementation, the Core Program 110 includes database libraries (not shown) comprising subroutines configured to perform database operations including low-level operations such as locking, transaction logging, shared buffer management, memory management, and other operations. Database libraries may include definitions of one or more interfaces for database and application connectivity and interfacing via an internal or external, socket-based, bridge-based, or other type of connection. Database libraries may also define instruction sets, operations, DBMS commands, instructions or any computer commands the Underlying DBMS Functionality 121 can accept and understand, and define handling of any SQL statements or any DBMS commands or instruction sets. Database libraries may be configured to execute on any type of operating system. The Core Program 110 may include one or more database files. Each database file may be a computer file configured to store data in an integrated collection of structured records. Each database file may be accessed by the database library. In this integrated implementation, database operations may be performed using pre-made or custom database libraries that may be loaded and linked at the initiation of the Core Program 110.

Figure 15B:
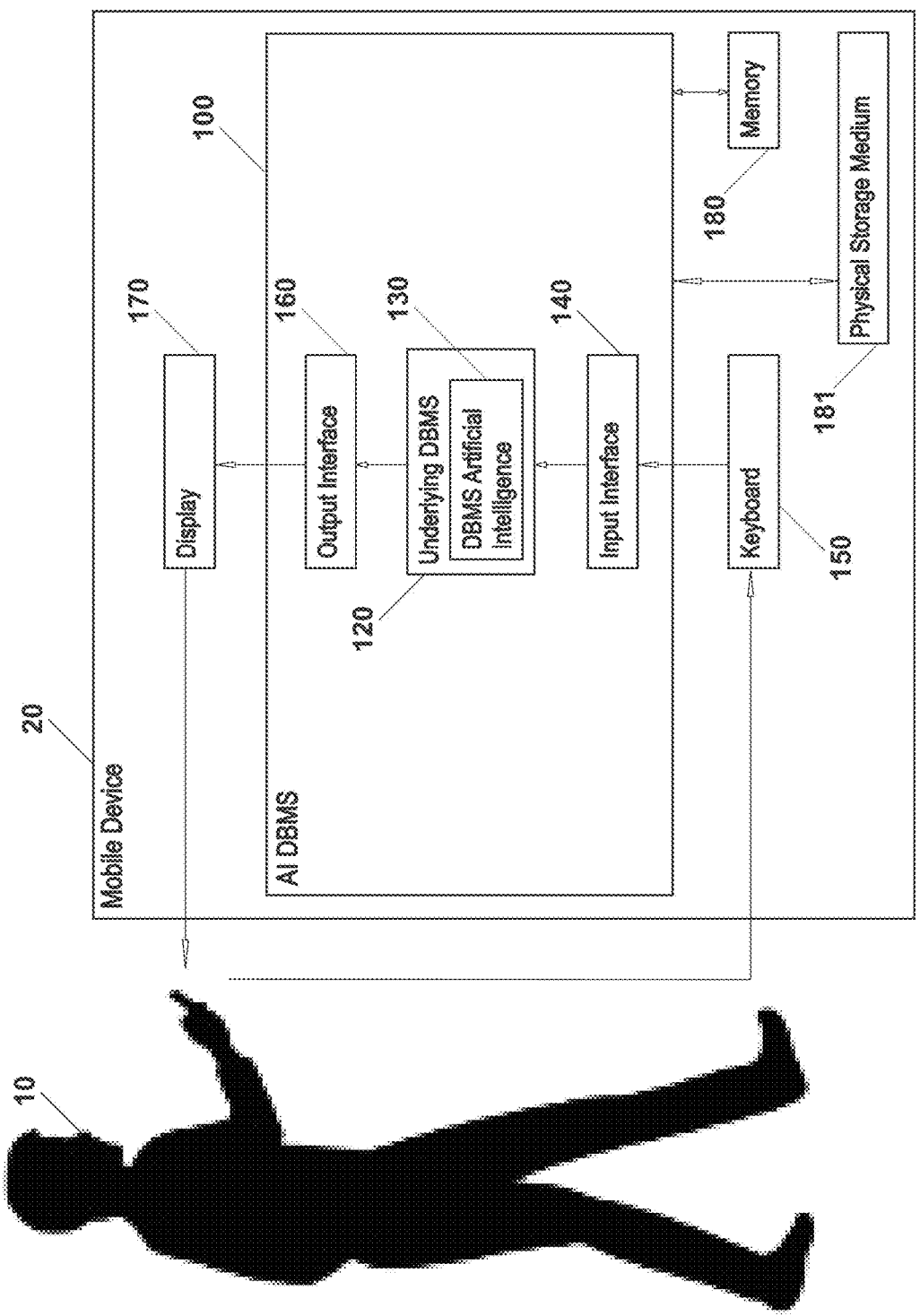
FIG. 15B is a diagram showing an embodiment of AI DBMS configured to include DBMS Artificial Intelligence 130 in the Underlying DBMS 120.

Referring to FIG. 15B, an embodiment is illustrated in which the Underlying DBMS 120 may include DBMS Artificial intelligence 130. In this integrated implementation, DBMS Artificial Intelligence 130 may be or may directly or operatively connect to internal functions, processes, libraries, files, data structures, and/or other elements of the Underlying DBMS 120. Underlying DBMS 120 may be, directly or operatively, connected to the Input Interface 140, the Output Interface 160, and/or other elements to facilitate the overall system operation and implement the functionalities described herein. The Core Program 110 may optionally be omitted in this integrated implementation.

In some embodiments, Knowledgebase 530 may be local (i.e. local Knowledgebase 530) and it may reside on the User's 10 Mobile Device 20. Such local Knowledgebase 530 may be stored in a local table, local file, or other local data structure or data repository, and it may include "knowledge" of the use of the Underlying DBMS 120 by the local User 10 (i.e. owner of the mobile device).

Figure 16:
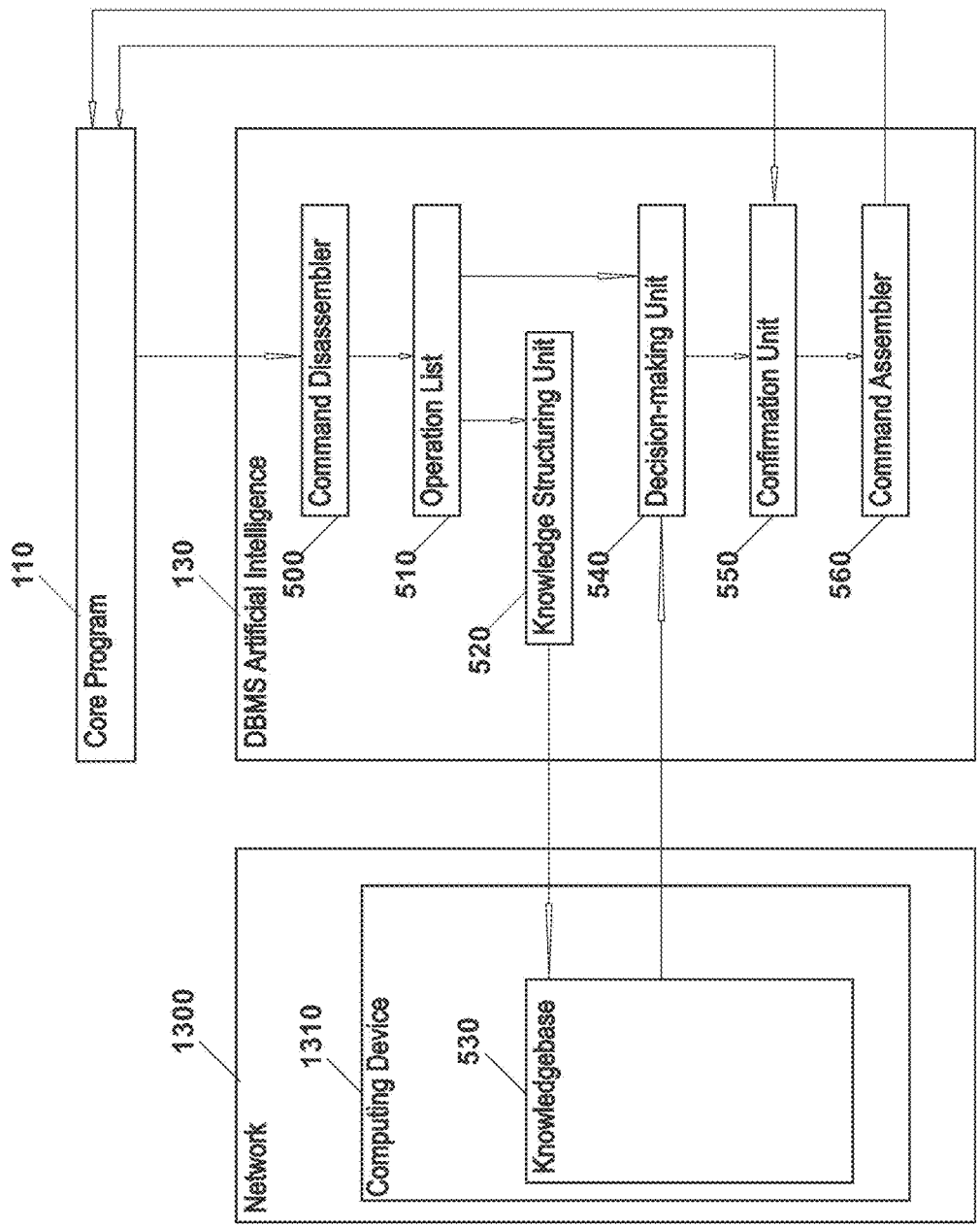
FIG. 16 is a diagram showing an embodiment of AI DBMS with global Knowledgebase 530 residing on a remote computing device.

Referring to FIG. 16, an embodiment is illustrated in which Knowledgebase 530 (i.e. global Knowledgebase 530) may reside on a remote Computing Device 1310 (i.e. application server, etc.) on a Network 1300 (i.e. corporate enterprise network, Internet, etc.). Such global Knowledgebase 530 may be stored in a remote table, remote file, or other remote data structure or data repository. Furthermore, such global Knowledgebase 530 may include "knowledge" (i.e. Knowledge Cells 800) of the use of the Underlying DBMS 120 by any number of Users 10 wherever on the Network 1300 they may be located. In turn, all these Users 10 may utilize the global Knowledgebase 530 to anticipate their future operating intentions (i.e. future Operations 610 or Instruction Sets 600). In one implementation, global Knowledgebase 530 may reside on a remote Computing Device 1310 on the Internet as an online service to all the world's Users 10 who wish to disclose their use of the Underlying DBMS 120 and/or utilize the global Knowledgebase 530 to automate their DBMS operation with AI DBMS functionalities described herein.

In some embodiments, AI DBMS may include DBMS Artificial Intelligence 130 (i.e. local DBMS Artificial Intelligence 130) residing and executing on the User's 10 Mobile Device 20.

Figure 17A:
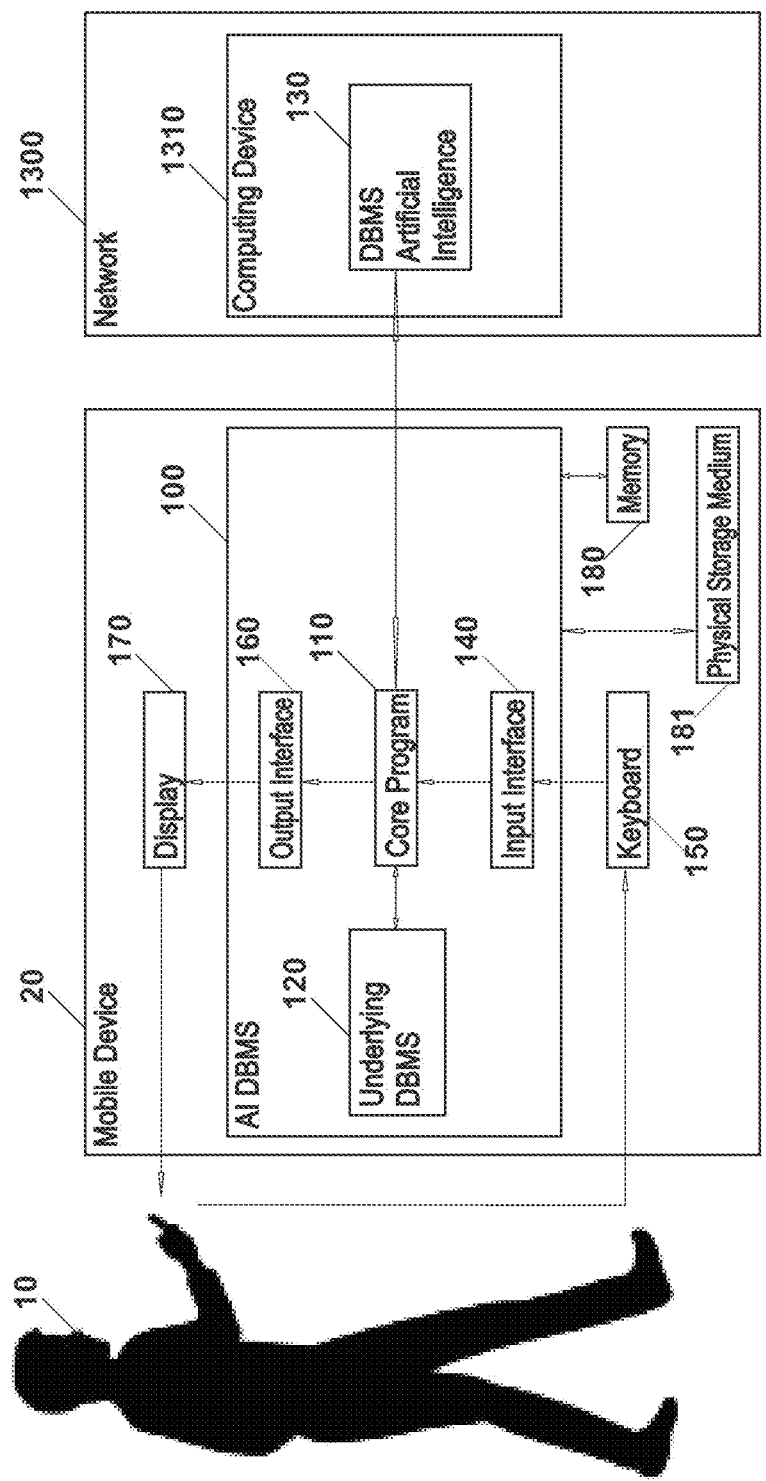
FIG. 17A is a diagram showing an embodiment of AI DBMS with DBMS Artificial Intelligence 130 residing on a remote computing device.

Referring to FIG. 17A, an embodiment is illustrated in which DBMS Artificial intelligence 130 (i.e. global DBMS Artificial Intelligence 130) may reside and execute on a remote Computing Device 1310 (i.e. application server, etc.) on a Network 1300. In this implementation, the Core Program 110 executing on the Mobile Device 20 may connect with the DBMS Artificial Intelligence 130 through the Network 1300 to achieve desired results.

Figure 17B:
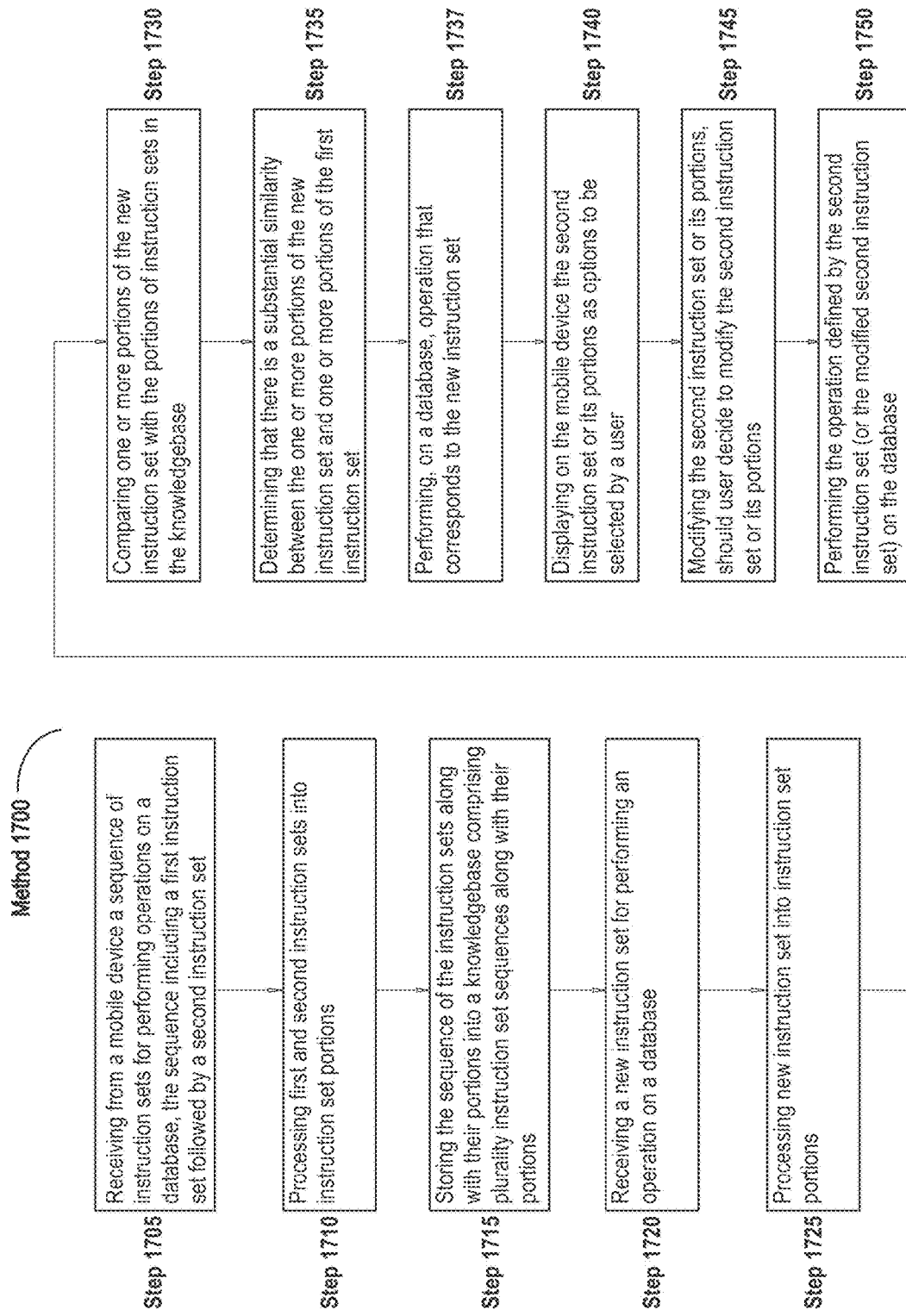
FIG. 17B illustrates a flow chart diagram of an embodiment of a method 1700 implemented by the AI DBMS.

Referring to FIG. 17B, the illustration shows an embodiment of a method 1700 for predicting instruction sets that the user is most likely to use next, based on sequences of prior used instruction sets. The method may therefore be used by a user on a mobile device operating an interface for an AI DBMS to perform operations on the back-end DBMS (i.e. Underlying DBMS 120).

In brief overview, at step 1705, a mobile device receives a sequence of instruction sets for performing operations on a database. The sequence may include an order of consecutive instruction sets, such as for example a first instruction set followed by a second instruction set. At step 1710, the first and second instruction sets are processed into instruction set portions. At step 1715, the sequence of the instruction sets is stored, along with their corresponding portions of instruction sets, into a knowledgebase that comprises plurality of instruction set sequences along with their corresponding portions. At step 1720, the mobile device receives a new instruction set for performing an operation on a database. At step 1725, the new instruction set is processed into instruction set portions. At step 1730, one or more portions of the new instruction set is compared with the portions of instruction sets in the knowledgebase. At step 1735, a determination is made that there is a substantial similarity between the one or more portions of the new instruction set and one or more portions of the first instruction set. At step 1737, the new instruction set is executed by performing, on a database, an operation corresponding to the new instruction set. At step 1740, the second instruction set, along with its portions, is displayed on the mobile device as options to be selected by a user. At step 1745, the second instruction set or any of its portions are modified, should the user decide to modify the second instruction set or its portions. At step 1750, the operation defined by the second instruction set (or the modified second instruction set) is performed on the database.

At step 1705, a mobile device receives a sequence of instruction sets. Each instruction set may indicate or identify one or more operations to be performed on some data in some database. The sequence may include a first instruction set, followed by a second instruction set, which may also be followed by a third instruction set, and so on. Any instruction set may be received by the interface for a DMBS. Any instruction set may be received by any component of the AI DBMS. Instruction sets of the sequence may be received by the mobile device, or by any other mobile device or a computing device in general.

At step 1710, the first and the second instruction sets of the sequence of instruction sets are processed into instruction set portions. In some embodiments, each of the instruction sets from the sequence are disassembled or parsed into portions. In other embodiments, the instruction sets are separated into commands, keywords, instructions, operators, variables, values, objects, functions and/or other components, etc. Processing may also include identifying the type of each instruction set, in terms of the commands used. Specifically, determinations may be made to identify if each instruction set is for modifying data, selecting data, accessing data, creating a database, creating a row or a column within a database, making a new entry, etc. Processing may further include creating a timestamp of the time when each instruction set has been received or executed. Processing may further include identifying a user which entered each instruction set or identifying a group to which the user belongs. Processing may include assigning a weight to each of the instruction sets or their potions. Processing may further include creating any extra information pertinent for facilitating AI DBMS functionalities described herein. Processing may include any action or operation by or for a Command Disassembler 500.

At step 1715, the sequence of instruction sets is stored into a knowledgebase, along with the portions of the instruction sets. The knowledgebase may comprise any number of instruction sets, instruction set portions and/or instruction set sequences, each of which may be stored in various arrangements, including tables, databases, DBMSs, memory structures, data structures, etc. In some embodiments, knowledgebase may include sequences of instruction sets, instruction sets and/or instruction set portions from the mobile device via which the sequences of instruction sets, instruction sets and/or instruction set portions are received. In other embodiments, knowledgebase may include sequences of instruction sets, instruction sets and/or instruction set portions from any number of computing devices. Knowledgebase or additional knowledgebases may also be populated to include the user specific and/or group specific informations gathered with respect to the instruction set. Also stored in knowledgebase may be the weight assigned to each instruction set or its portions. Storing may include any action or operation by or for a Knowledgebase 530 or Knowledge Structuring Unit 520.

At step 1720, a new instruction set for performing an operation on a database is received by the mobile device. The new instruction set may identify or indicate any operation to be performed on a database indicated herein. For instance, the new instruction set may include an instruction to select, add, delete, or modify an entry; add, delete, or modify a column; add, delete, or modify a table; add, delete, or modify a database; add, delete, or modify a relation; add, delete, or modify a user account; etc. The one or more portions of the new instruction set may be for performing some operation on some database managed by the AI DBMS. The new instruction set or one or more of its portions may be stored into operation lists.

At step 1725, the new instruction set is processed into instruction set portions. In some embodiments, the new instruction set is disassembled or parsed into portions, which may include commands, keywords, instructions, operators, variables, values, objects, functions and/or other components, etc. Processing may also include identifying the type of the new instruction set, in terms of the commands used. Specifically determinations may be made to identify if the new instruction set is for modifying data, selecting data, accessing data, creating a database, creating a row or a column within a database, making a new entry, etc, Processing may further include creating a timestamp of the time when the new instruction set has been received. Processing may further include identifying a user which entered the new instruction set or identifying a group to which the user belongs. Processing may include assigning a weight to each of the new instruction sets or their potions. Processing may further include creating any extra information pertinent for facilitating AI DBMS functionalities described herein. Processing may include any action or operation by or for a Command Disassembler 500.

At step 1730, one or more portions of the new instruction set is compared with the portions of instruction sets in the knowledgebase. In one embodiment, the one or more portions of the new instruction set are compared as a single string of characters with a plurality of portions of instruction sets in the knowledgebase. In other embodiments, comparison may be implemented by treating each instruction set portion as a separate string to be matched independently. In further embodiments, comparison is implemented by matching all of one or more portions of the new instruction set with one or more portions of an instruction set stored in a knowledgebase. Comparison may be implemented by matching all but one of the one or more portions of the new instruction set with one or more portions of an instruction set stored in a knowledgebase. Comparison may also be implemented by matching all but two of one or more portions of the new instruction set with one or more portions of an instruction set stored in a knowledgebase. In some embodiments, comparison may also be implemented by comparing the one or more portions of the new instruction set with portions of the instruction sets from the knowledgebase, factoring in the weights for each of the instruction set portions from the knowledgebase. As such matching some portions of the instruction set from the knowledgebase may be more important than other portions having smaller weight. In further embodiments, comparison may be implemented by comparing the new instruction set with the instruction sets from the knowledgebase, factoring in the weights for each of the instruction sets from the knowledgebase. As such matching some of the instruction sets from the knowledgebase may be more important than other instruction sets having smaller weight.

At step 1735, a determination is made if there is a substantial similarity between the one or more portions of the new instruction set and one or more portions of the instruction sets stored in the knowledgebase, such as the first instruction set. In one embodiment, during the comparison of the one or more portions of the new instruction set and the portions of the first instruction set a perfect match may be found. In other embodiments, AI DBMS may find a plurality of perfect matches with a plurality of stored instruction sets. If the number of matches exceeds a threshold for maximum number of substantial similarity results, strictness level for determining a substantial match may be modified to include an additional one or more portions of the new instruction set in order to narrow down or reduce the number of the perfect matching results. In some embodiments, if no perfect match is found, or if a number of matches is lower than a threshold for minimum amount of substantially matching results, then strictness level may be reduced to allow for finding a match that is imperfect. In some embodiments, a strictness level may be reduced to allow for a match for more important portions of the one or more portions of the new instruction set to be matched with the instruction sets in the knowledgebase. The more important portions of the one or more portions of the new instruction set may be portions including command words or keywords. For example, a substantial match may be found when SQL keywords from the one or more portions of the new instruction set match SQL keywords, and/or the order of such keywords, in one or more stored instruction sets in the knowledgebase, even if one or more variable names, data names or database names are not matched. Substantial match may also be found when a strictness level is reduced to allow a match to have all but one of the one or more portions of the new instruction set matching an instruction set in the knowledgebase. Similarly, a substantial match may be found when a strictness level is reduced to allow a match to have all but two of the one or more portions of the new instruction set matching an instruction set in the knowledgebase. Likewise, a substantial match may be found when a strictness level is reduced to allow a match to have all but three of the one or more portions of the new instruction set matching an instruction set in the knowledgebase. The one, two, or three non-matched portions of the instruction set may be portions having smaller or smallest weight. For example, the non-matched portions of the instruction set may be variable names, database names or other portions of the instruction set that may be less important than the commands or keywords, for example. Determination of substantial similarity between the one or more portions of the new instruction set and the first instruction set may include any one of, or any combination of, substantial similarity determination techniques or embodiments discussed herein.

At step 1737, the new instruction set is executed by performing, on a database, operation indicated by, or corresponding to, the new instruction set. In some embodiments, the new instruction set may be executed earlier or later in the process or not executed at all. The operation performed may include creating or deleting a database. The operation performed may include adding or deleting an entry within a database. The operation performed may include adding or deleting a row or a column within a database. The operation performed may include selecting an entry within a database. The operation performed may include any DBMS operation described herein.

At step 1740, the mobile device displays the second instruction set or its portions as options to be selected by a user. The second instruction set may be displayed in response to determining that the first instruction set is the most substantial match with the new instruction set and that the second instruction set immediately follows the first instruction set. In some embodiments, AI DBMS may select the second instruction set for display on the mobile device responsive to the determination at step 1735. In further embodiments, the second instruction set may be displayed along with one or more instruction sets that may immediately follow the second instruction set.

At step 1745, the second instruction set may be modified. In one example, the second instruction set may be modified to indicate the same database, as was indicated in the new instruction set. In another example, the second instruction set may be modified to indicate the same table or report/view, as was indicated in the new instruction set. In a further example, the second instruction set may be modified to indicate the same column or entry, as was indicated in the new instruction set, etc.

At step 1750, the operation defined by, or corresponding to, the second instruction set or the modified second instruction set is performed on a database. The operation performed may include one of, or a combination of: accessing, modifying, creating or deleting a database. The operation performed may include one of, or a combination of: accessing, modifying, creating or deleting a table of a database. The operation performed may include one of, or a combination of: accessing, modifying, creating or deleting of a row, column, or cell within a table of a database. The operation performed may include one of, or a combination of: accessing, modifying, creating or deleting a report/view, relation, user account, and/or other objects in a DBMS. The operation performed may include any DBMS operation described herein.

Figure 18:
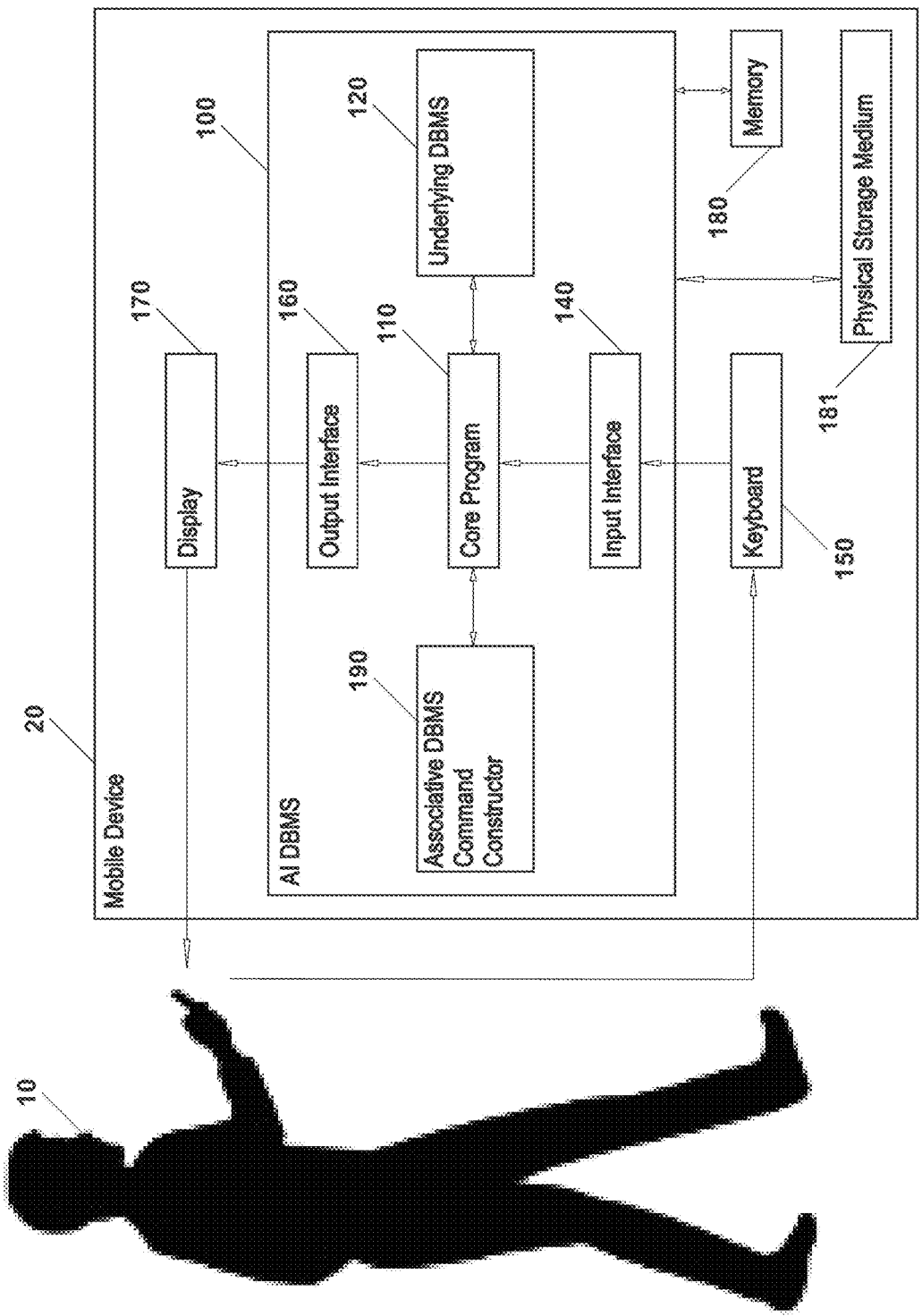
FIG. 18 is a diagram showing an embodiment of AI DBMS with the Associative DBMS Command Constructor 190.

Referring to FIG. 18, in some aspects, the teaching presented by the current disclosure may be implemented to include an associative method of constructing Operations 610 or Instruction Sets 600. This embodiment may enable a user to create an Operation 610 or Instruction Set 600 (i.e. enter instruction set portions) by inputting Keys 2110 of an input device (i.e. Keyboard 150, touch screen, wheel controls, remote control, etc.) where each Key 2110 may be associated with an Instruction Set Portion 620 of the Operation 610 or instruction Set 600. As such, User 10 may use Keys 2110 associated with instruction Set Portions 620 to input key by key (i.e. instruction set portion by instruction set portion) an Operation 610 or Instruction Set 600, until the user completes inputting the entire Operation 610 or Instruction Set 600. A Key 2110 may include any press-able key of the Keyboard 150, any push-able button of the Mobile Device 20 or an external input device (i.e. joystick, etc.), any touch-able areas of a touch screen, any click-able component of the Mobile Device 20 or an external input device (i.e. mouse, etc.), any slide-able component of the Mobile Device 20 or an external input device, a text field, selectable list, drop-down menu, or other graphical or physical elements that may enable a User 10 to input instructions or data.

As shown for example in FIG. 18, User 10 may use Mobile Device 20 that may include the Core Program 110, the Underlying DBMS 120, the input Interface 140, the Keyboard 150, the Output interface 160, the Display 170, the Memory 180, the Physical Storage Medium 181, and the Associative DBMS Command Constructor 190. Other additional elements may be included as needed, or some of the disclosed ones may be excluded, or a combination thereof may be utilized in alternate embodiments.

Figure 19:
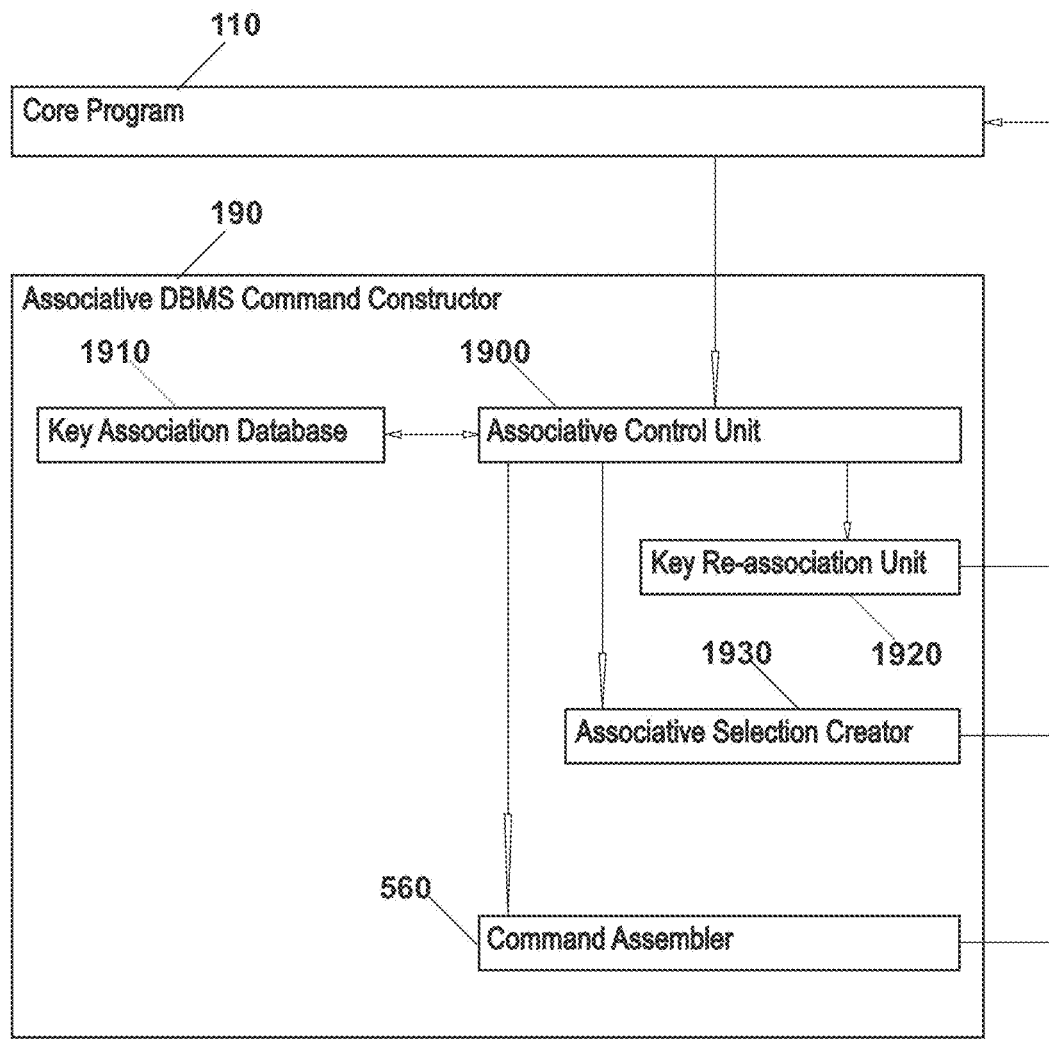
FIG. 19 is a diagram showing an embodiment of Associative DBMS Command Constructor 190.

Referring to FIG. 19, Associative DBMS Command Constructor 190 may comprise any hardware, software or a combination of hardware and software, and/or it may include functions and algorithms for constructing an Operation 610 or Instruction Set 600. Associative DBMS Command Constructor 190 may include functions and algorithms for constructing an Operation 610 or Instruction Set 600 by associating Keys 2110 of a Keyboard 150 for example, with Instruction Set Portions 620 of the Operation 610 or Instruction Set 600. Associative DBMS Command Constructor 190 may include functions and algorithms for constructing an Operation 610 or Instruction Set 600 by associating Keys 2110 of a Keyboard 150 for example, with Instruction Set Portions 620 of the Operation 610 or Instruction Set 600 based on the Level 2000 in the constructing process. The Associative DBMS Command Constructor 190 may be, directly or operatively, connected to the Core Program 110 and/or other elements to facilitate the overall system operation and implement the functionalities described herein.

Associative DBMS Command Constructor 190 may include an Associative Control Unit 1900, a Key Association Database 1910, a Key Re-association Unit 1920, an Associative Selection Creator 1930, and a Command Assembler 560. Other additional elements may be included as needed, or some of the disclosed ones may be excluded, or a combination thereof may be utilized in alternate embodiments.

Figure 20:
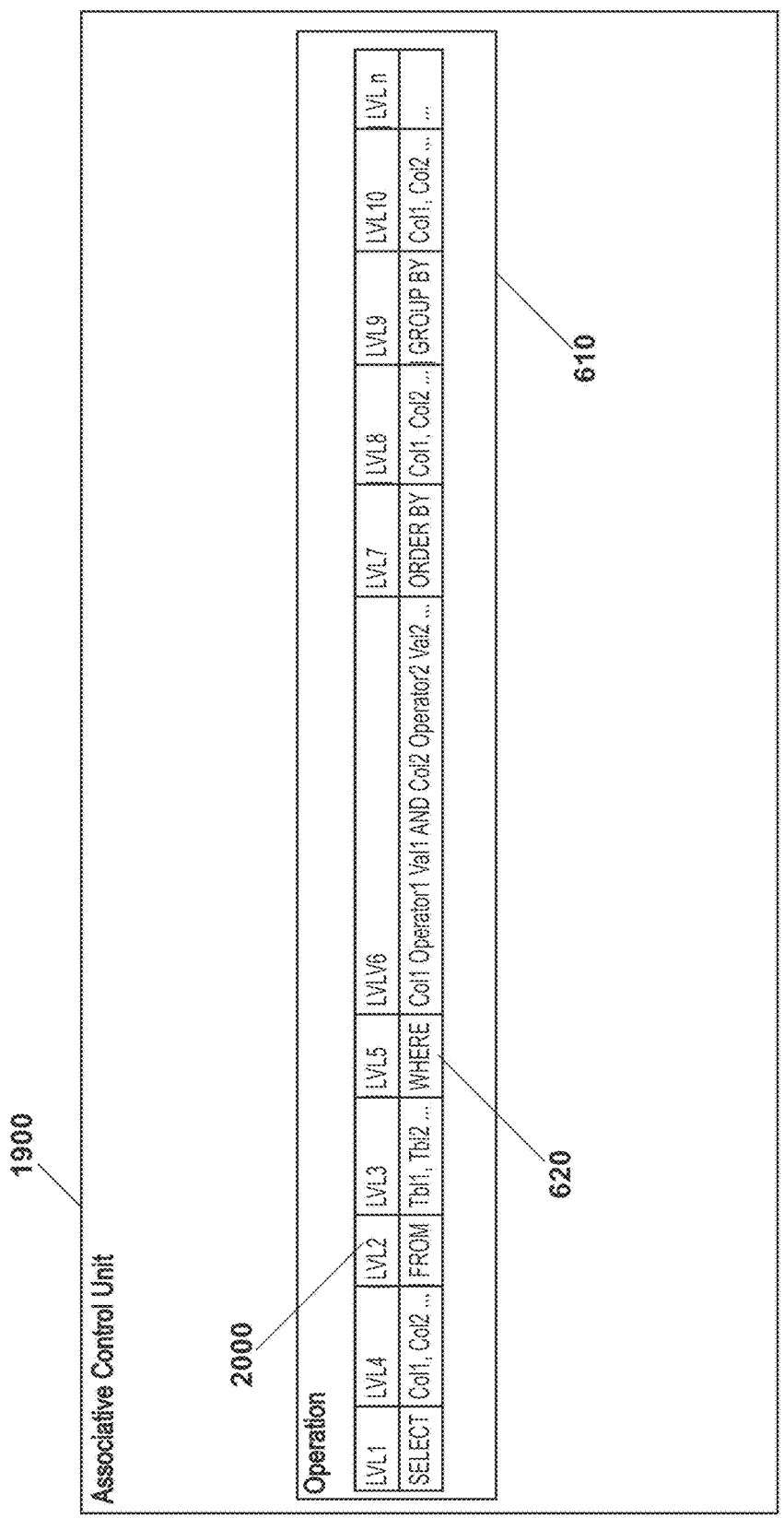
FIG. 20 is a diagram showing an embodiment of Associative Control Unit 1900.

Referring to FIG. 20, Associative Control Unit 1900 may comprise any hardware, software or a combination of hardware and software, and/or it may include functions and algorithms for managing and/or controlling the Operation 610 or Instruction Set 600 construction process. Associative Control Unit 1900 may include functions and algorithms for (1) recognizing the type of Operation 610 or Instruction Set 600 the User 10 is constructing, (2) associating the Instruction Set Portions 620 with the Levels 2000 based on the type of Operation 610 or Instruction Set 600, (3) keeping track of the Level 2000 up to which the Operation 610 or Instruction Set 600 is constructed, and/or (4) storing the inputted instruction Set Portions 620 within the Operation 610. The Associative Control Unit 1900 may be; directly or operatively, connected to the Core Program 110, the Key Association Database 1910; the Key Re-association Unit 1920; the Associative Selection Creator 1930, and the Command Assembler 560 and/or other elements to facilitate the overall system operation and implement the functionalities described herein.

In one example, at the initiation of the Associative DBMS Command Constructor 190, User 10 may be offered a Selection 2300 of the type of the Operation 610 or Instruction Set 600 the User 10 wishes to construct based on the LVL1 Association Table 2100 within the Key Association Database 1910. User 10 may press the "1" Key 2110 on the Keyboard 150. The "1" Key 2110 may be associated with the "SELECT" Instruction Set Portion 620 within the LVL1 Association Table 2100. The "SELECT" instruction Set Portion 620 indicates the type of Operation 610 or Instruction Set 600 as the SELECT type of Operation 610 or instruction Set 600 (i.e. SELECT type SQL statement), and therefore it may be stored in a data field of the Operation 610 and associated with the LVL1 Level 2000. The next instruction Set Portion 620 that is at LVL2 Level 2000 may be the "FROM" keyword that has only one association (i.e. "FROM") for the SELECT type Operation 610 or Instruction Set 600 and no User 10 selection may be needed. The next Selection 2300 the User 10 is offered may be at LVL3 Level 2000 to choose the "Tbl1, Tbl2 . . . " representing the names of tables from which to obtain data. The next Selection 2300 the User 10 is offered may be at LVL4 Level 2000 to choose the "Col1, Col2 . . . " representing the columns to be selected. The next Selection 2300 the User 10 is offered may be at LVL5 Level 2000 to choose the "WHERE", "ORDER BY", or "GROUP BY" keyword. In the case of "1" Key 2110 being pressed by the User 10 at LVL5 Level 2000 indicating the "WHERE" Instruction Set Portion 620, the next Selection 2300 the User 10 is offered may be at LVL6 Level 2000 to choose the "Col1 Operator1 Val1 AND Col2 Operator2 Val2 . . . " representing columns, operators and values used in restricting output results. Since the "Col1 Operator1 Val1 AND Col2 Operator2 Val2 . . . " Instruction Set Portion 620 may contain more than one object, operator and/or value, sub-selections may be offered for each. The next Selection 2300 the User 10 is offered may be at LVL7 Level 2000 to choose the "WHERE", "ORDER BY", or "GROUP BY" keyword. In the case of "2" Key 2110 being pressed by the User 10 at LVL7 Level 2000 indicating the "ORDER BY" Instruction Set Portion 620, the next Selection 2300 the User 10 is offered may be at LVL8 Level 2000 to choose the "Col1, Col2 . . . " representing columns by which to sort the resulting data set. The next Selection 2300 the User 10 is offered may be at LVL9 Level 2000 to choose the "WHERE", "ORDER BY", or "GROUP BY" keyword. In the case of "3" Key 2110 being pressed by the User 10 at LVL9 Level 2000 indicating the "GROUP BY" Instruction Set Portion 620, the next Selection 2300 the User 10 is offered may be at LVL10 Level 2000 to choose the "Col1, Col2 . . . " representing columns by which to group the resulting data set. Other Instruction Set Portions 620 not shown may be utilized in alternate embodiments such as functions including MIN( ), MAX( ), SUM( ), FIRST( ), LAST( ) etc.; operators including OR, LESS THAN, GREATER THAN, etc.; objects including databases, relations; user accounts, privileges; etc.; etc.

In some aspects of the current disclosure, the purpose of Levels 2000 may be to rearrange the inherent SQL (if SQL is used as the instruction set type to perform AI DBMS operations) order of constructing Operations 610 or Instruction Sets 600 in a user friendly order in which the User 10 (i.e. non-technical user) thinks of constructing Operations 610 or Instruction Sets 600. This option to rearrange the order is available where rearrangement is appropriate or where the User 10 chooses. Therefore; as shown in FIG. 20, after the "SELECT" keyword at LVL1 Level 2000, the "FROM" keyword is executed at LVL2 Level 2000, the "Tbl1, Tbl2 . . . " selection is executed at LVL3 Level 2000; the "Col1, Col2 . . . " selection is executed at LVL4 Level 2000; and so forth. This user friendly order of constructing the Operation 610 or instruction Set 600 may be preferred by the User 10 because it allows the User 10 to first select a table from a list of tables within the database and then select column(s) from a list of columns within the selected table. Conversely, the inherent SQL syntax such as for example "SELECT Col1, Col2 . . . FROM Tbl1, Tbl2 . . . etc." assumes (often wrongly) that the user knows which columns are included within the table. Any Instruction Set Portions 620 or other components of the Operation 610 or Instruction Set 600 may be rearranged using Levels 2000 and/or any order of rearrangement may be utilized.

At each Level 2000 the Associative Control Unit 1900 may interact with (1) the Control Program 110 to receive the User's 10 inputted Key 2110, (2) the Key Association Database 1910 to obtain the Association Table 2100 containing the Instruction Set Portions 620 appropriate for the currently inputted Key 2110 and the currently executing Level 2000, (3) the Key Re-association Unit 1920 that re-associates the Keys 2110 of the Keyboard 150 with the appropriate Instruction Set Portions 620 for the currently executing Level 2000, (4) the Associative Selection Creator 1930 that creates the Selections 2300 appropriate for the currently executing Level 2000, and/or (5) other elements. When all needed Instruction Set Portions 620 at their respective Levels 2000 are inputted the Associative Control Unit 1900 may send the completed Operation 610 to the Command Assembler 560 for assembling the Instruction Set 600 for execution. In some embodiments, Key Re-association Unit 1920 may optionally be omitted. In such embodiments, Associative Control Unit 1900 may receive the User's 10 inputted Key 2110 from the Control Program 110 and look up the associated Instruction Set Portion 620 in the Association Table 2100 containing the Instruction Set Portions 620 appropriate for the currently inputted Key 2110 and the currently executing Level 2000.

Figure 21:
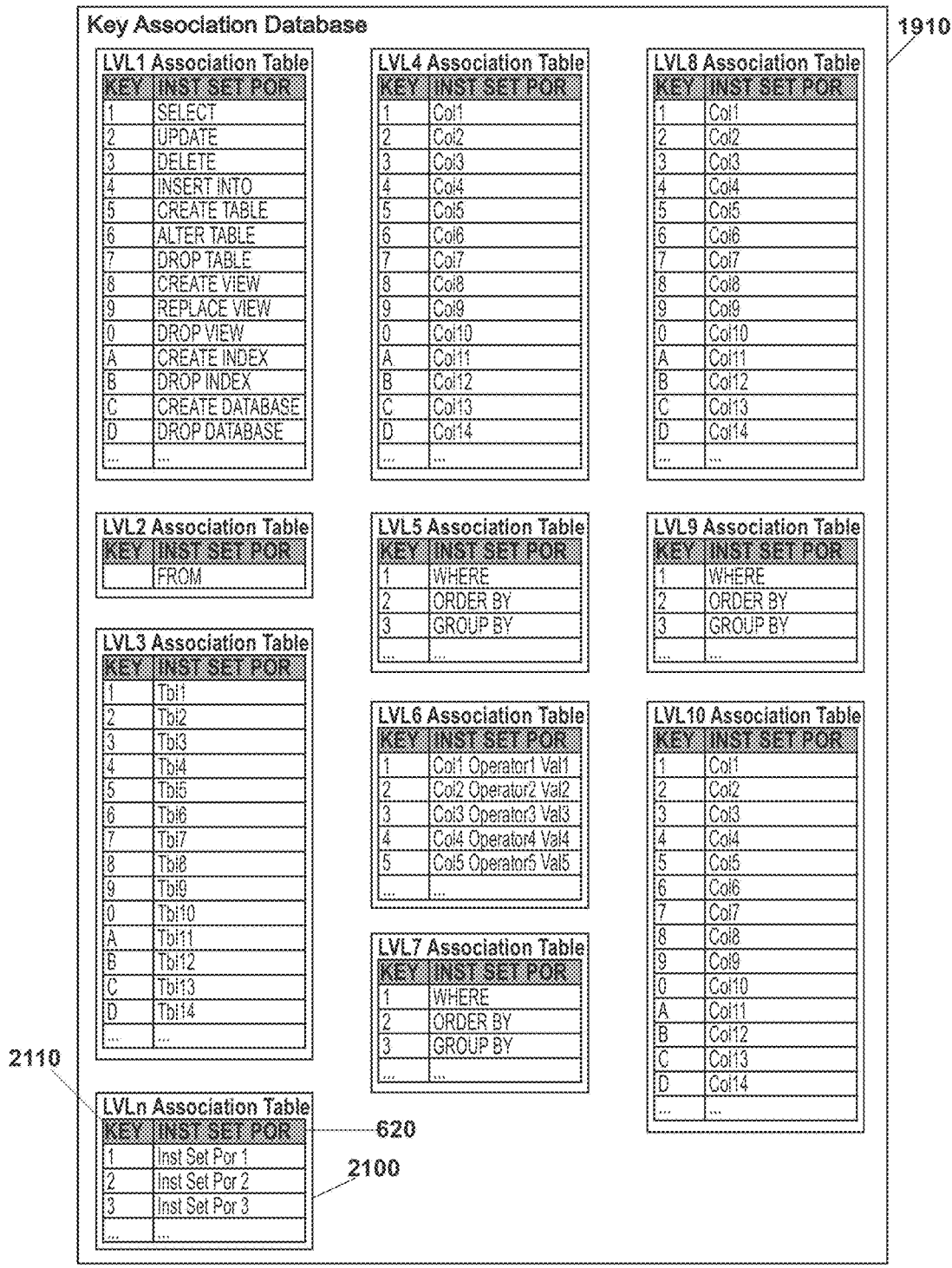
FIG. 21 is a diagram showing an embodiment of Key Association Database 1910.

Referring to FIG. 21, Key Association Database 1910 may comprise any hardware, software or a combination of hardware and software, and/or it may include functions and algorithms for storing the associations between Keys 2110 and the corresponding Instruction Set Portions 620. Key Association Database 1910 may include functions and algorithms for providing one or more Association Tables 2100 where each Association Table 2100 may include a column for the Keys 2110 and a column for the corresponding Instruction Set Portions 620 appropriate for the currently executing Level 2000. The Key 2110 column in the Association Table 2100 may represent the Keys 2110 on the mobile device's Keyboard 150. The Instruction Set Portion 620 or Inst Set Por column may represent the Instruction Set Portions 620 of an Operation 610 or instruction Set 600 appropriate for the currently executing Level 2000. Key Association Database 1910 may be, directly or operatively, connected to the Associative Control Unit 1900 and/or other elements to facilitate the overall system operation and implement the functionalities described herein.

In some embodiments, an Association Table 2100 may be implemented in any table, a database, linked arrays, linked queues, a hash table, or any data structure that can store associated elements (i.e. column-value pairs, etc.). Any or all Association Tables 2100 within a Key Association Database 1910 may be included in one Association Table 2100 in alternate embodiments. Association Tables 2100 may be pre-defined for every possible operation on each of the objects (i.e. tables, databases, etc.) in the Underlying DBMS 120. If pre-defined, Association Tables 2100 may change as the objects in the Underlying DBMS 120 change. For example, if the name of a database in the Underlying DBMS 120 changes, the Association Tables 2100 used for key associations related to this database may change to reflect the changed database name. Alternatively, Association Tables 2100 may be created on-fly or as needed in anticipation of the upcoming Instruction Set Portion 620 that the User 10 may wish to enter.

Figure 22:
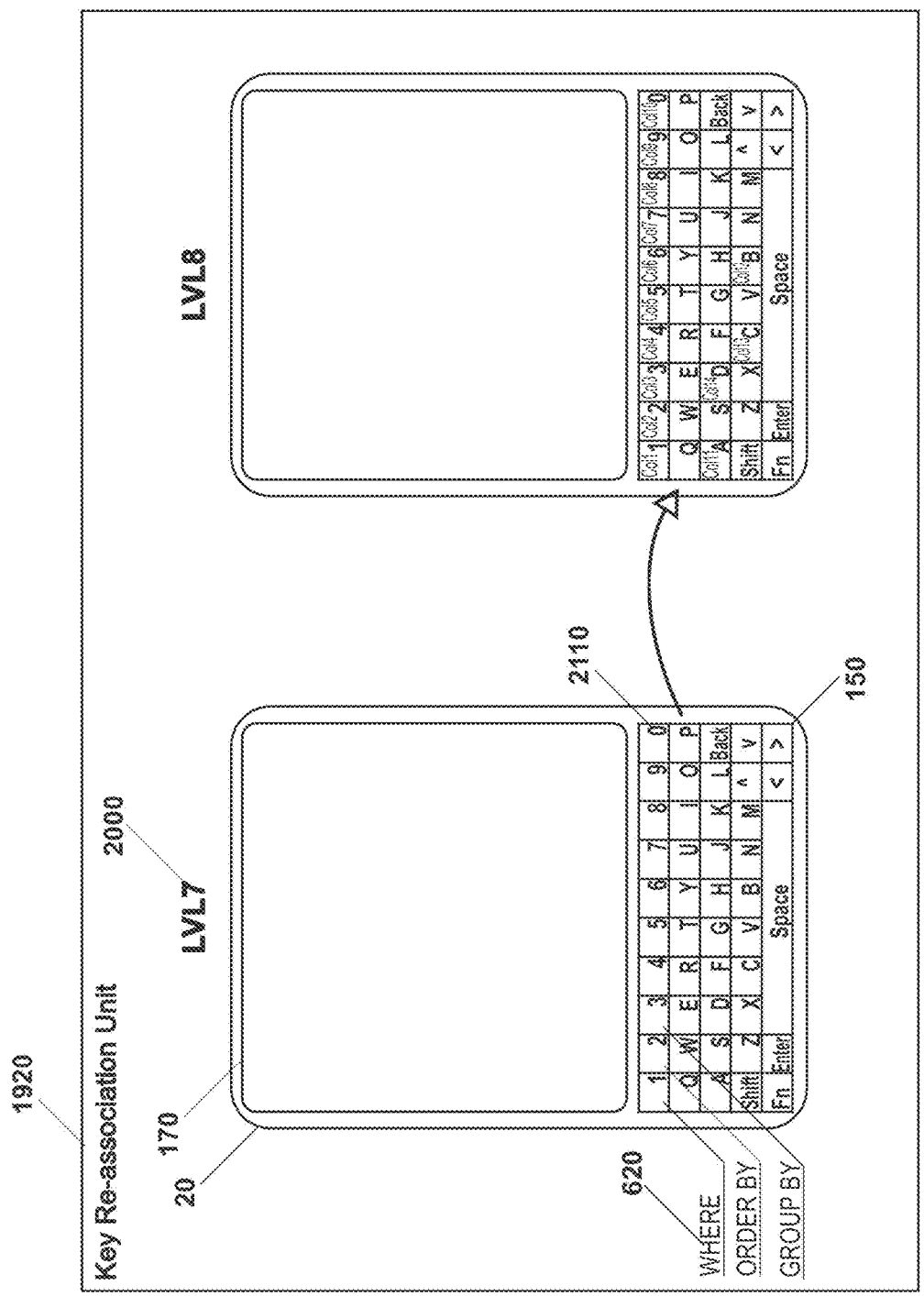
FIG. 22 is a diagram showing an example of functioning of the Key Re-association Unit 1920.

Referring to FIG. 22, Key Re-association Unit 1920 may comprise any hardware, software or a combination of hardware and software, and/or it may include functions and algorithms for associating or re-associating Keys 2110 of an input device (i.e. Keyboard 150, mouse, touch screen, control wheel, remote control, etc.) with Instruction Set Portions 620 of an Operation 610 or instruction Set 600. Key Re-association Unit 1920 may include functions and algorithms for associating or re-associating Keys 2110 of an input device (i.e. Keyboard 150, mouse, touch screen, control wheel, remote control, etc.) with Instruction Set Portions 620 of an Operation 610 or Instruction Set 600 appropriate for the currently executing Level 2000. As shown for example in FIG. 22, at LVL7 Level 2000 the "1", "2", and "3" Keys 2110 may be associated with "WHERE", "ORDER BY", and "GROUP BY" Instruction Set Portions 620 respectively. Once the User 10 presses the "2" Key 2110 for example, Key Re-association Unit 1920 may re-associate the Keys 2110 of the Keyboard 150 using the LVL8 Association Table 2100 as shown. Key Re-association Unit 1920 may be, directly or operatively, connected to the Associative Control Unit 1900, the Core Program 110 and/or other elements to facilitate the overall system operation and implement the functionalities described herein.

Figure 23A:
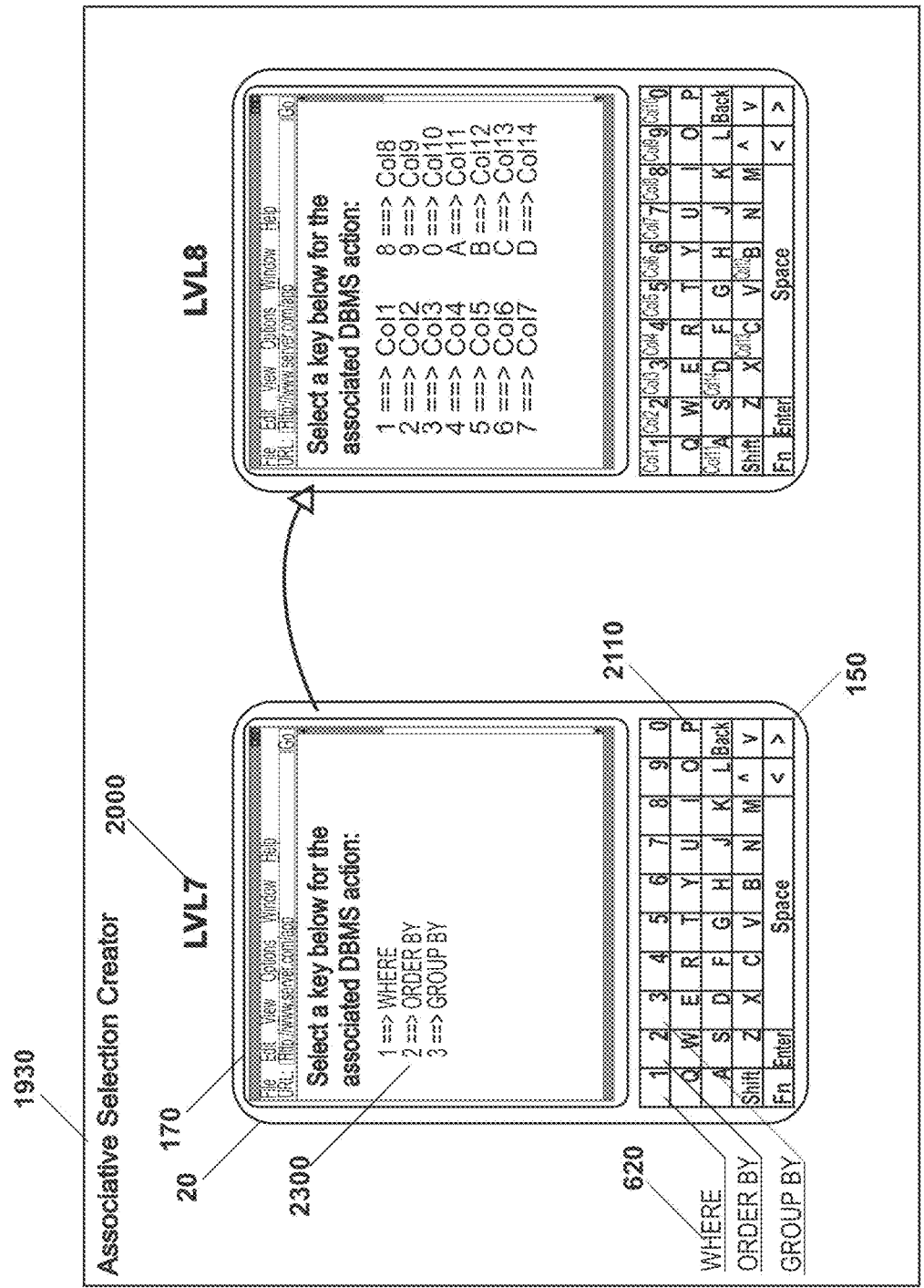
FIG. 23A is a diagram showing an example of functioning of the Associative Selection Creator 1930.

Referring to FIG. 23A, Associative Selection Creator 1930 may comprise any hardware, software or a combination of hardware and software, and/or it may include functions and algorithms for creating or re-creating Selections 2300 for consideration by the user. Associative Selection Creator 1930 may include functions and algorithms for creating or re-creating Selections 2300 for consideration by the user appropriate for the currently executing Level 2000. As shown for example in FIG. 23A, at LVL7 Level 2000 the Display 170 may include a Selection 2300 that shows "WHERE", "ORDER BY", and "GROUP BY" Instruction Set Portions 620 and their associated Keys 2110. Once the User 10 presses the "2" Key 2110 for example, Associative Selection Creator 1930 may create a Selection 2300 using the LVL8 Association Table 2100 as shown. Associative Selection Creator 1930 may be, directly or operatively, connected to the Associative Control Unit 1900, the Core Program 110 and/or other elements to facilitate the overall system operation and implement the functionalities described herein.

In some embodiments, the associative method of constructing Operations 610 or instruction Sets 600 may include Command Assembler 560, which Command Assembler 560 may be, directly or operatively, connected to the Associative Control Unit 1900, the Core Program 110 and/or other elements to facilitate the overall system operation and implement the functionalities described herein. Once all the needed Instruction Set Portions 620 are inputted at their respective Levels 2000 as tracked by the Associative Control Unit 1900, the complete Operation 610 may be sent to the Command Assembler 560 for assembling of the Instruction Set 600 for execution. The functioning of the Command Assembler 560 is equivalent of the Command Assembler 560 previously described.

In other embodiments, the associative method of constructing Operations 610 or instruction Sets 600 may construct an instruction Set 600 without ever using the Operation 610 as an intermediary data structure to store Instruction Set Portions 620. For example, as the User 10 inputs the required Instruction Set Portions 620 as tracked by the Associative Control Unit 1900 at various Levels 2000, the Associative Control Unit 1900 may append the incoming instruction Set Portions 620 as strings of characters to arrive at a complete Instruction Set 600. In this implementation without using Operations 610, Command Assembler's 560 functionality may be omitted or not fully utilized.

Figure 23B:
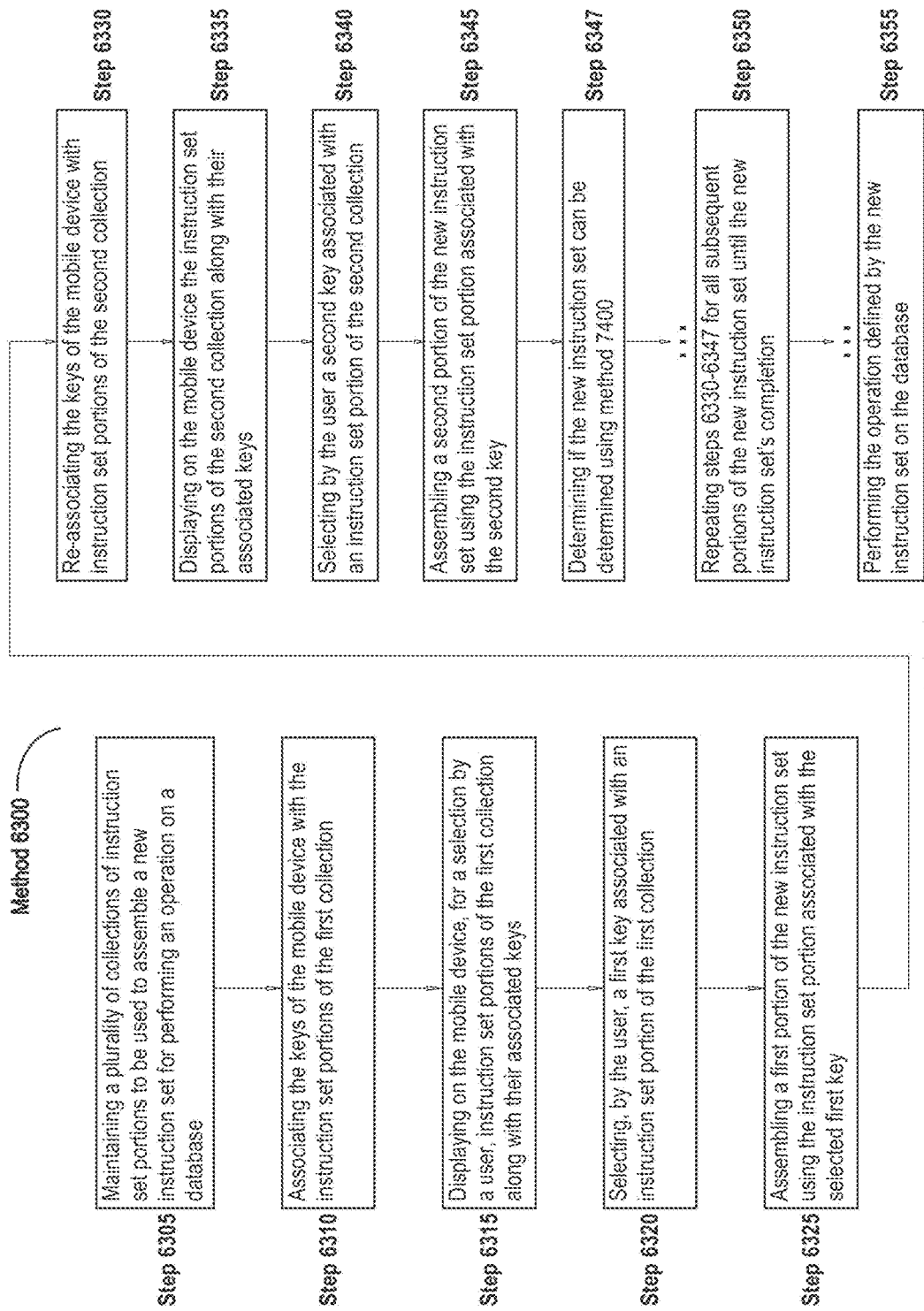
FIG. 23B illustrates a flow chart diagram of an embodiment of a method 6300 implemented by the AI DBMS.

Referring to FIG. 23B, the illustration shows an embodiment of a method 6300 for associative construction of instruction sets through key input. The method may therefore be used by a user on a mobile device operating an interface for an AI DBMS to perform operations on the back-end DBMS (i.e. Underlying DBMS 120).

In brief overview, at step 6305, a plurality of collections of instruction set portions to be used to assemble a new instruction set for performing an operation on a database are maintained on a mobile device. At step 6310, the keys of the mobile device are associated with the instruction set portions of the first collection. At step 6315, instruction set portions of the first collection along with their associated keys are displayed on the mobile device for a selection by a user. At step 6320, user selects a first key associated with an instruction set portion of the first collection. At step 6325, a first portion of the new instruction set is assembled using the instruction set portion associated with the selected first key. At step 6330, the keys of the mobile device are re-associated with instruction set portions of the second collection. At step 6335, the instruction set portions of the second collection along with their associated keys are displayed on the mobile device. At step 6340, the user selects a second key associated with an instruction set portion of the second collection. At step 6345, a second portion of the new instruction set is assembled using the instruction set portion associated with the second key. At step 6347, a determination is made if the new instruction set can be determined using method 7400 later described. At step 6350, steps 6330-6347 are repeated for all subsequent portions of the new instruction set until the new instruction set's completion. At step 6355, the operation defined by the new instruction set is performed on the database.

In further detail, at step 6305, a plurality of collections of instruction set portions are maintained on a mobile device. The instruction set portions may be used to assemble a new instruction set for performing an operation on some data in a database. The collections of instruction set portions may be maintained, organized and/or stored in various arrangements including tables, databases, DBMSs, memory structures, data structures, etc. In some embodiments, the collections of instruction set portions may be ordered to include a first collection, followed by a second collection, which may also be followed by a third collection, and so on, to complete the instruction set. The first collection of instruction set portions may include all possible or most likely first instruction set portions where the user may select among the possibilities, the second collection of instruction set portions may include all possible or most likely second instruction set portions where the user may select among the possibilities, and so on. In some embodiments, the collections of instruction set portions may be pre-defined for all possible or most used operations on each of the objects (i.e. tables, databases, reports/views, relations, user accounts, etc.) in the DBMS and the collections of instruction set portions may change as the objects in the DBMS change. In other embodiments, the collections of instruction set portions may be created on-fly or as needed in anticipation of the upcoming instruction set portion that the user may wish to enter.

At step 6310, the keys of the mobile device are associated with the instruction set portions of the first collection. A key may include any press-able key of a keyboard, any push-able button of the mobile device, any touch-able areas of a touch screen, any click-able component of the mobile device, any slide-able component of the mobile device, a text field, selectable list, drop-down menu, or other physical or graphical elements that may enable a user to input instructions or data. Keys of any internal or external input device such as keyboard, mouse, touch screen, control wheel, remote control, etc. may be used and/or associated with the instruction set portions of the first collection. In some embodiments, the first collection of instruction set portions may be included in a data structure such as a table comprising a column for the keys and a column for the associated instruction set portions of the first collection. Therefore, an association may be established between a key and an instruction set portion of the first collection in the same row of the table. Associating may include any action or operation by or for a Key Re-association Unit 1920.

At step 6315, instruction set portions of the first collection along with their associated keys are displayed on the mobile device for a selection by a user. The user may view on the display of the mobile device which keys of the mobile device may be associated with specific instruction set portions of the first collection. In some embodiments, the display may include keys pointing with arrows or other such signs or indicia to their associated instruction set portions of the first collection indicating the associations for user's consideration. Displaying may include any action or operation by or for an Associative Selection Creator 1930.

At step 6320, user selects a first key associated with an instruction set portion of the first collection. The first key may be received by the interface for a DMBS. The first key may be received by the mobile device, or by any other mobile device or a computing device in general. The first key may be received by any component of the AI DBMS. User may select the first key by using a key of the mobile device associated with one of the instruction set portions of the first collection. The associated instruction set portion of the first collection may identify or indicate one or more commands, keywords, instructions, operators, variables, values, objects, functions and/or other components of the new instruction set to be assembled.

At step 6325, a first portion of the new instruction set is assembled using the instruction set portion associated with the selected first key. In some embodiments, assembling may include storing the first instruction set portion in a data structure such as an array, linked list, table, etc. comprising all known instruction set portions of the new instruction set. In other embodiments, assembling may include appending the first instruction set portion to a string of characters (in the case of the first instruction set portion an empty string) containing the known instruction set portions of the new instruction set. Assembling may include any action or operation by or for an Associative Control Unit 1900.

At step 6330, the keys of the mobile device are re-associated with instruction set portions of the second collection. Step 6330 may include any action or operation described in Step 6310 as applicable.

At step 6335, the instruction set portions of the second collection along with their associated keys are displayed on the mobile device. Step 6335 may include any action or operation described in Step 6315 as applicable.

At step 6340, the user selects a second key associated with an instruction set portion of the second collection. Step 6340 may include any action or operation described in Step 6320 as applicable.

At step 6345, a second portion of the new instruction set is assembled using the instruction set portion associated with the second key. Step 6345 may include any action or operation described in Step 6325 as applicable.

At step 6347, a determination is made if the new instruction set can be determined using method 7400 later described. In some embodiments, method 7400 may be used for predicting the new instruction set by comparing its known instruction set portions with instruction set portions of prior stored instructions sets. Therefore, if enough instruction set portions of the new instruction set are known the new instruction set may be identified before the user inputs all needed instruction set portions.

At step 6350, steps 6330-6347 are repeated for all subsequent portions of the new instruction set until the new instruction sets completion, Steps 6330-6347 may be performed repeatedly with subsequent collections of instruction set portions to assemble the new instruction set one instruction set portion at a time. Once all the needed instruction set portions are known the new instruction set may be complete. In embodiments where the intermediary data structure (i.e. array, linked list, table, etc.) is used for storing known instruction set portions of the new instruction set as previously described, the complete new instruction set may be assembled from the instruction set portions in the data structure before being sent to DBMS for execution. Assembling may include any action or operation by or for a Command Assembler 560. In embodiments where appending is performed of known instruction set portions the new instruction set as previously described, the complete new instruction set may be directly sent to DBMS for execution.

At step 6355, the operation defined by the new instruction set is performed on the database. The operation defined by, or corresponding to, the assembled new instruction set is executed on a DBMS. The operation performed may include one of, or a combination of: accessing, modifying, creating or deleting a database. The operation performed may include one of, or a combination of: accessing, modifying, creating or deleting a table of a database. The operation performed may include one of, or a combination of: accessing, modifying, creating or deleting of a row, column, or cell within a table of a database. The operation performed may include one of, or a combination of: accessing, modifying, creating or deleting a report/view, relation, user account, and/or other objects in a DBMS. The operation performed may include any DBMS operation described herein.

Figure 24:
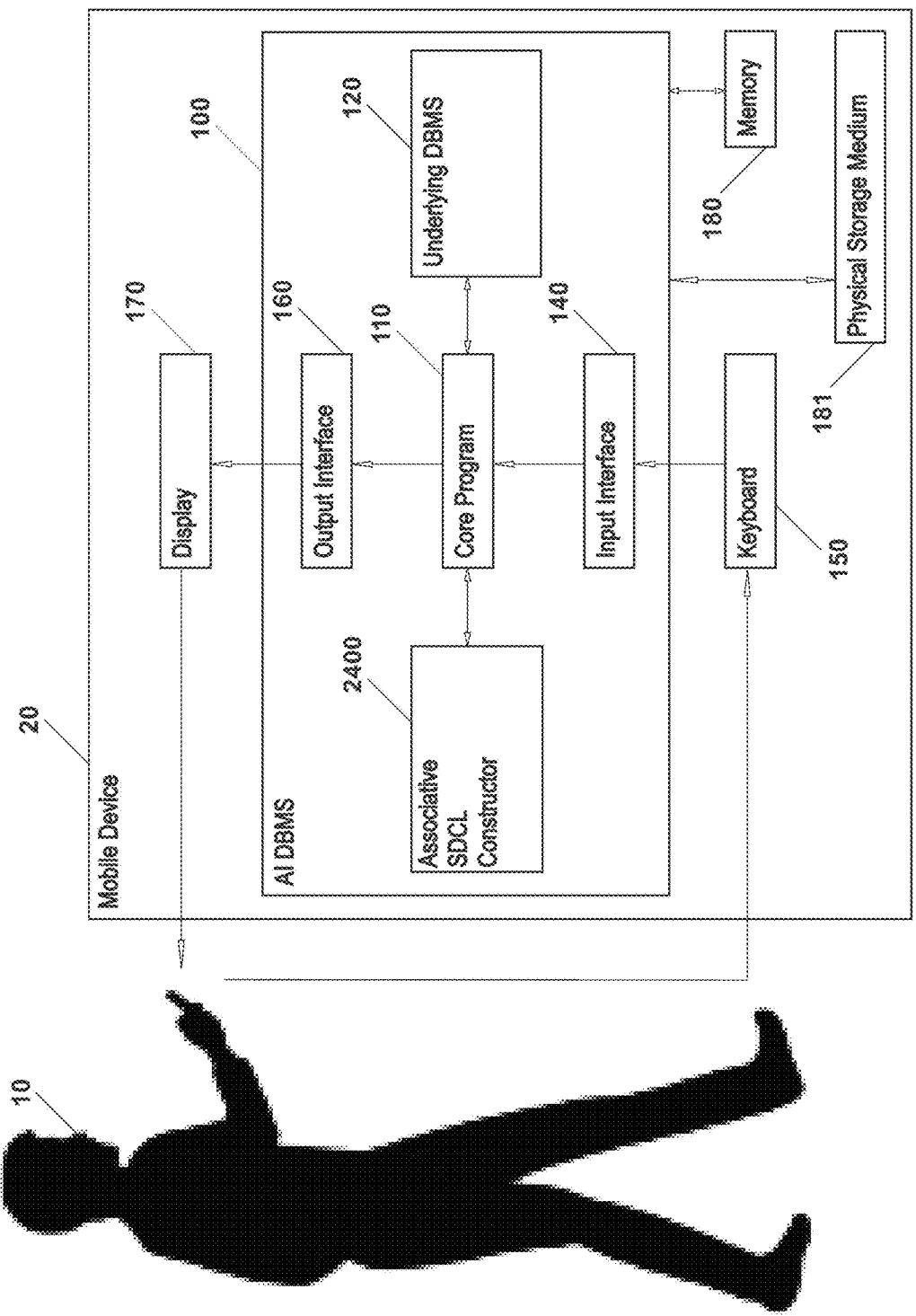
FIG. 24 is a diagram showing an embodiment of AI DBMS with the Associative Simplified DBMS Command Language (SDCL) Constructor 2400.

Referring to FIG. 24, in some aspects, the teaching presented by the current disclosure may be implemented to include a Simplified DBMS Command Language (SDCL) for associative Operation 610 or instruction Set 600 construction. In some embodiments, SDCL may include collections of Phrases 2610 that a non-technical user may typically associate with Instruction Set Portions 620 of an Operation 610 or instruction Set 600. Phrase 2610 may include one or more letters, one or more numbers, one or more symbols, one or more alphanumeric or any other characters, a word, an acronym, a group of words or acronyms, or a sentence each including all of its semantic variations. User 10 may input Phrases 2610 through the Keyboard 150, touch screen, key pad, or any other input device that includes a means of inputting instructions or data. These embodiments may enable a non-technical user to create Operations 610 or Instruction Sets 600 through an associative method in which each Phrase 2610 may be associated with an Instruction Set Portion 620 of the Operation 610 or Instruction Set 600.

As shown in FIG. 24, User 10 may use a Mobile Device 20 that may include the Core Program 110, the Underlying DBMS 120, the Input Interface 140, the Keyboard 150, the Output Interface 160, the Display 170, the Memory 180, the Physical Storage Medium 181, and the Associative SDCL Constructor 2400. Other additional elements may be included as needed, or some of the disclosed ones may be excluded, or a combination thereof may be utilized in alternate embodiments.

Figure 25:
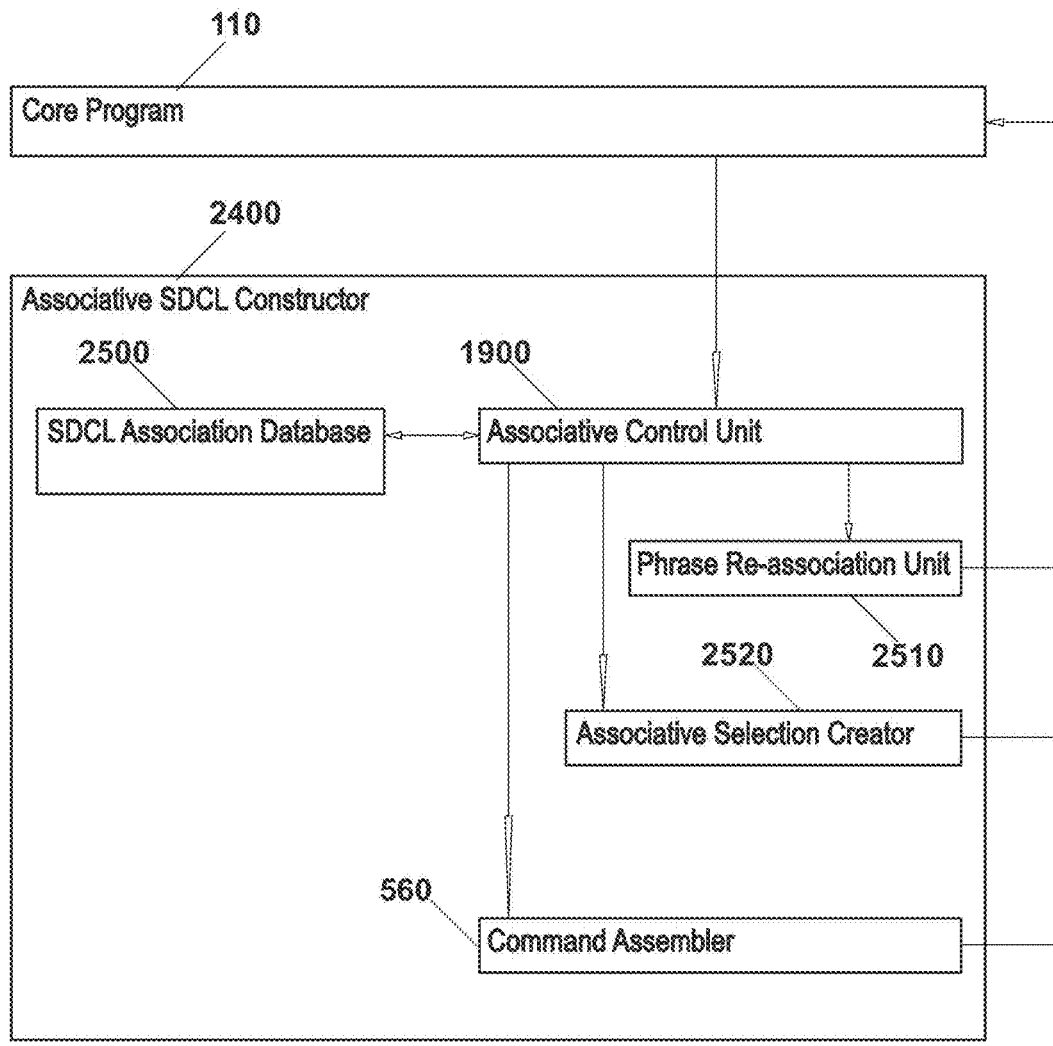
FIG. 25 is a diagram showing an embodiment of Associative SDCL Constructor 2400.

Referring to FIG. 25, Associative SDCL Constructor 2400 may comprise any hardware, software or a combination of hardware and software, and/or it may include functions and algorithms for constructing an Operation 610 or Instruction Set 600, Associative SDCL Constructor 2400 may include functions and algorithms for constructing an Operation 610 or Instruction Set 600 by associating Phrases 2610 with Instruction Set Portions 620 of the Operation 610 or Instruction Set 600. Associative SDCL Constructor 2400 may include functions and algorithms for constructing an Operation 610 or Instruction Set 600 by associating Phrases 2610 with Instruction Set Portions 620 of the Operation 610 or Instruction Set 600 appropriate for the currently executing Level 2000. Associative SDCL Constructor 2400 may be, directly or operatively, connected to the Core Program 110 and/or other elements to facilitate the overall system operation and implement the functionalities described herein.

Associative SDCL Constructor 2400 may include Associative Control Unit 1900, SDCL Association Database 2500, Phrase Re-association Unit 2510, Associative Selection Creator 2520, and Command Assembler 560. Other additional elements may be included as needed, or some of the disclosed ones may be excluded, or a combination thereof may be utilized in alternate embodiments.

Figure 26A:
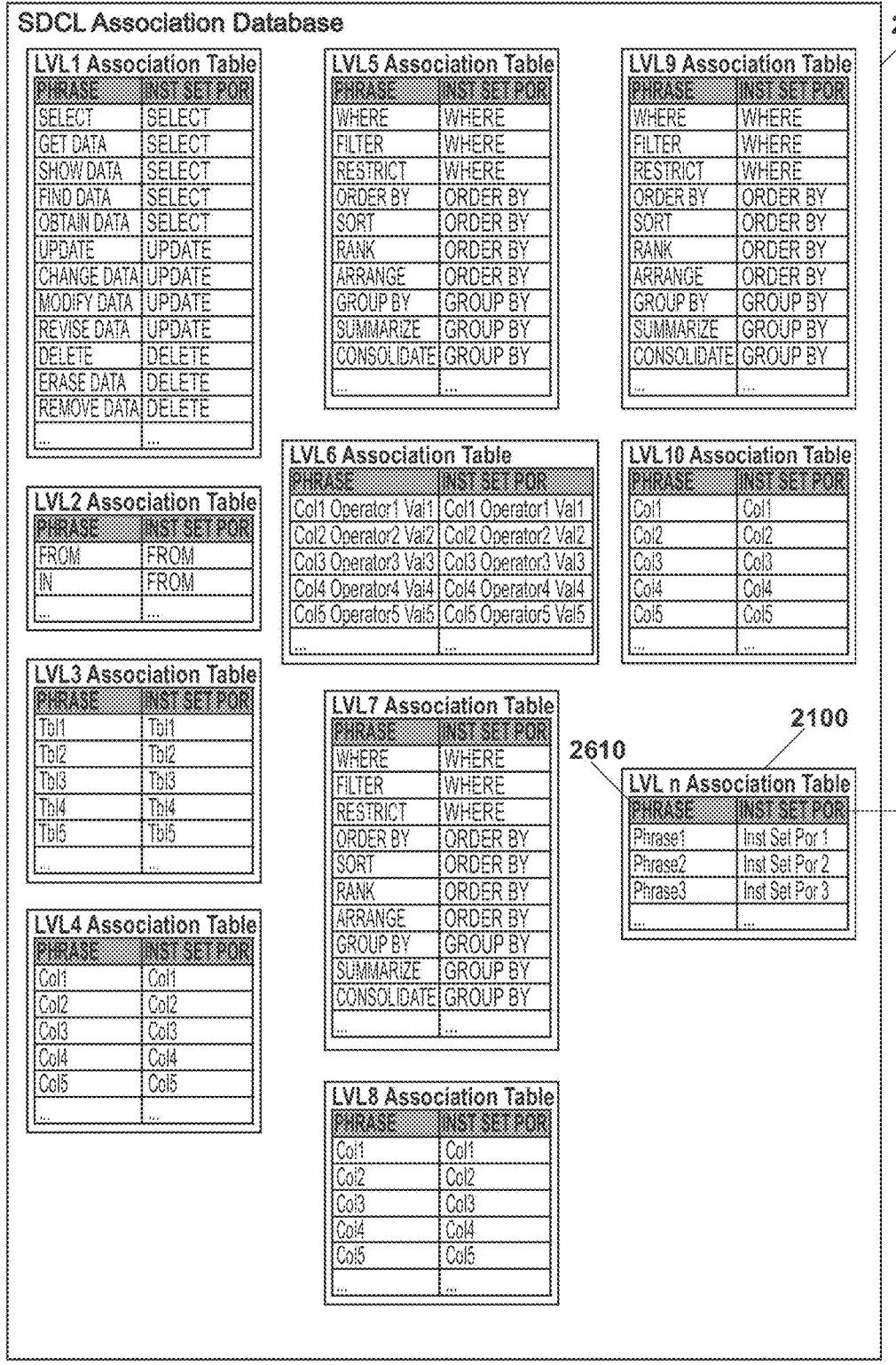
FIG. 26A is a diagram showing an embodiment of SDCL Association Database 2500.

Referring to FIG. 26A, SDCL Association Database 2500 may comprise any hardware, software or a combination of hardware and software, and/or it may include functions and algorithms for storing associations between Phrases 2610 and the corresponding Instruction Set Portions 620. SDCL Association Database 2500 may include functions and algorithms for providing Association Tables 2100 where each Association Table 2100 may include a column for the Phrases 2610 and a column for the corresponding Instruction Set Portions 620 appropriate for the currently executing Level 2000. The Phrase 2610 column in the Association Table 2100 may represent Phrases 2610 that User 10 (i.e. non-technical user) may typically associate with the Instruction Set Portions 620 of an Operation 610 or Instruction Set 600. The Instruction Set Portion 620 or Inst Set Por column may represent the Instruction Set Portions 620 of an Operation 610 or Instruction Set 600 appropriate for the currently executing Level 2000. SDCL Association Database 2500 may be, directly or operatively, connected to the Associative Control Unit 1900 and/or other elements to facilitate the overall system operation and implement the functionalities described herein.

In one example, at the initiation of the Associative SDCL Constructor 2400, User 10 may input or select a Phrase 2610 "GET DATA". The Phrase 2610 "GET DATA" may be associated with the "SELECT" Instruction Set Portion 620 within the LVL1 Association Table 2100. The "SELECT" instruction Set Portion 620 indicates the type of Operation 610 or Instruction Set 600 as the SELECT type of Operation 610 or Instruction Set 600 (i.e. SELECT type SQL statement), and therefore it may be stored in a data field of the Operation 610 and associated with the LVL1 Level 2000. The next Phrase 2610 the User 10 may be required to input or select is at LVL2 Level 2000 to input or select one of the Phrases 2610 associated with the keyword "FROM". The next Phrase 2610 the User 10 may be required to input or select is at LVL3 Level 2000 to input or select "Tbl1, Tbl2 . . . " representing the names of tables from which to obtain data. The next Phrase 2610 the User 10 may be required to input or select is at LVL4 Level 2000 to input or select "Col1, Col2 . . . " representing the columns to be selected. The next Phrase 2610 the User 10 may be required to input or select is at LVL5 Level 2000 to input or select "WHERE", "ORDER BY", or "GROUP BY" keyword. In the case of "FILTER" Phrase 2610 being inputted or selected by the User 10 at LVL5 Level 2000 indicating the "WHERE" Instruction Set Portion 620, the next Phrase 2610 the User 10 may be required to input or select is at LVL6 Level 2000 to input or select "Col1 Operator1 Val1 AND Col2 Operator2 Val2 . . . " representing columns, operators and values used in restricting output results. Since "Col1 Operator1 Val1 AND Col2 Operator2 Val2 . . . " may contain more than one object, operator and/or value, sub-inputs may be required for each in one embodiment. The next Phrase 2610 the User 10 may be required to input or select is at LVL7 Level 2000 to input or select "WHERE", "ORDER BY", or "GROUP BY" keyword. In the case of "SORT" Phrase 2610 being inputted or selected by the User 10 at LVL7 Level 2000 indicating the "ORDER BY" Instruction Set Portion 620, the next Phrase 2610 the User 10 may be required to input or select is at LVL8 Level 2000 to input or select "Col1 Col2 . . . " representing columns by which to sort the resulting data set. The next Phrase 2610 the User 10 may be required to input or select is at LVL9 Level 2000 to input or select "WHERE", "ORDER BY", or "GROUP BY" keyword. In the case of "SUMMARIZE" Phrase 2610 being inputted or selected by the User 10 at LVL9 Level 2000 indicating the "GROUP BY" Instruction Set Portion 620, the next Phrase 2610 the User 10 may be required to input or select is at LVL10 Level 2000 to input or select "Col1, Col2 . . . " representing columns by which to group the resulting data set. Other instruction Set Portions 620 not shown may be utilized in alternate embodiments such as functions including MIN( ), MAX( ), SUM( ), FIRST( ), LAST( ) etc.; operators including OR, LESS THAN, GREATER THAN, etc.; objects including databases, relations, user accounts, privileges, etc.; etc.

At each Level 2000 the Associative Control Unit 1900 may interact with (1) the Control Program 110 to obtain the User's 10 inputted or selected Phrase 2610, (2) the SDCL Association Database 2500 to obtain the Association Table 2100 containing the Instruction Set Portions 620 appropriate for the currently inputted Phrase 2610 and currently executing Level 2000, (3) the Phrase Re-association Unit 2510 that re-associates Phrases 2610 with appropriate Instruction Set Portions 620 for the currently executing Level 2000, (4) the Associative Selection Creator 2520 that creates the Selections 2300 appropriate for the currently executing Level 2000, and/or (5) other elements. When all needed Instruction Set Portions 620 at their respective Levels 2000 are inputted or selected the Associative Control Unit 1900 may send the completed Operation 610 to the Command Assembler 560 for assembling the Instruction Set 600 for execution. In some embodiments, Phrase Re-association Unit 2510 may optionally be omitted. In such embodiments, Associative Control Unit 1900 may receive the User's 10 inputted Phrase 2610 from the Control Program 110 and look up the associated Instruction Set Portion 620 in the Association Table 2100 containing the Instruction Set Portions 620 appropriate for the currently inputted Phrase 2610 and the currently executing Level 2000.

An extended example of the LVL1 Association Table 2100 may be as follows:

| PHRASE | INST SET POR |
|---|---|
| SELECT | SELECT |
| GET DATA | SELECT |
| SHOW DATA | SELECT |
| FIND DATA | SELECT |
| OBTAIN DATA | SELECT |
| UPDATE | UPDATE |
| CHANGE DATA | UPDATE |
| MODIFY DATA | UPDATE |
| REVISE DATA | UPDATE |
| DELETE | DELETE |
| ERASE DATA | DELETE |
| REMOVE DATA | DELETE |
| INSERT INTO | INSERT INTO |
| ADD DATA | INSERT INTO |
| INSERT DATA | INSERT INTO |
| CREATE TABLE | CREATE TABLE |
| ADD TABLE | CREATE TABLE |
| INSERT TABLE | CREATE TABLE |
| ALTER TABLE | ALTER TABLE |
| CHANGE TABLE | ALTER TABLE |
| UPDATE TABLE | ALTER TABLE |
| MODIFY TABLE | ALTER TABLE |
| REVISE TABLE | ALTER TABLE |
| DROP TABLE | DROP TABLE |
| DELETE TABLE | DROP TABLE |
| ERASE TABLE | DROP TABLE |
| REMOVE TABLE | DROP TABLE |
| CREATE VIEW | CREATE VIEVII |
| ADD VIEW | CREATE VIEW |
| INSERT VIEW | CREATE VIEW |
| ALTER VIEW | REPLACE VIEW |
| CHANGE VIEW | REPLACE VIEW |
| UPDATE VIEW | REPLACE VIEW |
| MODIFY VIEW | REPLACE VIEW |
| REVISE VIEW | REPLACE VIEW |
| DROP VIEW | DROP VIEW |
| DELETE VIEW | DROP VIEW |
| ERASE VIEW | DROP VIEW |
| REMOVE VIEW | DROP VIEW |
| CREATE INDEX | CREATE INDEX |
| ADD INDEX | CREATE INDEX |
| INSERT INDEX | CREATE INDEX |
| DROP INDEX | DROP INDEX |
| DELETE INDEX | DROP INDEX |
| ERASE INDEX | DROP INDEX |
| REMOVE INDEX | DROP INDEX |
| CREATE DATABASE | CREATE DATABASE |
| ADD DATABASE | CREATE DATABASE |
| INSERT DATABASE | CREATE DATABASE |
| DROP DATABASE | DROP DATABASE |
| DELETE DATABASE | DROP DATABASE |
| ERASE DATABASE | DROP DATABASE |
| REMOVE DATABASE | DROP DATABASE |
| . . . | . . . |

It should be understood that Phrases 2610 and their associated Instruction Set Portions 620 included in this LVL1 Association Table 2100 are examples of some possible Phrases 2610 that may be included in this LVL1 Association Table 2100 or any other Association Table 2100. Any Phrases 2610 and their associated Instruction Set Portions 620 included in this LVL1 Association Table 2100 or any other Association Table 2100 may be defined by the User 10 or system administrator, or by AI DBMS itself through a Phrase 2610 recording process (i.e. recording user phrases as the user uses them and asking the user to assign associated Instruction Set Portions 620). Phrases 2610 and their associated instruction Set Portions 620 may also be defined based on the type of DBMS application, experience, testing, logs, inquiry, analysis, synthesis or other techniques in alternate implementations. In general, other additional Phrases 2610 and their associated Instruction Set Portions 620 may be included as needed, or some of the disclosed ones may be excluded, or a combination thereof may be utilized in alternate embodiments.

Phrase Re-association Unit 2510 may comprise any hardware, software or a combination of hardware and software, and/or it may include functions and algorithms for associating or re-associating Phrases 2610 with Instruction Set Portions 620 of an Operation 610 or Instruction Set 600. Phrase Re-association Unit 2510 may include functions and algorithms for associating or re-associating Phrases 2610 with Instruction Set Portions 620 of an Operation 610 or instruction Set 600 appropriate for the currently executing Level 2000. For example, at LVL7 Level 2000 the Phrase Re-association Unit 2510 may associate Phrases 2610 with Instruction Set Portions 620 using the LVL7 Association Table 2100 containing Instruction Set Portions 620 "WHERE", "ORDER BY", and "GROUP BY" and their associated Phrases 2610. Once User 10 inputs a Phrase 2610 "SORT" for example indicating "ORDER BY" Instruction Set Portions 620, Phrase Re-association Unit 2510 may re-associate Phrases 2610 using the LVL8 Association Table 2100 containing instruction Set Portions 620 "Col1", "Col2", etc. and their associated Phrases 2610 indicating the columns by which to sort the resulting data set. Phrase Re-association Unit 2510 may be, directly or operatively, connected to the Associative Control Unit 1900, the Core Program 110 and/or other elements to facilitate the overall system operation and implement the functionalities described herein. Phrase Re-association Unit 2510 may include some or all the features and embodiments of the previously described Key Re-association Unit 1920.

Associative Selection Creator 2520 may comprise any hardware, software or a combination of hardware and software, and/or it may include functions and algorithms for creating or re-creating Selections 2300 for consideration by the user. Associative Selection Creator 2520 may include functions and algorithms for creating or re-creating Selections 2300 for consideration by the user appropriate for the currently executing Level 2000. For example, at LVL7 Level 2000 the Display 170 may include a Selection 2300 that may show entries of the LVL7 Association Table 2100 containing instruction Set Portions 620 "WHERE", "ORDER BY", and "GROUP BY" and their associated Phrases 2610. Once User 10 inputs a Phrase 2610 "SORT" for example indicating "ORDER BY" Instruction Set Portions 620, Associative Selection Creator 2520 may create a Selection 2300 using the LVL8 Association Table 2100 containing Instruction Set Portions 620 "Col1", "Col2", etc. and their associated Phrases 2610 indicating the columns by which to sort the resulting data set. Associative Selection Creator 2520 may be, directly or operatively, connected to the Associative Control Unit 1900, the Core Program 110 and/or other elements to facilitate the overall system operation and implement the functionalities described herein. Associative Selection Creator 2520 may include some or all the features and embodiments of the previously described Associative Selection Creator 1930.

In some embodiments, User 10 may input an entire sentence that may then be matched against Association Tables 2100 to decipher the Phrases 2610 and/or their associated Instruction Set Portions 620. For example, User 10 may input a sentence "SHOW DATA IN Tbl4", The words in this sentence may then be matched with the Phrases 2610 in LVL1 Association Table 2100 and it is found that "SHOW DATA" is a Phrase 2610 within the LVL1 Association Table 2100. The Phrase 2610 "SHOW DATA" may be associated with the "SELECT" Instruction Set Portion 620, it may indicate the type of Operation 610 or Instruction Set 600 as the SELECT type of Operation 610 or Instruction Set 600 (i.e. SELECT type SQL statement), and therefore it may be stored in a data field of the Operation 610 and associated with LVL1 Level 2000. The words in the rest of the sentence ("IN Tbl4") may then be matched with the Phrases 2610 in LVL2 Association Table 2100 and it is found that "IN" is a Phrase 2610 within the LVL2 Association Table 2100, The Phrase 2610 "IN" may be associated with the "FROM" Instruction Set Portion 620 and therefore it may be stored in a data field of the Operation 610 and associated with LVL2 Level 2000. The words in the rest of the sentence ("Tbl4") may then be matched with the Phrases 2610 in LVL3 Association Table 2100 and it is found that "Tbl4" is a Phrase 2610 within the LVL3 Association Table 2100. The Phrase 2610 "Tbl4" may be associated with the "Tbl4" Instruction Set Portion 620 and therefore it may be stored in a data field of the Operation 610 and associated with LVL3 Level 2000. The described matching process may continue for any number of words or phrases in the sentence and for any number of Association Tables 2100. If User 10 wishes to construct a longer or more detailed Operation 610 or Instruction Set 600 that may include filtered, sorted, and/or summarized results, etc. additional Phrases 2610 and/or their instruction Set Portions 620 may then be obtained from the User 10 in the associative process previously described.

Figure 26B:
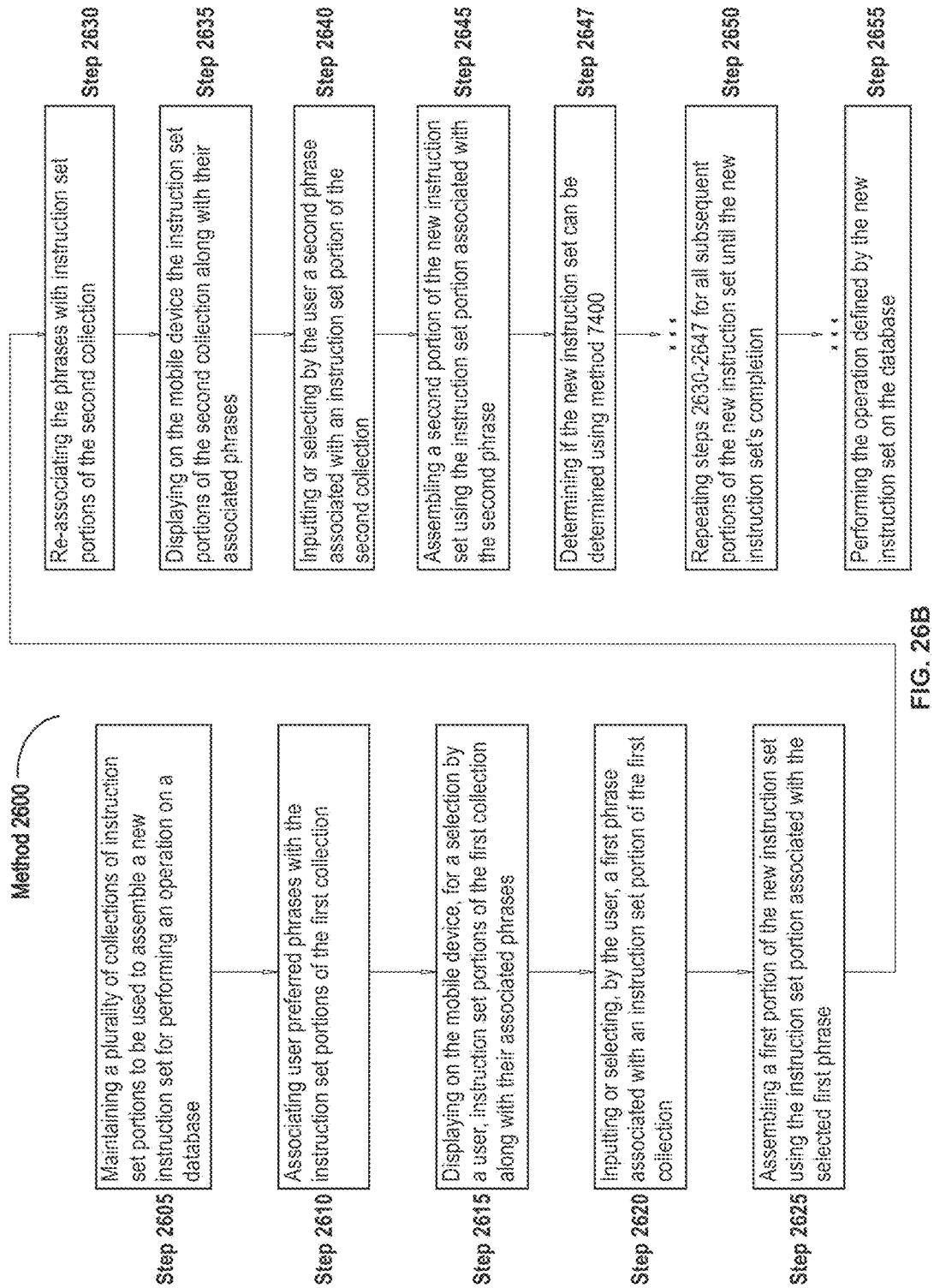
FIG. 26B illustrates a flow chart diagram of an embodiment of a method 2600 implemented by the AI DBMS.

Referring to FIG. 26B, the illustration shows an embodiment of a method 2600 for associative construction of instruction sets through phrase input. The method may therefore be used by a user on a mobile device operating an interface for an AI DBMS to perform operations on the back-end DBMS (i.e. Underlying DBMS 120).

In brief overview, at step 2605, a plurality of collections of instruction set portions to be used to assemble a new instruction set for performing an operation on a database are maintained on a mobile device. At step 2610, user preferred phrases are associated with the instruction set portions of the first collection. At step 2615, instruction set portions of the first collection along with their associated phrases are displayed on the mobile device for a selection by a user. At step 2620, user inputs or selects a first phrase associated with an instruction set portion of the first collection. At step 2625, a first portion of the new instruction set is assembled using the instruction set portion associated with the selected first phrase. At step 2630, the phrases are re-associated with instruction set portions of the second collection. At step 2635, the instruction set portions of the second collection along with their associated phrases are displayed on the mobile device. At step 2640, the user inputs or selects a second phrase associated with an instruction set portion of the second collection. At step 2645, a second portion of the new instruction set is assembled using the instruction set portion associated with the second phrase. At step 2647, a determination is made if the new instruction set can be determined using method 7400 later described. At step 2650, steps 2630-2647 are repeated for all subsequent portions of the new instruction set until the new instruction set's completion. At step 2655, the operation defined by the new instruction set is performed on the database.

In further detail, at step 2605, a plurality of collections of instruction set portions are maintained on a mobile device. The instruction set portions may be used to assemble a new instruction set for performing an operation on some data in a database. The collections of instruction set portions may be maintained, organized and/or stored in various arrangements including tables, databases, DBMSs, memory structures, data structures, etc. In some embodiments, the collections of instruction set portions may be ordered to include a first collection, followed by a second collection, which may also be followed by a third collection, and so on, to complete the instruction set. The first collection of instruction set portions may include all possible or most likely first instruction set portions where the user may select among the possibilities, the second collection of instruction set portions may include all possible or most likely second instruction set portions where the user may select among the possibilities, and so on. In some embodiments, the collections of instruction set portions may be pre-defined for all possible or most used operations on each of the objects (i.e. tables, databases, reports/views, relations, user accounts, etc.) in the DBMS and the collections of instruction set portions may change as the objects in the DBMS change. In other embodiments, the collections of instruction set portions may be created on-fly or as needed in anticipation of the upcoming instruction set portion that the user may wish to enter.

At step 2610, user preferred phrases are associated with the instruction set portions of the first collection. In some embodiments, a phrase may include one or more letters, one or more numbers, one or more symbols, one or more alphanumeric or any other characters, a word, an acronym, a group of words or acronyms, or a sentence each including all of its semantic variations. In some embodiments, user preferred phrases may include phrases that a non-technical user may typically associate with instruction set portions of an instruction set such as the new instruction set, Phrases may be inputted through any internal or external input device such as keyboard, mouse, touch screen, control wheel, remote control, microphone, etc. In some embodiments, the first collection of instruction set portions may be included in a data structure such as a table comprising a column for the phrases and a column for the associated instruction set portions of the first collection. Therefore, an association may be established between a phrase and an instruction set portion of the first collection in the same row of the table. Associating may include any action or operation by or for a Phrase Re-association Unit 2510.

At step 2615, instruction set portions of the first collection along with their associated phrases are displayed on the mobile device for a selection by a user. The user may view on the display of the mobile device which phrases may be associated with specific instruction set portions of the first collection. In some embodiments, the display may include phrases pointing with arrows or other such signs or indicia to their associated instruction set portions of the first collection indicating the associations for user's consideration. Displaying may include any action or operation by or for an Associative Selection Creator 2520.

At step 2620, user inputs or selects a first phrase associated with an instruction set portion of the first collection. The first phrase may be received by the interface for a DMBS. The first phrase may be received by the mobile device, or by any other mobile device or a computing device in general. The first phrase may be received by any component of the AI DBMS. User may input or select the first phrase by using the keyboard of the mobile device for example, and the first phrase may be associated with one of the instruction set portions of the first collection. The associated instruction set portion of the first collection may identify or indicate one or more commands, keywords, instructions, operators, variables, values, objects, functions and/or other components of the new instruction set to be assembled.

At step 2625, a first portion of the new instruction set is assembled using the instruction set portion associated with the selected first phrase. In some embodiments, assembling may include storing the first instruction set portion in a data structure such as an array, linked list, table, etc. comprising all known instruction set portions of the new instruction set. In other embodiments, assembling may include appending the first instruction set portion to a string of characters (in the case of the first instruction set portion an empty string) containing the known instruction set portions of the new instruction set. Assembling may include any action or operation by or for an Associative Control Unit 1900.

At step 2630, the phrases are re-associated with instruction set portions of the second collection. Step 2630 may include any action or operation described in Step 2610 as applicable.

At step 2635, the instruction set portions of the second collection along with their associated phrases are displayed on the mobile device. Step 2635 may include any action or operation described in Step 2615 as applicable.

At step 2640, the user inputs or selects a second phrase associated with an instruction set portion of the second collection. Step 2640 may include any action or operation described in Step 2620 as applicable.

At step 2645, a second portion of the new instruction set is assembled using the instruction set portion associated with the second phrase. Step 2645 may include any action or operation described in Step 2625 as applicable.

At step 2647, a determination is made if the new instruction set can be determined using method 7400 later described. In some embodiments, method 7400 may be used for predicting the new instruction set by comparing its known instruction set portions with instruction set portions of prior stored instructions sets. Therefore, if enough instruction set portions of the new instruction set are known the new instruction set may be identified before the user inputs all needed instruction set portions.

At step 2650, steps 2630-2647 are repeated for all subsequent portions of the new instruction set until the new instruction set's completion. Steps 2630-2647 may be performed repeatedly with subsequent collections of instruction set portions to assemble the new instruction set one instruction set portion at a time. Once all the needed instruction set portions are known the new instruction set may be complete. In embodiments where the intermediary data structure (i.e. array, linked list, table, etc.) is used for storing known instruction set portions of the new instruction set as previously described, the complete new instruction set may be assembled from the instruction set portions in the data structure before being sent to DBMS for execution. Assembling may include any action or operation by or for a Command Assembler 560. In embodiments where appending is performed of known instruction set portions the new instruction set as previously described, the complete new instruction set may be directly sent to DBMS for execution.

At step 2655, the operation defined by the new instruction set is performed on the database. The operation defined by, or corresponding to, the assembled new instruction set is executed on a DBMS. The operation performed may include one of, or a combination of: accessing, modifying, creating or deleting a database. The operation performed may include one of, or a combination of: accessing, modifying, creating or deleting a table of a database. The operation performed may include one of, or a combination of: accessing, modifying, creating or deleting of a row, column, or cell within a table of a database. The operation performed may include one of, or a combination of: accessing, modifying, creating or deleting a report/view, relation, user account, and/or other objects in a DBMS. The operation performed may include any DBMS operation described herein.

Figure 27:
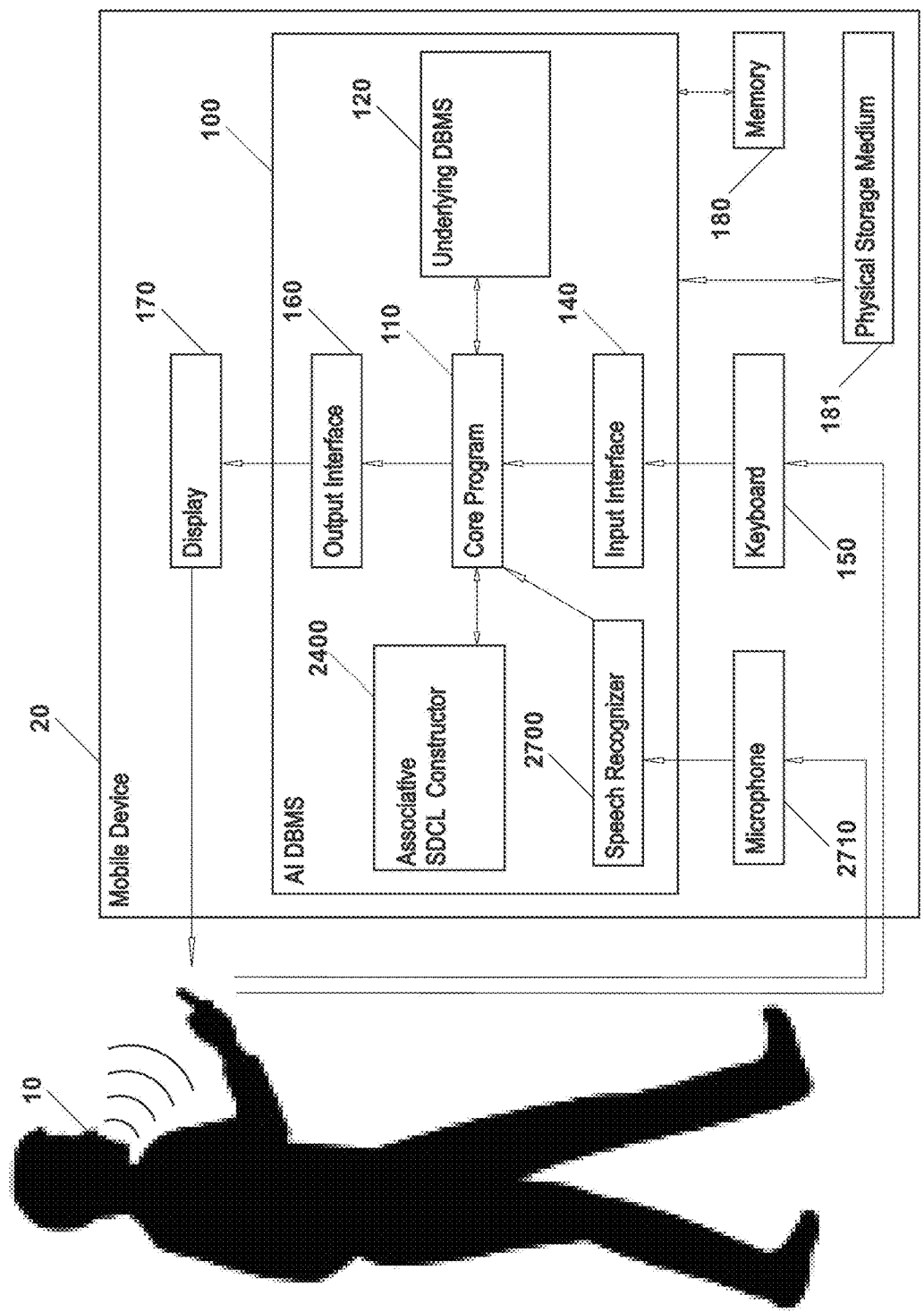
FIG. 27 is a diagram showing an embodiment of AI DBMS with the Associative SDCL Constructor 2400 and the Speech Recognizer 2700.

Referring to FIG. 27, in some aspects, the teaching presented by the current disclosure may be implemented to include a SDCL for associative Operation 610 or instruction Set 600 construction and speech recognition for voice input.

As shown in FIG. 27, User 10 may use a Mobile Device 20 that may include the Core Program 110, the Underlying DBMS 120, the Input Interface 140, the Keyboard 150, the Output Interface 160, the Display 170, the Memory 180, the Physical Storage Medium 181, the Associative SDCL Constructor 2400, the Speech Recognizer 2700, and the Microphone 2710. Other additional elements may be included as needed, or some of the disclosed ones may be excluded, or a combination thereof may be utilized in alternate embodiments.

In some embodiments, Speech Recognizer 2700 may comprise any hardware, software or a combination of hardware and software, and/or it may include functions and algorithms for processing input events of the Microphone 2710 for use by the Core Program 110 or other elements of the current disclosure. Speech Recognizer 2700 may include functions and algorithms for "listening" to voice events on the Microphone 2710, interpreting the voice events as User's 10 voice commands, and transmitting the voice commands for use by the Core Program 110. Speech Recognizer 2700 may fall under the general description of the previously described Input Interface 140, and while it includes all the aforementioned embodiments, it is described separately in this embodiment to offer additional detail on its functioning. Speech Recognizer 2700 may be implemented by utilizing (1) a Mobile Device 20 operating system's speech recognition functionality such as iOS's Voice Services, Siri, etc. which may come inherently as the part of the mobile device package; (2) a Java Speech API (JSAPI) or any of its implementations such as The Cloud Garden, Sphinx, etc.; or (3) applications or engines providing speech recognition functionality such as OpenEars, Dragon Mobile, iSpeech, CeedVocal, Elite, Julius, etc. AI DBMS with Speech Recognizer 2700 may enable User 10 to construct Operations 610 or Instruction Sets 600 (1) by issuing voice commands (i.e. phrases, etc.) combined with the associative SDCL constructing process previously described, (2) by issuing voice commands combined with the key associative DBMS command constructing process previously described, or (3) by issuing voice commands only.

In some embodiments, AI DBMS may use the Mobile Device 20 operating system's speech recognition functionality as the Speech Recognizer 2700. The Core Program 110 may use the operating system's native speech recognition API such as the iOS Voice Services to obtain User's 10 voice commands. This way, Microphone 2710 may detect User's 10 voice event; the iOS Voice Services may interpret the voice event as User's 20 voice command and make the voice event available as data (i.e. text, instruction, instruction set, command, object, data structure, etc.) to the Core Program 110; and the Core Program 110 may pass the data to the Associative SDCL Constructor 2400 as a Phrase 2610 for associating with Instruction Set Portions 620.

In other embodiments, AI DBMS may use a Java Speech API (JSAPI) implementation as the Speech Recognizer 2700. The Core Program 110 may use a JSAPI implementation such as The Cloud Garden to obtain User's voice commands. This way, Microphone 2710 may detect User's 10 voice event; the Cloud Garden JSAPI may interpret the voice event as User's 20 voice command and make the voice event available as data (i.e. text, instruction, instruction set, command, object, data structure, etc.) to the Core Program 110; and the Core Program 110 may pass the data to the Associative SDCL Constructor 2400 as a Phrase 2610 for associating with Instruction Set Portions 620.

In further embodiments, AI DBMS may use applications or engines providing speech recognition functionality as the Speech Recognizer 2700: The Core Program 110 may use an application or engine such as the OpenEars Software Development Kit (SDK) to obtain User's voice commands. This way, Microphone 2710 may detect User's 10 voice event; the OpenEars SDK may interpret the voice event as User's 20 voice command and make the voice event available as data (i.e. text, instruction, instruction set, command, object, data structure, etc.) to the Core Program 110; and the Core Program 110 may pass the data to the Associative SDCL Constructor 2400 as a Phrase 2610 for associating with Instruction Set Portions 620.

Depending on resource availability Speech Recognizer 2700 may be implemented as keyword spotting or as full speech recognition. Keyword spotting may attempt to find only a select group of words and/or phrases, and because of this limited lexicon it consumes fewer resources. In the case of keyword spotting implementation, Phrases 2610 within Association Tables 2100 may define the select group of words and/or phrases to be searched. Full speech recognition may attempt to find all the words and/or phrases that have been spoken, and because of this broader lexicon it consumes significant resources. In the case of full speech recognition implementation, the broadness of words and/or phrases would by definition include all the Phrases 2610 within the Association Tables 2100. In some embodiments, both keyword spotting and full speech recognition implementations may include a database of words and/or phrases located locally on the Mobile Device 20 or remotely on a remote Computing Device 1310 accessible over the Network 1300.

Microphone 2710 may comprise any hardware, software or a combination of hardware and software, and/or it may include functions and algorithms for receiving and/or detecting User's voice events or inputs. Most modern mobile devices include Microphone 2710 as one of the input devices.

Figure 28:
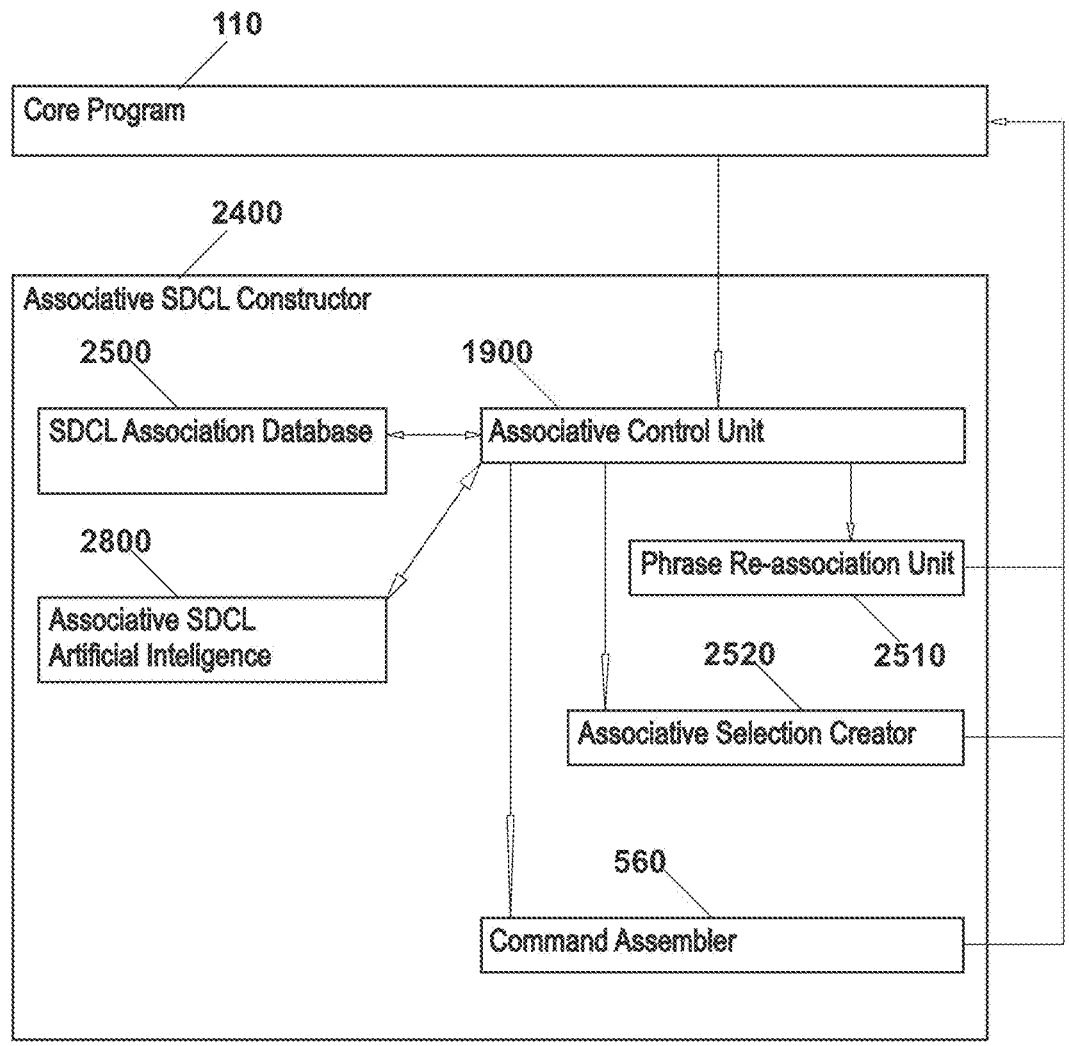
FIG. 28 is a diagram showing an embodiment of Associative SDCL Constructor 2400 with the Associative SDCL Artificial Intelligence 2800.

Referring to FIG. 28, in some aspects, the teaching presented by the current disclosure may be implemented to include artificial intelligence (i.e. machine learning and/or anticipation functionalities, etc.) to anticipate Instruction Set Portions 620 in an Operation 610 or instruction Set 600 construction process. This embodiment may enable a user to input one or more Instruction Set Portions 620 of an Operation 610 or Instruction Set 600 and AI DBMS may anticipate one or more subsequent Instruction Set Portions 620 or the entire Operation 610 or Instruction Set 600 that the User 10 may want or is most likely to implement. The anticipation of Instruction Set Portions 620 may be combined with (1) the previously described associative method of constructing Operations 610 or Instruction Sets 600 via phrase input, (2) the previously described associative method of constructing Operations 610 or Instruction Sets 600 via key input, and/or (3) any other method, system, element, or feature of the current disclosure.

An embodiment is illustrated in FIG. 28 where the anticipation of Instruction Set Portions 620 may be combined with the previously described associative method of constructing Operations 610 or Instruction Sets 600 via phrase input. Associative SDCL Constructor 2400 may comprise any hardware, software or a combination of hardware and software, and/or it may include functions and algorithms for constructing an Operation 610 or Instruction Set 600 by associating Phrases 2610 with instruction Set Portions 620 of the Operation 610 or Instruction Set 600 as previously described. In some embodiments, Associative SDCL Constructor 2400 may include artificial intelligence (i.e. machine learning and/or anticipation functionalities, etc.) to learn the Phrases 2610 that the User 10 used in the past and anticipate future Phrases 2610 and/or their associated Instruction Set Portions 620 to be used in the Operation 610 or instruction Set 600 construction process. In other embodiments, Associative SDCL Constructor 2400 may include artificial intelligence (i.e. machine learning and/or anticipation functionalities, etc.) to learn the Instruction Set Portions 620 that the User 10 used in the past and anticipate future instruction Set Portions 620 to be used in the Operation 610 or Instruction Set 600 construction process. Since Phrases 2610 may be associated with Instruction Set Portions 620, a Phrase 2610 may correspond to a particular Instruction Set Portion 620 identified by that particular Phrase 2610, and vice versa. Also, the Phrase 2610 may be referred to as the Instruction Set Portion 620, and vice versa, as this Instruction Set Portion 620 may be a representation of this particular Phrase 2610. In effect, a Phrase 2610 and its corresponding Instruction Set Portion 620 may be logical equivalents where the instruction Set Portion 620 may be understood or preferred by the system and the Phrase 2610 may be understood or preferred by the User 10. Therefore, Phrase 2610 and Instruction Set Portion 620 may be used interchangeably in descriptions of some embodiments, Associative SDCL Constructor 2400 may be, directly or operatively, connected to the Core Program 110 and/or other elements to facilitate the overall system operation and implement the functionalities described herein.

Associative SDCL Constructor 2400 may include the Associative Control Unit 1900, the SDCL Association Database 2500, the Phrase Re-association Unit 2510, the Associative Selection Creator 2520, the Command Assembler 560, and the Associative SDCL Artificial Intelligence 2800. Other additional elements may be included as needed, or some of the disclosed ones may be excluded, or a combination thereof may be utilized in alternate embodiments.

Figure 29:
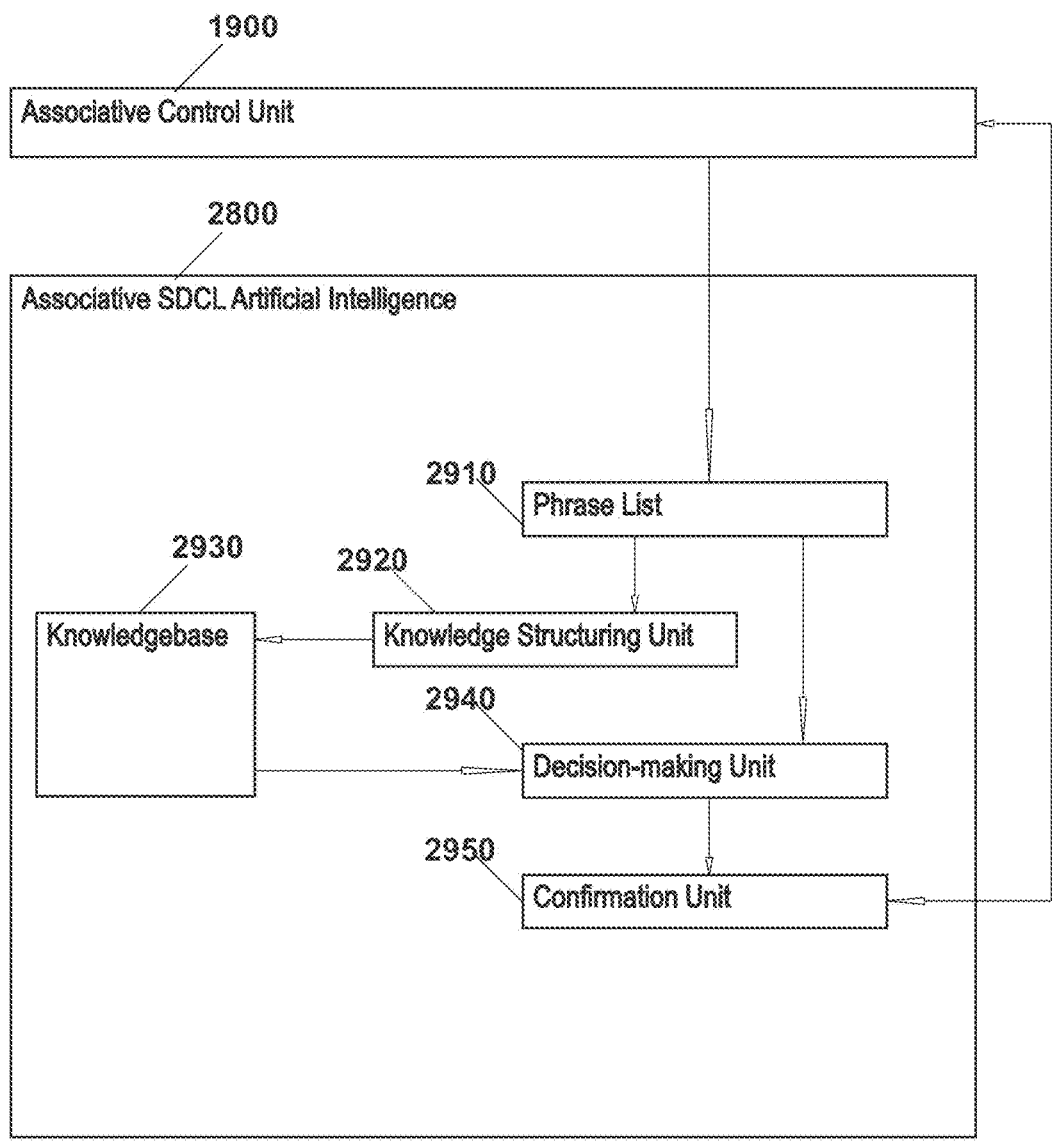
FIG. 29 is a diagram showing an embodiment of Associative SDCL Artificial Intelligence 2800.

Referring to FIG. 29, in some embodiments, Associative SDCL Artificial intelligence 2800 may comprise any hardware, software or a combination of hardware and software, and/or it may include functions and algorithms for anticipating User's 10 future Phrases 2610, Instruction Set Portions 620, and/or full Operations 610 or Instruction Sets 600 in an Operation 610 or Instruction Set 600 construction process. The Associative SDCL Artificial Intelligence 2800 may be, directly or operatively, connected to the Associative Control Unit 1900 and/or other elements to facilitate the overall system operation and implement the functionalities described herein.

Associative SDCL Artificial Intelligence 2800 may include a Phrase List 2910, a Knowledge Structuring Unit 2920, a Knowledgebase 2930, a Decision-making Unit 2940, and a User Confirmation Unit 2950. Other additional elements may be included as needed, or some of the disclosed ones may be excluded, or a combination thereof may be utilized in alternate embodiments.

Figure 30:
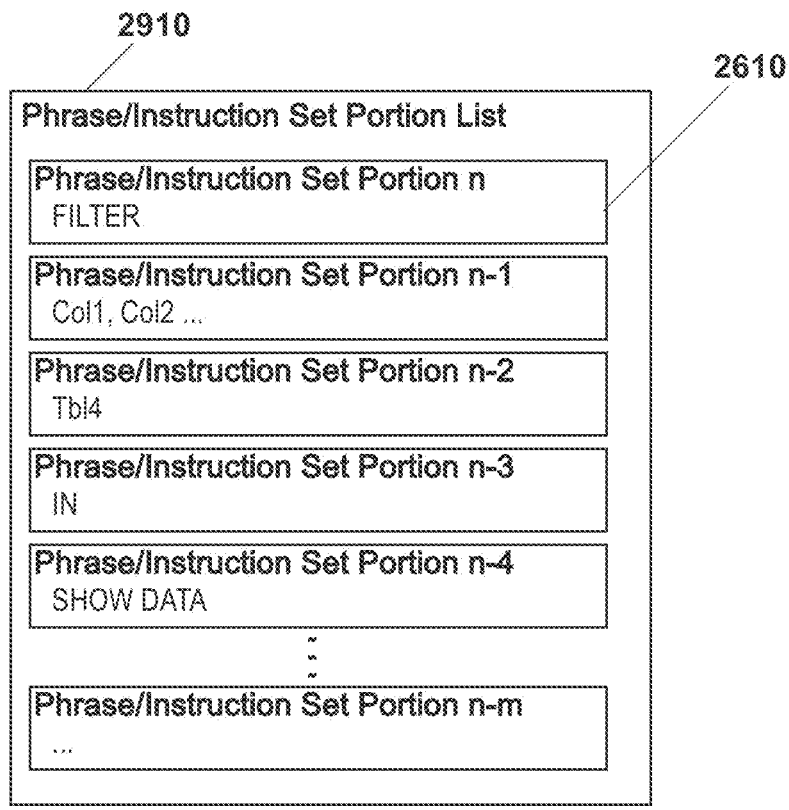
FIG. 30 is a diagram showing an embodiment of Phrase/Instruction Set Portion List 2910.

Referring to FIG. 30, Phrase List 2910 may comprise any hardware, software or a combination of hardware and software, and/or it may include functions and algorithms for storing User's 10 recently used Phrases 2610 or Instruction Set Portions 620. Phrase List 2910 may include some or all the features and embodiments of the previously described Operation List 510, While FIG. 30 depicts examples of Phrases 2610 that each includes only one textual element (i.e. string of characters, etc.), a Phrase 2610 may be implemented to include one or more portions of a textual element such as the previously described Instruction Set Portions 620 in which case a Phrase 2610 may be or include a data structure such as the Operation 610 storing those portions of a textual element, Therefore, in one example, "Col1, Col2, . . . " Phrase 2610 may be implemented as a data structure comprising "Col1" portion, "Col2" portion, and/or additional " . . . " portions. Phrase List 2910 may be, directly or operatively, connected to the Associative Control Unit 1900, Knowledge Structuring Unit 2920, and the Decision-making Unit 2940 and/or other elements to facilitate the overall system operation and implement the functionalities described herein.

Phrase List 2910 may receive a Phrase 2610 or Instruction Set Portion 620 from the Associative Control Unit 1900 and store any number of Phrases 2610 or Instruction Set Portions 620 that were recently used or implemented by the system. The number of Phrases 2610 or Instruction Set Portions 620 recently used or implemented may vary depending on the embodiments and one of ordinary skill in the art would recognize that the number of stored Phrases 2610 or Instruction Set Portions 620 may be any number that may be stored in any memory or storage described herein as previously described.

In one embodiment, in which the last five Phrases 2610 or instruction Set Portions 620 may be stored in the Phrase List 2910, Phrases 2610 or instruction Set Portions 620 may be identified such that the current Phrase 2610 or Instruction Set Portion 620 is identified as Phrase n, the most recent Phrase 2610 or Instruction Set Portion 620 prior to the current may be identified as Phrase n−1, and so on until the least most recent Phrase 2610 or Instruction Set Portion 620 being stored is labeled as Phrase n−4. In such embodiments, each time the Phrase List 2910 receives another new Phrase 2610 or Instruction Set Portion 620 from the Associative Control Unit 1900, it may erase the least recent Phrase 2610 or Instruction Set Portion 620, such as Phrase n−4, and insert the new Phrase 2610 or Instruction Set Portion 620 received as Phrase n. Naturally, all the most recently used or implemented Phrases 2610 or instruction Set Portions 620 that are stored in this list or queue may be shifted by one count further towards Phrase n−4. This way, the system may maintain a queue of stored recently used or implemented Phrases 2610 or instruction Set Portions 620, where the queue may include any number of stored Phrases 2610 or Instruction Set Portions 620 as previously described.

Still referring to FIG. 30, in one example, Phrase List 2910 may represent a hypothetical situation where the User 10 started constructing a "SELECT" type of Operation 610 or Instruction Set 600 with Phrases 2610 "SHOW DATA", "IN", "Tbl4", "Col1, Col2 . . . ", and "FILTER" that may be associated with Instruction Set Portions 620 "SELECT", "FROM", "Tbl4", "Col1, Col2 . . . ", and "WHERE" respectively.

Figure 31:
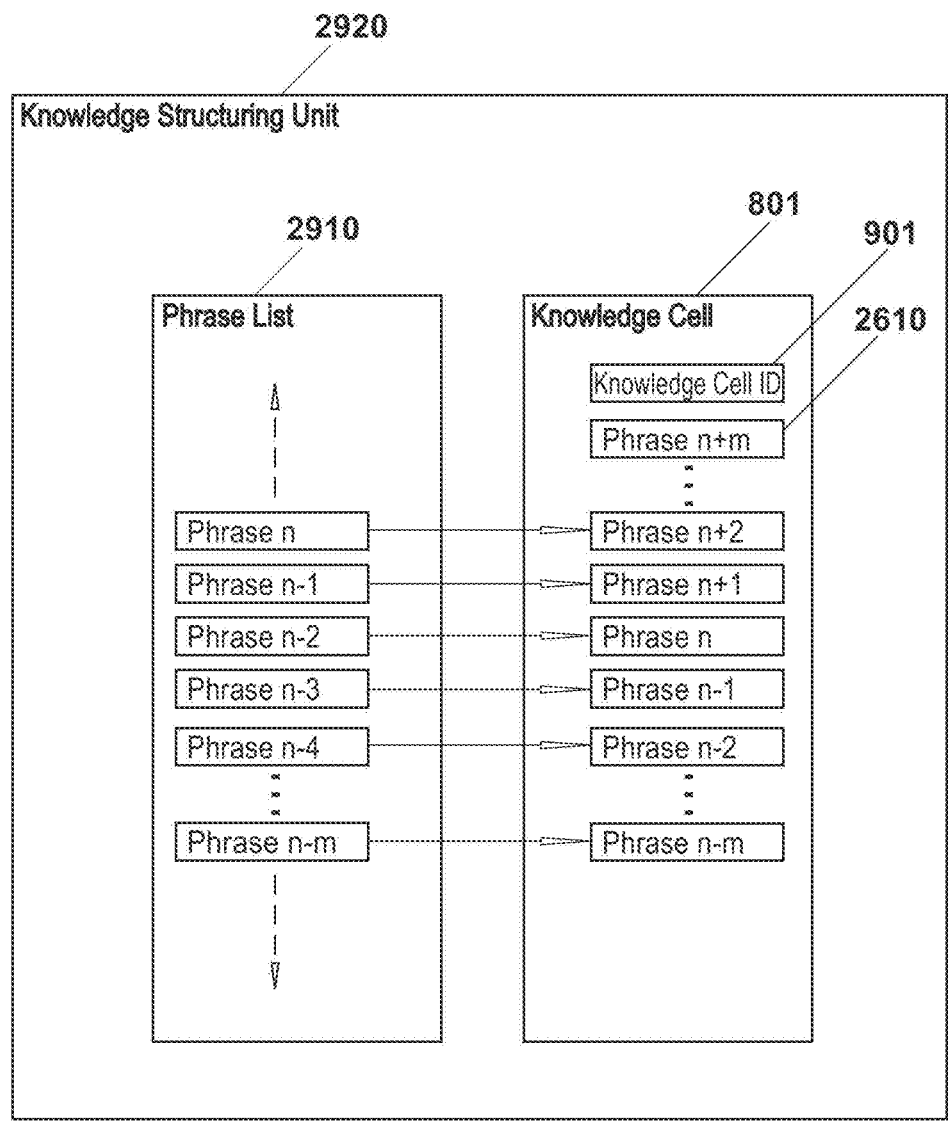
FIG. 31 is a diagram showing an embodiment of Knowledge Structuring Unit 2920.

Referring to FIG. 31, Knowledge Structuring Unit 2920 may comprise any hardware, software or a combination of hardware and software, and/or it may include functions and algorithms for structuring the "knowledge" of the User's 10 use of Phrases 2610 or Instruction Set Portions 620 for anticipating future Phrases 2610 or Instruction Set Portions 620. Knowledge Structuring Unit 2920 may include functions and algorithms for structuring the stored sequence (i.e. Phrase List 2910) of User's 10 Phrases 2610 or Instruction Set Portions 620 into usable "knowledge" for future anticipating of the User's 10 Phrases 2610 or Instruction Set Portions 620, or operating intentions. Knowledge Structuring Unit 2920 may include some or all the features and embodiments of the previously described Knowledge Structuring Unit 520. Knowledge Structuring Unit 2920 may include the functionality to produce any variations of Phrases 2610 or instruction Set Portions 620 that may ever be used by a user. The Knowledge Structuring Unit 2920 may be, directly or operatively, connected to the Phrase List 2910, Knowledgebase 2930, and/or other elements to facilitate the overall system operation and implement the functionalities described herein.

In one example, Knowledge Structuring Unit 2920 may receive the current Phrase List 2910 and may create a Knowledge Cell 801 by copying Phrase n from the Phrase List 2910 into Phrase n+2 of the Knowledge Cell 801, by copying Phrase n−1 from the Phrase List 2910 into Phrase n+1 of the Knowledge Cell 801, by copying Phrase n−2 from the Phrase List 2910 into Phrase n of the Knowledge Cell 801 and so forth. Knowledge Cell 801 may comprise any hardware, software or a combination of hardware and software, and/or it may include functions and algorithms for storing a recorded sequence of the User's 10 Phrases 2610 or Instruction Set Portions 620. In effect, when a Knowledge Cell 801 is created it may include any data structure (i.e. array, list, linked list, table, etc.) that may store a recorded sequence of the User's 10 Phrases 2610 or instruction Set Portions 620 where, for example, Phrase n, Phrase n−1, and Phrase n−2 may later be used for comparison with the then User's 10 current and recent Phrases 2610 or Instruction Set Portions 620, and Phrase n+1 and Phrase n+2 may later be used for anticipation of the User's 10 future Phrases 2610 or Instruction Set Portions 620. Knowledge Cell 801 may include some or all the features and embodiments of the previously described Knowledge Cell 800.

Figure 32:
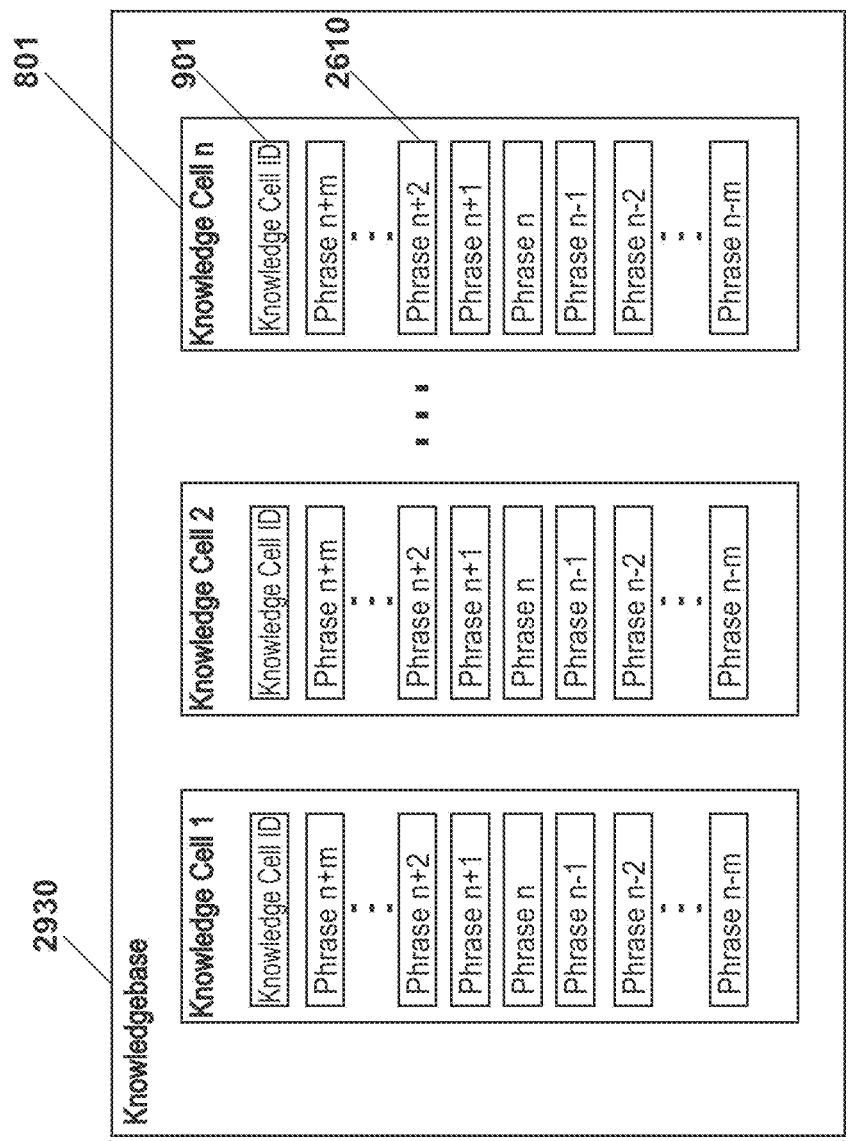
FIG. 32 is a diagram showing an embodiment of Knowledgebase 2930.

Referring to FIG. 32, in some embodiments, Knowledgebase 2930 may comprise any hardware, software or a combination of hardware and software, and/or it may include functions and algorithms for storing a plurality of Phrases 2610 or Instruction Set Portions 620. Knowledgebase 2930 may include functions and algorithms for storing a plurality of Phrases 2610 or Instruction Set Portions 620 generally structured into one or more Knowledge Cells 801, although Phrases 2610 or Instruction Set Portions 620 may be stored directly in the Knowledgebase 2930 and need not be structured into or use Knowledge Cells 801. Knowledgebase 2930 may include the functionality for storing Knowledge Cells 801, or Phrases 2610 or instruction Set Portions 620 in a particular order to enable easier access and usage of stored data. Knowledgebase 2930 may also include the functionality for managing and/or modifying and/or providing Knowledge Cells 801, or Phrases 2610 or instruction Set Portions 620 as necessary. Knowledgebase 2930 may comprise the functionality to store and manage all the Knowledge Cells 801, or Phrases 2610 or instruction Set Portions 620 that were used or implemented by any users in the past. Knowledgebase 2930 may store any variations of Knowledge Cells 801, or Phrases 2610 or Instruction Set Portions 620 that may ever be used by a user. Knowledgebase 2930 may include some or all the features and embodiments of the previously described Knowledgebase 530. Knowledgebase 2930 may be, directly or operatively, connected to the Knowledge Structuring Unit 2920 and the Decision-making Unit 2940 and/or other elements to facilitate the overall system operation and implement the functionalities described herein.

As shown in FIG. 32, Knowledgebase 2930 may include a table (a vertical representation of records in a table is shown), although, one or more tables, databases, files, or any other data structures or data repositories may be used. Knowledgebase 2930 may include an entire DBMS dedicated to Knowledgebase 2930 functionalities in some embodiments. For example, in the case of a single table being used as the Knowledgebase 2930, a Knowledge Cell 801 may be stored within the table where each of the Phrases 2610 or Instruction Set Portions 620 (such as for example: Phrase n+2, Phrase n+1, Phrase n, Phrase n−1, Phrase n−2, etc.) of the Knowledge Cell 801 may be a record with a common Knowledge Cell identifier (ID) 901 that signifies its association with its parent Knowledge Cell 801. Later in the process, a simple call to the table to read all records with a specific Knowledge Cell ID 901 would reconstruct the Knowledge Cell 801. Knowledge Cell ID 901 may include some or all the features and embodiments of the previously described Knowledge Cell ID 900. In other embodiments, all Phrases 2610 or Instruction Set Portions 620 (such as for example: Phrase n+2, Phrase n+1, Phrase n, Phrase n−1, Phrase n−2, etc.) of a Knowledge Cell 801 may be stored in a single record within the table. Knowledgebase 2930 may reside within the Underlying DBMS 120 in some embodiments, or it may reside anywhere outside the Underlying DBMS 120 in other embodiments.

Figure 33:
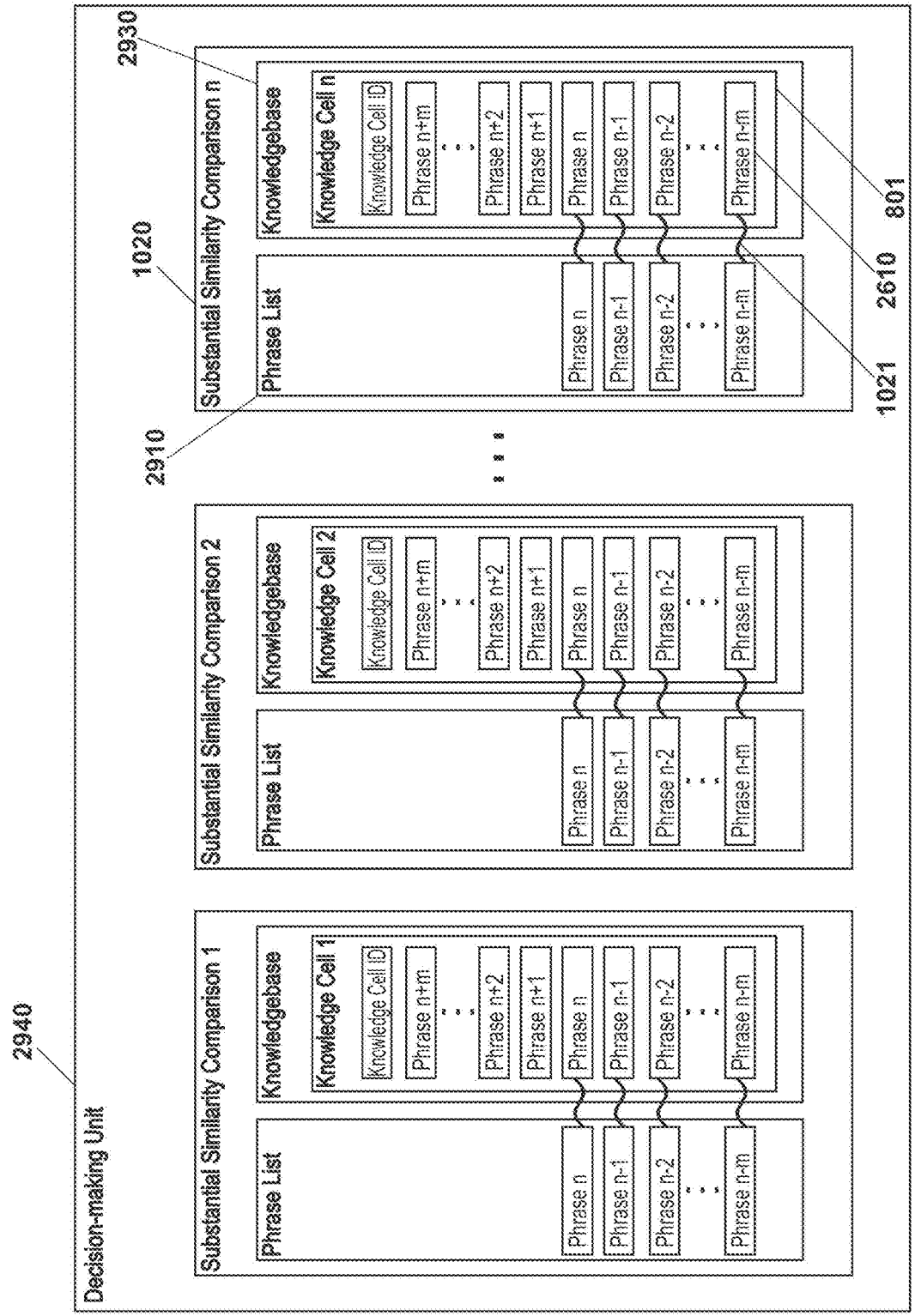
FIG. 33 is a diagram showing an embodiment of Decision-making Unit 2940.

Referring to FIG. 33, Decision-making Unit 2940 may comprise any hardware, software or a combination of hardware and software, and/or it may include functions and algorithms for anticipating User's 10 future Phrases 2610 or Instruction Set Portions 620, and/or Operations 610 or Instruction Sets 600. Decision-making Unit 2940 may comprise algorithms, functions, rules and logic to enable the system to determine which Phrase 2610 or Instruction Set Portion 620 the User 10 may intend or is most likely to use or implement. Similarly, Decision-making Unit 2940 may comprise the functionality to determine which Phrase 2610 or Instruction Set Portion 620 the user is second most likely to use or implement, which Phrase 2610 or Instruction Set Portion 620 the user is third most likely to use or implement, and so on. Furthermore, Decision-making Unit 2940 may comprise the functionality to determine the sequence or order in which the user may intend or is most likely to use or implement Phrases 2610 or instruction Set Portions 620. Decision-making Unit 2940 may include some or all the features and embodiments of the previously described Decision-making Unit 540. The Decision-making Unit 2940 may be, directly or operatively, connected to the Phrase List 2910 and the Knowledgebase 2930 and/or other elements to facilitate the overall system operation and implement the functionalities described herein.

In some embodiments, AI DBMS may anticipate one or more Phrases 2610 or Instruction Set Portions 620 the user may intend to enter while the User 10 is entering initial Phrases 2610 or instruction Set Portions 620 of an Operation 610 or Instruction Set 600. In other embodiments, AI DBMS may anticipate a full Operation 610 or Instruction Set 600 while the User 10 is entering initial Phrases 2610 or Instruction Set Portions 620.

Decision-making Unit 2940 may anticipate the User's 10 future Phrases 2610 or Instruction Set Portions 620 by performing Substantial Similarity Comparisons 1020 between the current Phrase List 2910 and the Knowledge Cells 801 stored in the Knowledgebase 2930. Substantial Similarity Comparison 1020 and the included Comparison Strictness Function 1021 may include some or all the features and embodiments of the previously described Substantial Similarity Comparison 1010 and Comparison Strictness Function 1011 respectively.

As previously described, Substantial Similarity Comparison 1020 may comprise algorithms, functions and/or logic for performing matching or comparisons and for determining that while a perfect match is not found, a substantially similar match has been found. Substantial Similarity Comparison 1020 may therefore identify a sequence of Phrases 2610 or Instruction Set Portions 620 from a Phrase List 2910 that is most like a sequence of Phrases 2610 or Instruction Set Portions 620 from a Knowledge Cell 801 in a Knowledgebase 2930, even if the sequence of Phrases 2610 or Instruction Set Portions 620 from the Phrase List 2910 is different from the sequence of Phrases 2610 or Instruction Set Portions 620 in the Knowledge Cell 801. Furthermore, Substantial Similarity Comparison 1020 may also identify a Phrase 2610 or Instruction Set Portion 620 from a Phrase List 2910 that is most like a Phrase 2610 or Instruction Set Portion 620 from a Knowledge Cell 801 in a Knowledgebase 2930, even if the Phrase 2610 or instruction Set Portion 620 from the Phrase List 2910 is different from the Phrase 2610 or Instruction Set Portion 620 in the Knowledge Cell 801.

As previously described, Comparison Strictness Function 1021 may also adjust the strictness level by choosing the number of Phrases 2610 or Instruction Set Portions 620 that it will use to find a substantial similarity match between the Phrases 2610 or Instruction Set Portions 620 in the Phrase List 2910 and the corresponding (i.e. comparative) Phrases 2610 or Instruction Set Portions 620 in the Knowledgebase 2930. For example, as a User 10 is inputting first three Phrases 2610 or Instruction Set Portions 620 of an Operation 610 or Instruction Set 600 the User 10 may intend to implement, Comparison Strictness Function 1021 may run these three Phrases 2610 or Instruction Set Portions 620 against Phrases 2610 or Instruction Set Portions 620 in the Knowledgebase 2930. If the Substantial Similarity Comparison 1020 provides a number of matching results (results that have perfect equivalence) that is above a particular threshold, the Comparison Strictness Function 1021 may decide to increase the strictness of the rules to decrease the number of results. AI DBMS may then decide to wait for the User 10 to add the fourth Phrase 2610 or Instruction Set Portion 620, thereby allowing the Substantial Similarity Comparison 1020 to use the fourth Phrase 2610 or instruction Set Portion 620 in addition to the earlier three to find a smaller number of matching results. Once the user adds the fourth Phrase 2610 or Instruction Set Portion 620, the Substantial Similarity Comparison 1020 may use all four Phrases 2610 or instruction Set Portions 620 to find a match. If the number of matching results (results that perfectly match, i.e. total equivalence) is sufficiently small, the system may present the User 10 with these results. If however, the number of matching results is still too high, the Comparison Strictness Function 1021 may determine to further increase the strictness by requiring the user to add additional Phrases 2610 or Instruction Set Portions 620 and thereby further narrow the search results before presenting the user with the suggested results. In some embodiments, Phrases 2610 or Instruction Set Portions 620 added may include a portion of a command or a keyword, such as a first one or more letters of a Phrase 2610 or Instruction Set Portion 620.

Comparison Strictness Function 1021 may therefore increase and decrease the strictness of the rules for finding a substantial similarity match depending on the number of Phrases 2610 or Instruction Set Portions 620 the user has already entered and/or whether or not perfect matches had been found. As such, Comparison Strictness Function 1021 may utilize two thresholds, the upper and a lower threshold, to determine the strictness of the rules used for determining the substantial similarity match. The upper threshold may correspond to the number of substantial similarity matches that are too high to be presented to the user (i.e. too many matching results, too vague suggestions). Alternatively, the lower threshold may correspond to the strictness level that results in too few results to be presented to the user. Comparison Strictness Function 1021 may make any combination of the aforementioned adjustments to achieve that the number of substantial similarity matches falls between the upper and the lower threshold. As such, Comparison Strictness Function 1021 may keep adjusting the strictness rules for finding the substantially similar match until both thresholds are satisfied, thereby adjusting the results until the best set of results is found.

Figure 34A:
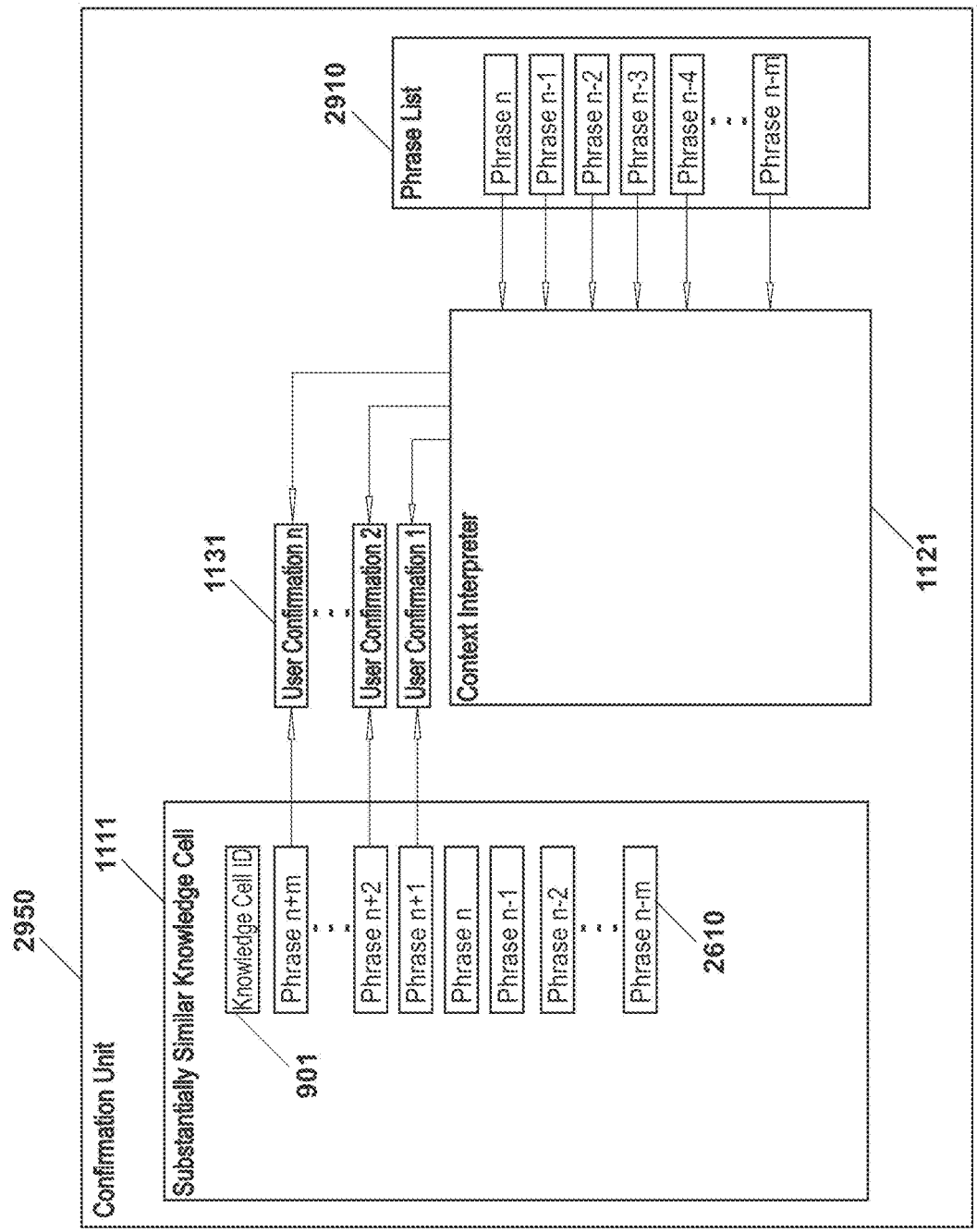
FIG. 34A is a diagram showing an embodiment of Confirmation Unit 2950.

Referring to FIG. 34A, in some embodiments, Confirmation Unit 2950 may comprise any hardware, software or a combination of hardware and software, and/or it may include functions and algorithms for confirming the User's 10 anticipated Phrases 2610 or Instruction Set Portions 620, and/or Operations 610 or instruction Sets 600 with the User 10. Confirmation Unit 2950 may comprise algorithms and functions to enable the system to confirm the Phrases 2610 or Instruction Set Portions 620, and/or Operations 610 or Instruction Sets 600 that the AI DBMS determined (i.e. via the substantial similarity comparison) could be the Phrases 2610 or instruction Set Portions 620, or Operations 610 or instruction Sets 600 which the user may want to use or implement. Confirmation Unit 2950 may include some or all the features and embodiments of the previously described Confirmation Unit 550. Confirmation Unit 2950 may be, directly or operatively, connected to the Decision-making Unit 2940 and the Associative Control Unit 1900 and/or other elements to facilitate the overall system operation and implement the functionalities described herein.

As shown in FIG. 34A, Confirmation Unit 2950 may include a Substantially Similar Knowledge Cell 1111, a Context Interpreter 1121, a User Confirmation 1131 process step, and the Phrase List 2910. Other additional elements may be included as needed, or some of the disclosed ones may be excluded, or a combination thereof may be utilized in alternate embodiments. Substantially Similar Knowledge Cell 1111, Context Interpreter 1121, and User Confirmation 1131 process step may include some or all the features and embodiments of the previously described Substantially Similar Knowledge Cell 1110, Context Interpreter 1120, and User Confirmation 1130 process step respectively.

The context in which the Phrases 2610 or Instruction Set Portions 620 from the Phrase List 2910 were performed may be analyzed by the Context Interpreter 1121. In one embodiment, context may be defined as any sub-segment of a Phrase 2610 or Instruction Set Portion 620 that is not used in the Substantial Similarity Comparison 1020, or any information about the Phrases 2610 or Instruction Set Portions 620 from the Phrase List 2910 that may be useful in anticipating User's 10 future Phrases 2610 or Instruction Set Portions 620, or Operations 610 or Instruction Sets 600. In effect, Context interpreter 1121 may represent an extra analysis step and it may attempt to capture all information and/or elements that may have been omitted by the Substantial Similarity Comparison 1020, and/or by the other process steps or elements.

As previously described, an example of Context Interpreter's 1121 usefulness is the fact that values may be omitted from Substantial Similarity Comparisons 1020 in some embodiments. It is Context Interpreter's 1121 responsibility to discover the values or the ranges of values used in the User's recent Phrases 2610 or Instruction Set Portions 620 by extracting the values from the Phrases 2610 or Instruction Set Portions 620.

Figure 34B:
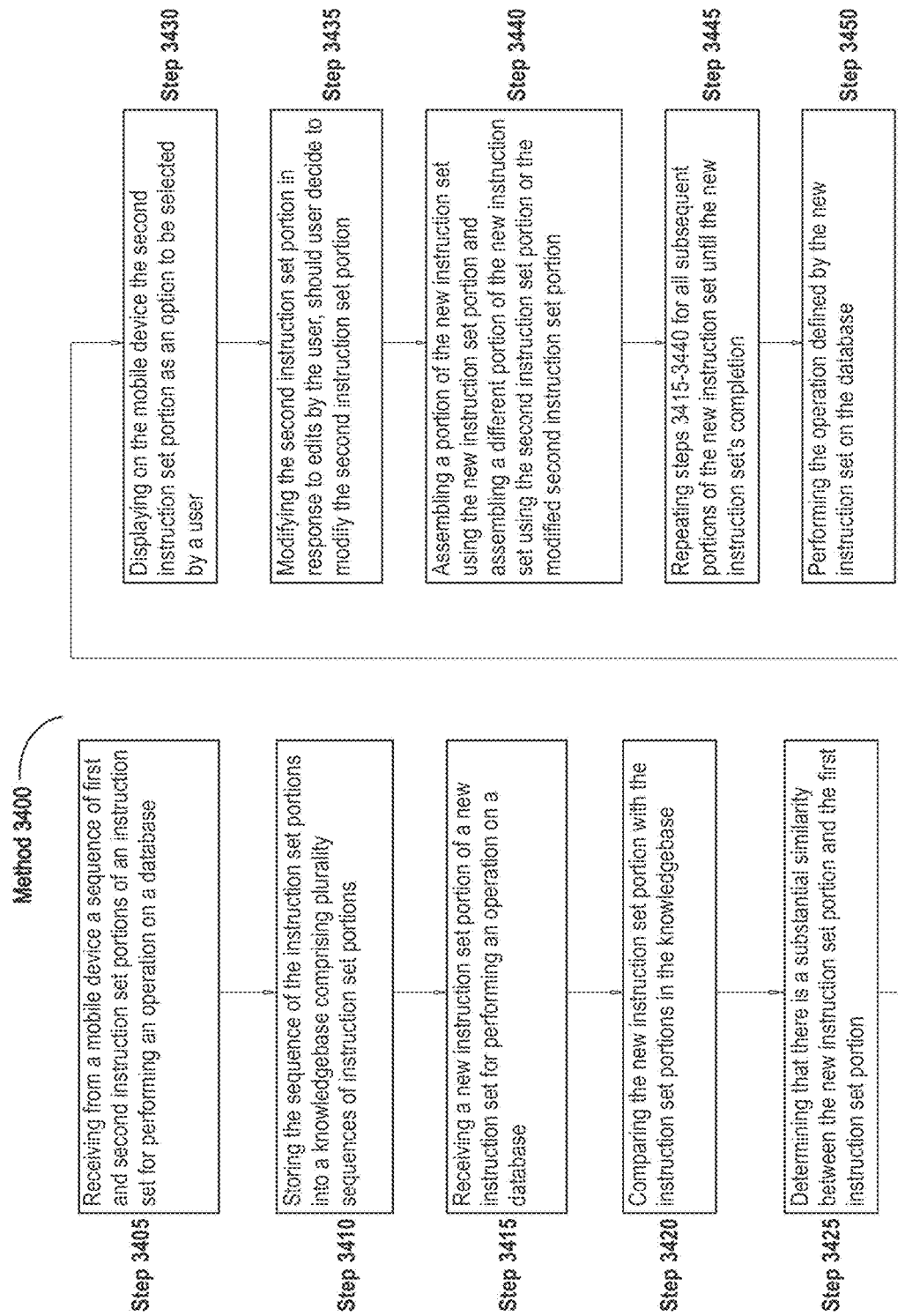
FIG. 34B illustrates a flow chart diagram of an embodiment of a method 3400 implemented by the AI DBMS.

Referring to FIG. 34B, the illustration shows an embodiment of a method 3400 for predicting instruction set portions that the user is most likely to use next, based on sequences of prior used instruction set portions. The method may therefore be used by a user on a mobile device operating an interface for an AI DBMS to perform operations on the back-end DBMS (i.e. Underlying DBMS 120).

In brief overview, at step 3405, a mobile device receives a sequence of first and second instruction set portions of an instruction set for performing an operation on a database. The sequence may include an order of consecutive instruction set portions, such as for example a first instruction set portion followed by a second instruction set portion. At step 3410, the sequence of the instruction set portions is stored into a knowledgebase that comprises plurality sequences of instruction set portions. At step 3415, the mobile device receives a new instruction set portion of a new instruction set for performing an operation on a database. At step 3420, the new instruction set portion is compared with instruction set portions in the knowledgebase. At step 3425, a determination is made that there is a substantial similarity between the new instruction set portion and the first instruction set portion. At step 3430, the second instruction set portion is displayed on the mobile device as an option to be selected by a user. At step 3435, the second instruction set portion is modified in response to edits by the user, should the user decide to modify the second instruction set portion. At step 3440, a portion of the new instruction set is assembled using the new instruction set portion and a different portion of the new instruction set is assembled using the second instruction set portion or the modified second instruction set portion. At step 3445, steps 3415-3440 are repeated for all subsequent portions of the new instruction set until the new instruction set's completion. At step 3450, the operation defined by the new instruction set is performed on the database.

In further detail, at step 3405, a mobile device receives a sequence of first and second instruction set portions of an instruction set for performing an operation on a database. Each instruction set portion may indicate or identify one or more commands, keywords, instructions, operators, variables, values, objects, functions and/or other components of an instruction set for performing an operation on some data in some database. The sequence may include a first instruction set portion, followed by a second instruction set portion, which may also be followed by a third instruction set portion, and so on. Instruction set portions of the sequence may be received by the interface for a DMBS. Instruction set portions of the sequence may be received by any component of the AI DBMS. Instruction set portions of the sequence may be received by the mobile device, or by any other mobile device or a computing device in general.

At step 3410, the sequence of the instruction set portions is stored into a knowledgebase that comprises plurality sequences of instruction set portions. The knowledgebase may comprise any number of instruction set portions and/or sequences of instruction set portions, each of which may be stored in various arrangements, including tables, database, memory structures, data structures, etc. In some embodiments, knowledgebase may include instruction set portions and/or sequences of instruction set portions from the mobile device via which the instruction set portions and/or sequences are received. In other embodiments, knowledgebase may include instruction set portions and/or sequences of instruction set portions from any number of computing devices. Knowledgebase or additional knowledgebases may also be populated to include the user specific and/or group specific informations gathered with respect to the instruction set portions and/or sequences of instruction set portions. Also stored in knowledgebase may be the weight assigned to each instruction set portion.

At step 3415, the mobile device receives a new instruction set portion of a new instruction set for performing an operation on a database. The new instruction set portion may identify or indicate any commands, keywords, instructions, operators, variables, values, objects, functions and/or other components of an instruction set for performing an operation on a database indicated herein. For instance, the new instruction set portion may include a keyword "DELETE" indicating an operation to delete an entry in a database. In another example, the new instruction set portion may include keyword(s) "CREATE TABLE" indicating an operation to create a table in a database. The new instruction set portion may include any keyword(s) to indicate any other operations such as for example to select, add, delete, or modify an entry; add, delete, or modify a column; add, delete, or modify a table; add, delete, or modify a database; add, delete, or modify a relation; add, delete, or modify a user account; etc. The new instruction set portion of the new instruction set may be for performing some operation on some database managed by the AI DBMS. The new instruction set portion may be stored into instruction set portion lists.

At step 3420, the new instruction set portion is compared with instruction set portions in the knowledgebase. In one embodiment, the new instruction set portion may be compared as a single string of characters with a plurality of instruction set portions in the knowledgebase. In other embodiments, comparison may be implemented by treating each of one or more components (i.e. words, etc.) of an instruction set portion as a separate string to be matched independently. In further embodiments, comparison may be implemented by matching one or more components of the new instruction set portion with one or more components of the instruction set portions stored in a knowledgebase. In yet further embodiments, comparison may also be implemented by matching all but one of one or more components of the new instruction set portion with one or more components of an instruction set portion stored in a knowledgebase. Comparison may also be implemented by matching all but two of one or more components of the new instruction set portion with one or more components of an instruction set portion stored in a knowledgebase. Comparison may also be implemented by matching one or more components of the new instruction set portion with one or more components of the instruction set portions from the knowledgebase, factoring in the weights for each of the components of instruction set portions from the knowledgebase. As such matching some components of the instruction set portions from the knowledgebase may be more important than other components having smaller weight.

At step 3425, a determination is made that there is a substantial similarity between the new instruction set portion and instruction set portions in the knowledgebase such as the first instruction set portion. In one embodiment, during the comparison of the one or more components of the new instruction set portion and the one or more components of the first instruction set portion a perfect match may be found. In other embodiments, AI DBMS may find a plurality of perfect matches with a plurality of instruction set portions stored in a knowledgebase. If the number of matches exceeds a threshold for maximum number of substantial similarity results, strictness level for determining a substantial similarity match may be modified to include an additional one or more components of the new instruction set portion in order to narrow down or reduce the number of the perfect matching results. In some embodiments, if no perfect match is found, or if a number of matches is lower than a threshold for minimum amount of substantially matching results, then strictness level may be reduced to allow for finding a match that is imperfect. In some embodiments, a strictness level may be reduced to allow for a match for more important components of the one or more components of the new instruction set portion to be matched with the components of instruction set portions in the knowledgebase. The more important components (i.e. words, etc.) of the one or more components of the new instruction set portion may be components including command words or keywords. For example, a substantial match may be found when SQL keywords from the one or more components of the new instruction set portion match SQL keywords, and/or the order of such keywords, from one or more components of instruction set portions in the knowledgebase, even if one or more variable names, data names or database names are not matched. Substantial match may also be found when a strictness level is reduced to allow a match to have all but one of the one or more components of the new instruction set portion matching an instruction set portion in the knowledgebase. Similarly, a substantial match may be found when a strictness level is reduced to allow a match to have all but two of the one or more components of the new instruction set portion matching an instruction set portion in the knowledgebase. Likewise, a substantial match may be found when a strictness level is reduced to allow a match to have all but three of the one or more components of the new instruction set portion matching an instruction set portion in the knowledgebase. The one, two, or three non-matched components of the new instruction set portion may be components having smaller or smallest weight. For example, the non-matched components of the new instruction set portion may be variable names, database names or other components of the instruction set portion that may be less important than the commands or keywords, for example. Determination of substantial similarity between the one or more components of the new instruction set portion and the first instruction set portion may include any one of, or any combination of, substantial similarity determination techniques or embodiments discussed herein.

At step 3430, the second instruction set portion is displayed on the mobile device as an option to be selected by a user. The second instruction set portion may be displayed in response to determining that the first instruction set portion may be the most substantial match with the new instruction set portion and that the second instruction set portion immediately follows the first instruction set portion. In some embodiments, AI DBMS may select the second instruction set portion for display on the mobile device responsive to the determination at step 3425. In further embodiments, the second instruction set portion may be displayed along with one or more instruction set portions that may immediately follow the second instruction set portion.

At step 3435, the second instruction set portion is modified in response to edits by the user, should the user decide to modify the second instruction set portion. In one example, the second instruction set portion may be modified to indicate the same column, as was indicated in previously used instruction set portions of the new instruction set. In another example, the second instruction set portion may be modified to indicate an appropriate value to be used in the new instruction set.

At step 3440, a portion of the new instruction set is assembled using the new instruction set portion and a different portion of the new instruction set is assembled using the second instruction set portion or the modified second instruction set portion, in some embodiments, assembling may include storing the new instruction set portion and the second instruction set portion or the modified second instruction set portion in a data structure such as an array, linked list, table, etc. comprising all known instruction set portions of the new instruction set. In other embodiments, assembling may include appending the new instruction set portion and the second instruction set portion or the modified second instruction set portion to a string of characters containing the known instruction set portions of the new instruction set. Assembling may include any action or operation by or for an Associative Control Unit 1900.

At step 3445, steps 3415-3440 are repeated for all subsequent portions of the new instruction set until the new instruction set's completion. Once all the needed instruction set portions are known the instruction set may be complete. In embodiments where the intermediary data structure (i.e. array, linked list, table, etc.) is used for storing known instruction set portions as previously described, the new instruction set may be assembled from the instruction set portions in the data structure before being sent to DBMS for execution. Assembling may include any action or operation by or for a Command Assembler 560. In embodiments where appending is performed of known instruction set portions as previously described, the new instruction set may be directly sent to DBMS for execution.

At step 3450, the operation defined by the new instruction set is performed on the database. The operation performed may include one of, or a combination of: accessing, modifying, creating or deleting a database. The operation performed may include one of, or a combination of: accessing, modifying, creating or deleting a table of a database. The operation performed may include one of, or a combination of: accessing, modifying, creating or deleting of a row, column, or cell within a table of a database. The operation performed may include one of, or a combination of: accessing, modifying, creating or deleting a report/view, relation, user account, and/or other objects in a DBMS. The operation performed may include any DBMS operation described herein.

Figure 34C:
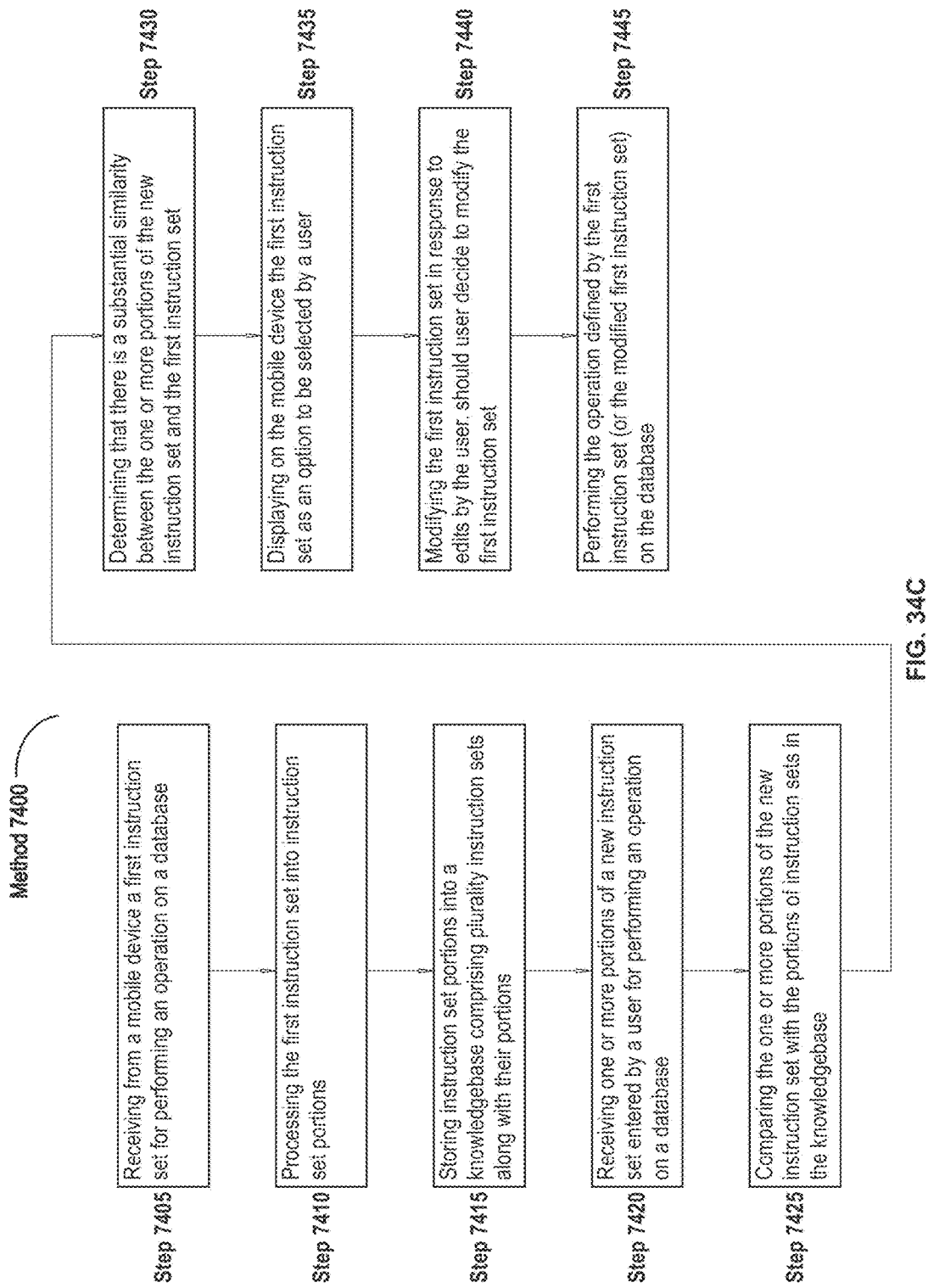
FIG. 34C illustrates a flow chart diagram of an embodiment of a method 7400 implemented by the AI DBMS.

Referring to FIG. 34C, an embodiment of a method 7400 for implementing the functionality of an AI DBMS via an interface is illustrated. In brief overview, at step 7405 a first instruction set for performing an operation on a database is received. At step 7410, the first instruction set is processed into instruction set portions. At step 7415, instruction set portions are stored into a knowledgebase that comprises plurality of other instruction sets, each having their own instruction set portions. At step 7420, one or more portions of a new instruction set that is entered by a user is received, the new instruction set for performing an operation on a database. At step 7425, the one or more portions of the new instruction set are compared with the portions of the plurality of instruction sets stored in the knowledgebase. At step 7430, AI DBMS determines that there is a substantial similarity between the one or more portions of the new instruction set and the first instruction set stored in the knowledgebase. At step 7435, the first instruction set is displayed on the mobile device as an option to be selected by the user. At step 7440, the interface provides the means for the user to further modify the selected first instruction set, should the user decide to do so. At step 7445, the operation defined by the first instruction set (or the modified instruction set) is performed on the database.

In further detail, at step 7405 an interface for the AI DBMS receives a first instruction set for performing an operation on a database. The first instruction set may include commands and instructions, along with data names and variable names identifying the specific operation to be taken on a specific database. The first instruction set may be received by the interface for a DBMS. The first instruction set may be received by any component of the AI DBMS.

At step 7410, the first instruction set is processed into instruction set portions, in some embodiment, the first instruction set is disassembled into a plurality of portions. Each of the portions may be further processed. Processing may also include identifying the type of the first instruction set, in terms of the commands used. Specifically determinations may be made to identify if the first instruction set is for modifying data, selecting data, accessing data, creating a database, creating a row or a column within a database, making a new entry or similar nature or type of the first instruction set. Processing may further include creating a timestamp of the time when the first instruction set has been received. Processing may further include identifying a user which entered the first instruction set or identifying a group to which the user belongs. Processing may include assigning a weight to each of the portions of the first instruction set. Processing may include any action or operation by or for a Command Disassembler 500.

At step 7415, instruction set, along with its disassembled instruction set portions, may be stored in a knowledgebase that comprises a plurality of instruction sets, each of which includes a plurality of portions of its own. In some embodiments, instruction sets may be stored in a data structure for storing instruction sets, such as a table of the knowledgebase. Instruction set portions may be stored in knowledge cells, where each group of instruction sets forms a knowledge cell. Knowledgebase or additional knowledgebases may also be populated to include the user specific and/or group specific informations gathered with respect to the first instruction set. Also stored in knowledgebase may be the weight assigned to each of the portions of the first instruction set.

At step 7420, one or more portions of a new instruction set entered by a user on the mobile device is received. The one or more portions of the new instruction set may be for performing some operation on some database managed by the AI DBMS. In some embodiments, the user enters in sequence one, two or three portions of a new instruction set which the user intends to enter into the mobile device to perform an operation defined by that new instruction set on a particular data in a database. As the user enters the one or more portions of the new instruction set, and before the user completes entering the entire new instruction set, the one or more portions of the new instruction set may be received by a component of the AI DBMS, such as the Associative SDCL Artificial Intelligence 2800 or DBMS Artificial Intelligence 130. One or more portions of the new instruction set may be stored into operations lists.

At step 7425, the received one or more portions of the new instruction set are compared with the portions of the instruction sets in the knowledgebase. The one or more portions of the new instruction set may be compared with any of the portions of the instruction sets in the knowledgebase. In one embodiment, the one or more portions of the new instruction set are compared as a single string of characters with a plurality of portions of instruction sets in the knowledgebase. In other embodiments, comparison may be implemented by treating each instruction set portion as a separate string to be matched independently. In further embodiments, comparison is implemented by matching all of one or more portions of the new instruction set with one or more portions of an instruction set stored in a knowledgebase. Comparison may be implemented by matching all but one of the one or more portions of the new instruction set with one or more portions of an instruction set stored in a knowledgebase. Comparison may also be implemented by matching all but two of one or more portions of the new instruction set with one or more portions of an instruction set stored in a knowledgebase, Comparison may also be implemented by comparing the one or more portions of the new instruction set with portions of the instruction sets from the knowledgebase, factoring in the weights for each of the instruction set portions from the knowledgebase. As such matching some portions of the instruction sets from the knowledgebase may be more important than other portions having smaller weight.

At step 7430, AI DBMS determines that there is a substantial similarity between the one or more portions of the new instruction set and the first instruction set stored in the knowledgebase. In one embodiment, during the comparison of the one or more portions of the new instruction set and the portions of the first instruction set a perfect match may be found. In other embodiments, AI DBMS may find a plurality of perfect matches with a plurality of stored instruction sets. If the number of matches exceeds a threshold for maximum number of substantial similarity results, strictness level for determining a substantial match may be modified to include an additional one or more portions of the new instruction set in order to narrow down or reduce the number of the perfect matching results.

Still at 7430, in some embodiments, if no perfect match is found, or if a number of matches is lower than a threshold for minimum amount of substantially matching results, then strictness level may be reduced to allow for finding a match that is imperfect. In some embodiments, a strictness level may be reduced to allow for a match for more important portions of the one or more portions of the new instruction set to be matched with the instruction sets in the knowledgebase. The more important portions of the one or more portions of the new instruction set may be portions including command words or keywords. For example, a substantial match may be found when SQL keywords from the one or more portions of the new instruction set match SQL keywords, and the order of such keywords, in one or more stored instruction sets in the knowledgebase, even if one or more variable names, data names or database names are not matched. Substantial match may also be found when a strictness level is reduced to allow a match to have all but one portion of the one or more portions of the new instruction set matching an instruction set in the knowledgebase. Similarly, a substantial match may be found when a strictness level is reduced to allow a match to have all but two portions of the one or more portions of the new instruction set matching an instruction set in the knowledgebase. Likewise, a substantial match may be found when a strictness level is reduced to allow a match to have all but three portions of the one or more portions of the new instruction set matching an instruction set in the knowledgebase. The one, two, or three non-matched portions of the instruction set may be portions having smaller or smallest weight. For example, the non-matched portions of the instruction set may be variable names, database names or other portions of the instruction set that may be less important than the command keywords, for example. Determination of substantial similarity between the one or more portions of the new instruction set and the first instruction set may include any one of, or any combination of, substantial similarity determination techniques or embodiments discussed herein.

At step 7435, mobile device may display the first instruction set as an option to be selected by a user. The first instruction set may be displayed in response to determining that the first instruction set is the most substantial match with the one or more portions of the new instruction set. In some embodiments, AI DBMS may select the first instruction set for display on the mobile device responsive to the determination at step 7430. In further embodiments, the first instruction set may be displayed along with one or more instruction sets that are also identified as substantially similar or substantially matching the one or more portions of the new instruction set at step 7430.

At step 7440, the first instruction set may be modified in response to edits by the user. If a user decides that the first instruction set is very similar to the instruction set the user wanted to enter, aside for a few changes for example, the user may modify the first instruction set. In some embodiments, interface for the AI DBMS may provide the means for the user to modify the first instruction set upon the selection of the first instruction set on the display of the mobile device by the user.

At step 7445, AI DBMS performs the operation defined by the first instruction set (or the modified first instruction set if the first instruction set has been modified at step 7440) on the DBMS. The operation performed may include one of, or a combination of: accessing, modifying, creating or deleting a database. The operation performed may include one of, or a combination of: accessing, modifying, creating or deleting a table of a database. The operation performed may include one of, or a combination of: accessing, modifying, creating or deleting of a row, column, or cell within a table of a database. The operation performed may include one of, or a combination of: accessing, modifying, creating or deleting a report/view, relation, user account, and/or other objects in a DBMS. The operation performed may include any DBMS operation described herein.

Figure 35:
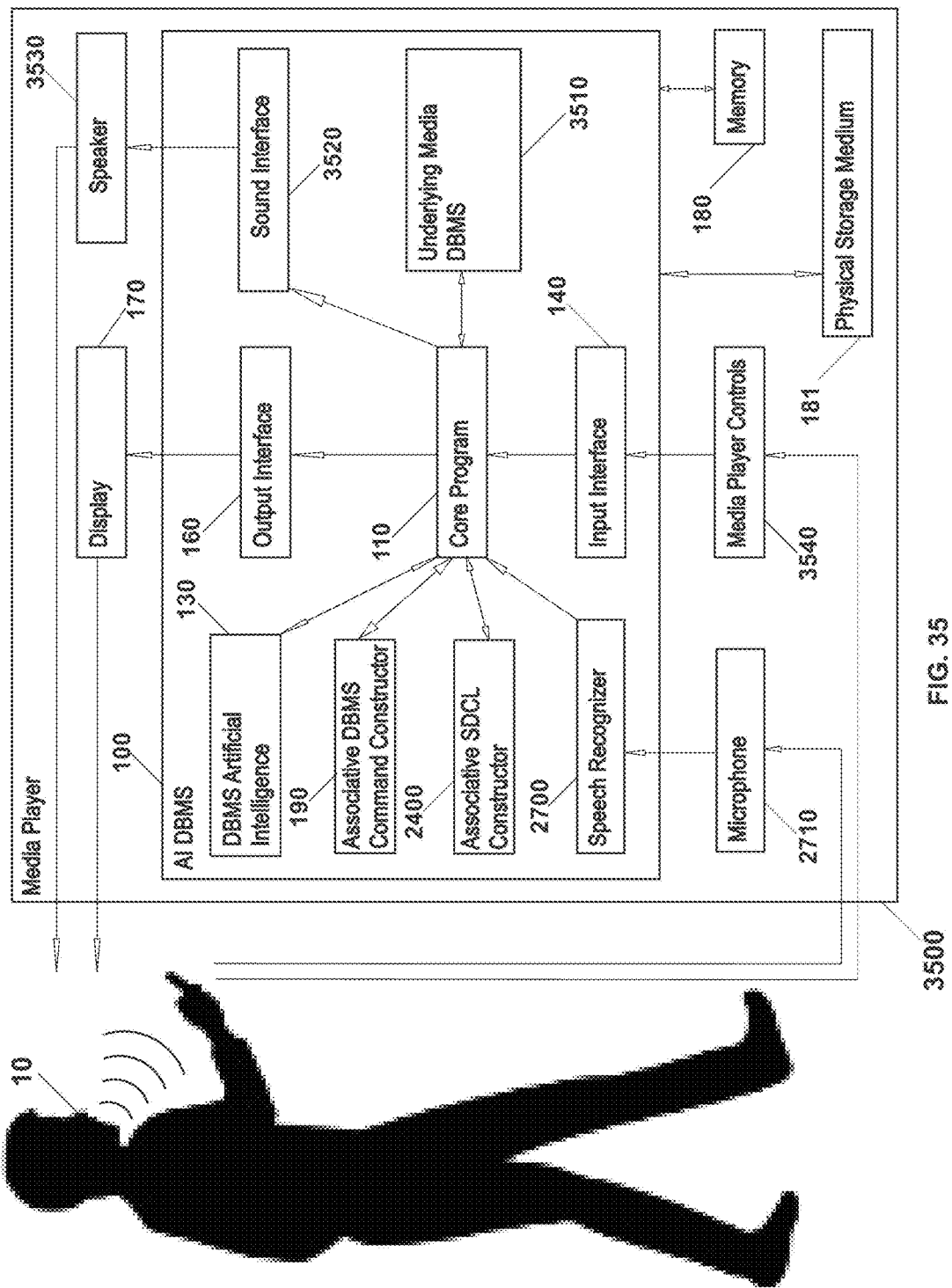
FIG. 35 is a diagram showing an embodiment of AI DBMS implemented on a Media Player 3500 with an Underlying Media DBMS 3510.

Referring to FIG. 35, in some aspects, the teaching presented by the current disclosure may be implemented in exemplary embodiments to provide AI DBMS functionalities for a media player. Such embodiments may include artificial intelligence (i.e. machine learning and/or anticipation functionalities, etc.) to learn the user's use of the media DBMS, store this "knowledge" in a knowledgebase, and anticipate the user's future operating intentions to help the user in his/her use of the media player. Such embodiments may also include the associative method of constructing Operations 610 or Instruction Sets 600 via key input, the SDCL for associative construction of Operations 610 or Instruction Sets 600 via phrase input, speech recognition for voice input, and/or other methods, systems, elements, or features and their embodiments as previously described.

AI DBMS may be used by the User 10 on a Media Player 3500, and the Media Player 3500 may further include Core Program 110, DBMS Artificial intelligence 130, Input interface 140, Output interface 160, Display 170, Memory 180, Physical Storage Medium 181, Associative DBMS Command Constructor 190, Associative SDCL Constructor 2400, Speech Recognizer 2700, Microphone 2710, Underlying Media DBMS 3510, Sound Interface 3520, Speaker 3530, and Media Player Controls 3540. Other additional elements may be included as needed, or some of the disclosed ones may be excluded, or a combination thereof may be utilized in alternate embodiments.

Media Player 3500 may comprise any hardware, software or a combination of hardware and software, and/or it may include functions and algorithms for playing media. Examples of Media Player 3500 include a music player such as an iPod, a video player such as a DVD player, a picture player, a television device, a media capable computer, a media capable cellular phone such as a Smartphone, a media capable tablet, and other media players.

In some embodiments, Underlying Media DBMS 3510 may comprise any hardware, software or a combination of hardware and software, and/or it may include functions and algorithms for storing, managing and/or manipulating various types of media or references thereto. The media may include music, video, pictures, and other media generally included in digital files. In one example, the media files or references thereto may be stored as Rows 330 in a single Table 310 within a single Database 300. In another example, the media files or references thereto may be stored as Rows 330 in multiple Tables 310 within multiple Databases 300 based on the type of content the media files contain (i.e. tables for specific authors and databases for specific genres of music or video, etc.). Columns 320 may be provided to include additional information such as author, authorship date, copyright information, and other additional information pertinent to the media file. Underlying Media DBMS 3510 may reside on the User's 10 Media Player 3500 or it may reside on a remote Computing Device 1310 accessible over a Network 1300, and if on a remote Computing Device 1310, the Underlying Media DBMS 3510 may be available as a network service (i.e. music or video streaming service, etc.) as previously described. User 10 may access, manage and/or manipulate the Underlying Media DBMS 3510 by using a control means and/or an associated interface of the Media Player 3500, and/or by using the previously described associative methods of constructing Operations 610 or Instruction Sets 600 via key, phrase, and/or voice inputs, or a combination thereof.

In one example, each time User 10 wishes to play a media file on the Media Player 3500, User 10 may issue an operating instruction (i.e. Instruction Set 600 or Operation 610, etc.) to the Underlying Media DBMS 3510 to retrieve the media file or a reference thereto to be played, Responsive to the User's 10 operating instruction to retrieve the media file or a reference thereto, Underlying Media DBMS 3510 may perform a SELECT type of Instruction Set 600 or Operation 610 (i.e. SELECT type of SQL statement, or any other SELECT type of DBMS command, etc.). In another example, each time User 10 wishes to delete a media file or a reference thereto on the Media Player 3500, User 10 may issue an operating instruction (i.e. Instruction Set 600 or Operation 610, etc.) to the Underlying Media DBMS 3510 to delete the media file or a reference thereto. Responsive to the User's 10 operating instruction to delete the media file or a reference thereto, Underlying Media DBMS 3510 may perform a DELETE type of Instruction Set 600 or Operation 610 (i.e. DELETE type of SQL statement, or any other DELETE type of DBMS command, etc.). Furthermore, AI DBMS may learn the User's 10 operating instructions such as the media file or a reference thereto retrieving or deleting instructions, store them for future use, and anticipate them in the future as previously described.

In some embodiments, Media Player 3500 may include the associative method of constructing Operations 610 or Instruction Sets 600 via key input as previously described. In one example, Keys 2110 of the Media Player Controls 3540 or other input device may be associated with Instruction Set Portions 620 of an Instruction Set 600 or Operation 610 for retrieving a media file to be played from the Underlying Media DBMS 3510. As such, User 10 may initially be offered a Selection 2300 on the Media Player's 3500 Display 170 to input a Key 2110 indicating that the User 10 wishes to play a media file. The next Selection 2300 the User 10 may be offered may be to input a Key 2110 indicating in which play list (i.e. table in a database) is the media file the User 10 wishes to play. The next Selection 2300 the User 10 may be offered may be to input a Key 2110 indicating which specific media file (i.e. row in a table) the User 10 wishes to play. AI DBMS may assemble Instruction Set 600 or Operation 610 from the inputted Keys 2110 and their associated Instruction Set Portions 620 to facilitate the User's operating instructions on the Underlying Media DBMS 3510 as previously described.

In other embodiments, Media Player 3500 may include the SDCL for associative construction of Operations 610 or Instruction Sets 600 via phrase or voice input as previously described. In one example, Phrases 2610 (i.e. user preferred phrases, etc.) may be associated with Instruction Set Portions 620 of an Instruction Set 600 or Operation 610 for retrieving a media file to be played from the Underlying Media DBMS 3510. As such, User 10 may initially be offered a Selection 2300 on the Media Player's 3500 Display 170 to input a Phrase 2610 (i.e. "PLAY", etc.) indicating that the User 10 wishes to play a media file. The next Selection 2300 the User 10 may be offered may be to input a Phrase 2610 (i.e. "MY FAVORITE LIST", etc.) indicating in which play list (i.e. table in a database) is the media file the User 10 wishes to play. The next Selection 2300 the User 10 may be offered may be to input a Phrase 2610 (i.e. "LOVE SONG", etc.) indicating which specific media file (i.e. row in a table) the User 10 wishes to play. AI DBMS may assemble Instruction Set 600 or Operation 610 from the inputted Phrases 2610 and their associated Instruction Set Portions 620 to facilitate the User's operating instructions on the Underlying Media DBMS 3510 as previously described.

In one exemplary embodiment, Media Player 3500 may be a music player such as an iPod. Underlying Media DBMS 3510 may include music files or references to music files with either or both the Underlying Media DBMS 3510 and the music files stored in the Media Player's 3500 Memory 180 and/or Physical Storage Medium 181. As the User 10 selects music files to play, DBMS Artificial Intelligence 130 may learn the User's 10 music playing selections (i.e. Instruction Sets 600 or Operations 610); store this "knowledge" (i.e. Knowledge Cells, etc.) in the Knowledgebase 530; and anticipate the User's 10 future music playing intentions (i.e. future/anticipatory Instruction Sets 600 or Operations 610) as previously described. User 10 may input his/her music playing instructions (1) by using the music player's native control means such as iPod's control wheel and the associated control program (i.e. interface, etc.) that interprets the control wheel's input events and generates requests to access, manage, and/or manipulate the Underlying Media DBMS 3510, and/or (2) by using the previously described associative methods of constructing Instruction Sets 600 or Operations 610 via key, phrase, and voice inputs, or a combination thereof.

In another exemplary embodiment, Media Player 3500 may be a network connected television device with network browsing capabilities. Underlying Media DBMS 3510 may include video files or references to video files with either or both the Underlying Media DBMS 3510 and the video files stored or on a remote Computing Device 1310 accessible over a Network 1300 as a network service. As the User 10 selects video files to play, DBMS Artificial Intelligence 130 may learn the User's 10 video playing selections (i.e. Instruction Sets 600 or Operations 610); store this "knowledge" (i.e. Knowledge Cells, etc.) in the Knowledgebase 530; and anticipate the User's 10 future video playing intentions (i.e. future/anticipatory Instruction Sets 600 or Operations 610) as previously described. Additionally, as previously described, a global Knowledgebase 530 including video playing "knowledge" (i.e. Knowledge Cells, etc.) of other users may be available to User 10 to guide his/her future video playing intentions. User 10 may input his/her video playing instructions (1) by using the television device's native control means such as a remote control and the associated control program (i.e. interface, etc.) that interprets the remote control's input events and generates requests to access, manage, and/or manipulate the Underlying Media DBMS 3510, and/or (2) by using the previously described associative methods of constructing instruction Sets 600 or Operations 610 via key, phrase, and voice inputs, or a combination thereof.

In yet another exemplary embodiment, Media Player 3500 may be a standard television device without network browsing capabilities. Underlying Media DBMS 3510 may include cable, satellite, on-the-air or other video channels or references thereto. Underlying Media DBMS 3510 may also include information on the User's 10 preferred settings such as volume, color, contrast, brightness, and other settings for various types of channels and video content. As the User 10 selects video channels to watch, DBMS Artificial Intelligence 130 may learn the User's 10 channel watching selections (i.e. Instruction Sets 600 or Operations 610), the timing of the channel watching selections, and the User's 10 preferred settings for the various types of channels and video content; store this "knowledge" (i.e. Knowledge Cells, etc.) in the Knowledgebase 530; and anticipate the User's 10 future channel watching intentions (i.e. future/anticipatory instruction Sets 600 or Operations 610) as previously described. In one example, User 10 may watch specific channels at specific times (as many television watchers do when they watch daily or weekly scheduled shows) and AI DBMS may learn the channels and the times (i.e. using the time stamp, etc.) and automatically switch to these channels at their specific times, and if the User 10 is not at home, AI DBMS may trigger a recording process for later recorded channel watching. In another example, while watching his/her favorite show, User 10 may switch to other channels during commercials in specific time intervals, and AI DBMS may learn the channels and the time intervals (i.e. using time stamp, etc.) and automatically switch the channels to avoid commercials. In yet another example, User 10 may change volume, color, contrast, brightness, and other settings based on the User's 10 preferences for various types of channels and content, and AI DBMS may learn the User's 10 preferred settings (i.e. using Extra Infos 630, etc.) for the specific channels and content and adjust the settings automatically. User 10 may input his/her video playing instructions (1) by using the television device's native control means such as a remote control and the associated control program (i.e. interface, etc.) that interprets the remote control's input events and generates requests to access, manage, and/or manipulate the Underlying Media DBMS 3510, and/or (2) by using the previously described associative methods of constructing Instruction Sets 600 or Operations 610 via key, phrase, and voice inputs, or a combination thereof.

Sound Interface 3520 may comprise any hardware, software or a combination of hardware and software, and/or it may include functions and algorithms for processing output from the Core Program 110 or other elements of the current disclosure for listening by the User 10. Sound Interface 3520 falls under the general description of the previously described Output Interface 160, and it is described separately in this embodiment to offer additional detail on its functioning. Sound interface 3520 may be or include a sound driver, a Java sound API, a built-in sound interface, or any other sound interface.

Speaker 3530 may comprise any hardware, software or a combination of hardware and software, and/or it may include functions and algorithms for providing sound to the User 10. Speaker 3530 may be a built-in or an external speaker, headphone, or any other sound producing device.

Media Player Controls 3540 may comprise any hardware, software or a combination of hardware and software, and/or it may include functions and algorithms for inputting operating instructions or data. Media Player Controls 3540 may include a means of inputting operating instructions or data by pressing keys or buttons, touching keys or buttons, clicking keys or buttons, sliding physical components, or manipulating other physical or other elements. Examples of Media Player Controls 3540 include a control wheel (i.e. iPod's control wheel, etc.), a keypad, a touch screen, a keyboard, or any other input or control device.

Figure 36:
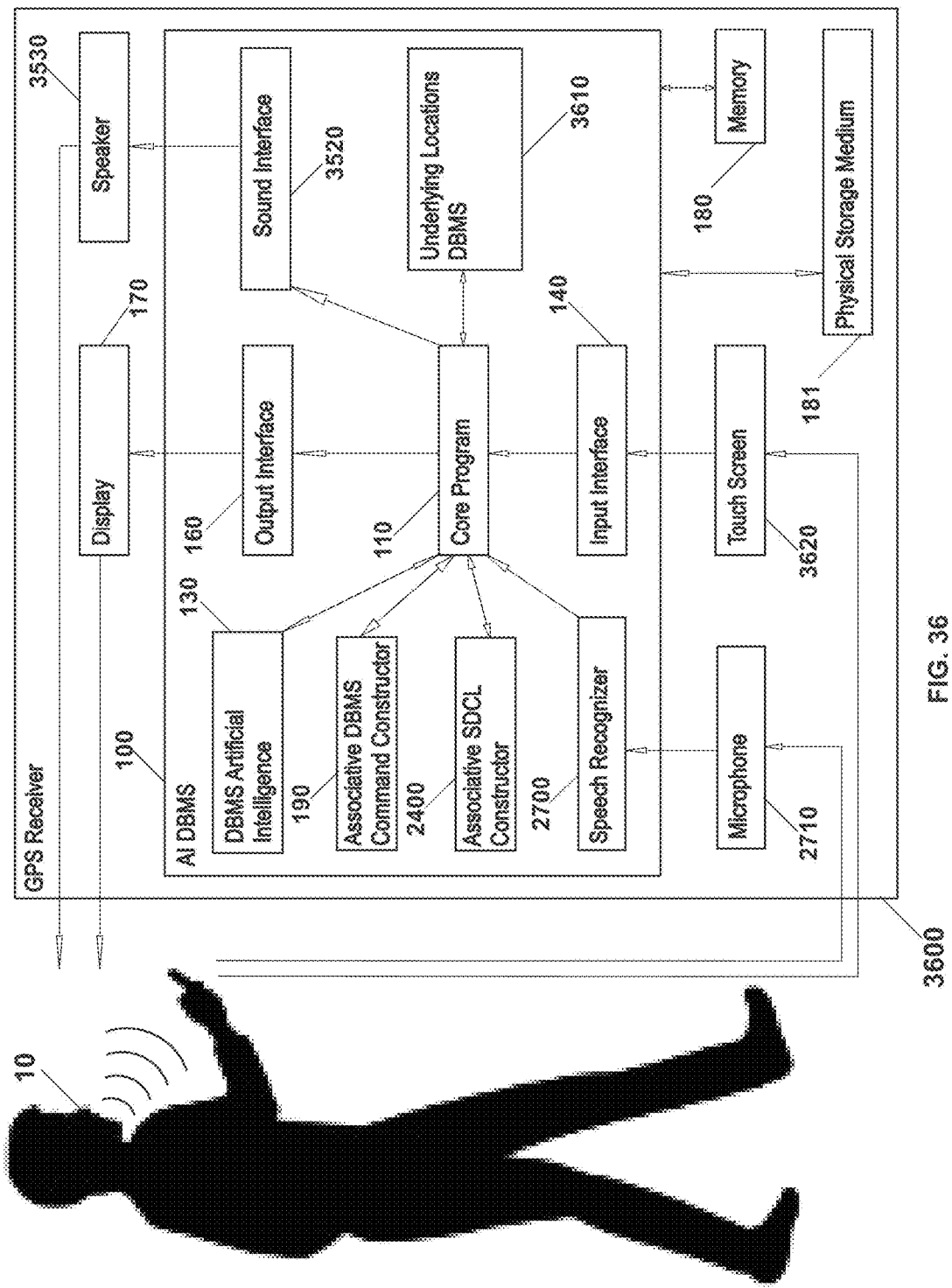
FIG. 36 is a diagram showing an embodiment of AI DBMS implemented on a GPS Receiver 3600 with an Underlying Locations DBMS 3610.

Referring to FIG. 36, in some aspects, the teaching presented by the current disclosure may be implemented in exemplary embodiments to provide AI DBMS functionalities for a GPS receiver. Such embodiments may include artificial intelligence (i.e. machine learning and/or anticipation functionalities, etc.) to learn the user's use of the global locations DBMS, store this "knowledge" in a knowledgebase, and anticipate the user's future operating intentions to help the user in his/her use of the GPS receiver. Such embodiments may also include the associative method of constructing Operations 610 or Instruction Sets 600 via key input, the SDCL for associative construction of Operations 610 or instruction Sets 600 via phrase input, speech recognition for voice input, and/or other methods, systems, elements, or features and their embodiments as previously described.

AI DBMS may be used by the User 10 on a GPS Receiver 3600, and the GPS Receiver 3600 may further include Core Program 110, DBMS Artificial intelligence 130, Input Interface 140, Output Interface 160, Display 170, Memory 180, Physical Storage Medium 181, Associative DBMS Command Constructor 190, Associative SDCL Constructor 2400, Speech Recognizer 2700, Microphone 2710, Sound interface 3520, Speaker 3530, Underlying Locations DBMS 3610, and Touch Screen 3620. Other additional elements may be included as needed, or some of the disclosed ones may be excluded, or a combination thereof may be utilized in alternate embodiments.

GPS Receiver 3600 may comprise any hardware, software or a combination of hardware and software, and/or it may include functions and algorithms for GPS functionalities. Examples of the GPS Receiver 3600 include a handheld GPS receiver, a built-in GPS receiver (i.e. built-in a car or boat, etc.), GPS capable cellular telephone (i.e. Smartphone, etc.), and other GPS receivers.

In some embodiments, Underlying Locations DBMS 3610 may comprise any hardware, software or a combination of hardware and software, and/or it may include functions and algorithms for storing, managing and/or manipulating location references. Location references may include latitude/longitude/altitude coordinates, street addresses, distances from a fixed point, and other location references. In one example, location references may be stored as Rows 330 in a single Table 310 within a single Database 300. In another example, location references may be stored as Rows 330 in multiple Tables 310 within multiple Databases 300 based on the geographic groupings (i.e. tables for specific cities and databases for specific countries, etc.). Columns 320 may be provided to include additional information such as population, historic facts, general climate facts, and other additional information pertinent to a specific location reference. Underlying Locations DBMS 3610 may reside on the User's 10 GPS Receiver 3600 or it may reside on a remote Computing Device 1310 accessible over a Network 1300, and if on a remote Computing Device 1310, the Underlying Locations DBMS 3610 may be available as a network service (i.e. service for updating location references, etc.) as previously described. User 10 may access, manage and/or manipulate the Underlying Locations DBMS 3610 by using a control means and/or an associated interface of the GPS Receiver 3600, and/or by using the previously described associative methods of constructing Operations 610 or Instruction Sets 600 via key, phrase, and/or voice inputs, or a combination thereof.

In one example, each time User 10 wishes to visit a location stored on the GPS Receiver 3600, User 10 may issue an operating instruction (i.e. Instruction Set 600 or Operation 610, etc.) to the Underlying Locations DBMS 3610 to retrieve the location reference (i.e. latitude/longitude/altitude coordinates, address, etc.) to be visited. Responsive to the User's 10 operating instruction to retrieve the location reference, Underlying Locations DBMS 3610 may perform a SELECT type of Instruction Set 600 or Operation 610 (i.e. SELECT type of SQL statement, or any other SELECT type of DBMS command, etc.). In another example, each time User 10 wishes to delete a location reference on the GPS Receiver 3600, User 10 may issue an operating instruction (i.e. Instruction Set 600 or Operation 610, etc.) to the Underlying Locations DBMS 3610 to delete the location reference. Responsive to the User's 10 operating instruction to delete the location reference, Underlying Locations DBMS 3610 may perform a DELETE type of Instruction Set 600 or Operation 610 (i.e. DELETE type of SQL statement, or any other DELETE type of DBMS command, etc.). Furthermore, AI DBMS may learn the User's 10 operating instructions such as the location reference retrieving or deleting instructions, store them for future use, and anticipate them in the future as previously described.

In some embodiments, GPS Receiver 3600 may include the associative method of constructing Operations 610 or Instruction Sets 600 via key input as previously described. For example, Keys 2110 of the Touch Screen 3620 or other input device may be associated with Instruction Set Portions 620 of an Instruction Set 600 or Operation 610 for retrieving a location reference of a location to be visited from the Underlying Locations DBMS 3610. As such, User 10 may initially be offered a Selection 2300 on the GPS Receiver's 3600 Display 170 to input a Key 2110 indicating that the User 10 wishes to visit a location. The next Selection 2300 the User 10 may be offered may be to input a Key 2110 indicating in which city (i.e. table in a database) is the location the User 10 wishes to visit. The next Selection 2300 the User 10 may be offered may be to input a Key 2110 indicating which specific location (i.e. row in a table) the User 10 wishes to visit. AI DBMS may assemble Instruction Set 600 or Operation 610 from the inputted Keys 2110 and their associated instruction Set Portions 620 to facilitate the User's operating instructions on the Underlying Locations DBMS 3610 as previously described.

In other embodiments, GPS Receiver 3600 may include the SDCL for associative construction of Operations 610 or Instruction Sets 600 via phrase or voice input as previously described. For example, Phrases 2610 (i.e. user preferred phrases, etc.) may be associated with Instruction Set Portions 620 of an Instruction Set 600 or Operation 610 for retrieving a location reference of a location to be visited from the Underlying Locations DBMS 3610. As such, User 10 may initially be offered a Selection 2300 on the GPS Receiver's 3600 Display 170 to input a Phrase 2610 (i.e. "GO TO", etc.) indicating that the User 10 wishes to visit a location. The next Selection 2300 the User 10 may be offered may be to input a Phrase 2610 (i.e. "LOS ANGELES", etc.) indicating in which city (i.e. table in a database) is the location the User 10 wishes to visit. The next Selection 2300 the User 10 may be offered may be to input a Phrase 2610 (i.e. "SCIENCE MUSEUM", etc.) indicating which specific location (i.e. row in a table) the User 10 wishes to visit. AI DBMS may assemble instruction Set 600 or Operation 610 from the inputted Phrases 2610 and their associated instruction Set Portions 620 to facilitate the User's operating instructions on the Underlying Locations DBMS 3610 as previously described.

In one exemplary embodiment, GPS Receiver 3600 may be a network connected GPS receiver. Underlying Locations DBMS 3610 may include location references stored in the GPS Receiver's 3600 Memory 180 and/or Physical Storage Medium 181. As the User 10 selects location references to visit, DBMS Artificial Intelligence 130 may learn the User's 10 selections (i.e. Instruction Sets 600 or Operations 610) of location references; store this "knowledge" (i.e. Knowledge Cells, etc.) in the Knowledgebase 530; and anticipate the User's 10 future location visiting intentions (i.e. future/anticipatory Instruction Sets 600 or Operations 610) as previously described. Additionally, as previously described, a global Knowledgebase 530 including location visiting "knowledge" (i.e. Knowledge Cells, etc.) of other users may be available to User 10 to guide his/her future location visiting intentions. In one example, User 10 may come to a city for the first time and look for places of interest to visit. After User 10 discovers and visits a great restaurant and/or an interesting museum, AI DBMS may anticipate the User's 10 future location references based on the sequence of location visits of other users in the global Knowledgebase 530 who visited the same restaurant and/or the museum. User 10 may input his/her location visiting instructions (1) by using GPS Receiver's 3600 native control means such as the Touch Screen 3620 and the associated control program (i.e. interface, etc.) that interprets the touch screen's input events and generates requests to access, manage, and/or manipulate the Underlying Locations DBMS 3610, and/or (2) by using the previously described associative methods of constructing Instruction Sets 600 or Operations 610 via key, phrase, and voice inputs, or a combination thereof.

Touch Screen 3620 may comprise any hardware, software or a combination of hardware and software, and/or it may include functions and algorithms for inputting operating instructions or data. Touch Screen 3620 may include a means of inputting operating instructions or data by touching areas of the Touch Screen 3620 representing keys or buttons, sliding Touch Screen's 3620 slider components, or manipulating other Touch Screen 3620 elements.

Figure 37:
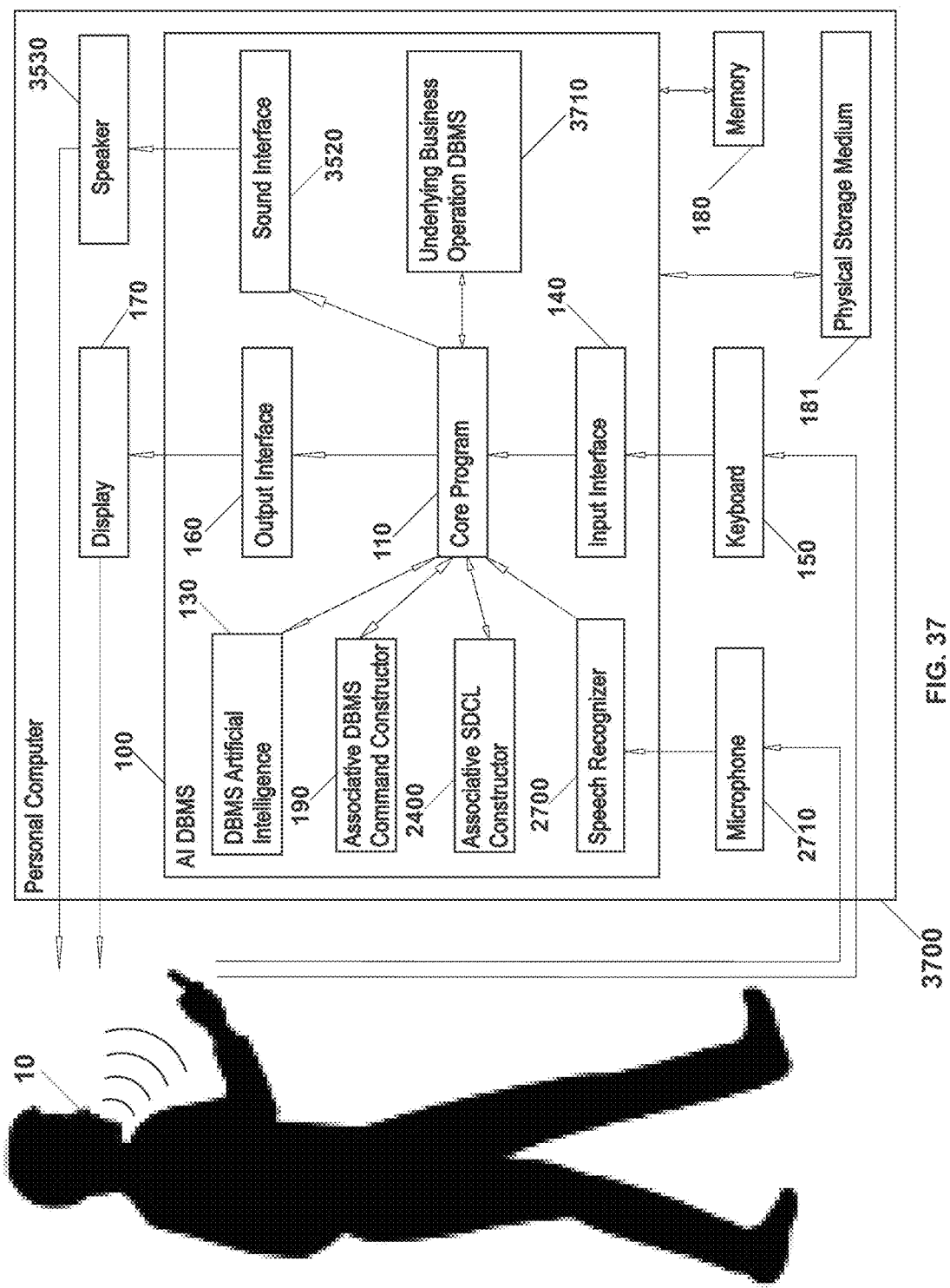
FIG. 37 is a diagram showing an embodiment of AI DBMS implemented on a Personal Computer 3700 with an Underlying Business Operation DBMS 3710.

Referring to FIG. 37, in some aspects, the teaching presented by the current disclosure may be implemented in exemplary embodiments to provide AI DBMS functionalities for a business operation. Such embodiments may include artificial intelligence (i.e. machine learning and/or anticipation functionalities, etc.) to learn the user's use of the business operation DBMS, store this "knowledge" in a knowledgebase, and anticipate the user's future operating intentions to help the user in his/her running the business operation. Such embodiments may also include the associative method of constructing Operations 610 or Instruction Sets 600 via key input, the SDCL for associative construction of Operations 610 or instruction Sets 600 via phrase input, speech recognition for voice input, and/or other methods, systems, elements, or features and their embodiments as previously described.

AI DBMS may be used by the User 10 on a Personal Computer 3700, and the Personal Computer 3700 may further include Core Program 110, DBMS Artificial Intelligence 130, Input Interface 140, Keyboard 150, Output Interface 160, Display 170, Memory 180, Physical Storage Medium 181, Associative DBMS Command Constructor 190, Associative SDCL Constructor 2400, Speech Recognizer 2700, Microphone 2710, Sound Interface 3520, Speaker 3530, and Underlying Business Operation DBMS 3710. Other additional elements may be included as needed, or some of the disclosed ones may be excluded, or a combination thereof may be utilized in alternate embodiments.

Personal Computer 3700 may comprise any hardware, software or a combination of hardware and software, and/or it may include functions and algorithms for computing functionalities. Examples of the Personal Computer 3700 include a desktop computer, a mobile computer such as a laptop or tablet computer, computing capable cellular telephone (i.e. Smartphone, etc.), and other personal computers.

In some embodiments, Underlying Business Operation DBMS 3710 may comprise any hardware, software or a combination of hardware and software, and/or it may include functions and algorithms for storing, managing and/or manipulating various business operation data. Business operation data may include sales, inventory, payroll, employee benefits, financial, and other business operation data. In a small business example, business operation data may be stored as Rows 330 in a single or multiple Tables 310 within a single Database 300. In an enterprise organization example, business operation data may be stored as Rows 330 in multiple Tables 310 within multiple Databases 300 based on the organizational departments (i.e. tables for specific functions within a department and databases for specific departments, etc.). Underlying Business Operation DBMS 3710 may reside on the User's 10 Personal Computer 3700 or it may reside on a remote Computing Device 1310 accessible over a Network 1300, and if on a remote Computing Device 1310, the Underlying Business Operation DBMS 3710 may be available as a network service (i.e. database service for multiple users to connect and use, etc.) as previously described. User 10 may access, manage and/or manipulate the Underlying Business Operation DBMS 3710 by using a control means and/or an associated interface of the Personal Computer 3700, and/or by using the previously described associative methods of constructing Operations 610 or Instruction Sets 600 via key, phrase, and/or voice inputs, or a combination thereof:

In one example, each time User 10 wishes to view a business operation data on the Personal Computer 3700, User 10 may issue an operating instruction (i.e. instruction Set 600 or Operation 610, etc.) to the Underlying Business Operation DBMS 3710 to retrieve the business operation data to be viewed. Responsive to the User's 10 operating instruction to retrieve the business operation data, Underlying Business Operation DBMS 3710 may perform a SELECT type of Instruction Set 600 or Operation 610 (i.e. SELECT type of SQL statement, or any other SELECT type of DBMS command, etc.). In another example, each time User 10 wishes to delete a business operation data on the Personal Computer 3700, User 10 may issue an operating instruction (i.e. Instruction Set 600 or Operation 610, etc.) to the Underlying Business Operation DBMS 3710 to delete the business operation data. Responsive to the User's 10 operating instruction to delete the business operation data, Underlying Business Operation DBMS 3710 may perform a DELETE type of Instruction Set 600 or Operation 610 (i.e. DELETE type of SQL statement, or any other DELETE type of DBMS command, etc.). Furthermore, AI DBMS may learn the User's 10 operating instructions such as the business operation data retrieving or deleting instructions, store them for future use, and anticipate them in the future as previously described.

In some embodiments, Personal Computer 3700 may include the associative method of constructing Operations 610 or instruction Sets 600 via key input as previously described. In one example, Keys 2110 of the Keyboard 150 or other input device may be associated with Instruction Set Portions 620 of an Instruction Set 600 or Operation 610 for retrieving a business operation data to be viewed from the Underlying Business Operation DBMS 3710. As such, User 10 may initially be offered a Selection 2300 on the Personal Computer's 3700 Display 170 to input a Key 2110 indicating that the User 10 wishes to view a business operation data. The next Selection 2300 the User 10 may be offered may be to input a Key 2110 indicating in which table (i.e. table in a database) is the business operation data the User 10 wishes to view. The next Selection 2300 the User 10 may be offered may be to input a Key 2110 indicating which specific business operation data (i.e. row in a table) the User 10 wishes to view. AI DBMS may assemble Instruction Set 600 or Operation 610 from the inputted Keys 2110 and their associated Instruction Set Portions 620 to facilitate the User's operating instructions on the Underlying Business Operation DBMS 3710 as previously described.

In other embodiments, Personal Computer 3700 may include the SDCL for associative construction of Operations 610 or instruction Sets 600 via phrase or voice input as previously described. In one example, Phrases 2610 (i.e. user preferred phrases, etc.) may be associated with Instruction Set Portions 620 of an Instruction Set 600 or Operation 610 for retrieving a business operation data to be viewed from the Underlying Business Operation DBMS 3710. As such, User 10 may initially be offered a Selection 2300 on the Personal Computer's 3700 Display 170 to input a Phrase 2610 (i.e. "GET DATA", etc.) indicating that the User 10 wishes to view a business operation data. The next Selection 2300 the User 10 may be offered may be to input a Phrase 2610 (i.e. "SALES", etc.) indicating in which table (i.e. table in a database) is the business operation data the User 10 wishes to view. The next Selection 2300 the User 10 may be offered may be to input a Phrase 2610 (i.e. "2013 FORD FOCUS", etc.) indicating which specific business operation data (i.e. row in a table) the User 10 wishes to view. AI DBMS may assemble Instruction Set 600 or Operation 610 from the inputted Phrases 2610 and their associated instruction Set Portions 620 to facilitate the User's operating instructions on the Underlying Business Operation DBMS 3710 as previously described.

In one exemplary embodiment, Personal Computer 3700 may be a network connected desktop computer. Underlying Business Operation DBMS 3710 may reside on a remote Computing Device 1310 accessible over a Network 1300 (i.e. enterprise network, or virtual private network over the Internet, etc.). As the User 10 performs select, insert, update, delete and other operations on the business operation data, DBMS Artificial intelligence 130 may learn User's 10 operations (i.e. Instruction Sets 600 or Operations 610); store this "knowledge" (i.e. Knowledge Cells, etc.) in the Knowledgebase 530; and anticipate the User's 10 future operating intentions (i.e. future/anticipatory Instruction Sets 600 or Operations 610) as previously described. In one example, User 10 may be responsible for maintaining sales and inventory Tables 310 within one or multiple Databases 300. When a sale is made, User 10 may need to perform several insert, update, and/or other operations such as inserting a Row 330 into the sales Table 310 and updating a Row 330 in the inventory Table 310 for each product sold: Each product may have its separate sales and inventory Tables 310 and User 10 may need to perform update operations on multiple sales and inventory Tables 310. After performing insert and update operations for one or more initial sale transactions, AI DBMS may learn the User's 10 sequence of operations for each sale transaction and perform the corresponding operations automatically. In another example, User 10 may be responsible for financial reporting. This type of reporting is often a daily, weekly, monthly and/or yearly scheduled process of creating same or similar reports with updated times, dates or other filtering information. After creating one or more scheduled Reports/Views 350, AI DBMS may learn the timing (i.e. using time stamp, etc.) of the User's 10 Reports/Views 350 creation and create future Reports/Views 350 automatically. User 10 may input his/her business operation DBMS instructions (1) by using the previously described Keyboard 150 and Input Interface 140 to access, manage and/or manipulate the Underlying Business Operation DBMS 3710, and/or (2) by using the previously described associative methods of constructing Instruction Sets 600 or Operations 610 via key, phrase, and voice inputs, or a combination thereof.

In another exemplary embodiment, Personal Computer 3700 may be a network connected mobile computer. Underlying Business Operation DBMS 3710 may be stored in the Personal Computer's 3700 Memory 180 or Physical Storage Medium 181. Also, User 10 may be a non-technical small business user attempting to create a Database 300 with several business operation Tables 310 (i.e. sales, inventory, etc.). As previously described, a global Knowledgebase 530 including Database 300 and Table 310 creation "knowledge" (i.e. Knowledge Cells, etc.) of other users may be available to User 10 to guide his/her Database 300 and Table 310 creation intentions. In one example, User 10 may be a professional painter and wish to create a database for a business that sells paintings. User 10 may wish to organize his/her paintings for sale into several Tables 310 based on the topic of the paintings (i.e. a Table 310 for paintings of nature, a Table 310 for paintings of animals, etc.). After User 10 creates an initial empty Database 300 titled "paintings for sale," AI DBMS may anticipate the user's table creation intentions (i.e. future/anticipatory Instruction Sets 600 or Operations 610) based on the sequence of table creations of other users in the global Knowledgebase 530 who created a "paintings for sale" (or its semantic variations) Database 300 in a similar small business context. User 10 may input his/her business operation DBMS instructions (1) by using the previously described Keyboard 150 and input Interface 140 to access, manage and/or manipulate the Underlying Business Operation DBMS 3710, and/or (2) by using the previously described associative methods of constructing Instruction Sets 600 or Operations 610 via key, phrase, and voice inputs, or a combination thereof.

A number of embodiments have been described herein. While this specification contains many specific implementation details, these should not be construed as limitations on the scope of any inventions or of what may be claimed, but rather as descriptions of features specific to particular embodiments. It will be understood that various modifications may be made without departing from the spirit and scope of the invention. The logic flows depicted in the figures do not require the particular order shown, or sequential order, to achieve desirable results. In addition, other or additional steps may be provided, or some of the steps may be eliminated, from the described flows, and/or other components may be added to, or removed from, the described methods, systems and techniques. Further, the various aspects and disclosed methods, systems and techniques can be combined in whole or in part with each other to produce additional implementations. Moreover, the separation of various components in the embodiments described herein should not be understood as requiring such separation in all embodiments, and it should be understood that the described components may generally be integrated together in a single software product or packaged into multiple software products. Accordingly, other embodiments are within the scope of the following claims.

The invention claimed is:

1. A method implemented using a computing system that includes one or more processor circuits, the method comprising:

accessing a memory that stores at least a first plurality of instruction sets for performing one or more operations on a first database management system (DBMS) and a second plurality of instruction sets for performing one or more operations on the first DBMS, wherein at least a portion of the first plurality of instruction sets is learned in a first learning process and at least a portion of the second plurality of instruction sets is learned in a second learning process;

determining at least one instruction set of the second plurality of instruction sets based on at least partial match between a new one or more instruction sets and one or more instruction sets of the second plurality of instruction sets, or receiving a selection of at least one instruction set of the second plurality of instruction sets;

at least in response to the determining or the receiving, executing the at least one instruction set of the second plurality of instruction sets in a temporal order in which the at least one instruction set of the second plurality of instruction sets are learned in the second learning process; and performing, by the first DBMS or by a second DBMS, at least one operation defined by the at least one instruction set of the second plurality of instruction sets.

2. The method of claim 1, wherein the first plurality of instruction sets for performing the one or more operations on the first DBMS include one or more instruction sets for performing one or more operations on a first portion of the first DBMS, and wherein the second plurality of instruction sets for performing the one or more operations on the first DBMS include one or more instruction sets for performing one or more operations on a second portion of the first DBMS, and wherein the first learning process includes operating the first portion of the first DBMS at least partially by a user, and wherein the second learning process includes operating the second portion of the first DBMS at least partially by the user.

3. The method of claim 1, wherein the first plurality of instruction sets for performing the one or more operations on the first DBMS include one or more instruction sets for performing one or more operations on a first portion of the first DBMS, and wherein the second plurality of instruction sets for performing the one or more operations on the first DBMS include one or more instruction sets for performing one or more operations on a second portion of the first DBMS, and wherein the first learning process includes operating the first portion of the first DBMS at least partially by a first user, and wherein the second learning process includes operating the second portion of the first DBMS at least partially by a second user.

4. The method of claim 1, wherein the memory further stores at least a third plurality of instruction sets for performing one or more operations on the second DBMS, and wherein at least a portion of the third plurality of instruction sets is learned in a third learning process, and wherein the first learning process includes operating the first DBMS at least partially by a first user, and wherein the third learning process includes operating the second DBMS at least partially by the first user.

5. The method of claim 1, wherein the memory further stores at least a third plurality of instruction sets for performing one or more operations on the second DBMS, and wherein at least a portion of the third plurality of instruction sets is learned in a third learning process, and wherein the first learning process includes operating the first DBMS at least partially by a first user, and wherein the third learning process includes operating the second DBMS at least partially by a second user.

6. The method of claim 1, further comprising:
modifying the at least one instruction set of the second plurality of instruction sets or a copy of the at least one instruction set of the second plurality of instruction sets based on a pattern recognized from: at least one portion of the at least one instruction set of the second plurality of instruction sets, at least one portion of the new one or more instruction sets, at least one portion of the one or more instruction sets of the second plurality of instruction sets, or at least one portion of another one or more instruction sets, and wherein the executing the at least one instruction set of the second plurality of instruction sets includes executing the modified the at least one instruction set of the second plurality of instruction sets or the modified the copy of the at least one instruction set of the second plurality of instruction sets, and wherein the performing, by the first DBMS or by the second DBMS, the at least one operation defined by the at least one instruction set of the second plurality of instruction sets includes performing, by the first DBMS or by the second DBMS, at least one operation defined by the modified the at least one instruction set of the second plurality of instruction sets or by the modified the copy of the at least one instruction set of the second plurality of instruction sets.

7. The method of claim 1, further comprising:
modifying the at least one instruction set of the second plurality of instruction sets or a copy of the at least one instruction set of the second plurality of instruction sets based on a context relating to: the at least one instruction set of the second plurality of instruction sets, the new one or more instruction sets, the one or more instruction sets of the second plurality of instruction sets, or another one or more instruction sets, and wherein the executing the at least one instruction set of the second plurality of instruction sets includes executing the modified the at least one instruction set of the second plurality of instruction sets or the modified the copy of the at least one instruction set of the second plurality of instruction sets, and wherein the performing, by the first DBMS or by the second DBMS, the at least one operation defined by the at least one instruction set of the second plurality of instruction sets includes performing, by the first DBMS or by the second DBMS, at least one operation defined by the modified the at least one instruction set of the second plurality of instruction sets or by the modified the copy of the at least one instruction set of the second plurality of instruction sets.

8. The method of claim 1, further comprising:
modifying the at least one instruction set of the second plurality of instruction sets or a copy of the at least one instruction set of the second plurality of instruction sets at least in response to receiving, via an input device, a user selection to modify the at least one instruction set of the second plurality of instruction sets or the copy of the at least one instruction set of the second plurality of instruction sets, and wherein the executing the at least one instruction set of the second plurality of instruction sets includes executing the modified the at least one instruction set of the second plurality of instruction sets or the modified the copy of the at least one instruction set of the second plurality of instruction sets, and wherein the performing, by the first DBMS or by the second DBMS, the at least one operation defined by the at least one instruction set of the second plurality of instruction sets includes performing, by the first DBMS or by the second DBMS, at least one operation defined by the modified the at least one instruction set of the second plurality of instruction sets or by the modified the copy of the at least one instruction set of the second plurality of instruction sets.

9. The method of claim 1, wherein the first plurality of instruction sets for performing the one or more operations on the first DBMS include one or more instruction sets for performing one or more operations on a first portion of the first DBMS, and wherein the second plurality of instruction sets for performing the one or more operations on the first DBMS include one or more instruction sets for performing one or more operations on a second portion of the first DBMS, and wherein the first plurality of instruction sets and the second plurality of instruction sets form at least a portion of a knowledgebase for operating at least one selected from the group comprising: the first portion of the first DBMS, the second portion of the first DBMS, and other one or more portions of the first DBMS.

10. The method of claim 1, wherein the memory further stores at least a third plurality of instruction sets for performing one or more operations on the second DBMS, and wherein the first plurality of instruction sets, the second plurality of instruction sets, and the third plurality of instruction sets form at least a portion of a knowledgebase for operating at least one selected from the group comprising: the first DBMS, the second DBMS, and other one or more DBMSs.

11. The method of claim 1, wherein the executing the at least one instruction set of the second plurality of instruction sets includes executing the at least one instruction set of the second plurality of instruction sets with no user input.

12. The method of claim 1, wherein the executing the at least one instruction set of the second plurality of instruction sets includes executing the at least one instruction set of the second plurality of instruction sets at least in response to receiving, via an input device, a user confirmation of the executing the at least one instruction set of the second plurality of instruction sets.

13. The method of claim 1, wherein the second plurality of instruction sets is modified by inserting an instruction set into or deleting an instruction set from the second plurality of instruction sets, and wherein the determining the at least one instruction set of the second plurality of instruction sets based on the at least partial match between the new one or more instruction sets and the one or more instruction sets of the second plurality of instruction sets includes determining at least one instruction set of the modified second plurality of instruction sets based on at least partial match between the new one or more instruction sets and one or more instruction sets of the modified second plurality of instruction sets, and wherein the receiving the selection of the at least one instruction set of the second plurality of instruction sets includes receiving a selection of at least one instruction set of the modified second plurality of instruction sets, and wherein the executing the at least one instruction set of the second plurality of instruction sets in the temporal order in which the at least one instruction set of the second plurality of instruction sets are learned in the second learning process includes executing the at least one instruction set of the modified second plurality of instruction sets in the temporal order modified by the insertion of the instruction set into or the deletion of the instruction set from the second plurality of instruction sets, and wherein the performing, by the first DBMS or by the second DBMS, the at least one operation defined by the at least one instruction set of the second plurality of instruction sets includes performing, by the first DBMS or by the second DBMS, at least one operation defined by the at least one instruction set of the modified second plurality of instruction sets.

14. The method of claim 1, further comprising:
inserting an instruction set into or deleting an instruction set from the at least one instruction set of the second plurality of instruction sets following the determining or the receiving, and wherein the executing the at least one instruction set of the second plurality of instruction sets in the temporal order in which the at least one instruction set of the second plurality of instruction sets are learned in the second learning process includes executing the at least one instruction set of the second plurality of instruction sets, modified by the inserted instruction set or the deleted instruction set, in the temporal order modified by the insertion of the instruction set into or the deletion of the instruction set from the at least one instruction set of the second plurality of instruction sets, and wherein the performing, by the first DBMS or by the second DBMS, the at least one operation defined by the at least one instruction set of the second plurality of instruction sets includes performing, by the first DBMS or by the second DBMS, at least one operation defined by the at least one instruction set of the second plurality of instruction sets modified by the inserted instruction set or the deleted instruction set.

15. The method of claim 1, wherein the at least the portion of the first plurality of instruction sets learned in the first learning process includes: one instruction set of the first plurality of instruction sets, multiple instruction sets of the first plurality of instruction sets, or all instruction sets of the first plurality of instruction sets, and wherein the at least the portion of the second plurality of instruction sets learned in the second learning process includes: one instruction set of the second plurality of instruction sets, multiple instruction sets of the second plurality of instruction sets, or all instruction sets of the second plurality of instruction sets, and wherein an instruction set of the at least one instruction set of the second plurality of instruction sets is the same as an instruction set of the one or more instruction sets of the second plurality of instruction sets, or multiple instruction sets of the at least one instruction set of the second plurality of instruction sets are the same as multiple instruction sets of the one or more instruction sets of the second plurality of instruction sets, or all instruction sets of the at least one instruction set of the second plurality of instruction sets are the same as all instruction sets of the one or more instruction sets of the second plurality of instruction sets, or all instruction sets of the at least one instruction set of the second plurality of instruction sets are different than all instruction sets of the one or more instruction sets of the second plurality of instruction sets.

16. The method of claim 1, wherein elements of the computing system are included in: a single device, or multiple devices, and wherein the one or more processor circuits include: one or more computing circuits, or one or more electronic circuits, and wherein the memory includes: a volatile memory, or a non-volatile memory, and wherein the first learning process and the second learning process use: a same learning algorithm, or different learning algorithms, and wherein an instruction set of the first plurality of instruction sets includes at least one selected from the group comprising: only one instruction, a plurality of instructions, one or more inputs, one or more commands, one or more DBMS commands, one or more computer commands, one or more structured query language (SQL) statements, one or more keywords, one or more operators, one or more variables, one or more values, one or more parameters, one or more objects or object references, one or more functions or function references, one or more user inputs, one or more user operating instructions, one or more representations of one or more user clicks, one or more representations of one or more user actions, one or more representations of one or more user actions on one or more graphical elements, one or more representations of one or more user actions on one or more physical elements, one or more codes, one or more data, and one or more information, and wherein an instruction set of the second plurality of instruction sets includes at least one selected from the group comprising: only one instruction, a plurality of instructions, one or more inputs, one or more commands, one or more DBMS commands, one or more computer commands, one or more SQL statements, one or more keywords, one or more operators, one or more variables, one or more values, one or more parameters, one or more objects or object references, one or more functions or function references, one or more user inputs, one or more user operating instructions, one or more representations of one or more user clicks, one or more representations of one or more user actions, one or more representations of one or more user actions on one or more graphical elements, one or more representations of one or more user actions on one or more physical elements, one or more codes, one or more data, and one or more information, and wherein the at least one instruction set of the second plurality of instruction sets includes: at least one instruction set for accessing an element of the first DBMS, at least one instruction set for creating an element of the first DBMS, at least one instruction set for altering an element of the first DBMS, at least one instruction set for deleting an element of the first DBMS, at least one instruction set for inserting an element into the first DBMS, at least one instruction set for searching an element of the first DBMS, at least one instruction set for sorting an element of the first DBMS, at least one instruction set for rearranging an element of the first DBMS, at least one instruction set for managing an element of the first DBMS, at least one instruction set for manipulating an element of the first DBMS, at least one instruction set for performing at least one operation on at least one element of the first DBMS, or at least one instruction set for performing at least one operation on the first DBMS, and wherein the first DBMS includes: an Oracle DBMS, a Microsoft SQL Server DBMS, a MySQL DBMS, an IBM DB2 DBMS, a relational DBMS, an application that uses the first DBMS, an application that includes the first DBMS, a system that uses the first DBMS, a system that includes the first DBMS, an interface for the first DBMS, one or more databases, one or more data structures, or one or more elements that at least store data, and wherein the second DBMS includes: an Oracle DBMS, a Microsoft SQL Server DBMS, a MySQL DBMS, an IBM DB2 DBMS, a relational DBMS, an application that uses the second DBMS, an application that includes the second DBMS, a system that uses the second DBMS, a system that includes the second DBMS, an interface for the second DBMS, one or more databases, one or more data structures, or one or more elements that at least store data.

17. One or more non-transitory machine readable media storing machine readable code that when executed by one or more processor circuits causes the one or more processor circuits to perform at least:

accessing a memory that stores at least a first plurality of instruction sets for performing one or more operations on a first database management system (DBMS) and a second plurality of instruction sets for performing one or more operations on the first DBMS, wherein at least a portion of the first plurality of instruction sets is learned in a first learning process and at least a portion of the second plurality of instruction sets is learned in a second learning process;

determining at least one instruction set of the second plurality of instruction sets based on at least partial match between a new one or more instruction sets and one or more instruction sets of the second plurality of instruction sets, or receiving a selection of at least one instruction set of the second plurality of instruction sets; and at least in response to the determining or the receiving, causing the first DBMS or a second DBMS to perform at least one operation defined by the at least one instruction set of the second plurality of instruction sets at least by causing an execution of the at least one instruction set of the second plurality of instruction sets, wherein the execution of the at least one instruction set of the second plurality of instruction sets is performed in a temporal order in which the at least one instruction set of the second plurality of instruction sets are learned in the second learning process.

18. The one or more non-transitory machine readable media of claim 17, wherein the execution of the at least one instruction set of the second plurality of instruction sets is performed by at least one selected from the group comprising: the one or more processor circuits, another one or more processor circuits, the first DBMS, the second DBMS, and one or more other execution elements.

19. A system comprising:

a memory that stores at least a first plurality of instruction sets for performing one or more operations on a first database management system (DBMS) and a second plurality of instruction sets for performing one or more operations on the first DBMS, wherein at least a portion of the first plurality of instruction sets is learned in a first learning process and at least a portion of the second plurality of instruction sets is learned in a second learning process;

means for determining at least one instruction set of the second plurality of instruction sets based on at least partial match between a new one or more instruction sets and one or more instruction sets of the second plurality of instruction sets, or means for receiving a selection of at least one instruction set of the second plurality of instruction sets; and means for executing the at least one instruction set of the second plurality of instruction sets at least in response to the determining or the receiving, wherein the executing the at least one instruction set of the second plurality of instruction sets is performed in a temporal order in which the at least one instruction set of the second plurality of instruction sets are learned in the second learning process, and wherein the first DBMS or a second DBMS performs at least one operation defined by the at least one instruction set of the second plurality of instruction sets.

20. The system of claim 19, wherein the means for determining the at least one instruction set of the second plurality of instruction sets based on the at least partial match between the new one or more instruction sets and the one or more instruction sets of the second plurality of instruction sets includes one or more processor circuits, and wherein the means for receiving the selection of the at least one instruction set of the second plurality of instruction sets includes one or more processor circuits, and wherein the means for executing the at least one instruction set of the second plurality of instruction sets includes one or more processor circuits.

* * * * *